US009613497B2

(12) United States Patent
Miller et al.

(10) Patent No.: US 9,613,497 B2
(45) **Date of Patent: *Apr. 4, 2017**

(54) AMUSEMENT DEVICE INCLUDING MEANS FOR PROCESSING ELECTRONIC DATA IN PLAY OF A GAME OF CHANCE

(71) Applicant: CFPH, LLC, New York, NY (US)

(72) Inventors: Mark A. Miller, Chicago, IL (US); Dean P. Alderucci, Westport, CT (US); Thomas D. Bradshaw, New York, NY (US)

(73) Assignee: CFPH, LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/322,508

(22) Filed: Jul. 2, 2014

(65) Prior Publication Data

US 2015/0080077 A1 Mar. 19, 2015

Related U.S. Application Data

(63) Continuation of application No. 12/479,954, filed on Jun. 8, 2009, now Pat. No. 8,771,078.

(51) Int. Cl.

| | |
|---|---|
| ***A63F 13/00*** | (2014.01) |
| ***G07F 17/32*** | (2006.01) |
| ***A63F 1/18*** | (2006.01) |
| *A63F 9/24* | (2006.01) |

(52) U.S. Cl.

CPC ............ *G07F 17/3293* (2013.01); *A63F 1/18* (2013.01); *G07F 17/32* (2013.01); *G07F 17/3223* (2013.01); *G07F 17/3232* (2013.01); *G07F 17/3258* (2013.01); *A63F 2009/2454* (2013.01)

(58) Field of Classification Search

None

See application file for complete search history.

(56) References Cited

U.S. PATENT DOCUMENTS

| | | | | |
|---|---|---|---|---|
| 4,900,903 | A | 2/1990 | Wright et al. | |
| 5,585,787 | A * | 12/1996 | Wallerstein ........ | G06Q 20/3415 235/380 |
| 5,823,873 | A | 10/1998 | Moody | |
| 6,007,066 | A | 12/1999 | Moody | |
| 6,098,985 | A | 8/2000 | Moody | |
| 6,524,240 | B1 | 2/2003 | Thede | |
| 6,890,260 | B2 * | 5/2005 | Ollins .................... | G07F 17/32 385/123 |
| 6,906,495 | B2 | 6/2005 | Cheng et al. | |
| 6,906,496 | B1 | 6/2005 | Grace | |

(Continued)

FOREIGN PATENT DOCUMENTS

| | | | |
|---|---|---|---|
| WO | WO 2006/037349 | A1 | 4/2006 |
| WO | WO 2008/045464 | A2 | 4/2008 |

OTHER PUBLICATIONS

D.-H. Kim and J.A. Rogers, "Stretchable Electronics: Materials Strategies and Devices," Advanced Materials 20, 4887-4892 (2008).

(Continued)

*Primary Examiner* — Sunit Pandya

(74) *Attorney, Agent, or Firm* — Mark Miller

(57) ABSTRACT

Various card devices and methods involving card devices are described. Other embodiments are also described.

25 Claims, 52 Drawing Sheets

(56) References Cited

U.S. PATENT DOCUMENTS 7,097,108 B2 * 8/2006 Zellner ............ G06K 19/06206 235/492
7,189,161 B1 3/2007 Wiltshire et al.
7,200,266 B2 4/2007 Ozer et al.
7,438,992 B2 10/2008 Barker et al.
7,458,825 B2 12/2008 Atsmon et al.
7,552,467 B2 6/2009 Lindsay
7,975,927 B1 * 7/2011 Whitney ............ G06K 19/0704 235/492
8,020,775 B2 * 9/2011 Mullen ............ G06K 19/06206 235/380
8,057,303 B2 * 11/2011 Rasmussen ......... G07F 17/3218 463/16
8,087,988 B2 * 1/2012 Nguyen .................. G07F 17/32 463/17
8,115,451 B2 2/2012 Griffin, Jr.
8,169,185 B2 5/2012 Partovi et al.
8,419,535 B2 4/2013 Miller et al.
8,545,327 B2 10/2013 Miller et al.
8,545,328 B2 10/2013 Miller et al.
8,613,671 B2 12/2013 Miller et al.
8,771,078 B2 7/2014 Miller et al.
8,784,189 B2 7/2014 Miller et al.
2003/0048254 A1 3/2003 Huang
2004/0083111 A1 * 4/2004 Rehbein ................. G06Q 30/06 434/157
2004/0248073 A1 12/2004 Pinkerman et al.
2005/0184993 A1 8/2005 Ludwin et al.
2005/0189139 A1 9/2005 Stole
2006/0058090 A1 * 3/2006 Crawford, III ..... G07F 17/3293 463/13
2007/0111014 A1 5/2007 Katsoulis et al.
2007/0191074 A1 8/2007 Harrist et al.
2007/0191075 A1 8/2007 Greene et al.
2007/0243456 A1 10/2007 Ahn et al.
2007/0259716 A1 11/2007 Mattice et al.
2007/0259717 A1 11/2007 Mattice et al.
2008/0051043 A1 2/2008 Greene et al.
2008/0063931 A1 3/2008 Zucker
2008/0067247 A1 3/2008 McGregor et al.
2008/0076505 A1 3/2008 Nguyen et al.
2008/0076506 A1 3/2008 Nguyen et al.
2008/0102957 A1 5/2008 Burman et al.
2008/0113772 A1 5/2008 Burrill et al.
2008/0169910 A1 7/2008 Greene et al.
2008/0203903 A1 8/2008 De Kok et al.
2008/0234024 A1 9/2008 Connors et al.
2008/0246026 A1 10/2008 Kim
2008/0252570 A1 10/2008 Kwon
2008/0265754 A1 10/2008 Young et al.
2008/0265759 A1 10/2008 Young et al.
2008/0268934 A1 10/2008 Mattice et al.
2008/0280682 A1 11/2008 Brunner et al.
2008/0284693 A1 11/2008 Sarma et al.
2008/0295327 A1 12/2008 Aeling et al.
2008/0297448 A1 12/2008 Mizukoshi et al.
2008/0303782 A1 12/2008 Grant et al.
2008/0309867 A1 12/2008 Kampstra
2009/0001380 A1 1/2009 Yang et al.
2009/0009396 A1 1/2009 Yang
2009/0009496 A1 1/2009 Kwak et al.
2009/0058361 A1 3/2009 John
2009/0087024 A1 4/2009 Eaton et al.
2009/0093300 A1 4/2009 Lutnick et al.
2009/0103161 A1 4/2009 Kothari et al.
2010/0121719 A1 * 5/2010 Blair ...................... G06Q 30/02 705/14.64
2010/0130280 A1 * 5/2010 Arezina .............. G07F 17/3206 463/20

OTHER PUBLICATIONS

International Search Report and Written Opinion for International Application No. PCT/US10/37690, dated Oct. 22, 2010 (13 pages).
USPTO Office Action for U.S. Appl. No. 12/479,938, Jan. 11, 2012 (6 pages).
International Preliminary Report on Patentability for International Application No. PCT/US10/37690, dated Dec. 12, 2011 (10 pages).
USPTO Office Action for U.S. Appl. No. 12/479,954, Feb. 22, 2012 (6 pages).
USPTO Office Action for U.S. Appl. No. 12/479,964, Apr. 4, 2012 (6 pages).
USPTO Office Action for U.S. Appl. No. 12/479,968, Apr. 13, 2012 (9 pages).
USPTO Office Action for U.S. Appl. No. 12/479,976, Oct. 27, 2011 (5 pages).
USPTO Office Action for U.S. Appl. No. 12/479,976, Jul. 3, 2012 (6 pages).
USPTO Notice of Allowance and Fees Due for U.S. Appl. No. 12/479,997, Jun. 12, 2012 (10 pages).
USPTO Office Action for U.S. Appl. No. 12/479,987, Jun. 7, 2012 (11 pages).
USPTO Office Action for U.S. Appl. No. 12/479,938, Sep. 18, 2012 (11 pages).
USPTO Office Action for U.S. Appl. No. 12/479,954, Feb. 26, 2013 (13 pages).
USPTO Office Action for U.S. Appl. No. 12/479,964, Oct. 30, 2012 (10 pages).
USPTO Notice of Allowance and Fees Due for U.S. Appl. No. 12/479,968, Nov. 27, 2012 (10 pages).
USPTO Office Action for U.S. Appl. No. 12/479,987, Feb. 6, 2013 (14 pages).
USPTO Office Action for U.S. Appl. No. 12/479,938, May 21, 2013 (14 pages).
USPTO Notice of Allowance and Fees Due for U.S. Appl. No. 12/479,964, Jun. 12, 2013 (12 pages).
USPTO Notice of Allowance and Fees Due for U.S. Appl. No. 12/479,976, Apr. 4, 2013 (9 pages).
USPTO Notice of Allowance and Fees Due for U.S. Appl. No. 12/479,987, May 28, 2013 (12 pages).
USPTO Office Action for U.S. Appl. No. 12/479,938, Jul. 12, 2013 (2 pages).
USPTO Notice of Allowance and Fees Due for U.S. Appl. No. 12/479,938, Oct. 23, 2013 (12 pages).
USPTO Notice of Allowance and Fees Due for U.S. Appl. No. 12/479,954, Oct. 24, 2013 (11 pages).
U.S. Appl. No. 12/194,593, filed Aug. 20, 2008, Lutnick et al.

* cited by examiner

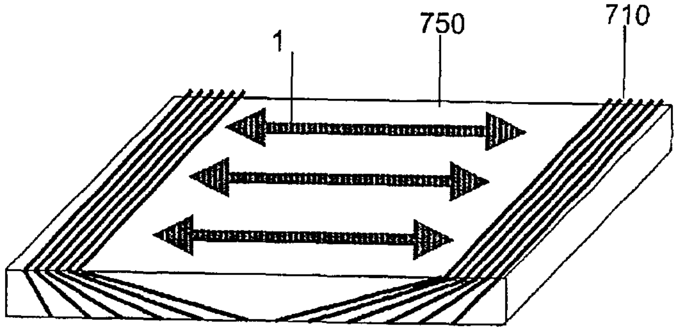
Figure 61C
Figure 61D
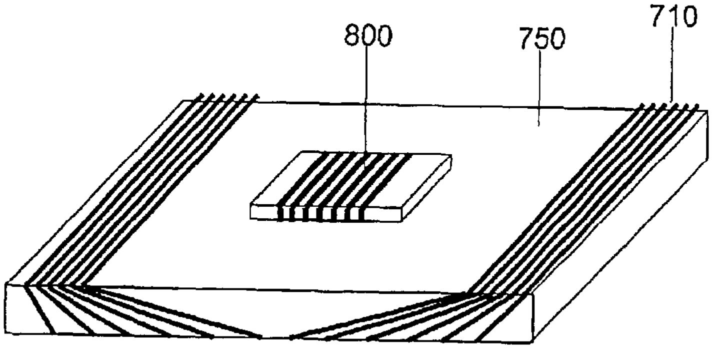
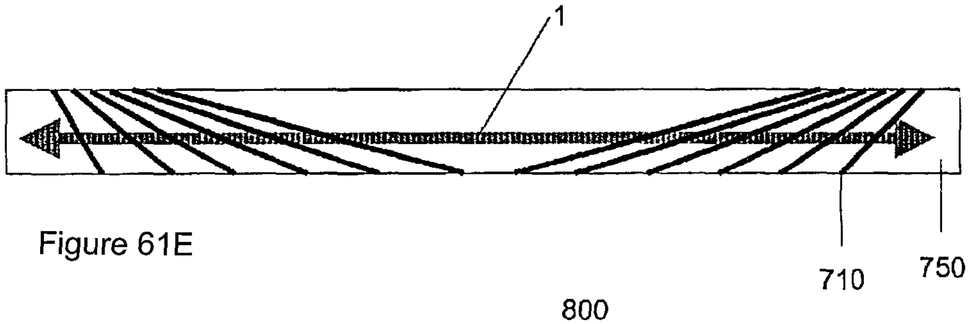
Figure 61E
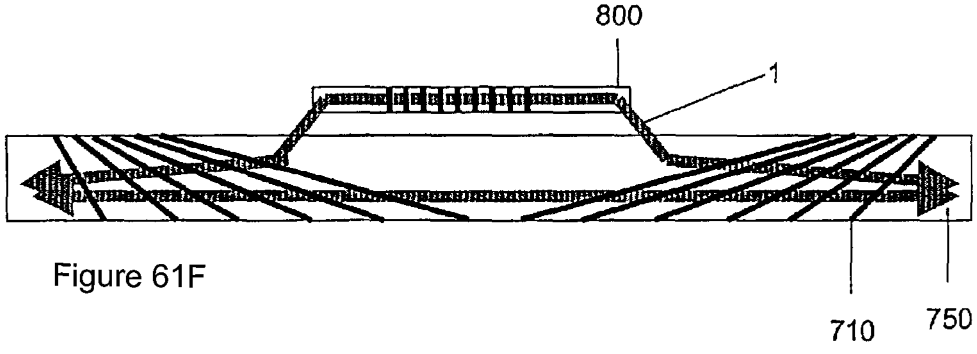
Figure 61F Figure 63
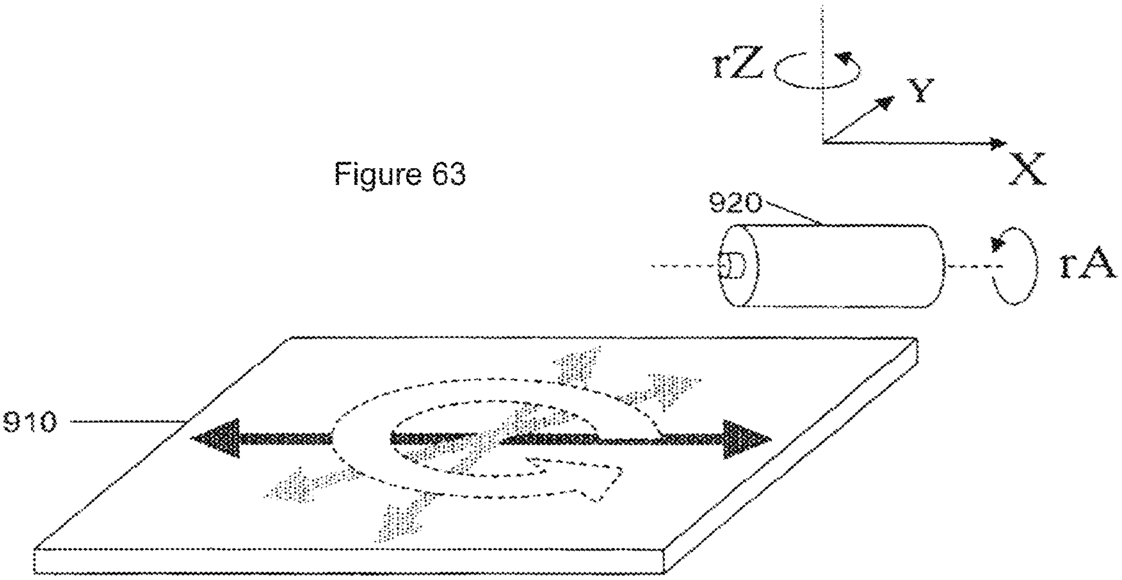
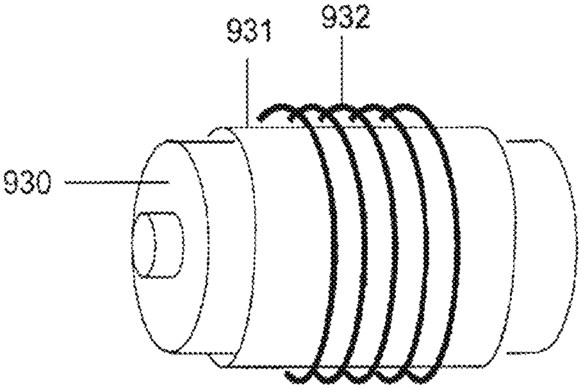
Figure 64A

AMUSEMENT DEVICE INCLUDING MEANS FOR PROCESSING ELECTRONIC DATA IN PLAY OF A GAME OF CHANCE

CROSS REFERENCE TO RELATED APPLICATIONS

The present application is a continuation of U.S. patent application Ser. No. 12/479,954 filed Jun. 8, 2009, which is hereby incorporated by reference herein in its entirety.

BRIEF DESCRIPTION OF THE FIGURES

FIGS. 54A-77 illustrate various example power related components and techniques that may be used in some embodiments.

DETAILED DESCRIPTION

Figure 1:
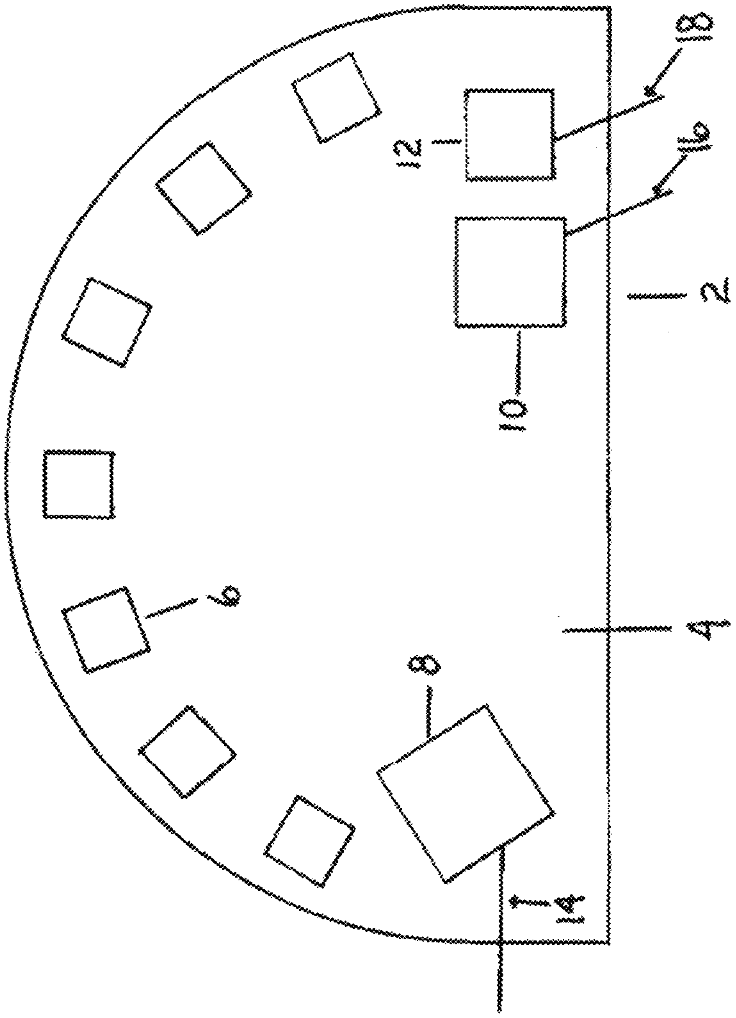
FIG. 1 shows a block diagram of components for a hand-reading system, according to some embodiments.

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Where a system is referred to as an "external system" it should be understood that such a system may be external to a device being described. For example, when referring to a card device, if an external system is mentioned, such a system may include a system that is not physically part of the card device (e.g., such as a deck device, a central system 503, and so on).

Some things are described herein as flexible. It should be understood that the term flexible applied to a thing when used herein means that the thing may be flexed beyond an inconsequential amount (e.g., less than a double digit number of degrees from a normal layout), using normal human force without causing damage to the thing. In contrast, a rigid thing may be a thing that is not capable of ever being flexed, or a thing that may be flexed an inconsequential amount, a thing that may be flexed with an amount of force beyond normal human force, or a thing that may be flexed but with a high likelihood that damage will result to the thing. For example, a traditional circuit board is rigid because such a circuit board may only be flexed an imperceptible amount with normal human force, any additional flexing requires greater than normal human force, and flexing of a traditional circuit board is highly likely to cause damage to the circuit board and/or components coupled to the circuit board. In contrast, a traditional playing card is flexible because it may be flexed a large amount with normal human force and without a high chance of causing damage to the playing card.

In some embodiments, a plurality of things have a combined structure that is flexible. The things themselves may include rigid portions and/or rigid things, and/or flexible portions and/or flexible things. For example, a flexible substrate with a rigid processor attached to it may have a combined structure that is flexible. The combined structure may be flexible if the combination of the things may be flexed beyond an inconsequential amount (e.g., less than a double digit number of degrees from a normal layout), using normal human force without causing damage to the things or the combination of the thing. In the example, a rigid processor attached to a flexible substrate may have a combined structure that is flexible, for example, if the substrate may be flexed using normal human force without causing damage to the processor or the substrate or the combination of the two. In one example implementation, the processor may be of a size so that the processor is unaffected by the flexing of the substrate (e.g., occupies only a small portion of a substrate).

Some embodiments include an edge of a device. An edge of a device should be recognized as having any desired shape. For example, an edge may be a straight line in some embodiments. An edge however, may be curvilinear.

Some embodiments may include display, communication of and so on of one or more types of information. One example type of information that may be used in some embodiments includes gaming information. Gaming information may include information on which an outcome of a game is based (e.g., card values), information about options available in a game (e.g., things a player can do at a current time in a game), information about recommendations based on a state of a game (e.g., base don historic information, based on a strategy, etc.), outcome information, game rules, and/or any other types of information related to a game. Other types of information may include non-gaming information, such as advertising information, and so on.

Some embodiments may include a first thing coupled to a second thing. The term coupled should be broadly interpreted to include, for example, soldered to, formed on/in, embedded on/in, mounted to, attached to, glued to, printed on, and so on. For example, some embodiments, may include circuitry printed on a substrate, components formed on the substrate, components embedded in the substrate, and so on, all of which may be considered coupled to the substrate. In some embodiments, a first thing may be coupled to a second thing through any number of third things. For example, in some implementations, a touch input element may be coupled to a substrate through a display (e.g., one or more touch sensitive layers on top of a display on top of a substrate). Accordingly, it should be understood that coupled to does not mean directly coupled to unless otherwise specified.

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth□, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

IX. Incorporation by Reference

Any patent, patent application or other document referred to herein is incorporated by reference into this patent application as part of the present disclosure, but only for purposes of written description and enablement in accordance with 35 U.S.C. §112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. Cards

Playing cards have been in existence for many years. Although there are many types of playing cards that are played in many different types of games, the most common type of playing cards consists of 52 cards, divided out into four different suits (namely Spades, Hearts, Diamonds and Clubs) which are printed or indicated on one side or on the face of each card. In the standard deck, each of the four suits of cards consists of 13 cards, numbered either two through ten, or lettered A (Ace), K (King), Q (Queen), or J (Jack), which is also printed or indicated on the face of each card. Each card will thus contain on its face a suit indication along with a number or letter indication. The King, Queen, and Jack usually also include some sort of design on the face of the card, and may be referred to as picture cards. Other types of playing cards are described herein, but it should be recognized that various topics may apply to any, some, and/or all type of playing cards.

In some cases, the 52 card standard playing deck also contains a number of extra cards, sometimes referred to as jokers, that may have some use or meaning depending on the particular game being played with the deck. For example, if a card game includes the jokers, then if a player receives a joker in his "hand" he may use it as any card in the deck. If the player has the ten, jack, queen and king of Spades, along with a joker, the player would use the joker as an Ace of Spades. The player will then have a Royal Flush (ten through Ace of Spades).

Many different games can be played using a standard deck of playing cards. The game being played with the standard deck of cards may include other items, such as game boards, chips, etc., or the game being played may only need the playing card deck itself. In most of the games played using a standard deck of cards, a value is assigned to each card. The value may differ for different games.

Usually, the card value begins with the number two card as the lowest value and increases as the numbers increase through ten, followed in order of increasing value with the Jack, Queen, King and Ace. In some games the Ace may have a lower value than the two, and in games where a particular card is determined to be wild, or have any value, that card may have the greatest value of all. For example, in card games where deuces, or twos, are wild, the player holding a playing card containing a two can use that two as any other card, such that a nine and a two would be the equivalent of two nines.

Further, the four different suits indicated on the cards may have a particular value depending on the game. Under game rules where one suit, i.e., Spades, has more value than another suit, i.e., Hearts, the seven of Spades may have more value than the seven of Hearts.

It is easy to visualize that using the different card quantity and suit values, many different games can be played. In certain games, it is the combination of cards that one player obtains that determines whether or not that player has defeated the other player or players. Usually, the more difficult the combination is to obtain, the more value the combination has, and the player who obtains the more difficult combination (also taking into account the value of the cards) wins the game.

For instance in the game of Poker, each player may ultimately receive five cards. The player who obtains three cards having similar numbers on their face, i.e., the four of Hearts, four of Diamonds and four of Clubs, will defeat the player having only two cards with the same numerical value, i.e., the King of Spades and the King of Hearts. However, the player with five cards that all contain Clubs, commonly known as a flush, will defeat the player with the same three of a kind described above.

In many instances, a standard deck of playing cards is used to create gaming machines. In these gaming machines players insert coins and play certain card games, such as poker, using an imitation of standard playing cards on a video screen, in an attempt to win back more money than they originally inserted into the machine.

Another form of gambling using playing cards utilizes tables, otherwise known as table games. A table uses a table and a dealer, with the players sitting or standing around the table. The players place their bets on the table and the dealer deals the cards to each player. The number of cards dealt, or whether the cards are dealt face up or face down, will depend on the particular table game being played.

Further, an imitation or depiction of a standard playing card is used in many handheld electronic games, such as poker and blackjack, and in many computer games and Internet games. Using a handheld electronic game or a computer terminal that may or may not be connected to the Internet, a player receives the imitation playing cards and plays a card game either against the computer or against other players. Further, many of these games can be played on the computer in combination with gambling.

Also, there are many game shows that are broadcasted on television that use a deck of playing cards in the game play, in which the cards are usually enlarged or shown on a video screen or monitor for easy viewing. In these television game shows, the participants play the card game for prizes or money, usually against each other, with an individual acting as a host overseeing the action.

Also, there are lottery tickets that players purchase and play by "scratching off" an opaque layer to see if they have won money and prizes. The opaque layer prevents the player from knowing the results of the lottery ticket prior to purchasing and scratching off the layer. In some of these lottery tickets, playing cards are used under the opaque layer and the player may need to match a number of similar cards in order to win the prizes or money.

XII. Rules of Card Games

Rules of Poker

In a basic poker game, which is played with a standard 52-card deck, each player is dealt five cards. All five cards in each player's hand are evaluated as a single hand with the presence of various combinations of the cards such as pairs, three-of-a-kind, straight, etc. Determining which combinations prevail over other combinations is done by reference to a table containing a ranking of the combinations. Rankings in most tables are based on the odds of each combination occurring in the player's hand. Regardless of the number of cards in a player's hand, the values assigned to the cards, and the odds, the method of evaluating all five cards in a player's hand remain the same.

Poker is a popular skill-based card game in which players with fully or partially concealed cards make wagers into a central pot. The pot is awarded to the player or players with the best combination of cards or to the player who makes an uncalled bet. Poker can also refer to video poker, a single-player game seen in casinos much like a slot machine, or to other games that use poker hand rankings.

Poker is played in a multitude of variations, but most follow the same basic pattern of play.

The right to deal each hand typically rotates among the players and is marked by a token called a 'dealer' button or buck. In a casino, a house dealer handles the cards for each hand, but a button (typically a white plastic disk) is rotated clockwise among the players to indicate a nominal dealer to determine the order of betting.

For each hand, one or more players are required to make forced bets to create an initial stake for which the players will contest. The dealer shuffles the cards, he cuts, and the appropriate number of cards are dealt to the players one at a time. Cards may be dealt either face-up or face-down, depending on the variant of poker being played. After the initial deal, the first of what may be several betting rounds begins. Between rounds, the players' hands develop in some way, often by being dealt additional cards or replacing cards previously dealt. At the end of each round, all bets are gathered into the central pot.

At any time during a betting round, if a player makes a bet, opponents are required to fold, call or raise. If one player bets and no opponents choose to match the bet, the hand ends immediately, the bettor is awarded the pot, no cards are required to be shown, and the next hand begins. The ability to win a pot without showing a hand makes bluffing possible. Bluffing is a primary feature of poker, one that distinguishes it from other vying games and from other games that make use of poker hand rankings.

At the end of the last betting round, if more than one player remains, there is a showdown, in which the players reveal their previously hidden cards and evaluate their hands. The player with the best hand according to the poker variant being played wins the pot.

The most popular poker variants are as follows:

Draw Poker

Players each receive five—as in five-card draw—or more cards, all of which are hidden. They can then replace one or more of these cards a certain number of times.

Stud Poker

Players receive cards one at a time, some being displayed to other players at the table. The key difference between stud and 'draw' poker is that players are not allowed to discard or replace any cards.

Community Card Poker

Players combine individually dealt cards with a number of "community cards" dealt face up and shared by all players. Two or four individual cards may be dealt in the most popular variations, Texas hold 'em and Omaha hold 'em, respectively.

Poker Hand Rankings

Straight Flush

A straight flush is a poker hand such as Q♠ J♠ 10♠ 9♠ 8♠, which contains five cards in sequence, all of the same suit. Two such hands are compared by their high card in the same way as are straights. The low ace rule also applies: 5♦ 4♦ 3♦ 2♦ A♦ is a 5-high straight flush (also known as a "steel wheel"). An ace-high straight flush such as A♣ K♣ Q♣ J♣ 10♣ is known as a royal flush, and is the highest ranking standard poker hand (excluding five of a kind).

Examples:

7♥ 6♥ 5♥ 4♥ 3♥ beats 5♠ 4♠ 3♠ 2♠ A♠

J♣ 10♣ 9♣ 8♣ 7♣ ties J♦ 10♦ 9♦ 8♦ 7♦

Four of a Kind

Four of a kind, or quads, is a poker hand such as 9♣ 9♠ 9♦ 9♥ J♥, which contains four cards of one rank, and an unmatched card. It ranks above a full house and below a straight flush. Higher ranking quads defeat lower ranking ones. Between two equal sets of four of a kind (possible in wild card and community card games), the kicker determines the winner.

Examples:

10♣ 10♦ 10♥ 10♠ 5♦ ("four tens" or "quad tens") defeats 6♦ 6♥ 6♠ 6♣ K♠ ("four sixes" or "quad sixes")

10♣ 10♦ 10♥ 10♠ Q♣ ("four tens, queen kicker") defeats 10♣ 10♦ 10♥ 10♠ 5♦ ("four tens with a five")

Full House

A full house, also known as a boat or a full boat, is a poker hand such as 3♣ 3♠ 3♦ 6♣ 6♥, which contains three matching cards of one rank, plus two matching cards of another rank. It ranks below a four of a kind and above a flush. Between two full houses, the one with the higher ranking set of three wins. If two have the same set of three (possible in wild card and community card games), the hand with the higher pair wins. Full houses are described by the three of a kind (e.g. Q-Q-Q) and pair (e.g. 9-9), as in "Queens over nines" (also used to describe a two pair), "Queens full of nines" or simply "Queens full".

Examples:

10♠ 10♥ 10♦ 4♠ 4♦ ("tens full") defeats 9♥ 9♣ 9♠ A♥ A♣ ("nines full")

K♠ K♣ K♥ 3♦ 3♠ ("kings full") defeats 3♠ 3♥ 3♦ K♠ K♦ ("threes full")

Q♥ Q♦ Q♣ 8♥ 8♣ ("queens full of eights") defeats Q♥ Q♦ Q♣ 5♠ 5♥ ("queens full of fives")

Flush

A flush is a poker hand such as Q♣ 10♣ 7♣ 6♣ 4♣, which contains five cards of the same suit, not in rank sequence. It ranks above a straight and below a full house. Two flushes are compared as if they were high card hands. In other words, the highest ranking card of each is compared to determine the winner; if both have the same high card, then the second-highest ranking card is compared, etc. The suits have no value: two flushes with the same five ranks of cards are tied. Flushes are described by the highest card, as in "queen-high flush".

Examples:

A♥ Q♥ 10♥ 5♥ 3♥ ("ace-high flush") defeats K♠ Q♠ J♠ 9♠ 6♠ ("king-high flush")

A♦ K♦ 7♦ 6♦ 2♦ ("flush, ace-king high") defeats A♥ Q♥ 10♥ 5♥ 3♥ ("flush, ace-queen high")

Q♥ 10♥ 9♥ 5♥ 2♥ ("heart flush") ties Q♠ 10♠ 9♠ 5♠ 2♠ ("spade flush")

Straight

A straight is a poker hand such as Q♣ J♠ 10♠ 9♥ 8♥, which contains five cards of sequential rank, of varying suits. It ranks above three of a kind and below a flush. Two straights are ranked by comparing the high card of each. Two straights with the same high card are of equal value, and split any winnings (straights are the most commonly tied hands in poker, especially in community card games). Straights are described by the highest card, as in "queen-high straight" or "straight to the queen".

A hand such as A♣ K♣ Q♦ J♠ 10♠ is an ace-high straight, and ranks above a king-high straight such as K♥ Q♠ J♥ 10♥ 9♦. But the ace may also be played as a 1-spot in a hand such as 5♠ 4♦ 3♦ 2♠ A♣, called a wheel or five-high straight, which ranks below the six-high straight 6♠ 5♣ 4♣ 3♥ 2♥. The ace may not "wrap around", or play both high and low in the same hand: 3♣ 2♦ A♠ K♠ Q♣ is not a straight, but just ace-high no pair.

Examples:

8♠ 7♠ 6♥ 5♥ 4♠ ("eight-high straight") defeats 6♦ 5♠ 4♦ 3♥ 2♣ ("six-high straight")

8♠ 7♠ 6♥ 5♥ 4♠ ties 8♥ 7♦ 6♣ 5♣ 4♥

Three of a Kind

Three of a kind, also called trips, set or a prile, is a poker hand such as 2♦ 2♠ 2♥ K♠ 6♠, which contains three cards of the same rank, plus two unmatched cards. It ranks above two pair and below a straight. Higher ranking three of a kind defeat lower ranking three of a kinds. If two hands have the same rank three of a kind (possible in games with wild cards or community cards), the kickers are compared to break the tie.

Examples:

8♠ 8♥ 8♦ 5♠ 3♣ ("three eighths") defeats 5♣ 5♥ 5♦ Q♦ 10♣ ("three fives")

8♠ 8♥ 8♦ A♣ 2♦ ("three eighths, ace kicker") defeats 8♠ 8♥ 8♦ 5♠ 3♣ ("three eighths, five kicker")

Two Pair

A poker hand such as J♥ J♣ 4♣ 4♠ 9♠, which contains two cards of the same rank, plus two cards of another rank (that match each other but not the first pair), plus one unmatched card, is called two pair. It ranks above one pair and below three of a kind. Between two hands containing two pair, the higher ranking pair of each is first compared, and the higher pair wins. If both have the same top pair, then the second pair of each is compared. Finally, if both hands have the same two pairs, the kicker determines the winner. Two pair are described by the higher pair (e.g., K♥ K♣) and the lower pair (e.g., 9♠ 9♦), as in "Kings over nines", "Kings and nines" or simply "Kings up".

Examples:

K♥ K♦ 2♣ 2♦ J♥ ("kings up") defeats J♦ J♠ 10♠ 10♣ 9♠ ("jacks up")

9♣ 9♦ 7♦ 7♠ 6♥ ("nines and sevens") defeats 9♥ 9♠ 5♥ 5♦ K♣ ("nines and fives")

4♠ 4♣ 3♠ 3♥ K♦ ("fours and threes, king kicker") defeats 4♥ 4♦ 3♦ 3 10♠ ("fours and threes with a ten")

One Pair

One pair is a poker hand such as 4♥ 4♠ K♠ 10♦ 5♠, which contains two cards of the same rank, plus three unmatched cards. It ranks above any high card hand, but below all other poker hands. Higher ranking pairs defeat lower ranking pairs. If two hands have the same rank of pair, the non-paired cards in each hand (the kickers) are compared to determine the winner.

Examples:

10♣ 10♠ 6♠ 4♥ 2♥ ("pair of tens") defeats 9♥ 9♣ A♥ Q♦ 10♦ ("pair of nines")

10♥ 10♦ J♦ 3♥ 2♣ ("tens with jack kicker") defeats 10♣ 10♠ 6♠ 4♥ 2♥ ("tens with six kicker")

2♦ 2♥ 8♠ 5♣ 4♣ ("deuces, eight-five-four") defeats 2♣ 2♠ 8♣ 5♥ 3♥ ("deuces, eight-five-three")

High Card

A high-card or no-pair hand is a poker hand such as K♥ J♣ 8♣ 7♦ 3♠, in which no two cards have the same rank, the five cards are not in sequence, and the five cards are not all the same suit. It can also be referred to as "nothing" or "garbage," and many other derogatory terms. It ranks below all other poker hands. Two such hands are ranked by comparing the highest ranking card; if those are equal, then the next highest ranking card; if those are equal, then the third highest ranking card, etc. No-pair hands are described by the one or two highest cards in the hand, such as "king high" or "ace-queen high", or by as many cards as are necessary to break a tie.

Examples:

A♦ 10♦ 9♠ 5♣ 4♣ ("ace high") defeats K♣ Q♦ J♣ 8♥ 7♥ ("king high")

A♣ Q♣ 7♦ 5♥ 2♣ ("ace-queen") defeats A♦ 10♦ 9♠ 5♣ 4♠ ("ace-ten")

7♠ 6♣ 5♣ 4♦ 2♥ ("seven-six-five-four") defeats 7♣ 6♦ 5♦ 3♥ 2♣ ("seven-six-five-three")

Decks Using a Bug

The use of joker as a bug creates a slight variation of game play. When a joker is introduced in standard poker games it functions as a fifth ace, or can be used as a flush or straight card (though it can be used as a wild card too). Normally casino draw poker variants use a joker, and thus the best possible hand is five of a kind, as in A♥ A♦ A♣ A♠ Joker.

Rules of Caribbean Stud

Caribbean Stud™ poker may be played as follows. A player and a dealer are each dealt five cards. If the dealer has a poker hand having a value less than Ace-King combination or better, the player automatically wins. If the dealer has a poker hand having a value of an Ace-King combination or better, then the higher of the player's or the dealer's hand wins. If the player wins, he may receive an additional bonus payment depending on the poker rank of his hand. In the commercial play of the game, a side bet is usually required to allow a chance at a progressive jackpot. In Caribbean Stud™ poker, it is the dealer's hand that must qualify. As the dealer's hand is partially concealed during play (usually only one card, at most) is displayed to the player before player wagering is complete), the player must always be aware that even ranked player hands can lose to a dealer's hand and no bonus will be paid out unless the side bet has been made, and then usually only to hands having a rank of a flush or higher.

Rules of Blackjack

Some versions of Blackjack are now described. Blackjack hands are scored according to the point total of the cards in the hand. The hand with the highest total wins as long as it is 21 or less. If the total is greater than 21, it is a called a "bust." Numbered cards 2 through 10 have a point value equal to their face value, and face cards (i.e., Jack, Queen and King) are worth 10 points. An Ace is worth 11 points unless it would bust a hand, in which case it is worth 1 point. Players play against the dealer and win by having a higher point total no greater than 21. If the player busts, the player loses, even if the dealer also busts. If the player and dealer have hands with the same point value, this is called a "push," and neither party wins the hand.

After the initial bets are placed, the dealer deals the cards, either from one or more, but typically two, hand-held decks of cards, or from a "shoe" containing multiple decks of cards, generally at least four decks of cards, and typically many more. A game in which the deck or decks of cards are hand-held is known as a "pitch" game. "Pitch" games are generally not played in casinos. When playing with more than one deck, the decks are shuffled together in order to make it more difficult to remember which cards have been dealt and which have not. The dealer deals two cards to each player and to himself. Typically, one of the dealer's two cards is dealt face-up so that all players can see it, and the other is face down. The face-down card is called the "hole card." In a European variation, the "hole card" is dealt after all the players' cards are dealt and their hands have been played. The players' cards are dealt face up from a shoe and face down if it is a "pitch" game.

A two-card hand with a point value of 21 (i.e., an Ace and a face card or a 10) is called a "Blackjack" or a "natural" and wins automatically. A player with a "natural" is conventionally paid 3:2 on his bet, although in 2003 some Las Vegas casinos began paying 6:5, typically in games with only a single deck.

Once the first two cards have been dealt to each player and the dealer, the dealer wins automatically if the dealer has a "natural" and the player does not. If the player has a "natural" and the dealer does not, the player automatically wins. If the dealer and player both have a "natural," neither party wins the hand.

If neither side has a "natural," each player completely plays out their hand; when all players have finished, the dealer plays his hand.

The playing of the hand typically involves a combination of four possible actions "hitting," "standing," "doubling down," or "splitting" his hand. Often another action called "surrendering" is added. To "hit" is to take another card. To "stand" is to take no more cards. To "double down" is to double the wager, take precisely one more card and then "stand." When a player has identical value cards, such as a pair of 8s, the player can "split" by placing an additional wager and playing each card as the first card in two new hands. To "surrender" is to forfeit half the player's bet and give up his hand. "Surrender" is not an option in most casino games of Blackjack. A player's turn ends if he "stands," "busts" or "doubles down." If the player "busts," he loses even if the dealer subsequently busts. This is the house advantage.

After all players have played their hands, the dealer then reveals the dealer's hole card and plays his hand. According to house rules (the prevalent casino rules), the dealer must hit until he has a point total of at least 17, regardless of what the players have. In most casinos, the dealer must also hit on a "soft" 17 (e.g., an Ace and 6). In a casino, the Blackjack table felt is marked to indicate if the dealer hits or stands on a soft 17. If the dealer busts, all remaining players win. Bets are normally paid out at odds of 1:1.

Four of the common rule variations are one card split Aces, early surrender, late surrender and double-down restrictions. In the first variation, one card is dealt on each Ace and the player's turn is over. In the second, the player has the option to surrender before the dealer checks for Blackjack. In the third, the player has the option to surrender after the dealer checks for Blackjack. In the fourth, doubling-down is only permitted for certain card combinations.

Insurance

Insurance is a commonly-offered betting option in which the player can hedge his bet by wagering that the dealer will win the hand. If the dealer's "up card" is an Ace, the player is offered the option of buying Insurance before the dealer checks his "hole card." If the player wishes to take Insurance, the player can bet an amount up to half that of his original bet. The Insurance bet is placed separately on a special portion of the table, which is usually marked with the words "Insurance Pays 2:1." The player buying Insurance is betting that the dealer's "hole card" is one with a value of 10 (i.e., a 10, Jack, Queen or King). Because the dealer's up card is an Ace, the player who buys Insurance is betting that the dealer has a "natural."

If the player originally bets $10 and the dealer shows an Ace, the player can buy Insurance by betting up to $5. Suppose the player makes a $5 Insurance bet and the player's hand with the two cards dealt to him totals 19. If the dealer's hole card is revealed to be a 10 after the Insurance betting period is over (the dealer checks for a "natural" before the players play their hands), the player loses his original $10 bet, but he wins the $5 Insurance bet at odds of 2:1, winning $10 and therefore breaking even. In the same situation, if the dealer's hole card is not one with a value of ten, the player immediately loses his $5 Insurance bet. But if the player chooses to stand on 19, and if the dealer's hand has a total value less than 19, at the end of the dealer's turn, the player wins his original $10 bet, making a net profit of $5. In the same situation, if the dealer's hole card is not one with a value of ten, again the player will immediately lose their $5 Insurance bet, and if the dealer's hand has a total value greater than the player's at the end of both of their turns, for example the player stood on 19 and the dealer ended his turn with 20, the player loses both his original $10 bet and his $5 Insurance bet.

Basic Strategy

Blackjack players can increase their expected winnings by several means, one of which is "basic strategy." "Basic strategy" is simply something that exists as a matter of general practice; it has no official sanction. The "basic strategy" determines when to hit and when to stand, as well as when doubling down or splitting in the best course. Basic strategy is based on the player's point total and the dealer's visible card. Under some conditions (e.g., playing with a single deck according to downtown Las Vegas rules) the house advantage over a player using basic strategy can be as low as 0.16%. Casinos offering options like surrender and double-after-split may be giving the player using basic strategy a statistical advantage and instead rely on players making mistakes to provide a house advantage.

A number of optional rules can benefit a skilled player, for example: if doubling down is permitted on any two-card hand other than a natural; if "doubling down" is permitted after splitting; if early surrender (forfeiting half the bet against a face or Ace up card before the dealer checks for Blackjack) is permitted; if late surrender is permitted; if re-splitting Aces is permitted (splitting when the player has more than two cards in their hand, and has just been dealt a second ace in their hand); if drawing more than one card against a split Ace is permitted; if five or more cards with a total no more than 21 is an automatic win (referred to as "Charlies").

Other optional rules can be detrimental to a skilled player. For example: if a "natural" pays less than 3:2 (e.g., Las Vegas Strip single-deck Blackjack paying out at 6:5 for a "natural"); if a hand can only be split once (is re-splitting possible for other than aces); if doubling down is restricted to certain totals (e.g., 9 11 or 10 11); if Aces may not be re-split; if the rules are those of "no-peek" (or European) Blackjack, according to which the player loses hands that have been split or "doubled down" to a dealer who has a "natural' (because the dealer does not check for this automatically winning hand until the players had played their hands); if the player loses ties with the dealer, instead of pushing where neither the player or the dealer wins and the player retains their original bet.

Card Counting

Unlike some other casino games, in which one play has no influence on any subsequent play, a hand of Blackjack removes those cards from the deck. As cards are removed from the deck, the probability of each of the remaining cards being dealt is altered (and dealing the same cards becomes impossible). If the remaining cards have an elevated proportion of 10-value cards and Aces, the player is more likely to be dealt a natural, which is to the player's advantage (because the dealer wins even money when the dealer has a natural, while the player wins at odds of 3:2 when the player has a natural). If the remaining cards have an elevated proportion of low-value cards, such as 4s, 5s and 6s, the player is more likely to bust, which is to the dealer's advantage (because if the player busts, the dealer wins even if the dealer later busts).

The house advantage in Blackjack is relatively small at the outset. By keeping track of which cards have been dealt, a player can take advantage of the changing proportions of the remaining cards by betting higher amounts when there is an elevated proportion of 10-value cards and Aces and by better lower amounts when there is an elevated proportion of low-value cards. Over time, the deck will be unfavorable to the player more often than it is favorable, but by adjusting the amounts that he bets, the player can overcome that inherent disadvantage. The player can also use this information to refine basic strategy. For instance, basic strategy calls for hitting on a 16 when the dealer's up card is a 10, but if the player knows that the deck has a disproportionately small number of low-value cards remaining, the odds may be altered in favor of standing on the 16.

There are a number of card-counting schemes, all dependent for their efficacy on the player's ability to remember either a simplified or detailed tally of the cards that have been played. The more detailed the tally, the more accurate it is, but the harder it is to remember. Although card counting is not illegal, casinos will eject or ban successful card counters if they are detected.

Shuffle tracking is a more obscure, and difficult, method of attempting to shift the odds in favor of the player. The player attempts to track groups of cards during the play of a multi-deck shoe, follow them through the shuffle, and then looks for the same group to reappear from the new shoe, playing and betting accordingly.

XIII. Tracking the Action at a Table

U.S. Pat. No. 6,579,181 generally describes, "a system for automatically monitoring playing and wagering of a game. In one illustrated embodiment, the system includes a card deck reader that automatically reads a respective symbol from each card in a deck of cards before a first one of the cards is removed from the deck. The symbol identifies a value of the card in terms of rank and suit, and can take the form of a machine-readable symbol, such as a bar code, area or matrix code or stacked code. In another aspect, the system does not decode the read symbol until the respective card is dealt, to ensure security.

"In another aspect, the system can include a chip tray reader that automatically images the contents of a chip tray. The system periodically determines the number and value of chips in the chip tray from the image, and compares the change in contents of the chip tray to the outcome of game play to verify that the proper amounts have been paid out and collected.

"In a further aspect, the system can include a table monitor that automatically images the activity or events occurring at a gaming table. The system periodically compares images of the gaming table to identify wagering, as well as the appearance, removal and position of cards and/or other objects on the gaming table. The table monitoring system can be unobtrusively located in the chip tray."

U.S. Pat. No. 6,579,181 generally describes "a drop box that automatically verifies an amount and authenticity of a deposit and reconciles the deposit with a change in the contents of the chip tray. The drop box can image different portions of the deposited item, selecting appropriate lighting and resolutions to examine security features in the deposited item.

"In another aspect, the system can employ some, or all of the components to monitor the gaming habits of players and the performance of employees. The system can detect suspect playing and wagering patterns that may be prohibited. The system can also identify the win/loss percentage of the players and the dealer, as well as a number of other statistically relevant measures. Such measures can provide a casino or other gaming establishment with enhanced automated security, and automated real-time accounting. The measures can additionally provide a basis for automatically allocating complimentary benefits to the players."

Various embodiments include an apparatus, method and system which utilizes a card dispensing shoe with scanner and its associated software which enable the card dealer when dealing the game from a card dispensing shoe with scanner preferably placed on a game table where the twenty-one game to be evaluated by the software is being played, to use one or more keyboard(s) and/or LCD displays coupled to the shoe to identify for the computer program the number of the active players' seats, or active players, including the dealer's position relative thereto and their active play at the game table during each game round dealt from the shoe. These keyboards and LCD displays are also used to enter other data relevant to each seat's, or player's, betting and/or decision strategies for each hand played. The data is analyzed by a computer software program designed to evaluate the strategy decisions and betting skills of casino twenty-one, or blackjack players playing the game of blackjack during real time. The evaluation software is coupled to a central processing unit (CPU) or host computer that is also coupled to the shoe's keyboard(s) and LCD displays. The dealer using one or more keyboard(s) attached to or carried by the shoe, or a keyboard(s) located near the dealer is able to see and record the exact amount bet by each player for each hand played for the game to be evaluated. The optical scanner coupled to the CPU reads the value of each card dealt to each player's hand(s) and the dealer's hand as each card is dealt to a specific hand, seat or position and converts the game card value of each card dealt from the shoe to the players and the dealer of the game to a card count system value for one or more card count systems programmed into the evaluation software. The CPU also records each players decision(s) to hit a hand, and the dealer's decision to hit or take another card when required by the rules of the game, as the hit card is removed from the shoe. The dealer uses one or more of the keyboards and LCD displays carried by the shoe to record each player's decision(s) to Insure, Surrender, Stand, Double Down, or Split a hand. When the dealer has an Ace or a Ten as an up-card, he/she may use one or more of the keyboards to prompt the computer system's software, since the dealer's second card, or hole-card, which is dealt face down, has been scanned and the game card value thereof has been imported into the computer systems software, to instantly inform the dealer, by means of one or more of the shoe's LCDs, if his/her game cards, or hand total, constitutes a two-card "21" or "Blackjack".

In various embodiments, a card playing system for playing a card game which includes a card delivery shoe apparatus for use in dealing playing cards to at least one player for the playing of the card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying each of the playing cards received by each player from the shoe, for evaluating information relative to each players received playing cards and their values with information as to playing tactics used by each player relative to the values of the received playing cards, and for combining all of this information for identifying each player's playing strategy, and a playing table coupled to the card delivery shoe apparatus and having at least one keypad means located thereon for permitting at least one player to select various card playing options to wager upon.

In various embodiments, a card playing system for playing a card game which includes a card delivery shoe apparatus for use in dealing playing cards to at least one player for the playing of the card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying such of the playing cards received by each player from the shoe apparatus, for evaluating information relative to each player's received playing cards and their values with information as to betting tactics used by each player relative to playing cards previously dealt out from the shoe apparatus providing card count information, and for combining all of this information for identifying each player's card count strategy, and a playing table coupled to the card delivery shoe apparatus and having at least one keypad means located thereon for permitting the at least one player to select at least one of various card playing options to wager upon.

In various embodiments, a card playing system for playing a card game which includes a card delivery shoe apparatus for use in dealing playing cards to at least one player for the playing of a card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying each of the playing cards received by each player from the shoe apparatus, for evaluating information relative to each player's received playing cards and their values with information as to playing tactics used by each player relative to the values of the received playing cards, for combining use of all of this information for identifying each player's playing strategy, and for also identifying each player's card count strategy based on each player's betting tactics used by each player relative to playing cards previously dealt out from the shoe apparatus providing card count information, and a playing table coupled to the card delivery shoe apparatus and having at least one keypad means located thereon for permitting the at least one player to select at least one of various card playing options to wager upon.

In various embodiments, a secure game table system, adapted for multiple sites under a central control, allows for the monitoring of hands in a progressive live card game. A live card game has at least one deck, with each deck having a predetermined number of cards. Each game table in the system has a plurality of player positions with or without players at each position and a dealer at a dealer position.

In one embodiment, for providing additional security, a common identity code is located on each of the cards in each deck. Each deck has a different common identity code. A shuffler is used to shuffle the decks together and the shuffler has a circuit for counting of the cards from a previous hand that are inserted into the shuffler for reshuffling. The shuffler circuit counts each card inserted and reads the common identity code located on each card. The shuffler circuit issues a signal corresponding to the count and the common identity code read. The game control (e.g., the computer) located at each table receives this signal from the shuffler circuit and verifies that no cards have been withdrawn from the hand by a player (or the dealer) or that no new cards have been substituted. If the count is not proper or if a game card lacks an identity code or an identity code is mismatched, an alarm signal is generated indicating that a new deck of cards needs to be used and that the possibility of a breach in the security of the game has occurred.

In yet another embodiment of security, a unique code, such as a bar code, is placed on each card and as each card is dealt by the dealer from a shoe, a detector reads the code and issues a signal to the game control containing at least the value and the suit of each card dealt in the hand. The detector may also read a common identity deck code and issue that as a signal to the game control. The shoe may have an optical scanner for generating an image of each card as it is dealt from the shoe by the dealer in a hand. The game control stores this information in a memory so that a history of each card dealt from the shoe in a hand is recorded.

In yet another embodiment of security, an integrated shuffler/shoe obtains an optical image of each card dealt from the shoe for a hand and for each card inserted into the shuffler after a hand. These images are delivered to the game control where the images are counted and compared. When an irregular count or comparison occurs, an alarm is raised. The shuffler and shoe are integrated to provide security between the two units.

In another embodiment of security for a live card game, a game bet sensor is located near each of the plurality of player positions for sensing the presence of a game bet. The game bet sensor issues a signal counting the tokens placed. It is entirely possible that game bet sensors at some player positions do not have bets, and therefore, the game control that is receptive of these signals identifies which player positions have players placing game bets. This information is stored in memory and becomes part of the history of the game.

In another embodiment of security, a progressive bet sensor is located at each of the plurality of player positions and senses the presence of a progressive bet. The progressive bet sensor issues a signal that is received by the game control, which records in memory the progressive bets being placed at the respective player position sensed. If a progressive bet is sensed and a game bet is not, the game control issues an alarm signal indicating improper betting. At this point, the game control knows the identity of each player location having placed a game bet and, of those player positions having game bets placed, which player positions also have a progressive bet. This is stored in memory as part of the history of the hand.

In yet another embodiment of security, a card sensor is located near each player position and the dealer position. The card sensor issues a signal for each card received at the card sensor. The game control receives this issued signal and correlates those player positions having placed a game bet with the received cards. In the event a player position without a game bet receives a card or a player position with a game bet receives a card out of sequence, the game control issues an alarm. This information is added to the history of the game in memory, and the history contains the value and suit of each card delivered to each player position having a game bet.

A progressive jackpot display may be located at each game table and may display one or more jackpot awards for one or more winning combinations of cards. In one embodiment of the present invention, the game control at each table has stored in memory the winning combinations necessary to win the progressive jackpots. Since the game control accurately stores the suit and value of each card received at a particular player position, the game control can automatically detect a winning combination and issue an award signal for that player position. The dealer can then verify that that player at that position indeed has the correct combination of cards. The game control continuously updates the central control interconnected to all other game tables so that the central control can then inform all game tables of this win including, if desirable, the name of the winner and the amount won.

The central control communicates continuously with each game control and its associated progressive jackpot display may receive over a communication link all or part of the information stored in each game control.

Various embodiments include a card shoe with a device for automatic recognition and tracking of the value of each gaming card drawn out of the card shoe in a covered way (face down).

Various embodiments include a gaming table with a device for automatic recognition of played or not played boxes (hands), whereby it has to realize multiple bets on each hand and the use of insurance lines. Further more, the gaming table may include a device to recognize automatically the number of cards placed in front of each player and the dealer.

Various embodiments include the recognition, tracking, and storage of gaming chips.

In various embodiment, an electronic data processing (EDP) program may process the value of all bets on each box and associated insurance line, control the sequence of delivery of the cards, control the distribution of the gaming cards to each player and the dealer, may calculate and compare the total score of each hand and the dealer's, and may evaluate the players' wins.

Gaming data may then be processed by means of the EDP program and shown simultaneously to the actual game at a special monitor or display. Same data may be recalled later on to monitor the total results whenever requested.

Various embodiments include a gaming table and a gaming table cloth arranged on the gaming table, the gaming table cloth provided with betting boxes and areas designated for placement of the gaming chips and other areas designated for placement of the playing cards, a card shoe for storage of one or more decks of playing cards, this card shoe including means for drawing individual ones of the playing cards face down so that a card value imprint on the drawn card is not visible to a player of the game of chance, a card recognition means for recognizing this card value imprint on the drawn card from the card shoe, this card recognition means being located in the card shoe, an occupation detector unit including means for registering a count of gaming chips placed on the designated areas and another count of playing cards placed on the other designated areas on the table cloth, this occupation detector unit being located under the table cloth and consisting of multiple single detectors allocated to each betting box, each area for chips and each other area for playing cards respectively, a gaming bet detector for automatic recognition or manual input of gaming bets, and a computer including means for evaluating the play of the game of chance according to the rules of the game of chance, means for storing results of the play of the game of chance and means for displaying a course of the play of the game of chance and the results from electronic signals input from the gaming bet detector, the occupation detector unit and the card recognition means.

According to various embodiments, the card recognition means comprises an optical window arranged along a movement path of the card image imprint on the playing card drawn from the card shoe; a pulsed light source for illuminating a portion of the drawn playing card located opposite the optical window; a CCD image converter for the portion of the drawn playing card located opposite the optical window; an optical device for deflecting and transmitting a reflected image of the card value imprint from the drawn playing card to the CCD image converter from that portion of the drawn playing card when the drawn card is exactly in a correct drawn position opposite the optical window; and sensor means for detecting movement of the drawn card and for providing a correct timing for operation of the pulsed light source for transmission of the reflected image to the CCD image converter. The optical device for deflecting and transmitting the reflected image can comprise a mirror arranged to deflect the reflected image to the CCD image converter. Alternatively, the optical device for deflecting and transmitting the reflected image comprises a reflecting optical prism having two plane surfaces arranged at right angles to each other, one of which covers the optical window and another of which faces the CCD image converter and comprises a mirror, and the pulsed light source is arranged behind the latter plane surface so as to illuminate the drawn card when the drawn card is positioned over the optical window. Advantageously the sensor means for detecting movement of the drawn card and for providing a correct timing comprises a single sensor, preferably either a pressure sensor or a photoelectric threshold device, for sensing a front edge of the drawn card to determine whether or not the drawn card is being drawn and to activate the CCD image converter and the pulsed light source when a back edge of the drawn card passes the sensor means. Alternatively, the sensor means can include two electro-optical sensors, one of which is located beyond a movement path of the card image imprint on the drawn playing card and another of which is located in a movement path of the card image imprint on a drawn playing card. The latter electro-optical sensor can includes means for activating the pulsed light source by sensing a color trigger when the card value imprint passes over the optical window. In preferred embodiments of the card shoe the pulsed light source comprises a Xenon lamp.

In various embodiments of the gaming apparatus the single detectors of the occupation detector unit each comprise a light sensitive sensor for detection of chips or playing cards arranged on the table cloth over the respective single detector. Each single detector can be an infrared sensitive photodiode, preferably a silicon photodiode. Advantageously the single detectors can be arranged in the occupation detector unit so that the chips or playing cards placed over them on the table cloth are arrange over at least two single detectors.

The gaming apparatus may includes automatic means for discriminating colored markings or regions on the chips and for producing a bet output signal in accordance with the colored markings or regions and the number of chips having identical colored markings or regions.

The gaming bet detector may include automatic means for discriminating between chips of different value in the game of chance and means for producing a bet output signal in accordance with the different values of the chips when the chips are bet by a player. In various embodiments the gaming bet detector includes a radio frequency transmitting and receiving station and the chips are each provided with a transponder responding to the transmitting and receiving station so that the transponder transmits the values of the bet chips back to the transmitting and receiving station.

The connection between the individual units of the gaming apparatus and the computer can be either a wireless connection or a cable connection.

XIV. Following the Bets

Various embodiments include a smart card delivery shoe that reads the suit and rank of each card before it is delivered to the various positions where cards are to be dealt in the play of the casino table card game. The cards are then dealt according to the rules of the game to the required card positions. Different games have diverse card distribution positions, different card numbers, and different delivery sequences that the hand identifying system of the invention must encompass. For example, in the most complex of card distribution games of blackjack, cards are usually dealt one at a time in sequence around a table, one card at a time to each player position and then to the dealer position. The one card at a time delivery sequence is again repeated so that each player position and the dealer position have an initial hand of exactly two cards. Complexity in hand development is introduced because players have essentially unlimited control over additional cards until point value in a hand exceeds a count of twenty-one. Players may stand with a count of 2 (two aces) or take a hit with a count of 21 if they are so inclined, so the knowledge of the count of a hand is no assurance of what a player will do. The dealer, on the other hand, is required to follow strict house rules on the play of the game according to the value of the dealer's hand. Small variances such as allowing or disallowing a hit on a "soft" seventeen count (e.g., an Ace and a 6) may exist, but the rules are otherwise very precise so that the house or dealer cannot exercise any strategy.

Other cards games may provide equal numbers of cards in batches. Variants of stud poker played against a dealer, for example, would usually provide hands of five cards, five at a time to each player position and if competing against a dealer, to the dealer position. This card hand distribution is quite simple to track as each sequence of five cards removed from the dealer shoe is a hand.

Other games may require cards to be dealt to players and other cards dealt to a flop or common card area. The system may also be programmable to cover this alternative if it is so desired.

Baccarat is closer to blackjack in card sequence of dealing, but has more rigid rules as to when hits may be taken by the player and the dealer, and each position may take a maximum of one card as a hit. The hand identification system of the invention must be able to address the needs of identifying hands in each of these types of games and especially must be able to identify hands in the most complex situation, the play of blackjack.

In various embodiments, where cameras are used to read cards, the light sensitive system may be any image capture system, digital or analog, that is capable of identifying the suit and rank of a card.

In various embodiments, a first step in the operation is to provide a set of cards to the smart delivery shoe, the cards being those cards that are going to be used in the play of a casino table card game. The set of cards (usually one or more decks) is provided in an already randomized set, being taken out of a shuffler or having been shuffled by hand. A smart delivery shoe is described in U.S. patent application Ser. No. 10/622,321, titled SMART DELIVERY SHOE, which application is incorporated herein in its entirety by reference. Some delivery systems or shoes with reading capability include, but are not limited to those disclosed in U.S. Pat. Nos. 4,750,743; 5,779,546; 5,605,334; 6,361,044; 6,217,447; 5,941,769; 6,229,536; 6,460,848; 5,722,893; 6,039,650; and 6,126,166. In various embodiments, the cards are read in the smart card delivery shoe, such as one card at a time in sequence. Reading cards by edge markings and special codes (as in U.S. Pat. No. 6,460,848) may require special encoding and marking of the cards. The entire sequence of cards in the set of cards may thus be determined and stored in memory. Memory may be at least in part in the smart delivery shoe, but communication with a central processor is possible. The sequence would then also or solely be stored in the central computer.

In various embodiments, the cards are then dealt out of the smart delivery shoe, the delivery shoe registering how many cards are removed one-at-a-time. This may be accomplished by the above identified U.S. patent application Ser. No. 10/622,321 where cards are fed to the dealer removal area one at a time, so only one card can be removed by the dealer. As each card is removed, a signal is created indicating that a specific card (of rank and suit) has been dealt. The computer and system knows only that a first card has been dealt, and it is presumed to go to the first player. The remaining cards are dealt out to players and dealer. In the play of certain games (e.g., stud variants) where specific numbers of cards are known to be dealt to each position, the shoe may be programmed with the number of players at any time, so hands can be correlated even before they have been dealt. If the shoe is playing a stud variant where each player and the dealer gets three cards (Three Card Poker™ game), the system may know in advance of the deal what each player and the dealer will have as a hand. It is also possible that there be a signal available when the dealer has received either his first card (e.g., when cards are dealt in sequence, one-at-a-time) or has received his entire hand. The signal may be used to automatically determine the number of player positions active on the table at any given time. For example, if in a hand of blackjack the dealer receives the sixth card, the system may immediately know that there are five players at the table. The signal can be given manually (pressing a button at the dealer position or on the smart card delivery shoe) or can be provided automatically (a card presence sensor at the dealer's position, where a card can be placed over the sensor to provide a signal). Where an automatic signal is provided by a sensor, some physical protection of the sensor may be provided, such as a shield that would prevent accidental contact with the sensor or blockage of the sensor. An L-shaped cover may be used so a card could be slid under the arm of the L parallel to the table surface and cover the sensor under that branch of the L. The signal can also be given after all cards for the hand have been delivered, again indicating the number of players, For example, when the dealer's two cards are slid under the L-shaped cover to block or contact the sensor, the system may know the total number of cards dealt on the hand (e.g., 10 cards), know that the dealer has 2 cards, determine that players therefore have 8 cards, and know that each player has 2 cards each, thereby absolutely determining that there are four active player positions at the table (10−2=8 and then 8/2=4 players). This automatic determination may serve as an alternative to having dealers input the number of players each hand at a table or having to manually change the indicated number of players at a table each time the number changes.

Once all active positions have been dealt to, the system may now know what cards are initially present in each player's hand, the dealer's hand, and any flop or common hand. The system operation may now be simple when no more cards are provided to play the casino table game. All hands may then be known and all outcomes may be predicted. The complication of additional cards will be addressed with respect to the game of blackjack.

After dealing the initial set of two cards per hand, the system may not immediately know where each remaining card will be dealt. The system may know what cards are dealt, however. It is with this knowledge and a subsequent identification of discarded hands that the hands and cards from the smart delivery shoe can be reconciled or verified. Each hand is already identified by the presence of two specifically known cards. Hands are then played according to the rules of the game, and hands are discarded when play of a hand is exhausted. A hand is exhausted when 1) there is a blackjack, the hand is paid, and the cards are cleared; 2) a hand breaks with a count over twenty-one and the cards are cleared; and/or a round of the game is played to a conclusion, the dealer's hand completed, all wagers are settled, and the cards are cleared. As is typically done in a casino to enable reconciling of hands manually, cards are picked up in a precise order from the table. The cards are usually cleared from the dealer's right to the dealer's left, and the cards at each position comprise the cards in the order that they were delivered, first card on the bottom, second card over the first card, third card over the second card, etc. maintaining the order or a close approximation of the order (e.g., the first two cards may be reversed) is important as the first two cards form an anchor, focus, basis, fence, end point or set edge for each hand. For example, if the third player position was known to have received the 10 of hearts (10H) and the 9 of spades (9S) for the first two card, and the fourth player was known to receive the 8 of diamonds (8D) and the 3 of clubs (3C) for the first two cards, the edges or anchors of the two hands are 9S/10H and 8D/3C. When the hands are swept at the conclusion of the game, the cards are sent to a smart discard rack (e.g., see U.S. patent application Ser. No. 10/622,388, which application is incorporated herein by reference in its entirety) and the hand with the 9S/10H was not already exhausted (e.g., broken or busted) and the swept cards consist of 9S, 10H, 8S, 8D and 3C (as read by the smart discard rack), the software of the processor may automatically know that the final hands in the third and fourth positions were a count of 19 (9S and 10H) for the third hand and 19 (8D and 3C originally plus the 8S hit) for the fourth hand. The analysis by the software specifically identifies the fourth hand as a count of 19 with the specific cards read by the smart discard shoe. The information from reading that now exhausted hand is compared with the original information collected from the smart delivery shoe. The smart delivery shoe information when combined with the smart discard rack information shall confirm the hands in each position, even though cards were not uniformly distributed (e.g., player one takes two hits for a total of four cards, player two takes three hits for a total of five cards, player three takes no hit for a total of two cards, player four takes one hit for a total of three cards, and the dealer takes two hits for a total of four cards).

The dealer's cards may be equally susceptible to analysis in a number of different formats. After the last card has been dealt to the last player, a signal may be easily and imperceptibly generated that the dealer's hand will now become active with possible hits. For example, with the sensor described above for sensing the presence of the first dealer card or the completion of the dealer's hand, the cards would be removed from beneath the L-shaped protective bridge. This type of movement is ordinarily done in blackjack where the dealer has at most a single card exposed and one card buried face down. In this case, the removal of the cards from over the sensor underneath the L-cover to display the hole card is a natural movement and then exposes the sensor. This can provide a signal to the central processor that the dealer's hand will be receiving all additional cards in that round of the game. The system at this point knows the two initial cards in the dealer's hand, knows the values of the next sequence of cards, and knows the rules by which a dealer must play. The system knows what cards the dealer will receive and what the final total of the dealer's hand will be because the dealer has no freedom of decision or movement in the play of the dealer's hand. When the dealer's hand is placed into the smart discard rack, the discard rack already knows the specifics of the dealer's hand even without having to use the first two cards as an anchor or basis for the dealer's hand. The cards may be treated in this manner in some embodiments.

When the hands are swept from the table, dealer's hand then players' hands from right to left (from the dealer's position or vice-versa if that is the manner of house play), the smart discard rack reads the shoes, identifies the anchors for each hand, knows that no hands swept at the conclusion can exceed a count of twenty-one, and the computer identifies the individual hands and reconciles them with the original data from the smart delivery shoe. The system thereby can identify each hand played and provide system assurance that the hand was played fairly and accurately.

If a lack of reconciling by the system occurs, a number of events can occur. A signal can be given directly to the dealer position, to the pit area, or to a security zone and the cards examined to determine the nature and cause of the error and inspect individual cards if necessary. When the hand and card data is being used for various statistical purposes, such as evaluating dealer efficiency, dealer win/loss events, player efficiency, player win/loss events, statistical habits of players, unusual play tactics or meaningful play tactics (e.g., indicative of card counting), and the like, the system may file the particular hand in a 'dump' file so that hand is not used in the statistical analysis, this is to assure that maximum benefits of the analysis are not tilted by erroneous or anomalous data.

Various embodiments may include date stamping of each card dealt (actual time and date defining sequence, with concept of specific identification of sequence identifier possibly being unique). The date stamping may also be replaced by specific sequence stamping or marking, such as a specific hand number, at a specific table, at a specific casino, with a specific number of players, etc. The records could indicate variations of indicators in the stored memory of the central computer of Lucky 777 Casino, Aug. 19, 1995, 8:12:17 a.m., Table 3, position 3, hand 7S/4D/9S, or simply identify something similar by alphanumeric code as L7C-819-95-3-3-073-7S/4D/9S (073 being the 73$^{rd}$ hand dealt). This date stamping of hands or even cards in memory can be used as an analytical search tool for security and to enhance hand identification.

FIG. 1 shows a block diagram of the minimum components for the hand-reading system on a table 4 of the invention, a smart card-reading delivery shoe 8 with output 14 and a smart card-reading discard rack 12 with output 18. Player positions 6 are shown, as is a dealer's hand position sensor 10 without output port 16.

The use of the discard rack acting to reconcile hands returned to the discard rack out-of-order (e.g., blackjack or bust) automatically may be advantageous, in some embodiments. The software as described above can be programmed to recognize hands removed out-of-dealing order on the basis of knowledge of the anchor cards (the first two cards) known to have been dealt to a specific hand. For example, the software will identify that when a blackjack was dealt to position three, that hand will be removed, the feed of the third hand into the smart card discard tray confirms this, and position three will essentially be ignored in future hand resolution. More importantly, when the anchor cards were, for example, 9S/5C in the second player position and an exhausted hand of 8D/9S/5C is placed into the smart discard rack, that hand will be identified as the hand from the second player position. If two identical hands happen to be dealt in the same round of play, the software will merely be alerted (it knows all of the hands) to specifically check the final order of cards placed into the smart discard rack to more carefully position the location of that exhausted hand. This is merely recognition software implementation once the concept is understood.

That the step of removal of cards from the dealer's sensor or other initiated signal identifies that all further cards are going to the dealer may be useful in defining the edges of play between rounds and in identifying the dealer's hand and the end of a round of play. When the dealer's cards are deposited and read in the smart discard rack, the central computer knows that another round of play is to occur and a mark or note may be established that the following sequence will be a new round and the analytical cycle may begin all over again.

The discard rack indicates that a complete hand has been delivered by absence of additional cards in the Discard Rack in-feed tray. When cards are swept from an early exhausted hand (blackjack or a break), they are swept one at a time and inserted into the smart discard rack one at a time. When the smart discard rack in-feed tray is empty, the system understands that a complete hand has been identified, and the system can reconcile that specific hand with the information from the smart delivery shoe. The system can be hooked-up to feed strategy analysis software programs such as the SMI licensed proprietary Bloodhound™ analysis program.

Various embodiments include a casino or cardroom game modified to include a progressive jackpot component. During the play of a Twenty-One game, for example, in addition to this normal wager, a player will have the option of making an additional wager that becomes part of, and makes the player eligible to win, the progressive jackpot. If the player's Twenty-One hand comprises a particular, predetermined arrangement of cards, the player will win all, or part of, the amount showing on the progressive jackpot. This progressive jackpot feature is also adaptable to any other casino or cardroom game such as Draw Poker, Stud Poker, Lo-Ball Poker or Caribbean Stud™ Poker. Various embodiments include a gaming table, such as those used for Twenty-One or poker, modified with the addition of a coin acceptor that is electronically connected to a progressive jackpot meter. When player drops a coin into the coin acceptor, a light is activated at the player's location indicating that he is participating in the progressive jackpot component of the game during that hand. At the same time, a signal from the coin acceptor is sent to the progressive meter to increment the amount shown on the progressive meter. At the conclusion of the play of each hand, the coin acceptor is reset for the next hand. When a player wins all or part of the progressive jackpot, the amount showing on the progressive jackpot meter is reduced by the amount won by the player. Any number of gaming tables can be connected to a single progressive jackpot meter.

XV. Card Shufflers

Various embodiments include an automatic card shuffler, including a card mixer for receiving cards to be shuffled in first and second trays. Sensors detect the presence of cards in these trays to automatically initiate a shuffling operation, in which the cards are conveyed from the trays to a card mixer, which randomly interleaves the cards delivered to the mixing mechanism and deposits the interleaved cards in a vertically aligned card compartment.

A carriage supporting an ejector is reciprocated back and forth in a vertical direction by a reversible linear drive while the cards are being mixed, to constantly move the card ejector along the card receiving compartment. The reversible linear drive is preferably activated upon activation of the mixing means and operates simultaneously with, but independently of, the mixing means. When the shuffling operation is terminated, the linear drive is deactivated thereby randomly positioning the card ejector at a vertical location along the card receiving compartment.

A sensor arranged within the card receiving compartment determines if the stack of cards has reached at least a predetermined vertical height. After the card ejector has stopped and, if the sensor in the compartment determines that the stack of cards has reached at least the aforesaid predetermined height, a mechanism including a motor drive, is activated to move the wedge-shaped card ejector into the card receiving compartment for ejecting a group of the cards in the stack, the group selected being determined by the vertical position attained by the wedge-shaped card ejector.

In various embodiments, the card ejector pushes the group of cards engaged by the ejector outwardly through the forward open end of the compartment, said group of cards being displaced from the remaining cards of the stack, but not being completely or fully ejected from the stack.

The card ejector, upon reaching the end of its ejection stroke, detected by a microswitch, is withdrawn from the card compartment and returned to its initial position in readiness for a subsequent shuffling and card selecting operation.

In various embodiments, a technique for randomly selecting the group of cards to be ejected from the card compartment utilizes solid state electronic circuit means, which may comprise either a group of discrete solid state circuits or a microprocessor, either of which techniques preferably employ a high frequency generator for stepping a N-stage counter during the shuffling operation. When the shuffling operation is completed, the stepping of the counter is terminated. The output of the counter is converted to a DC signal, which is compared against another DC signal representative of the vertical location of the card ejector along the card compartment.

In various embodiments, a random selection is made by incrementing the N-stage counter with a high frequency generator. The high frequency generator is disconnected from the N-stage counter upon termination of the shuffling operation. The N-stage counter is then incremented by a very low frequency generator until it reaches its capacity count and resets. The reciprocating movement of the card ejector is terminated after completion of a time interval of random length and extending from the time the high frequency generator is disconnected from the N-stage counter to the time that the counter is advanced to its capacity count and reset by the low frequency generator, triggering the energization of the reciprocating drive, at which time the card ejector carriage coasts to a stop.

In various embodiments, the card ejector partially ejects a group of cards from the stack in the compartment. The partially displaced group of cards is then manually removed from the compartment. In another preferred embodiment, the ejector fully ejects the group of cards from the compartment, the ejected cards being dropped into a chute, which delivers the cards directly to a dealing shoe. The pressure plate of the dealing shoe is initially withdrawn to a position enabling the cards passing through the delivery shoe to enter directly into the dealing shoe, and is thereafter returned to its original position at which it urges the cards towards the output end of the dealing shoe.

Various embodiments include a method and apparatus for automatically shuffling and cutting playing cards and delivering shuffled and cut playing cards to the dispensing shoe without any human intervention whatsoever once the playing cards are delivered to the shuffling apparatus. In addition, the shuffling operation may be performed as soon as the play of each game is completed, if desired, and simultaneously with the start of a new game, thus totally eliminating the need to shuffle all of the playing cards (which may include six or eight decks, for example) at one time. Preferably, the cards played are collected in a "dead box" and are drawn from the dead box when an adequate number of cards have been accumulated for shuffling and cutting using the method of the present invention.

Various embodiments include a computer controlled shuffling and cutting system provided with a housing having at least one transparent wall making the shuffling and card delivery mechanism easily visible to all players and floor management in casino applications. The housing is provided with a reciprocally slidable playing card pusher which, in the first position, is located outside of said housing. A motor-operated transparent door selectively seals and uncovers an opening in the transparent wall to permit the slidably mounted card pusher to be moved from its aforementioned first position to a second position inside the housing whereupon the slidably mounted card pusher is then withdrawn to the first position, whereupon the playing cards have been deposited upon a motorized platform which moves vertically and selectively in the upward and downward directions.

The motor driven transparent door is lifted to the uncovered position responsive to the proper location of the motor driven platform, detected by suitable sensor means, as well as depression of a foot or hand-operated button accessible to the dealer.

The motor driven platform (or "elevator") lifts the stack of playing cards deposited therein upwardly toward a shuffling mechanism responsive to removal of the slidably mounted card pusher and closure of the transparent door whereupon the playing cards are driven by the shuffling mechanism in opposing directions and away from the stack to first and second card holding magazines positioned on opposing sides of the elevator, said shuffling mechanism comprising motor driven rollers rotatable upon a reciprocating mounting device, the reciprocating speed and roller rotating speed being adjustable. Alternatively, however, the reciprocating and rotating speeds may be fixed; if desired, employing motors having fixed output speeds, in place of the stepper motors employed in one preferred embodiment.

Upon completion of a shuffling operation, the platform is lowered and the stacks of cards in each of the aforementioned receiving compartments are sequentially pushed back onto the moving elevator by suitable motor-driven pushing mechanisms. The order of operation of the pushing mechanisms is made random by use of a random numbers generator employed in the operating computer for controlling the system. These operations can be repeated, if desired. Typically, new cards undergo these operations from two to four times.

Guide assemblies guide the movement of cards onto the platform, prevent shuffled cards from being prematurely returned to the elevator platform and align the cards as they fall into the card receiving regions as well as when they are pushed back onto the elevator platform by the motor-driven pushing mechanism.

Upon completion of the plurality of shuffling and cutting operations, the platform is again lowered, causing the shuffled and cut cards to be moved downwardly toward a movable guide plate having an inclined guide surface.

As the motor driven elevator moves downwardly between the guide plates, the stack of cards engages the inclined guide surface of a substantially U-shaped secondary block member causing the stack to be shifted from a horizontal orientation to a diagonal orientation. Substantially simultaneously therewith, a "drawbridge-like" assembly comprised of a pair of swingable arms pivotally mounted at their lower ends, are swung downwardly about their pivot pin from a vertical orientation to a diagonal orientation and serve as a diagonally aligned guide path. The diagonally aligned stack of cards slides downwardly along the inclined guide surfaces and onto the draw bridge-like arms and are moved downwardly therealong by the U-shaped secondary block member, under control of a stepper motor, to move cards toward and ultimately into the dealing shoe.

A primary block, with a paddle, then moves between the cut-away portion of the U-shaped secondary block, thus applying forward pressure to the stack of cards. The secondary block then retracts to the home position. The paddle is substantially rectangular-shaped and is aligned in a diagonal orientation. Upon initial set-up of the system the paddle is positioned above the path of movement of cards into the dealing shoe. The secondary block moves the cut and shuffled cards into the dealing shoe and the paddle is lowered to the path of movement of cards toward the dealing shoe and is moved against the rearwardmost card in the stack of cards delivered to the dealing shoe. When shuffling and cutting operations are performed subsequent to the initial set-up, the paddle rests against the rearwardmost card previously delivered to the dealing shoe. The shuffled and cut cards sliding along the guide surfaces of the diagonally aligned arms of the draw bridge-like mechanism come to rest upon the opposite surface of the paddle which serves to isolate the playing cards previously delivered to the dispensing shoe, as well as providing a slight pushing force urging the cards toward the outlet slot of the dispensing shoe thereby enabling the shuffling and delivering operations to be performed simultaneously with the dispensing of playing cards from the dispensing shoe.

After all of the newly shuffled playing cards have been delivered to the rear end of the dispensing shoe, by means of the U-shaped secondary block the paddle which is sandwiched between two groups of playing cards, is lifted to a position above and displaced from the playing cards. A movable paddle mounting assembly is then moved rearwardly by a motor to place the paddle to the rear of the rearmost playing card just delivered to the dispensing shoe; and the paddle is lowered to its home position, whereupon the motor controlling movement of the paddle assembly is then deenergized enabling the rollingly-mounted assembly supporting the paddle to move diagonally downwardly as playing cards are dispensed from the dispensing shoe to provide a force which is sufficient to urge the playing cards forwardly toward the playing card dispensing slot of the dealing shoe. The force acting upon the paddle assembly is the combination of gravity and a force exerted upon the paddle assembly by a constant tension spring assembly. Jogging (i.e., "dither") means cause the paddle to be jogged or reciprocated in opposing forward and rearward directions at periodic intervals to assure appropriate alignment, stacking and sliding movement of the stack of playing cards toward the card dispensing slot of the dealing shoe.

Upon completion of a game, the cards used in the completed game are typically collected by the dealer and placed in a dead box on the table. The collected cards are later placed within the reciprocally movable card pusher. The dealer has the option of inserting the cards within the reciprocally slidable card pusher into the shuffling mechanism or, alternatively, and preferably, may postpone a shuffling operation until a greater number of cards have been collected upon the reciprocally slidable card pusher. The shuffling and delivery operations may be performed as often or as infrequently as the dealer or casino management may choose. The shuffling and playing card delivery operations are fully automatic and are performed without human intervention as soon as cards are inserted within the machine on the elevator platform. The cards are always within the unobstructed view of the players to enable the players, as well as the dealer, to observe and thereby be assured that the shuffling, cutting and card delivery operations are being performed properly and without jamming and that the equipment is working properly as well. The shuffling and card delivery operations do not conflict or interfere with the dispensing of cards from the dispensing shoe, thereby permitting these operations to be performed substantially simultaneously, thus significantly reducing the amount of time devoted to shuffling and thereby greatly increasing the playing time, as well as providing a highly efficient random shuffling and cutting mechanism.

The system may be controlled by a microcomputer programmed to control the operations of the card shuffling and cutting system. The computer controls stepper motors through motor drive circuits, intelligent controllers and an opto-isolator linking the intelligent controllers to the computer. The computer also monitors a plurality of sensors to assure proper operation of each of the mechanisms of the system.

XVI. Casino Countermeasures

Some methods of thwarting card counters include using a large number of decks. Shoes containing 6 or 8 decks are common. The more cards there are, the less variation there is in the proportions of the remaining cards and the harder it is to count them. The player's advantage can also be reduced by shuffling the cards more frequently, but this reduces the amount of time that can be devoting to actual play and therefore reduces the casino profits. Some casinos now use shuffling machines, some of which shuffle one set of cards while another is in play, while others continuously shuffle the cards. The distractions of the gaming floor environment and complimentary alcoholic beverages also act to thwart card counters. Some methods of thwarting card counters include using varied payoff structures, such Blackjack payoff of 6:5, which is more disadvantageous to the player than the standard 3:2 Blackjack payoff.

XVII. Video Wagering Games

Video wagering games are set up to mimic a table game using adaptations of table games rules and cards.

In one version of video poker the player is allowed to inspect five cards randomly chosen by the computer. These cards are displayed on the video screen and the player chooses which cards, if any, that he or she wishes to hold. If the player wishes to hold all of the cards, i.e., stand, he or she presses a STAND button. If the player wishes to hold only some of the cards, he or she chooses the cards to be held by pressing HOLD keys located directly under each card displayed on the video screen. Pushing a DEAL button after choosing the HOLD cards automatically and simultaneously replaces the unchosen cards with additional cards which are randomly selected from the remainder of the deck. After the STAND button is pushed, or the cards are replaced, the final holding is evaluated by the game machine's computer and the player is awarded either play credits or a coin payout as determined from a payoff table. This payoff table is stored in the machine's computer memory and is also displayed on the machine's screen. Hands with higher poker values are awarded more credits or coins. Very rare poker hands are awarded payoffs of 800-to-1 or higher.

XVIII. Apparatus for Playing Over a Communications System

Figure 2:
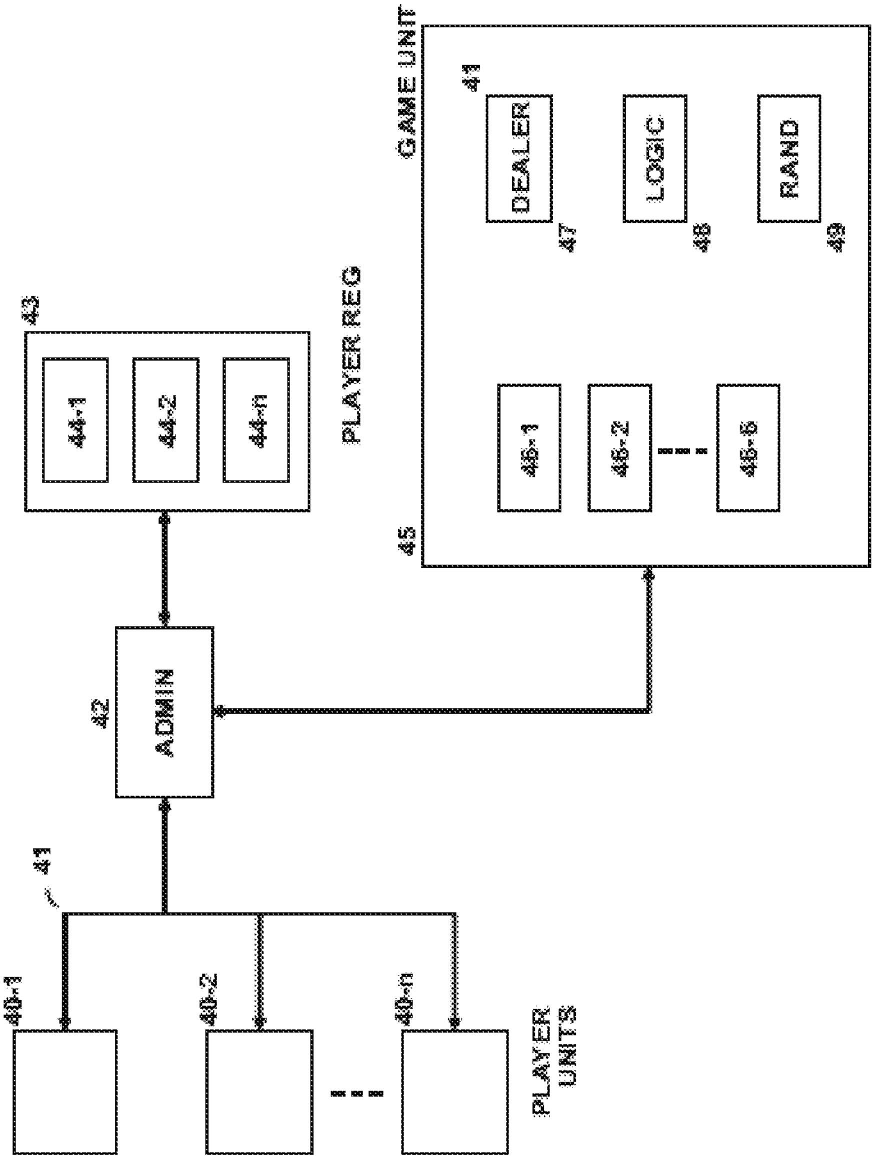
FIG. 2 shows an apparatus for playing a game, according to some embodiments.

FIG. 2 shows apparatus for playing the game. There is a plurality of player units 40-1 to 40-*n* which are coupled via a communication system 41, such as the Internet, with a game playing system comprising an administration unit 42, a player register 43, and a game unit 45. Each unit 40 is typically a personal computer with a display unit and control means (a keyboard and a mouse).

When a player logs on to the game playing system, their unit 40 identifies itself to the administration unit. The system holds the details of the players in the register 43, which contains separate player register units 44-1 to 44-*n* for all the potential players, i.e., for all the members of the system.

Once the player has been identified, the player is assigned to a game unit 45. The game unit contains a set of player data units 46-1 to 46-6, a dealer unit 47, a control unit 48, and a random dealing unit 49.

Up to seven players can be assigned to the game unit 45. There can be several such units, as indicated, so that several games can be played at the same time if there are more than seven members of the system logged on at the same time. The assignment of a player unit 40 to a player data unit 46 may be arbitrary or random, depending on which player data units 46 and game units 45 are free. Each player data unit 46 is loaded from the corresponding player register unit 44 and also contains essentially the same details as the corresponding player unit 40, and is in communication with the player unit 40 to keep the contents of the player unit and player data unit updated with each other. In addition, the appropriate parts of the contents of the other player data units 46 and the dealer unit 47 are passed to the player unit 40 for display.

The logic unit 48 of the game unit 45 steps the game unit through the various stages of the play, initiating the dealer actions and awaiting the appropriate responses from the player units 40. The random dealing unit 49 deals cards essentially randomly to the dealer unit 47 and the player data units 46. At the end of the hand, the logic unit passes the results of the hand, i.e., the wins and/or losses, to the player data units 46 to inform the players of their results. The administrative unit 42 also takes those results and updates the player register units 44 accordingly.

The player units 40 are arranged to show a display. To identify the player, the player's position is highlighted. As play proceeds, so the player selects the various boxes, enters bets in them, and so on, and the results of those actions are displayed. As the cards are dealt, a series of overlapping card symbols is shown in the Bonus box. At the option of the player, the cards can be shown in a line below the box, and similarly for the card dealt to the dealer. At the end of the hand, a message is displayed informing the player of the results of their bets, i.e., the amounts won or lost.

XIX. Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

XX. References

The following patents and patent applications are hereby incorporated by reference herein for all purposes: U.S. Pat. No. 6,579,181, U.S. Pat. No. 6,299,536, U.S. Pat. No. 6,093,103, U.S. Pat. No. 5,941,769, U.S. Pat. No. 7,114,718, U.S. patent application Ser. No. 10/622,321, U.S. Pat. No. 4,515,367, U.S. Pat. No. 5,000,453, U.S. Pat. No. 7,137,630, and U.S. Pat. No. 7,137,629.

XXI. Other Embodiments

The following should be understood as example embodiments and not as claims.

A. An apparatus comprising:

a flexible substrate having a front face and a back face, a flexible organic light emitting diode display coupled to the front side of the flexible substrate;

a flexible communication element coupled to the flexible substrate, in which the flexible communication element is configured to receive an indication of gaming information from an external system, and in which the flexible communication element is configured to provide information to the external system;

a flexible processor element coupled to the flexible substrate, in which the flexible processor element is configured to control the flexible organic light emitting diode display to display the gaming information;

a flexible touch input element coupled to the front side of the flexible substrate, in which the flexible touch input element is configured to determine a location on the front side of the substrate that is touched by a user of the apparatus, in which the flexible touch element is configured to provide an indication of the location to at least one of the external system and the flexible processor element; and a flexible power element coupled to the flexible substrate and configured to provide power to the flexible organic light emitting diode display, the flexible processor element, the flexible communication element, and the flexible touch input element, in which the flexible substrate, flexible organic light emitting diode display, flexible processor element, flexible communication element, flexible touch input element, and flexible power element have a combined length, width, and height substantially similar to a playing card and have a combined structure that is flexible.

A.1 The apparatus of claim A, in which the flexible power element includes at least one of an induction element configured to provide power through magnetic induction from a power source that is not in physical contact with the flexible power element and an RF power element configured to provide power from an RF signal generated by a power source that is not in physical contact with the flexible power element.

A.1.1. The apparatus of claim A.1, in which the induction element includes an arrangement of conductive material configured such that a changing magnetic field induces an electric charge that may be used to power the flexible organic light emitting diode, the flexible processor element, and the flexible communication element.

A.2. The apparatus of claim A, in which the flexible power element includes a flexible battery.

A.2.1. The apparatus of claim A.2, in which the flexible battery includes at least one of a paper infused with carbon nanotubes, a redox active organic polymer film, and a polymer matrix electrolyte separator.

A.3. The apparatus of claim A, in which the flexible touch input element includes at least one of a resistive touch screen, a capacitive touch screen, a surface acoustic wave touch screen, a projected capacitance touch screen, an optical/IR touch screen, a strain gauge touch screen, an optical imaging touch screen, a dispersive signal technology touch screen, an acoustic pulse recognition touch screen, an inductive touch screen.

A.3.1. The apparatus of claim A in which the flexible touch input element includes the inductive touch screen with a thin film plastic backpanel.

A.4. The apparatus of claim A, further comprising a second flexible organic light emitting diode display coupled to the back face of the flexible substrate; in which the flexible communication element is configured to receive an indication of second information from the external system; in which the flexible processor element is configured to control the second flexible organic light emitting diode display to display the second information; in which the flexible power element is configured to provide power to the second flexible organic light emitting diode display; and in which the flexible substrate, flexible organic light emitting diode display, second flexible organic light emitting diode display, flexible processor element, flexible communication element, flexible touch input element, and flexible power element have combined dimensions substantially similar to a poker card and have a combined length, width, and height substantially similar to a playing card and have a combined structure that is flexible A.5. The apparatus of claim A, in which each of the flexible processor element, and the flexible communication element are comprised of flexible circuitry.

A.5.1. The apparatus of claim A.5, in which the flexible circuitry comprises at least one of a plurality of ribbons of silicon mounted on the flexible substrate, and circuits printed on the flexible substrate.

A.6. The apparatus of claim A, in which the flexible substrate includes at least one of a flexible plastic substrate, a flexible nylon substrate, a flexible polymer film substrate, a flexible glass substrate, and a flexible metallic foil substrate.

A.7. The apparatus of claim A, in which the flexible organic light emitting diode display includes a light emitting polymer.

A.8. The apparatus of claim A, in which the flexible organic light emitting diode display includes elements formed on the flexible substrate.

A.9. The apparatus of claim A, in which the flexible substrate, flexible organic light emitting diode display, flexible processor element, flexible communication element, flexible touch input element, and flexible power element have a combined thickness less than about 0.02 inches.

A.9.1. The apparatus of claim A.9, in which the flexible substrate, flexible organic light emitting diode display, flexible processor element, flexible communication element, flexible touch input element, and flexible power element have a combined thickness of about 0.011 inches.

A.9.2. The apparatus of claim A.9, in which the playing card includes a poker card, and in which the flexible substrate, flexible organic light emitting diode display, flexible processor element, flexible communication element, flexible touch input element, and flexible power element have combined dimensions of about 2.5 inches wide and about 3.5 inches tall.

A.9.3. The apparatus of claim A.9, in which the playing card includes a bridge card, and in which the flexible substrate, flexible organic light emitting diode display, flexible processor element, flexible communication element, flexible touch input element, and flexible power element have combined dimensions of about 2.25 inches wide and about 3.5 inches tall.

A.10. The apparatus of claim A.10, in which the flexible substrate is bendable without interference to operation of the flexible organic light emitting diode display.

A.11. The apparatus of claim A, further comprising a flexible location element coupled to the flexible substrate, in which the flexible location element is configured to determine a location of the apparatus and to provide an indication of the location to the external system;

A.11.1. The apparatus of claim A.11, in which the flexible location element includes at least one of a global positioning system element, and a processing element configured to triangulate the location based on a plurality of communication signal strengths.

A.12. The apparatus of claim A, further comprising a flexible element coupled to the flexible substrate, in which the flexible element is configured to determine at least one of a movement and an orientation of the apparatus and to communicate the at least one of the movement and the orientation of the apparatus to the flexible communication element for communication to the external system.

A.12.1. The apparatus of claim A.12, in which the flexible element includes at least one of an accelerometer and a gyroscope.

A.13. The apparatus of claim A, in which the flexible touch input element in configured to provide the indication of the location to the flexible processor element, the flexible processor element is configured to determine an action corresponding to the location, and the flexible processor element is configured to provide an indication of the action to the external system.

A.14. The apparatus of claim A, in which the flexible processor element is configured to control the flexible organic light emitting diode display to provide a display of a card value in a game and an interface that includes a plurality of actions that may be taken in the game;

in which the flexible touch input element is configured to detect a touch from a user corresponding to a selection of a location that corresponds to an action of the plurality of actions displayed in the interface and provide an indication of the location to the flexible processor element;

in which the flexible processor element is configured to determine the action based on the indication of the location, and provide an indication of the action to the external system;

in which the flexible communication element is configured to transmit the indication of the action to the external system, receive information from the external system after transmitting the indication of the action to the external system, and in which the communication element is configured to provide the information to the flexible processor element; and in which the flexible processor element is configured to alter the display of at least one of the card value and the interface based on the received information.

A.15. The apparatus of claim A, in which the flexible processor element is configured to control the flexible organic light emitting diode display to provide a display of a card value in a game and an interface that includes a plurality of actions that may be taken in the game;

in which the flexible touch input element is configured to detect a touch from a user corresponding to a selection of a location that corresponds to an action of the plurality of actions displayed in the interface and provide an indication of the location to the external system;

in which the flexible communication element is configured to transmit the indication of the location to the external system, receive information from the external system after transmitting the indication of the location to the external system, and in which the communication element is configured to provide the information to the flexible processor element; and in which the flexible processor element is configured to alter the display of at least one of the card value and the interface based on the received information.

B. An apparatus comprising:

a flexible substrate having a front face and a back face;

a display coupled to the front side of the flexible substrate;

a communication element coupled to the flexible substrate, in which the communication element is configured to receive an indication of gaming information from an external system and provide the indication to the processor element;

a processor element coupled to the flexible substrate, in which the processor element is configured to control the display to display the gaming information; and a power element coupled to the flexible substrate and configured to provide power to the display, the processor element, and the communication element, in which the flexible substrate, display, processor element, communication element, and power element have a combined length, width, and height substantially similar to a playing card and have a combined structure that is flexible.

B.1. The apparatus of claim B, in which the display includes an organic light emitting diode display B.1.1. The apparatus of claim B.1, in which the display includes a flexible organic light emitting diode display.

B.1.1.1. The apparatus of claim B.1.1, in which the flexible organic light emitting diode display includes a light emitting polymer.

B.1.1.2. The apparatus of claim B.1.1, in which the flexible organic light emitting diode display includes elements formed on the flexible substrate.

B.2 The apparatus of claim B, in which the power element includes at least one of an induction element configured to provide power through magnetic induction from a power source that is not in physical contact with the power element and an RF power element configured to provide power from an RF signal generated by a power source that is not in physical contact with the power element.

B.2.1. The apparatus of claim B.2, in which the induction element includes an arrangement of conductive material configured such that a changing magnetic field induces an electric charge that may be used to power the display, processor element, and the communication element.

B.3. The apparatus of claim B, in which the power element includes a battery.

B.3.1. The apparatus of claim B.3, in which the battery includes a flexible battery.

B.3.1.1. The apparatus of claim B.3.1, in which the flexible battery includes at least one of a paper infused with carbon nanotubes, a redox active organic polymer film, and a polymer matrix electrolyte separator.

B.4. The apparatus of claim B, further comprising a touch input element coupled to the front face of the flexible substrate, in which the touch input element is configured to determine a location on the front side of the substrate that is touched by a user of the apparatus, in which the touch element is configured to provide an indication of the location to at least one of the external system and the processor element.

B.4.1. The apparatus of claim B.4, in which the touch input element includes a flexible touch input element.

B.4.1.1. The apparatus of claim B.4.1, in which the flexible touch input element includes at least one of a resistive touch screen, a capacitive touch screen, a surface acoustic wave touch screen, a projected capacitance touch screen, an optical/IR touch screen, a strain gauge touch screen, an optical imaging touch screen, a dispersive signal technology touch screen, an acoustic pulse recognition touch screen, an inductive touch screen.

B.4.1.1.1. The apparatus of claim B.4 in which the flexible touch input element includes the inductive touch screen with a thin film plastic backpanel.

B.4.2. The apparatus of claim B.4, in which the touch input element in configured to provide the indication of the location to the processor element, the processor element is configured to determine an action corresponding to the location, and the processor element is configured to provide an indication of the action to the external system.

B.5. The apparatus of claim B, further comprising a second display coupled to the back face of the flexible substrate; in which the communication element is configured to receive an indication of second information from the external system and provide the indication to the processor element; in which the processor element is configured to control the second display to display the second information; in which the power element is configured to provide power to the second display; and in which the flexible substrate, display, second display, processor element, communication element, touch input element, and power element have a combined length, width, and height substantially similar to a playing card and have a combined structure that is flexible.

B.5.1. The apparatus of claim B.5, in which the second display includes a flexible light emitting diode display.

B.6. The apparatus of claim B, in which each of the processor element, and the communication element are comprised of flexible circuitry.

B.6.1. The apparatus of claim B.6, in which the flexible circuitry comprises at least one of a plurality of ribbons of silicon mounted on the flexible substrate, and circuits printed on the flexible substrate.

B.7. The apparatus of claim B, in which the flexible substrate includes at least one of a flexible plastic substrate, a flexible nylon substrate, a flexible polymer film substrate, a flexible glass substrate, and a flexible metallic foil substrate.

B.8. The apparatus of claim B, in which the flexible substrate, display, processor element, communication element, and power element have a combined thickness less than about 0.02 inches.

B.8.1. The apparatus of claim B.8, in which the flexible substrate, display, processor element, communication element, and power element have a combined thickness of about 0.011 inches.

B.8.2. The apparatus of claim B.8, in which the playing card includes a poker card, and in which the flexible substrate, display, processor element, communication element, and power element have combined dimensions of about 2.5 inches wide and about 3.5 inches tall.

B.8.3. The apparatus of claim B.8, in which the playing card includes a bridge card, and in which the flexible substrate, display, processor element, communication element, and power element have combined dimensions of about 2.25 inches wide and about 3.5 inches tall.

B.9. The apparatus of claim B.9, in which the flexible substrate is bendable without interference to operation of the display.

B.10. The apparatus of claim B, further comprising a location element coupled to the flexible substrate, in which the location element is configured to determine a location of the apparatus and to provide an indication of the location to the communication element for communication to the external system;

B.10.1. The apparatus of claim B.10, in which the location element includes at least one of a global positioning system element, and a processing element configured to triangulate the location based on a plurality of communication signal strengths.

B.11. The apparatus of claim B, further comprising an element coupled to the flexible substrate, in which the element is configured to determine at least one of a movement and an orientation of the apparatus and to communicate the at least one of the movement and the orientation of the apparatus to the communication element for communication to the external system.

B.11.1. The apparatus of claim B.11, in which the element includes at least one of an accelerometer and a gyroscope.

B.12. The apparatus of claim B, in which the communication element is configured to receive a first card value from the external system;

in which the processor element is configured to control the display to provide a display of the first card value, in which the communication element is configured to receive first gaming information from the external system; and in which the processor element is configured to alter the display of the first card value based on the first gaming information.

B.12.1. The apparatus of claim B.12, in which the first gaming information includes a second card value, and in which altering the display includes controlling the display to provide a display of the second card value.

C. An apparatus comprising:

a substrate having a front face and a back face;

a display coupled to the front face of the substrate;

a communication element coupled to the substrate, in which the communication element is configured to receive an indication of gaming information from the external system and provide the indication to the processor element;

a processor element coupled to the substrate, in which the processor element is configured to control the display to display the gaming information; and a power element coupled to the substrate and configured to provide power to the display, the processor element, and the communication element, in which the substrate, display, processor element, communication element, and power element have a combined length, width, and height substantially similar to a playing card.

C.1. The apparatus of claim C, in which the display includes an organic light emitting diode display C.1.1. The apparatus of claim C.1, in which the display includes a flexible organic light emitting diode display.

C.1.1.1. The apparatus of claim C.1.1, in which the flexible organic light emitting diode display includes a light emitting polymer.

C.1.1.2. The apparatus of claim C.1.1, in which the flexible organic light emitting diode display includes elements formed on the substrate.

C.2 The apparatus of claim C, in which the power element includes at least one of an induction element configured to provide power through magnetic induction from a power source that is not in physical contact with the power element and an RF power element configured to provide power from an RF signal generated by a power source that is not in physical contact with the power element.

C.2.1. The apparatus of claim C.2, in which the induction element includes an arrangement of conductive material configured such that a changing magnetic field induces an electric charge that may be used to power the display, processor element, and the communication element.

C.3. The apparatus of claim C, in which the power element includes a battery.

C.3.1. The apparatus of claim C.3, in which the battery includes a flexible battery.

C.3.1.1. The apparatus of claim C.3.1, in which the flexible battery includes at least one of a paper infused with carbon nanotubes, a redox active organic polymer film, and a polymer matrix electrolyte separator.

C.4. The apparatus of claim C, further comprising a touch input element coupled to the front side of the substrate, in which the touch input element is configured to determine a location on the front side of the substrate that is touched by a user of the apparatus, in which the touch element is configured to provide an indication of the location to at least one of the external system and the processor element.

C.4.1. The apparatus of claim C.4, in which the touch input element includes a flexible touch input element.

C.4.1.1. The apparatus of claim C.4.1, in which the flexible touch input element includes at least one of a resistive touch screen, a capacitive touch screen, a surface acoustic wave touch screen, a projected capacitance touch screen, an optical/IR touch screen, a strain gauge touch screen, an optical imaging touch screen, a dispersive signal technology touch screen, an acoustic pulse recognition touch screen, an inductive touch screen.

C.4.1.1.1. The apparatus of claim C.4 in which the flexible touch input element includes the inductive touch screen with a thin film plastic backpanel.

C.4.2. The apparatus of claim C.4, in which the touch input element in configured to provide the indication of the location to the processor element, the processor element is configured to determine an action corresponding to the location, and the processor element is configured to provide an indication of the action to the external system.

C.5. The apparatus of claim C, further comprising a second display coupled to the back face of the substrate; in which the communication element is configured to receive an indication of second information from the external system and provide the indication to the processor element; in which the processor element is configured to control the second display to display the second information; in which the power element is configured to provide power to the second display; and in which the substrate, display, second display, processor element, communication element, touch input element, and power element have a combined length, width, and height substantially similar to a playing card.

C.5.1. The apparatus of claim C.5, in which the second display includes a flexible light emitting diode display.

C.6. The apparatus of claim C, in which each of the processor element, and the communication element are comprised of flexible circuitry.

C.6.1. The apparatus of claim C.6, in which the flexible circuitry comprises at least one of a plurality of ribbons of silicon mounted on the flexible substrate, and circuits printed on the substrate.

C.7. The apparatus of claim C, in which the substrate includes a flexible substrate.

C.7.1. The apparatus of claim C.7, in which the flexible substrate includes at least one of a flexible plastic substrate, a flexible nylon substrate, a flexible polymer film substrate, a flexible glass substrate, and a flexible metallic foil substrate.

C.7.2. The apparatus of claim C.7, in which the flexible substrate is bendable without interference to operation of the display.

C.7.3. The apparatus of claim C.7, in which the flexible substrate, display, processor element, communication element, and power element have a combined structure that is flexible.

C.8. The apparatus of claim C, in which the substrate, display, processor element, communication element, and power element have a combined thickness less than about 0.02 inches.

C.8.1. The apparatus of claim C.8, in which the substrate, display, processor element, communication element, and power element have a combined thickness of about 0.011 inches.

C.8.2. The apparatus of claim C.8, in which the playing card includes a poker card, and in which the substrate, display, processor element, communication element, and power element have combined dimensions of about 2.5 inches wide and about 3.5 inches tall.

C.8.3. The apparatus of claim C.8, in which the playing card includes a bridge card, and in which the substrate, display, processor element, communication element, and power element have combined dimensions of about 2.25 inches wide and about 3.5 inches tall.

C.9. The apparatus of claim C, further comprising a location element coupled to the substrate, in which the location element is configured to determine a location of the apparatus and to provide an indication of the location to the external system;

C.9.1. The apparatus of claim C.9, in which the location element includes at least one of a global positioning system element, and a processing element configured to triangulate the location based on a plurality of communication signal strengths.

C.10. The apparatus of claim C, further comprising an element coupled to the substrate, in which the element is configured to determine at least one of a movement and an orientation of the apparatus and to communicate the at least one of the movement and the orientation of the apparatus to the external system.

C.10.1. The apparatus of claim C.10, in which the element includes at least one of an accelerometer and a gyroscope.

C.11. The apparatus of claim C, in which the communication element is configured to receive a first card value from the external system;

in which the processor element is configured to control the display to provide a display of the first card value, in which the communication element is configured to receive first gaming information from the external system; and in which the processor element is configured to alter the display of the first card value based on the first gaming information.

C.11.1. The apparatus of claim C.11, in which the first gaming information includes a second card value, and in which altering the display includes controlling the display to provide a display of the second card value.

D. An apparatus comprising:

a card device comprising:

a substrate having a front face and a back face;

a display coupled to the front face of the substrate; and an element coupled to the substrate and configured to:

receive an indication of a gaming action, transmit an indication of the gaming action, receive an indication of gaming information and advertising information in response to transmitting the indication of the gaming action, and control the display to display the gaming information and the advertising information, in which the card device has a combined length, width, and height substantially similar to a playing card and has a combined structure that is flexible; and a system comprising:

a gaming server configured to:

determine the gaming information to display on the display based on the gaming action and a random event generation, and determine the advertising information based on the gaming information.

D.1. The apparatus of claim D, in which the at least one random event generation includes at least one of a random number generation, a random event happening, and a pseudo-random number generation.

D.2. The apparatus of claim D, in which the element is configured to control the display to display an interface that includes the gaming action, in which the card device includes a touch input element configured to determine that a user touched the card device at a location corresponding to the gaming action, and configured to provide an indication of the location to the element, and in which the indication of the gaming action includes the indication of the location.

D.3. The apparatus of claim D, in which the indication of the gaming action includes an indication of a location on the card device that was touched by the user.

D.4. The apparatus of claim D, in which the indication of the gaming action includes an indication of a location of the card device.

D.4.1. The apparatus of claim D.4, in which the card device includes a location element configured to facilitate determining a location of the card device, in which the gaming server is configured to receive an indication of the location and in response to receiving the indication of the location determine the gaming action.

D.5. The apparatus of claim D, in which the indication of the gaming action includes an indication of an orientation of the card device.

D.5.1. The apparatus of claim D.5, in which card device includes an element configured to facilitate determining an orientation of the card device, in which the gaming server is configured to receive an indication of the orientation and in response to receiving the indication of the orientation determine the gaming action.

D.6. The apparatus of claim D, in which each of the display includes a flexible organic light emitting diode display.

D.7. The apparatus of claim D, in which the card device includes at least one of an induction element configured to provide power through magnetic induction from a power source that is not in physical contact with the induction element and an RF power element configured to provide power from an RF signal that is generated by a power source that is not in physical contact with the RF signal element.

D.8. The apparatus of claim D, in which the card device has a thickness of less than about 0.02 inches.

D.8.1. The apparatus of claim D.8, in which the card device has a thickness of less than about 0.011 inches.

D.9. The apparatus of claim D, in which the gaming information includes a card value and in which the advertising information includes at least one of an image, a video, and text.

D.10. The apparatus of claim D, in which determining the advertising information includes determining the advertising information based on the gaming information and gaming information displayed other card devices that make up a hand of a game including the card device.

D.11. The apparatus of claim D, in which determining the advertising information includes determining the advertising information based on a result of a hand of a game including the card device.

D.12. The apparatus of claim D, in which the substrate is bendable during operation of the display.

E. An apparatus comprising:

a first set of mobile devices, each mobile device of the first set of mobile devices comprising:

a respective first display; and a respective first element configured to:

receive a respective first indication of respective first gaming information, and control the respective first display to display the respective first gaming information, in which a combination of the respective first gaming information displayed on each mobile device of the first set of mobile devices makes up an initial hand of a game; and a second mobile device comprising:

a second display; and an second element coupled to the second substrate and configured to:

receive an indication of second gaming information, and control the second display to display the second gaming information, in which a combination of the respective first gaming information displayed on each mobile device of the first set of mobile devices and the second gaming information makes up a final hand of the game.

E.1. The apparatus of claim E, further comprising:

a system comprising:

a gaming server configured to:

determine the respective first gaming information based on at least one random event generation, determine that the first set of mobile devices and the second mobile device make up the final hand, and determine the second gaming information based the at least one random event generation and a gaming action.

E.1.1. The apparatus of claim E.1, in which the at least one random event generation includes at least one of a random number generation, a random event happening, and a pseudo-random number generation.

E.1.2. The apparatus of claim E.1, in which determining that the first set of mobile devices and the second mobile device make up the final hand includes receiving an indication that the second card device should be part of the final hand.

E.1.2.1. The apparatus of claim E.1.2, in which the indication is received from the second mobile device.

E.1.2.1.1. The apparatus of claim E.1.2.1, in which the second element is configured to control the second display to provide an interface through which a user may select to add the second card to the final hand, in which the second mobile device includes a touch input element configured to receive input from the user based on touch of the second mobile device, in which the second element is configured to receive an indication of an input selecting to add the second card to the final hand from the touch input element and transmit the indication to the gaming server, and in which the gaming server is configured to receive the indication and in response to receiving the indication, determine that the second card device should be part of the final hand.

E.1.2.2. The apparatus of claim E.1.2, in which the indication includes an indication of a location of the second mobile device.

E.1.2.2.1. The apparatus of claim E.1.2.2, in which second mobile device includes a location element configured to facilitate determining a location of the second card device, in which the gaming server is configured to receive an indication of the location and in response to receiving the indication of the location determine that the second mobile device should be part of the final hand.

E.1.2.2.2. The apparatus of claim E.1.2.2, in which the location includes a location associated with a user of the first set of mobile devices, and a location proximate to the first set of mobile devices.

E.1.2.3. The apparatus of claim E.1.2, in which the indication includes an indication of a selection of the second mobile device for the final hand.

E.1.3. The apparatus of claim E.1, in which the gaming server is further configured to receive an indication of the action.

E.1.3.1. The apparatus of claim E.1.3, in which receiving an indication of the action includes receiving an indication of the action from at least one of the first set of mobile devices.

E.1.3.1.1. The apparatus of claim E.1.3.1, in which the respective first element is configured to control the respective first display to provide an interface through which a user may select the action, in which each of the first set of mobile devices includes a respective touch input element configured to receive input from the user based on touch of the respective first mobile device, in which the respective first element is configured to receive an indication of an input selecting the action from a respective touch input element and transmit the indication to the gaming server, and in which the gaming server is configured to receive the indication.

E.1.3.2. The apparatus of claim E.1.3, in which receiving an indication of the action includes receiving an indication of the action from the second mobile device.

E.1.3.2.1. The apparatus of claim E.1.3.2, in which the second element is configured to control the second display to provide an interface through which a user may select the action, in which the second card device includes a touch input element configured to receive input from the user based on touch of the second mobile device, in which the second element is configured to receive an indication of an input selecting the action from the touch input element and transmit the indication to the gaming server, and in which the gaming server is configured to receive the indication.

E.1.3.3. The apparatus of claim E.1.3, in which the indication includes an indication of a location on at least one of the first set of mobile devices and the second mobile device that was touched by a user.

E.1.3.4. The apparatus of claim E.1.3, in which the indication of the action includes an indication of a selection through an interface separate from the mobile devices.

E.1.3.5. The apparatus of claim E.1.3, in which the indication of the action includes an indication of a location of the second mobile device.

E.1.3.5.1. The apparatus of claim E.1.3.5, in which second mobile device includes a location element configured to facilitate determining a location of the second mobile device, in which the gaming server is configured to receive an indication of the location and in response to receiving the indication of the location determine the action.

E.1.3.6. The apparatus of claim E.1.3, in which the indication of the action includes an indication of an orientation of the second mobile device.

E.1.3.6.1. The apparatus of claim E.1.3.6, in which second mobile device includes an element configured to facilitate determining an orientation of the second mobile device, in which the gaming server is configured to receive an indication of the orientation and in response to receiving the indication of the orientation determine the action.

E.2. The apparatus of claim E, in which the respective first gaming information includes at least one respective first card value, and in which the second gaming information includes at least one second card value.

E.3. The apparatus of claim E, in which each of the first displays includes a respective first flexible organic light emitting diode display, and in which the second display includes a second flexible organic light emitting diode display.

E.4. The apparatus of claim E, in which the second mobile device includes at least one of an induction element configured to provide power through magnetic induction from a power source that is not in physical contact with the induction element and an RF power element configured to provide power from an RF signal that is generated by a power source that is not in physical contact with the RF power element.

E.5. The apparatus of claim E, in which the second mobile device includes a third display facing an opposite direction as the second display; in which the second element is configured to control the third display to display non-gaming information.

E.6. The apparatus of claim E, in which each mobile device of the first set of mobile devices includes a respective first substrate having a respective front face and a respect back face, in which each first display is coupled to a respective front face of a respective first substrate, in which each first element is coupled to a respective first substrate, and in which each mobile device of the first set of mobile devices has a combined length, width, and height substantially similar to a playing card.

E.6.1. The apparatus of claim E.6, in which the second mobile device includes a second substrate having a front face and a back face, in which the second display is coupled to the front face of the second substrate, in which the second element is coupled to the second substrate, and in which the second mobile device has a combined length, width, and height substantially similar to a playing card.

E.6.1.1. The apparatus of claim E.6.1, in which each of the first substrate and second substrate is bendable without interference to operation of the respective first and second display.

E.6.1.2. The apparatus of claim E.6.1, in which each of the mobile devices of the first set of mobile devices and the second mobile devices have a combined structure that is flexible.

E.7. The apparatus of claim E, in which each of the first set of mobile devices and the second card device have a respective thickness of less than about 0.02 inches.

E.7.1. The apparatus of claim E.7, in which each of the first set of mobile devices and the second card device have a thickness of less than about 0.011 inches.

F. An apparatus comprising:

a card device comprising:

a substrate having a front face and a back face;

a display coupled to the front face of the substrate; and an element coupled to the substrate and configured to:

receive an indication of gaming information, and control the display to display the gaming information, in which the card device has a combined length, width, and height substantially similar to a playing card; and a system comprising:

a gaming server configured to determine the gaming information to display on the display based on a gaming action and a random event generation.

F.1. The apparatus of claim F, in which the at least one random event generation includes at least one of a random number generation, a random event happening, and a pseudo-random number generation.

F.2. The apparatus of claim F, in which the element is configured to control the display to display an interface that includes the gaming action, in which the card device includes a touch input element configured to determine that a user touched the card device at a location corresponding to the gaming action, and configured to provide an indication of the location to the element, and in which the element is configured to transmit an indication of the gaming action to the gaming server.

F.3. The apparatus of claim F, in which the gaming server is configured to receive an indication of the gaming action and in which the indication of the gaming action includes an indication of a location on the card device that was touched by a user.

F.4. The apparatus of claim F, in which the card device includes a location element configured to facilitate determining a location of the card device, in which the gaming server is configured to receive an indication of the location and in response to receiving the indication of the location determine the gaming action.

F.4.1. The apparatus of claim F.4, in which the location includes a location relative to at least one other card device.

F.5. The apparatus of claim F, in which card device includes an element configured to facilitate determining an orientation of the card device, in which the gaming server is configured to receive an indication of the orientation and in response to receiving the indication of the orientation determine the gaming action.

F.5.1. The apparatus of claim F.5, in which the orientation includes an orientation relative to at least one other card device.

F.6. The apparatus of claim F, in which each of the display includes a flexible organic light emitting diode display.

F.7. The apparatus of claim F, in which the card device includes at least one of an induction element configured to provide power through magnetic induction from a power source that is not in physical contact with the induction element and an RF power element configured to provide power from an RF signal generated by a power source that is not in physical contact with the RF power element.

F.8. The apparatus of claim F, in which the card device has a thickness of less than about 0.02 inches.

F.8.1. The apparatus of claim F.8, in which the card device has a thickness of less than about 0.011 inches.

F.9. The apparatus of claim F, in which the element is configured to receive an indication of advertising information, and to control the display to display the advertising information, in which the gaming server is configured to determine the advertising information based on the gaming information.

F.9.1. The apparatus of claim F.9, in which the gaming information includes a card value and in which the advertising information includes at least one of an image, a video, and text.

F.9.2. The apparatus of claim F.9, in which determining the advertising information includes determining the advertising information based on the gaming information and gaming information displayed on other card devices that make up a hand of a game including the card device.

F.9.3. The apparatus of claim F.9, in which determining the advertising information includes determining the advertising information based on a result of a hand of a game including the card device.

F.10. The apparatus of claim F, in which the substrate is bendable during operation of the display.

F.11. The apparatus of claim F, in which the card device has a combined structure that is flexible G. An apparatus comprising:

a deck device comprising:

a holder section into which a plurality of card devices may be placed and from which the plurality of card devices may be removed;

a charging element configured to provide power to the plurality of card devices when they are placed in the holder section;

a battery element configured to provide the power to the charging element; and a communication element configured to provide respective gaming information to each of the plurality of card devices; and the plurality of card devices, in which each card device of the plurality of card devices includes a respective display coupled to a respective substrate and a respective control element coupled to the respective substrate, in which each control element is configured to receive the respective gaming information and control the respective display to display the respective gaming information, and in which each card device of the plurality of card devices has a combined length, width, and height substantially similar to a playing card.

G.1. The apparatus of claim G, in which each card device includes a respective battery, in which each card device includes a respective pair of electrodes through which the respective battery may be charged, and in which the charging element includes electrodes arranged to contact respective pairs of electrodes of the plurality of card devices when the plurality of card devices are in the holder section.

G.2. The apparatus of claim G, in which each card device includes a respective battery, in which each card device includes an induction element which is configured to charge the battery when a time-varying magnetic field is proximate to the respective card device, and in which the charging element includes an inducer element configured to produce the time-varying magnetic field when the plurality of card devices are in the holder section.

G.2.1. The apparatus of claim G.2, in which the inducer element is configured to produce the time-varying magnetic field when the card devices are not in the holder section to cause power to be generated by the respective induction elements.

G.3. The apparatus of claim G, in which each card device includes a respective battery, in which each card device includes an RF power element which is configured to charge the battery when an RF signal is proximate to the respective card device, and in which the charging element includes an RF signal generator configured to produce the RF signal when the plurality of card devices are in the holder section.

G.3.1. The apparatus of claim G.3, in which the RF signal generator is configured to generate the RF signal when the card devices are not in the holder section to cause power to be generated by the respective RF power elements.

G.4. The apparatus of claim G, in which the battery element includes at least one of a lithium ion battery, and a nickel-based battery.

G.5. The apparatus of claim G, in which the communication element is configured to receive the respective gaming information from an external system and forward the gaming information to the respective card devices.

G.6. The apparatus of claim G, in each of the plurality of card devices includes a location element configured to facilitate determining a respective location of the respective card device.

G.6.1. The apparatus of claim G.6, in which the deck device comprises a processing element configured to receive respective indications identifying respective locations of each of the card devices and determine to which of a plurality of hands each of the card devices belong based on the respective locations.

G.6.1.1. The apparatus of claim G.6.1, in which the respective locations include locations relative to the deck device.

G.6.1.2. The apparatus of claim G.6.1, in which the processing element is configured to determine that a first subset of the plurality of card devices located on a first side of the deck device belong to a first hand of the plurality of hands and that a second subset of the plurality of card devices located on a second side of the deck device belong to a second hand of the plurality of hands.

G.6.2. The apparatus of claim G.6, in which the deck device comprises a processing element configured to receive respective indications identifying respective locations of each of the card devices and in which the communication element is configured to identify the respective locations to an external system.

G.7. The apparatus of claim G, in which the deck device comprises a processing element configured to determine the gaming information.

G.8. The apparatus of claim G, in which the deck device comprises an interface through which a user may select gaming actions for a game played using the card devices.

G.8.1. The apparatus of claim G.8, in which the communication element is configured to forward a selected gaming action to an external system and receive the respective gaming information from the external system, and in which the gaming information includes gaming information provided in response to taking the selected gaming action G.9. The apparatus of claim G, in which the gaming information includes respective card values for each of the plurality of card devices used in a card game.

G.10. The apparatus of claim G, in which each of the respective displays includes a respective flexible organic light emitting diode display.

G.11. The apparatus of claim G, in which each card device has a thickness of less than about 0.02 inches.

G.11.1. The apparatus of claim G.11, in which each card device has a thickness of less than about 0.011 inches.

G.12. The apparatus of claim G, in which each substrate is bendable without interfering with operation of a respective display.

G.13. The apparatus of claim G, in which each card device has a combined structure that is flexible.

H. An apparatus comprising:

a deck device comprising:

a holder section into which a plurality of card devices may be placed and from which the plurality of card devices may be removed;

a charging element configured to provide power to the plurality of card devices when they are placed in the holder section; and a battery element configured to provide the power to the charging element; and the plurality of card devices, in which each card device of the plurality of card devices includes a respective display coupled to a respective substrate and a respective control element coupled to the respective substrate and configured to control the respective display, and in which each card device of the plurality of card devices has combined length, width, and height substantially similar to a playing card.

H.1. The apparatus of claim H, in which each card device includes a respective battery, in which each card device includes a respective pair of electrodes through which the respective battery may be charged, and in which the charging element includes electrodes arranged to contact respective pairs of electrodes of the plurality of card devices when the plurality of card devices are in the holder section.

H.2. The apparatus of claim H, in which each card device includes a respective battery, in which each card device includes an induction element through which is configured to charge the battery when a time-varying magnetic field is proximate to the respective card element, and in which the charging element includes an inducer element configured to produce the time-varying magnetic field when the plurality of card devices are in the holder section.

H.2.1. The apparatus of claim G.2, in which the inducer element is configured to produce the time-varying magnetic field when the card devices are not in the holder section to cause power to be generated by the respective induction elements.

H.3. The apparatus of claim H, in which each card device includes a respective battery, in which each card device includes an RF power element which is configured to charge the battery when an RF signal is proximate to the respective card device, and in which the charging element includes an RF signal generator configured to produce the RF signal when the plurality of card devices are in the holder section.

H.3.1. The apparatus of claim H.3, in which the RF signal generator is configured to generate the RF signal when the card devices are not in the holder section to cause power to be generated by the respective RF power elements.

H.4. The apparatus of claim H, in which the battery element includes at least one of a lithium ion battery, and a nickel-based battery.

H.5. The apparatus of claim H, in each of the plurality of card devices includes a location element configured to facilitate determining a respective location of the respective card device.

H.5.1. The apparatus of claim H.5, in which the deck device comprises a processing element configured to receive respective indications identifying respective locations of each of the card devices and determine to which of a plurality of hands each of the card devices belong based on the respective locations.

H.5.1.1. The apparatus of claim H.5.1, in which the respective locations include locations relative to the deck device.

H.5.1.2. The apparatus of claim H.5.1, in which the processing element is configured to determine that a first subset of the plurality of card devices located on a first side of the deck device belong to a first hand of the plurality of hands and that a second subset of the plurality of card devices located on a second side of the deck device belong to a second hand of the plurality of hands.

H.6. The apparatus of claim H, in which the deck device comprises an interface through which a user may select gaming actions for a game played using the card devices.

H.6.1. The apparatus of claim H.6, in which the deck device comprises a processing element configured to determine respective gaming information for display on each of the plurality of card device in response to selection of a gaming action through the interface.

H.7. The apparatus of claim H, in which each of the respective displays includes a respective flexible organic light emitting diode display.

H.8. The apparatus of claim H, in which each card device has a thickness of less than about 0.02 inches.

H.8.1. The apparatus of claim H.8, in which each card device has a thickness of less than about 0.011 inches.

H.9. The apparatus of claim H, in which each respective control element is configured to receive respective gaming information for display on the respective display.

H.9.1. The apparatus of claim H.9, in which the gaming information is received form an external system.

H.9.2. The apparatus of claim H.9, in which the deck device comprises a processing element configured to determine the respective gaming information and in which the respective control elements receive the information from the processing element.

H.10. The apparatus of claim H, in which each substrate is bendable without interfering with operation of a respective display.

H.11. The apparatus of claim H, in which each card device has a combined structure that is flexible.

I. An apparatus comprising:

a plurality of card devices, each card device of the plurality of card devices comprising:

a respective substrate having a front face and a back face;

a respective display coupled to the front face of the respective substrate; and a respective power element configured to provide power to the respective first display element and comprising a respective arrangement of first conductive elements configured to generate at least a portion of the power through induction caused by a time varying magnetic field proximate to the respective card device;

in which each card device of the plurality of card devices have a combined length, width, and height substantially similar to a playing card, and in which each of the plurality of card devices is configured to display a respective card value for a hand of a game; and a charge device comprising:

an arrangement of second conductive elements; and a driver configure to provide a voltage across the second conductive elements so that the time varying magnetic field is generated.

I.1 The apparatus of claim I, in which each of the respective power elements is configured to provide power through induction induced by the time varying magnetic field while not in physical contact with the charge device.

I.2. The apparatus of claim I, in which each arrangement of first conductive elements includes a respective coil of first conductive elements.

I.3. The apparatus of claim I, in which each arrangement of first conductive elements includes a respective arrangement of flexible conductive elements.

I.3.1. The apparatus of claim I.3, in which each of the respective flexible conductive elements includes a respective at least one of a plurality of ribbons of silicon mounted on a respective substrate, and circuits printed on a respective substrate.

I.4. The apparatus of claim I, in which each respective power element includes a respective flexible power element.

I.4.1. The apparatus of claim I.4, in which each flexible power element includes a respective flexible battery.

I.4.1.1. The apparatus of claim I.4.1, in which each flexible battery includes a respective at least one of a paper infused with carbon nanotubes, a redox active organic polymer film, and a polymer matrix electrolyte separator.

I.5. The apparatus of claim I, in which each respective display include a respective flexible organic light emitting diode display.

I.6. The apparatus of claim I, in which each card device has a respective combined thickness less than about 0.02 inches.

I.6.1. The apparatus of claim I.6, in which each card device has a respective combined thickness less than about 0.011 inches.

I.7. The apparatus of claim I, in which the driver is configured to provide the voltage across the second conduct elements such that the time varying magnetic field has a frequency that is resonant with each of the respective power elements.

I.7.1. The apparatus of claim I.7, in which each power element includes a capacitive element configured to tune the resonant frequency of the respective power element to the frequency.

I.8. The apparatus of claim I, in which each substrate is bendable without interfering with operation of a respective display.

I.9. The apparatus of claim I, in which each card device has a combined structure that is flexible.

J. An apparatus comprising:

a plurality of card devices, each card device of the plurality of card devices comprising:

a respective substrate having a front face and a back face;

a respective display coupled to the front face of the respective substrate; and a respective power element configured to provide power to the respective first display element and comprising a respective RF power generator configured to generate at least a portion of the power from an RF signal proximate to the respective card device;

in which each card device of the plurality of card devices have a combined length, width, and height substantially similar to a playing card, and in which each of the plurality of card devices is configured to display a respective card value for a hand of a game; and a charge device comprising:

an RF signal generator configured to generate the RF signal; and a driver configure to provide power to the RF signal generator so that the RF signal is generated.

J.1 The apparatus of claim I, in which each of the respective power elements is configured to provide power from the RF signal while not in physical contact with the charge device.

J.2. The apparatus of claim J, in which the RF signal includes an RF signal with a constant intensity over a period of time when the card devices are in use.

J.3. The apparatus of claim J, in which each respective power element includes a respective flexible power element.

J.3.1. The apparatus of claim J.3, in which each flexible power element includes a respective flexible battery.

J.3.1.1. The apparatus of claim J.3.1, in which each flexible battery includes a respective at least one of a paper infused with carbon nanotubes, a redox active organic polymer film, and a polymer matrix electrolyte separator.

J.4. The apparatus of claim I, in which each respective display include a respective flexible organic light emitting diode display.

J.5. The apparatus of claim I, in which each card device has a respective combined thickness less than about 0.02 inches.

J.5.1. The apparatus of claim J.5, in which each card device has a respective combined thickness less than about 0.011 inches.

J.6. The apparatus of claim J, in which the RF signal generator is configured to provide an RF signal that is resonant with each RF power generator.

J.6.1. The apparatus of claim J.6, in which each power element includes a capacitive element configured to tune the resonant frequency of the respective power element to the frequency.

J.7. The apparatus of claim I, in which each substrate is bendable without interfering with operation of a respective display.

J.8. The apparatus of claim I, in which each card device has a combined structure that is flexible.

K. An apparatus comprising:

a card device comprising:

a substrate having a front side, a back side, and four edges;

a display coupled to the front side of the substrate; and a power element configured to provide power to the respective first display element and configured to generate at least a portion of the power at least one from a time varying magnetic field proximate to the card device and from an RF signal proximate to the card device;

in which the card device has a combined length, width, and height substantially similar to a playing card, and in which the card device is configured to display a card value for a hand of a game; and a charge device comprising:

a driver configure to generate a respective at least one of the time-varying magnetic field and the RF signal.

K.1 The apparatus of claim K, in which the power element is configured to provide power while not in physical contact with the charge device.

K.2. The apparatus of claim K, in which the power element includes an arrangement of second conductive elements.

K.2.1. The apparatus of claim K.2, in which the arrangement of second conductive elements includes an arrangement of flexible conductive elements.

K.2.1.1. The apparatus of claim K.2.1, in which the arrangement of flexible conductive elements includes at least one of a plurality of ribbons of silicon mounted on the substrate, and circuits printed on the substrate.

K.3. The apparatus of claim K, in which the power element includes a flexible power element.

K.3.1. The apparatus of claim K.3, in which the flexible power element includes a flexible battery.

K.3.1.1. The apparatus of claim K.3.1, in which the flexible battery includes at least one of a paper infused with carbon nanotubes, a redox active organic polymer film, and a polymer matrix electrolyte separator.

K.4. The apparatus of claim K, in which the display include a flexible organic light emitting diode display.

K.5. The apparatus of claim K, in which the card device has a combined thickness less than about 0.02 inches.

K.5.1. The apparatus of claim K.5, in which the card device has a combined thickness less than about 0.011 inches.

K.6. The apparatus of claim K, in which the driver is configured to generate the at least one of the time varying magnetic field and the RF signal with a frequency that is resonant with the power element.

K.6.1. The apparatus of claim K.6, in which the power element includes a capacitive element configured to tune the resonant frequency of the power element to the frequency.

K.7. The apparatus of claim K, in which the substrate is bendable without interfering with operation of a respective display.

K.8. The apparatus of claim K, in which the card device has a combined structure that is flexible.

L. An apparatus comprising a first set of mobile devices, each mobile device of the first set of mobile devices comprising a respective first display, a second mobile device comprising a second display; and a system configured to:

receive respective information identifying a respective first location of each of the first set of mobile devices;

determine a respective hand of a plurality of hands of a game to which each of the first set of mobile devices belongs based on the respective first locations;

receive information identifying a second location of the second mobile device;

determine to which hand of the plurality of hands to the second mobile device belongs based on the second location; and determine which hand of the plurality of hands is a winning hand of the game based on the hands to which each of the respective mobile devices of the first set of mobile devices and the second mobile device are determined to belong.

L.1. The apparatus of claim L, in which the system is configured to determine a respective card value for each of the mobile devices of the first set of mobile devices based on at least one random event generation, control each of the card devices of the first set of mobile devices to display the respective card value, determine a second card value for the second mobile device based on the at least one random event generation, and control the second mobile device to display the second card value.

L.1.1. The apparatus of claim L.1, in which determining which hand is a winning hand includes comparing respective sets of card values displayed on the respective mobile devices that make up each respective hand.

L.1.2. The apparatus of claim L.1, in which the at least one random event generation includes at least one of a random number generation, an event happening, and a pseudo-random number generation.

L.2. The apparatus of claim L, in which the system is configured to: determine a gaming action based on the second location.

L.2.1. The apparatus of claim L, in which the system is configured to: control the second mobile device to display a result of the gaming action.

L.2.1.1. The apparatus of claim L.2.1, in which the system is configured to:

control the mobile devices of the first set of card devices that belong to the same hand to which the second mobile device belongs, to display the result of the gaming action.

L.2.1.2. The apparatus of claim L.2.1, in which the gaming action includes at least one of a hit, a split, and a draw.

L.3. The apparatus of claim L, in which the second location is proximate to the respective first location of a mobile device of the first set of card devices that belongs to the hand to which the second mobile device belongs.

L.4. The apparatus of claim L, in which each of the respective first locations includes a respective area of a plurality of areas of a table, and in which each mobile device of the first set of card devices that is associated with a same respective area as any other mobile devices of the first set of card devices is determined to be in the same respective hand as the other mobile devices.

L.4.1. The apparatus of claim L.4, in which the second location includes a respective one area of the plurality of areas in which the mobile devices of the first set of mobile devices that belong to the same hand to which the second mobile device belongs are located.

L.5. The apparatus of claim L, in which each of the respective first locations includes a respective side of a communication device, and in which each mobile device of the first set of mobile devices that is in a same respective side as any other mobile devices of the first set of mobile devices is determined to be in the same respective hand as the other mobile devices.

L.5.1. The apparatus of claim L.5, in which the second location includes a respective side of the plurality of areas in which the mobile devices of the first set of mobile devices that belong to the same hand to which the second mobile device belongs are located.

L.6. The apparatus of claim L, in which each card device of the first set of mobile devices and the second mobile device has a respective combined thickness less than about 0.02 inches.

L.6.1. The apparatus of claim L.6, in which each mobile device of the first set of mobile devices and the second mobile device has a respective combined thickness less than about 0.011 inches.

L.7. The apparatus of claim L, in which each mobile device of the first set of mobile devices and the second mobile device includes a respective wireless power element configured to provide power from at least one of a time varying magnetic field and an RF signal generated by a power source that is not in physical contact with the wireless power element.

L.8. The apparatus of claim L, in which each mobile device of the first set of mobile devices and the second mobile device includes a respective location device configured to facilitate a determination of a respective location of the mobile device.

L.8.1. The apparatus of claim L.8, in which each location device includes at least one of a global positioning system element, a processing element configured to triangulate the location based on a plurality of communication signal strength, and a communication element configured to provide a wireless communication signal to each of a plurality of stationary communication devices for use in triangulation of the location.

L.9. The apparatus of claim L, in which each first mobile device includes a respective first substrate having a front face and a back face; in which each respective first display is coupled to a respective front face of a respective substrate; in which each first mobile device has a combined length, width, and height substantially similar to a playing card; in which the second mobile device includes a respective second substrate having a front face and a back face, in which the second display is coupled to the front face of the second substrate, and in which the second mobile device has a combined length, width, and height substantially similar to a playing card.

L.9.1. The apparatus of claim L.9, in which each substrate is bendable without interfering with operation of a respective display.

L.10. The apparatus of claim L, in which each respective first display and the second display includes a respective flexible organic light emitting diode display.

L.11. The apparatus of claim L, in which each mobile device has a combined structure that is flexible.

M. An apparatus comprising a plurality of mobile devices, each mobile device of the plurality of mobile devices comprising a respective display; and a system configured to:

receive information identifying a respective location of each of the plurality of mobile devices; and determine a respective hand of a plurality of hands of a game to which each of the plurality of mobile devices belongs based on the respective location of the respective mobile device.

M.1. The apparatus of claim M, in which the system is configured to determine a respective card value for each of the plurality of mobile devices based on at least one random event generation, and control each of the mobile devices to display the respective card value on a respective display.

M.1.1. The apparatus of claim M.1, in which the system is configured to determine which hand of the plurality of hands is a winning hand of the game based on the card values.

M.1.1.1. The apparatus of claim M.1.1, in which determining which hand is a winning hand includes comparing respective sets of card values displayed on the respective mobile devices that make up each respective hand.

M.1.2. The apparatus of claim M.1, in which the at least one random event generation includes at least one of a random number generation, an event happening, and a pseudo-random number generation.

M.2. The apparatus of claim M, in which the system is configured to receive an indication of a gaming action, and control at least one of the plurality of mobile devices to display a result of the gaming action.

M.2.1. The apparatus of claim M.2, in which the gaming action includes at least one of a hit, a split, and a draw.

M.2.2. The apparatus of claim M.2, in which controlling the at least one of the mobile devices to display the result includes controlling the at least one of the mobile devices to alter a display of a first card value to a display of a second card value.

M.3. The apparatus of claim M, in which each respective location include a respective area of a plurality of areas of a table, and in which each mobile device that is associated with a respective location in a same respective area as any other mobile devices of the first set of mobile devices is determined to belong in the same respective hand as the other mobile devices.

M.4. The apparatus of claim M, in which each locations includes a respective side of a communication device, and in which each mobile device is in a same respective side as any other mobile devices of the card devices is determined to be in the same respective hand as the other mobile devices.

M.5. The apparatus of claim M, in which each mobile device has a respective combined thickness less than about 0.02 inches.

M.5.1. The apparatus of claim M.5, in which each mobile device has a respective combined thickness less than about 0.011 inches.

M.6. The apparatus of claim M, in which each respective display includes a respective flexible organic light emitting diode display.

M.7. The apparatus of claim M, in which each mobile device includes a respective wireless power element configured to provide power from at least one of a time varying magnetic field and an RF signal generated by a power source that is not in physical contact with the wireless power element.

M.8. The apparatus of claim M, in which each mobile device includes a respective location determination device configured to facilitate a determination of a respective location of the mobile device.

M.8.1. The apparatus of claim M.8, in which each location determination elements includes at least one of a global positioning system element, a processing element configured to triangulate the location based on a plurality of communication signal strength, and a communication element configured to provide a wireless communication signal to each of a plurality of stationary communication devices for use in triangulation of the location.

M.9. The apparatus of claim M, in which each mobile device has a combined structure that is flexible.

M.10. The apparatus of claim M, in which each mobile device includes a respective substrate having a front face and a back face, in which each respective display is coupled to a respective front face; and in which each card device has a combined length, width, and height substantially similar to a playing card.

M.10.1. The apparatus of claim M.10, in which each substrate is bendable without interfering with operation of a respective display.

N. An apparatus comprising:

a first mobile device comprising a first display;

a second mobile device comprising a second display; and a system configured to:

receive information identifying a first location of the first mobile device;

receive information identifying a second location of the second mobile device;

determine an action to be taken in a game based on the first location and the second location;

determine gaming information resulting from taking the action; and control at least one of the first mobile device and the second mobile device to display, on a respective at least one of the first display and the second display, the gaming information.

N.1. The apparatus of claim N, in which determining the action includes determining the action based on the first location relative to the second location.

N.1.1. The apparatus of claim N.1, in which the determining the action includes determining that the first mobile device is a distance away from the second mobile device.

N.1.2. The apparatus of claim N.1, in which the determining the action includes determining that the first mobile device is in a direction from the second mobile device.

N.2. The apparatus of claim N, in which the system is further configured to receive information identifying a third location of the first mobile device, in which the third location includes a location associated with a later time than the first location, and in which determining the action includes determining the action based on the third location relative to the second location and the first location.

N.2.1. The apparatus of claim N.2, in which the determining the action includes determining that the first mobile device has been moved a distance away from the second mobile device.

N.2.2. The apparatus of claim N.2, in which the determining the action includes determining that the first mobile device has been moved in a direction from the second mobile device.

N.3. The apparatus of claim N, in which the system is configured to determine a first card value for the first mobile device based on at least one random event generation, determine a second card value for the second mobile device based on the at least one random event generation, control the first mobile device to display the first card value before determining the action; and control the second mobile device to display the second card value before determining the action.

N.3.1. The apparatus of claim N.3, in which controlling the at least one of the first mobile device and the second mobile device to display, on a respective at least one of the first display and the second display, information identifying the result, includes controlling the second mobile device to display an indication of the gaming information in place of the second card value.

N.3.1.1. The apparatus of claim N.3.1, in which the result includes a third card value.

N.3.2. The apparatus of claim N.3, in which the at least one random event generation includes at least one of a random number generation, an event happening, and a pseudo-random number generation.

N.4. The apparatus of claim N, in which the system is configured to determine if a hand of the game is a winning hand based on the result.

N.5. The apparatus of claim N, in which the action includes at least one of a hit, a split, a deal, a stand, a fold, and a draw.

N.6. The apparatus of claim N, in which the second location is proximate to the first location, in which the action includes adding the second mobile device to a hand associated with the first mobile device, and in which the result includes a card value for the second mobile device.

N.7. The apparatus of claim N, in which each mobile device has a respective combined thickness less than about 0.02 inches.

N.7.1. The apparatus of claim N.7, in which each mobile device has a respective combined thickness less than about 0.011 inches.

N.8. The apparatus of claim N, in which each display includes a respective flexible organic light emitting diode display.

N.9. The apparatus of claim N, in which each mobile device includes a respective wireless power element configured to provide power from at least one of a time varying magnetic field and an RF signal generated by a power source that is not in physical contact with the wireless power element.

N.10. The apparatus of claim N, in which each card device includes a respective location determination device configured to facilitate a determination of a respective location of the mobile device.

N.10.1. The apparatus of claim N.10, in which each location determination elements includes at least one of a global positioning system element, a processing element configured to triangulate the location based on a plurality of communication signal strength, and a communication element configured to provide a wireless communication signal to each of a plurality of stationary communication devices for use in triangulation of the location.

N.11. The apparatus of claim N, in which each mobile device has a combined structure that is flexible.

N.12. The apparatus of claim N, in which each mobile device includes a respective substrate having a front face and a back face, in which each respective display is coupled to a respective front face; and in which each card device has a combined length, width, and height substantially similar to a playing card.

N.12.1. The apparatus of claim N.12, in which each substrate is bendable without interfering with operation of a respective display.

O. An apparatus comprising:

a first mobile device comprising a first display;

a second card device comprising a second display; and a system configured to:

receive information identifying a first orientation of the first mobile device;

receive information identifying a second orientation of the second mobile device;

determine an action to be taken based on the first orientation and the second orientation;

determine gaming information resulting from taking the action; and control at least one of the first mobile device and the second mobile device to display, on a respective at least one of the first display and the second display, the gaming information.

O.1. The apparatus of claim O, in which determining the action includes determining the action based on the first orientation relative to the second orientation.

O.1.1. The apparatus of claim O.1, in which the determining the action includes determining that the first mobile device oriented at a particular angle with respect to the second mobile device.

O.2. The apparatus of claim O, in which the system is further configured to receive information identifying a third orientation of the first card device, in which the third orientation includes an orientation associated with a later time than the first orientation, and in which determining the action includes determining the action based on the third orientation relative to the second orientation and the first orientation.

O.2.1. The apparatus of claim O.2, in which the determining the action includes determining that the first mobile device has been moved from a first angle relative to the second mobile device to a second angle relative to the second mobile device.

O.3. The apparatus of claim O, in which the system is configured to determine a first card value for the first mobile device based on at least one random event generation, determine a second card value for the second mobile device based on the at least one random event generation, control the first mobile device to display the first card value before determining the action; and control the second mobile device to display the second card value before determining the action.

O.3.1. The apparatus of claim O.3, in which controlling the at least one of the first mobile device and the second mobile device to display, on a respective at least one of the first display and the second display, the gaming information, includes controlling the second mobile device to display an indication of the result in place of the second card value.

O.3.1.1. The apparatus of claim O.3.1, in which the result includes a third card value.

O.3.2. The apparatus of claim O.3, in which the at least one random event generation includes at least one of a random number generation, an event happening, and a pseudo-random number generation.

O.4. The apparatus of claim O, in which the system is configured to determine if a hand of the game is a winning hand based on the result.

O.5. The apparatus of claim O, in which the action includes at least one of a hit, a split, a draw, a fold, a bet, a stand, and a non-gaming action.

O.6. The apparatus of claim O, in which each mobile device has a respective combined thickness less than about 0.02 inches.

O.6.1. The apparatus of claim O.6, in which each mobile device has a respective combined thickness less than about 0.011 inches.

O.7. The apparatus of claim O, in which each display includes a respective flexible organic light emitting diode display.

O.8. The apparatus of claim O, in which each mobile device includes a respective wireless power element configured to provide power from at least one of a time varying magnetic field and an RF signal generated by a power source that is not in physical contact with the wireless power element.

O.9. The apparatus of claim O, in which each mobile device includes a respective orientation device configured to facilitate a determination of a respective orientation of the mobile device.

O.9.1. The apparatus of claim O.9, in which each orientation determination elements includes at least one of a gyroscope and an accelerometer.

O.10. The apparatus of claim O, in which each mobile device has a combined structure that is flexible.

O.11. The apparatus of claim O, in which each mobile device includes a respective substrate having a front face and a back face, in which each respective display is coupled to a respective front face; and in which each card device has a combined length, width, and height substantially similar to a playing card.

O.11.1. The apparatus of claim O.11, in which each substrate is bendable without interfering with operation of a respective display.

P. An apparatus comprising:

a card device comprising:

a substrate having a front face and a back face;

a display coupled to the front face of the substrate; and an element coupled to the substrate and configured to:

receive an indication of a first card value;

control the display to display the first card value;

receive an indication of a second card value;

receive an advertisement to display on the display; and control the display to replace the first card value with the second card value and to display the advertisement;

in which the card device has a combined length, width, and height substantially similar to a playing card and have a combined structure that is flexible; and a server configured to:

receive information identifying an advertisement;

determine that the advertisement should be displayed on the card device;

determine the first card value; and determine the second card value.

P.1. The apparatus of claim P, in which the element controls the display to display the advertisement between displaying the first card value and displaying the second card value.

P.2. The apparatus of claim P, in which the server is configured to determine an outcome of a hand of a game being played using the card device in which the first card value was dealt based on the second card value rather than the first card value.

P.3. The apparatus of claim P, in which determining the first card value includes determining the first card value based on a random event generation, and in which determining the second card value includes determining the second card value based on at least one other card value associated with a hand to which the first card value is dealt.

P.3.1. The apparatus of claim P.3, in which determining the second card value includes determining the second card value such that the hand results in a winning outcome.

P.3.2. The apparatus of claim P.3, in which the at least one random event generation includes at least one of a random number generation, a random event happening, and a pseudo-random number generation.

P.3.3. The apparatus of claim P.3, in which determining that the advertisement should be displayed includes determining that the first card value results in a losing outcome for the hand.

P.4. The apparatus of claim P, in which determining the second card value includes determining the second card value based on a random event generation, and in which determining the first card value includes determining the first card value based on at least one other card value associated with a hand to which the first card value is dealt.

P.4.1. The apparatus of claim P.4, in which determining the first card value includes determining the first card value such that the hand results in a losing outcome.

P.4.2. The apparatus of claim P.4, in which the at least one random event generation includes at least one of a random number generation, a random event happening, and a pseudo-random number generation.

P.4.3. The apparatus of claim P.4, in which determining that the advertisement should be displayed includes determining that the second card value results in a winning outcome for the hand.

P.5. The apparatus of claim P, in which the display includes a flexible organic light emitting diode display.

P.6. The apparatus of claim P, in which the card device includes a wireless power element configured to provide power from at least one of a time varying magnetic field and an RF signal generated by a power source that is not in physical contact with the wireless power element.

P.7. The apparatus of claim P, in which the card device has a thickness of less than about 0.02 inches.

P.7.1. The apparatus of claim P.7, in which the card device has a thickness of less than about 0.011 inches.

P.8. The apparatus of claim P, in which the advertisement includes at least one of an image, a video, and text.

P.9. The apparatus of claim P, in which determining that the advertisement should be displayed includes determining that the advertisement should be displayed based on a result of a hand of a game that includes the second card value and at least one other card value displayed on at least one other card device.

P.10. The apparatus of claim P, in which the substrate is bendable without interfering with operation of the display.

Q. An apparatus comprising:

a card device comprising:

a substrate having a front face and a back face;

a display coupled to the front face of the substrate;

an element coupled to the substrate and configured to:

receive an indication of a first card value;

control the display to display the first card value;

receive an indication of a second card value; and control the display to replace the first card value with the second card value;

in which the card device has a combined length, width, and height substantially similar to a playing card; and a server configured to:

determine a first card value; and determine a second card value.

Q.1. The apparatus of claim Q, in which the server is configured to determine an outcome of a hand of a game being played using the card device in which the first card value was dealt based on the second card value rather than the first card value.

Q.2. The apparatus of claim Q, in which determining the first card value includes determining the first card value based on a random event generation, and in which determining the second card value includes determining the second card value based on at least one other card value associated with a hand to which the first card value is dealt.

Q.2.1. The apparatus of claim Q.2, in which determining the second card value includes determining the second card value such that the hand results in a winning outcome.

Q.2.2. The apparatus of claim Q.2, in which the at least one random event generation includes at least one of a random number generation, a random event happening, and a pseudo-random number generation.

Q.2.3. The apparatus of claim Q.2, in which the server is configured to determine that the second card value should be displayed on the card device, and in which determining that the second card value should be displayed on the card device includes determining that the first card value results in a losing outcome for the hand.

Q.3. The apparatus of claim Q, in which determining the second card value includes determining the second card value based on a random event generation, and in which determining the first card value includes determining the first card value based on at least one other card value associated with a hand to which the first card value is dealt.

Q.3.1. The apparatus of claim Q.3, in which determining the first card value includes determining the first card value such that the hand results in a losing outcome.

Q.3.2. The apparatus of claim Q.3, in which the at least one random event generation includes at least one of a random number generation, a random event happening, and a pseudo-random number generation.

Q.3.3. The apparatus of claim Q.3, in which the server is configured to determine that the second card value should be displayed on the card device, and in which determining that the second card value results in a winning outcome for the hand.

Q.4. The apparatus of claim Q, in which the display includes a flexible organic light emitting diode display.

Q.5. The apparatus of claim Q, in which the substrate is bendable without interfering with operation of the display.

Q.6. The apparatus of claim Q, in which the card device includes a wireless power element configured to provide power from at least one of a time varying magnetic field and an RF signal generated by a power source that is not in physical contact with the wireless power element.

Q.7. The apparatus of claim Q, in which the card device has a thickness of less than about 0.02 inches.

Q.7.1. The apparatus of claim Q.7, in which the card device has a thickness of less than about 0.011 inches.

Q.8. The apparatus of claim Q, in which the card device has a combined structure that is flexible.

R. An apparatus comprising:

a first set of card devices, each card device of the first set of card devices comprising:

a respective first substrate having a front face and a back face;

a respective first display coupled to the front face of the respective first substrate; and a respective element configured to:

receive a respective indication of a respective first card value; and control the respective display to display the respective first card value;

in which each card device of the first set of card devices has a combined length, width, and height substantially similar to a playing card and has a combined structure that is flexible;

a second card device comprising:

a second substrate having a front face and a back face;

a second display coupled to the front face of the second substrate; and a second element coupled to the second substrate and configured to:

receive an indication of a second card value;

control the second display to display the second card value;

receive an indication of a plurality of third card values; and control the second display to replace the display of the second card value with a simultaneous display of each of the plurality of third card values;

in which the second card device has a combined length, width, and height substantially similar to a playing card and has a combined structure that is flexible; and a server configured to:

determine the first and second card values based on at least one random event generation;

receive an indication of a request to replace the second value; and determine each of the third card values based on the at least one random event generation, in which each third card value includes a replacement value for the second card value in a respective hand of a plurality of hands of draw poker.

R.1 The apparatus of claim R, in which controlling the second display to replace the display of the second card value includes controlling the second display to display the third card values, such that each card value of the third card values is displayed in a respective section of the second card device that does not overlap with other such sections.

R.1.1. The apparatus of claim R.1, in which each section corresponds to a respective hand of the plurality of hands.

R.2. The apparatus of claim R, in which the server is configured to determine if each hand of the plurality of hands is a winning hand based on the respective third card value and the first card values.

R.2.1. The apparatus of claim R.2, in which the second element is configured to control the second display to identify whether each hand of the plurality of hands is a winning hand.

R.3. The apparatus of claim R, in which the server is configured to determine an outcome of a progressive game based on outcomes of the plurality of hands.

R.3.1. The apparatus of claim R.3, in which the server is configured to determine that the progressive game has been won if each of the plurality of hands includes a winning hand.

R.3.1.1. The apparatus of claim R.3.1, in which the server is configured to determine that the progressive game has been won if each of the plurality of hands includes a respective winning hand greater than a particular hand value.

R.3.2. The apparatus of claim R.3, in which the server is configured to determine that the progressive game has been won based on the third card values.

R.3.2.1. The apparatus of claim R.3.2, in which the server is configured to determine that the progressive game has been won if each of the third card values include a same card value.

R.3.2.2. The apparatus of claim R.3.2, in which the server is configured to determine that the progressive game has been won if each of the third card values include a card value that is at least one of greater than a predetermined card value and equal to the predetermined card value.

R.4. The apparatus of claim R, in which the server is configured to determine the outcome of a game based on the third card values.

R.5. The apparatus of claim R, in which the server is configured to receive an indication of a number of the hands, in which the plurality of hands includes the number of hands, and the plurality of third card values includes the number of third card values.

R.5.1. The apparatus of claim R.5, in which the indication is received from at least one of the first card devices and the second card device.

R.5.2. The apparatus of claim R.5, in which the indication includes an indication of a selection through an interface.

R.5.3. The apparatus of claim R.5, in which the indication includes an indication of a selection of a game of draw poker.

R.6. The apparatus of claim R, in which the at least one random event generation includes at least one of a random number generation, a random event happening, and a pseudo-random number generation.

R.7. The apparatus of claim R, in which each of the first displays and the second display includes a flexible organic light emitting diode display.

R.8. The apparatus of claim R, in which each of the first card devices and the second card device the card device includes a respective wireless power element configured to provide power from at least one of a time varying magnetic field and an RF signal generated by a power source that is not in physical contact with the respective wireless power element.

R.9. The apparatus of claim R, in which each card device of the first card devices and the second card device has a respective thickness of less than about 0.02 inches.

R.9.1. The apparatus of claim R.9, in which each card device of the first card devices and the second card device has a respective thickness of less than about 0.011 inches.

R.10. The apparatus of claim R, in which each substrate is bendable without interfering with operation of a respective display.

S. An apparatus comprising:

a processor configured to execute a plurality of instructions; and a memory on which the plurality of instructions are stored, in which the instructions, when execute, cause the processor to:

determine a first set of card values based on at least one random event generation;

control each of a plurality of mobile devices to display a respective one of the first set of card values;

receive an indication of a request to replace one card value of the first set of card values that is displayed on one mobile device of the plurality of mobile devices;

determine a second set of card values based on the at least one random event generation, in which each one of the plurality of the second set of card values corresponds to a replacement card value for the one card value of the first set of card values in a respective one of a plurality of final hands of draw poker; and control the one mobile device to display the second set of card values.

S.1. The apparatus of claim S, in which controlling the one mobile device to display the second set of card values includes controlling the one mobile device to display each of the second set of card values in a respective section of the mobile device that does not overlap with other such sections.

S.1.1. The apparatus of claim S.1, in which each section corresponds to a respective hand of the plurality of hands.

S.2. The apparatus of claim S, in which the instructions, when execute, cause the processor to: determine if each hand of the plurality of hands is a winning hand based on the respective second set of card values and at least one of the first set of card values.

S.2.1. The apparatus of claim S.2, in which the instructions, when execute, cause the processor to in control the one mobile device to identify winning hands of the plurality of hands.

S.3. The apparatus of claim S, in which the instructions, when execute, cause the processor to determine an outcome of a progressive game based on outcomes of the plurality of hands.

S.3.1. The apparatus of claim S.3, in which the instructions, when execute, cause the processor to determine that the progressive game has been won if each of the plurality of hands includes a winning hand.

S.3.1.1. The apparatus of claim S.3.1, in which the instructions, when execute, cause the processor to determine that the progressive game has been won if each of the plurality of hands includes a respective winning hand greater than a particular hand value.

S.3.2. The apparatus of claim S.3, in which the instructions, when execute, cause the processor to determine that the progressive game has been won based on the second set of card values.

S.3.2.1. The apparatus of claim S.3.2, in which the instructions, when execute, cause the processor to determine that the progressive game has been won if each of the second set of card values include a same card value.

S.3.2.2. The apparatus of claim S.3.2, in which the instructions, when execute, cause the processor to determine that the progressive game has been won if each of the second set of card values include a card value that is at least one of greater than a predetermined card value and equal to the predetermined card value.

S.4. The apparatus of claim S, in which the instructions, when execute, cause the processor to determine the outcome of a game based on the second set of card values.

S.5. The apparatus of claim S, in which the instructions, when execute, cause the processor to receive an indication of a number of the hands, in which the plurality of hands includes the number of hands, and the second set of card values includes the number card values.

S.5.1. The apparatus of claim S.5, in which the indication of the number is received from at least one of the plurality of mobile devices.

S.5.2. The apparatus of claim S.5, in which the indication of the number includes an indication of a selection through an interface.

S.5.3. The apparatus of claim S.5, in which the indication of the number includes an indication of a selection of a game of draw poker.

S.5.4. The apparatus of claim S.5, in which the indication of the number of hands is received as part of an electronic message that includes the indication of the request to replace the one card value.

S.6. The apparatus of claim S, in which the at least one random event generation includes at least one of a random number generation, a random event happening, and a pseudo-random number generation.

S.7. The apparatus of claim S, further comprising the plurality of mobile devices.

S.7.1. The apparatus of claim S.7, in which each mobile device includes:

a respective first substrate having a front face and a back face;

a respective first display coupled to the front face of the respective substrate; and a respective element configured to:

receive respective card values and cause the display to display the respective card values.

S.7.1.1. The apparatus of claim S.7.1, in which each mobile device has a combined length, width, and height substantially similar to a playing card.

S.7.1.1.1. The apparatus of claim S.7.1.1, in which each mobile device has a respective thickness of less than about 0.02 inches.

S.7.1.1.1.1. The apparatus of claim S.7.1.1.1, in which each mobile device has a respective thickness of less than about 0.011 inches.

S.7.1.2. The apparatus of claim S.7.1, in which each of the displays includes a flexible organic light emitting diode display.

S.7.1.3. The apparatus of claim S.7.1, in which each substrate is bendable without interfering with operation of a respective display.

S.7.1.4. The apparatus of claim S.7.1, in which each mobile device includes a respective wireless power element configured to provide power from at least one of a time varying magnetic field and an RF signal generated by a power source that is not in physical contact with the respective wireless power element.

S.7.1.5. The apparatus of claim S.7.1, in which each mobile device has a combined structure that is flexible.

XXII. Card Devices

Figure 3:
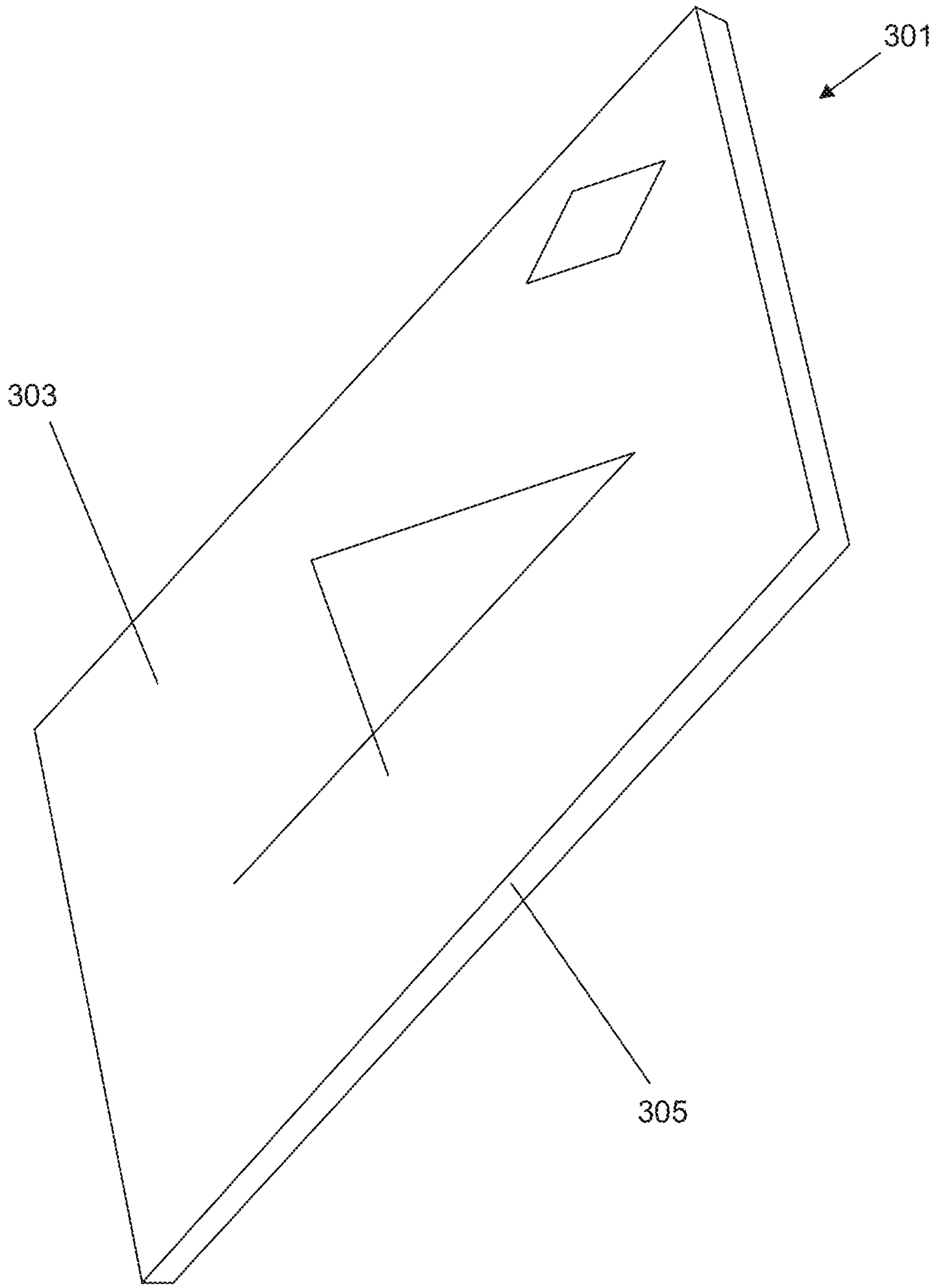
FIG. 3 shows an example card device according to some embodiments.

FIG. 3 illustrates an example card device 301. The card device may be used to play games, obtain information, display images, make purchases, and so on. The card device may be flexible. The card device may include a display 303 coupled to a face of a substrate. The display may include a flexible organic light emitting diode display or other flexible display.

A. Organic Light Emitting Diodes

Some embodiments may include one or more organic light emitting diode displays coupled to one or more faces of a substrate of a card device. Some example organic light emitting diode displays may consume low levels of power, may be about as thin as or thinner than a piece of paper, may be bendable and/or flexible, may be efficiently produced, and/or may include any other number of desirable properties. Examples of flexible organic light emitting diodes include a polymer light emitting diode (PLED) or a light-emitting polymer (LEP). Such examples include conductive polymers that emit light when a voltage is applied. Some example polymers that may be used include poly(p-phenylene vinylene) and/or polyfluorene. Such examples may be applied to a flexible substrate, such as a plastic or glass to create flexible display 303. Some embodiments may include an active matrix OLED, a passive matrix OLED, a phosphorescent OLED, a transparent and top emitting OLED, and/or any other desired technology. It should be recognized that although examples herein may be given in terms of a flexible organic light emitting diode display, other embodiments may include any other display technology whether flexible or non-flexible.

Flexible organic light emitting diode displays are known in the art. For examples regarding manufacture and use of organic light emitting diode displays, the following references provide significant information.

Figure 40:
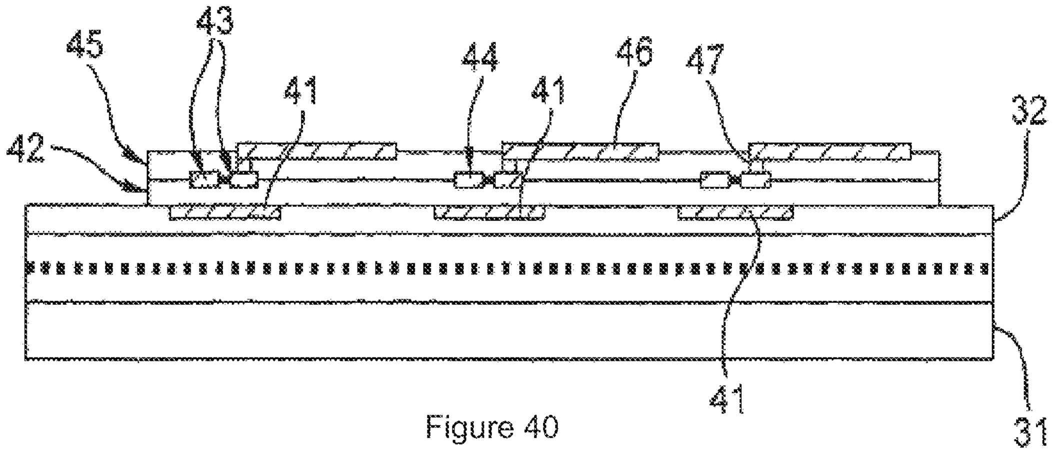
FIGS. 40-53 illustrate various example components that may be used in some embodiments.
Figure 41:
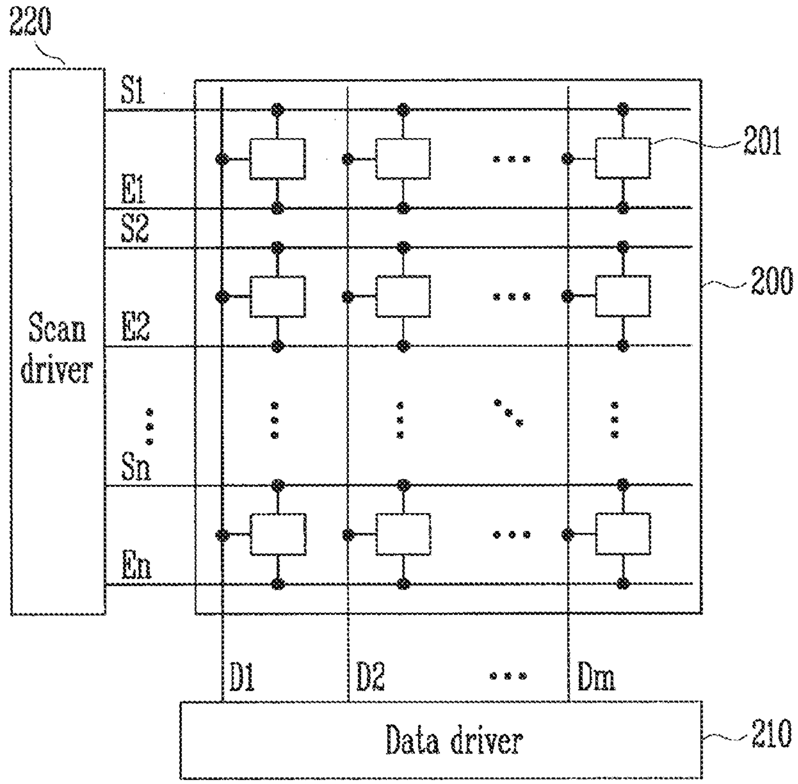
Figure 42:
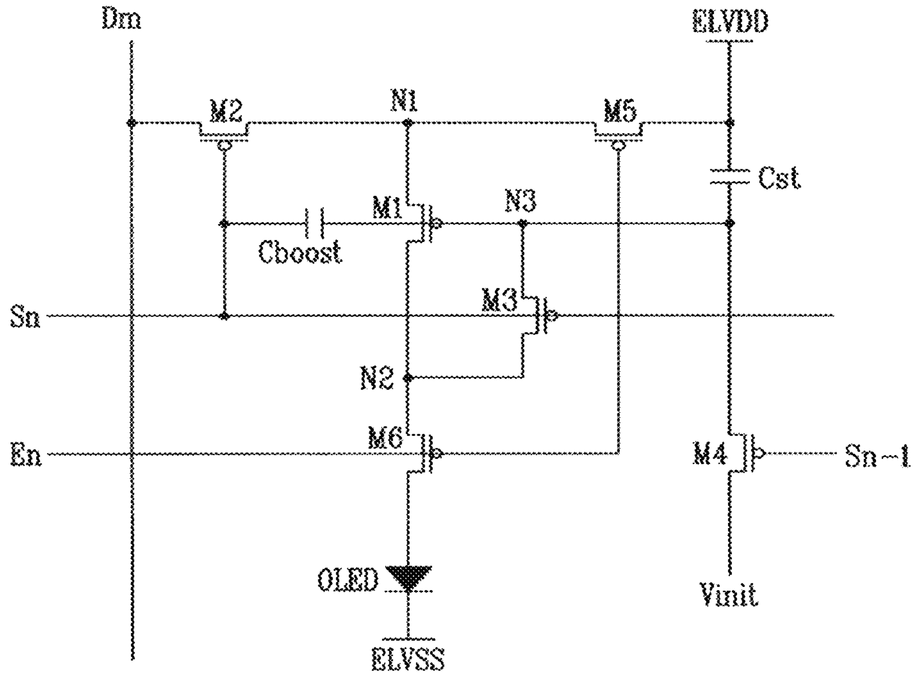
Figure 43:
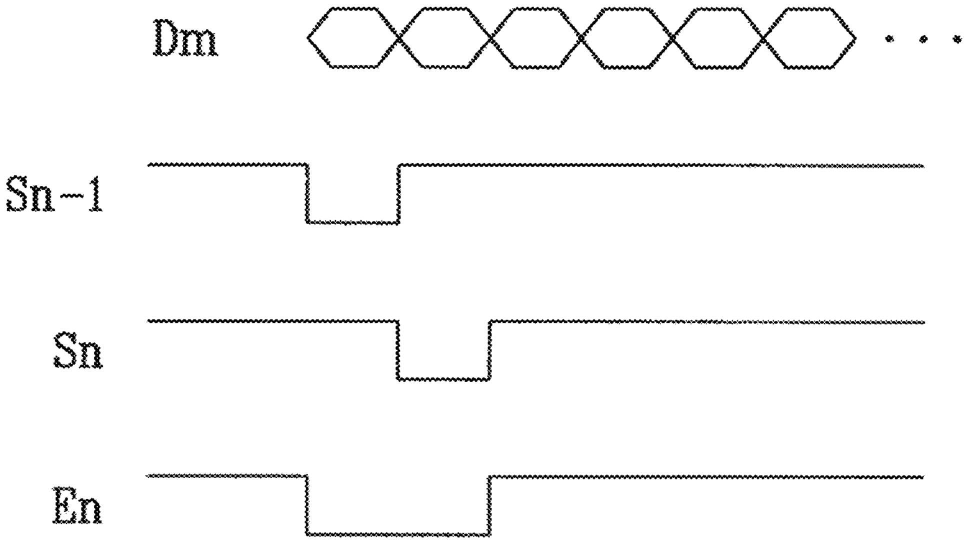
Figure 44:
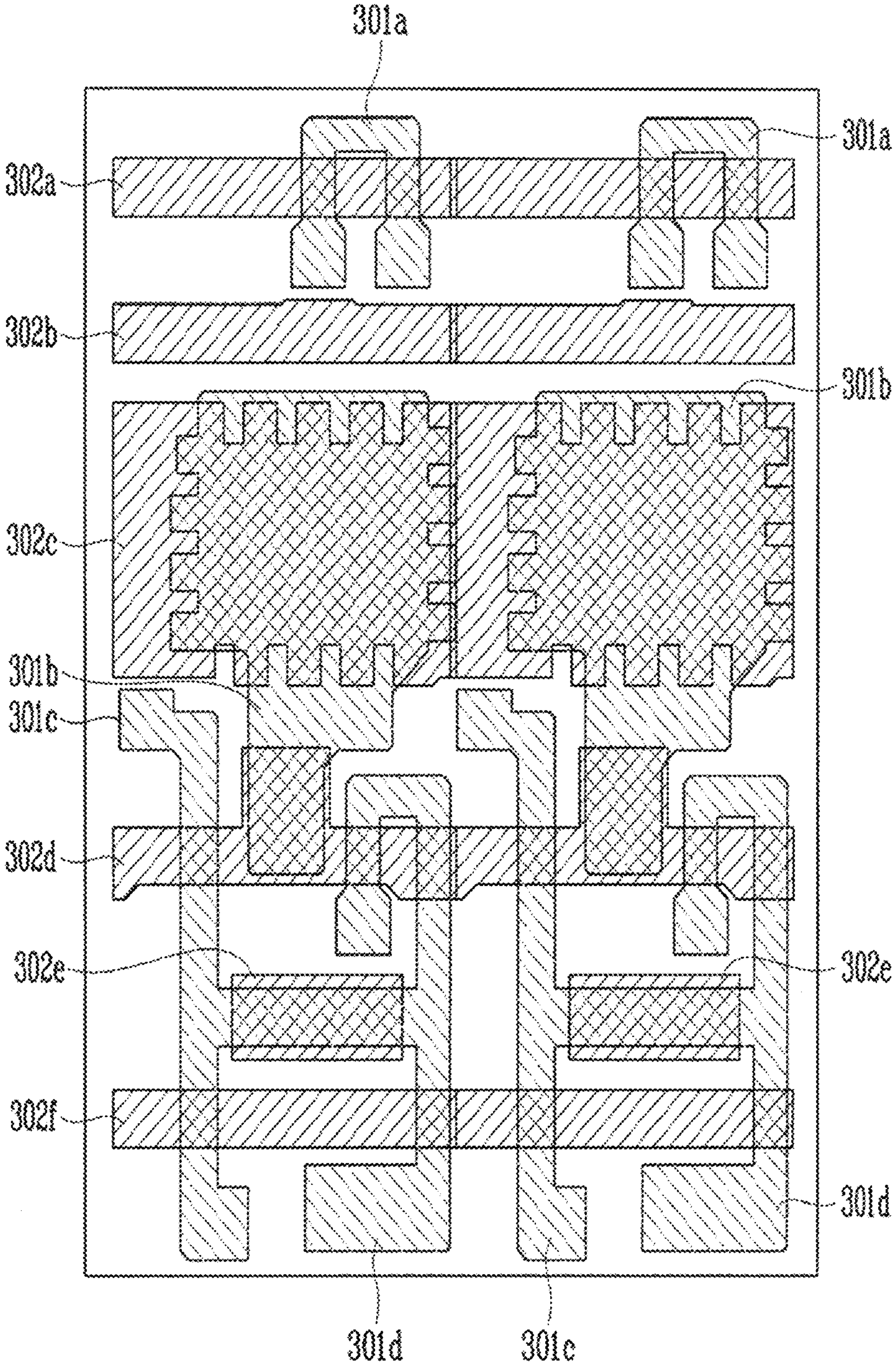
Figure 45:
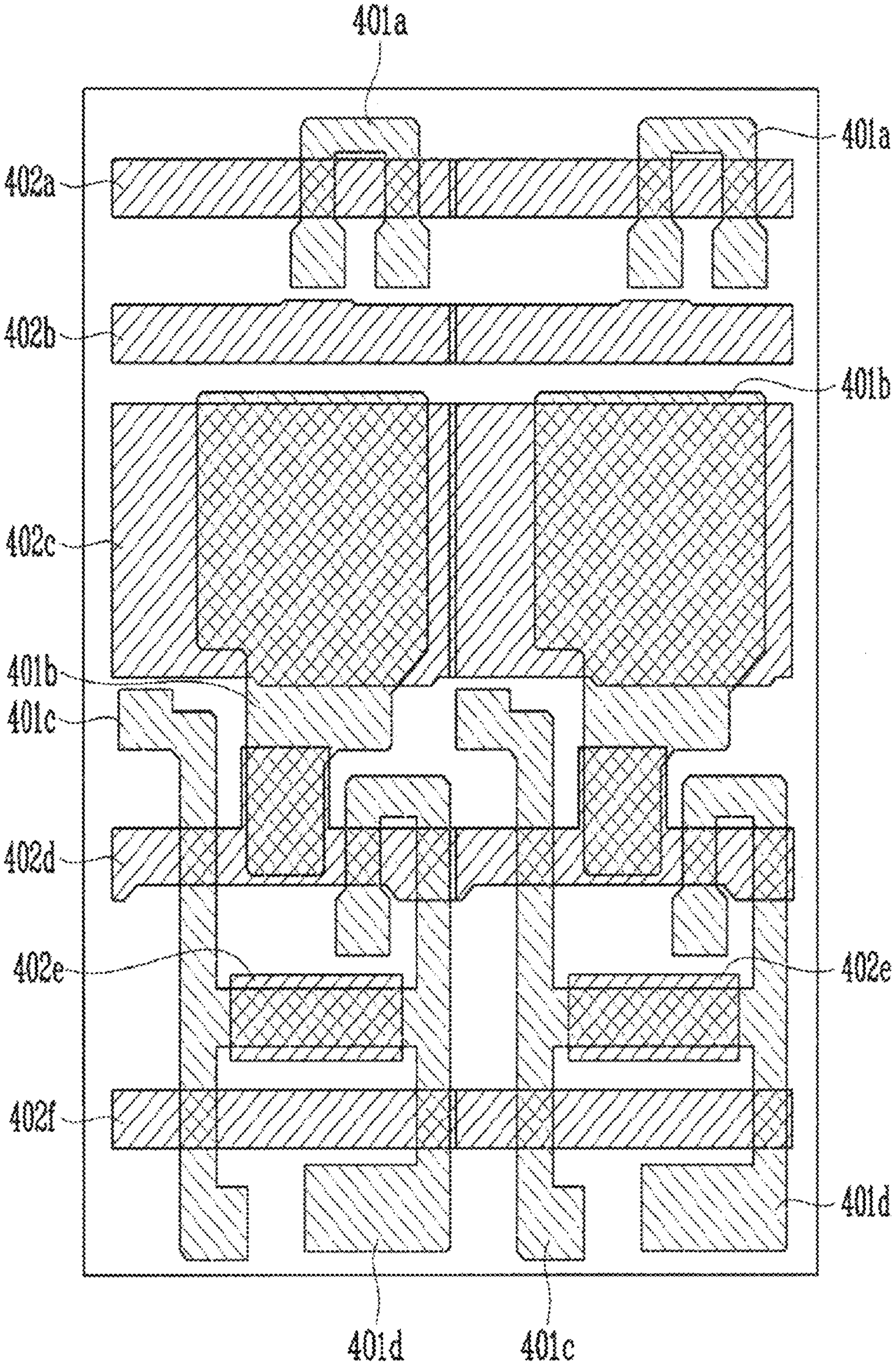
Figure 46:
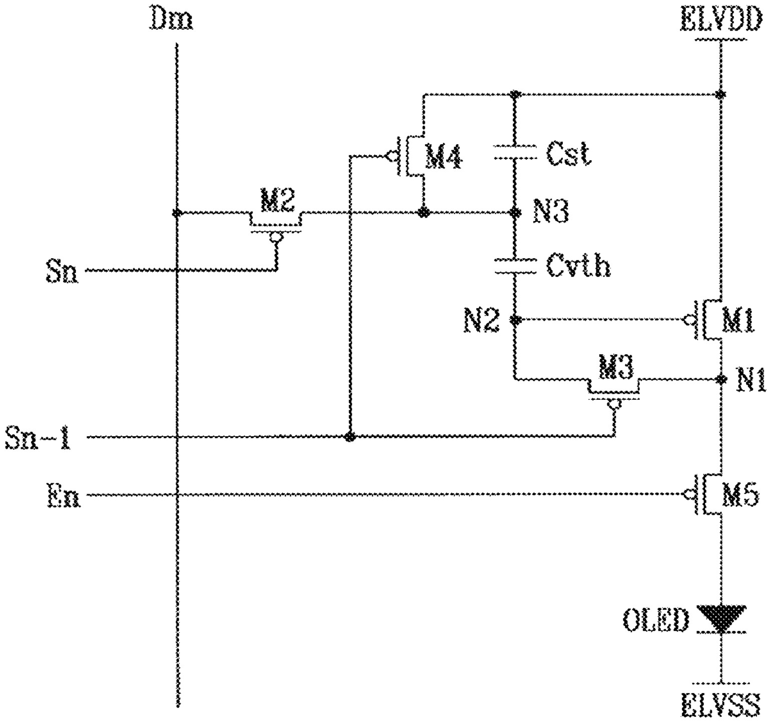

U.S. patent application Ser. No. 12/094,521 entitled "PROCESS FOR FABRICATING A FLEXIBLE ELECTRONIC DEVICE OF THE SCREEN TYPE, INCLUDING A PLURALITY OF THIN-FILM COMPONENTS" is hereby incorporated herein by reference and describes some example fabrication methods for a flexible organic light emitting diode display. Part of this application, in which FIG. 3 refers to FIG. 40, recites:

> "An advantage of the FIG. 1 device is therefore that it can be fabricated using techniques for depositing thin layers on a substrate formed of glass, at least at the surface, without it being necessary afterwards to dissociate the components from the glass.
>
> FIGS. 2 to 7 show how this screen 10 can be fabricated in accordance with the invention. This screen fabrication process can be described succinctly by the following steps:
>
> 1) fabrication of a starting substrate consisting of a stack of a thin glass film and a rigid film, advantageously also made of glass, the two being temporarily fastened together by reversible direct (molecular) bonding to form a debondable interface;
> 2) fabrication of an active matrix of pixels on that substrate;
> 3) fabrication of a display layer on top of the active matrix of pixels, 4) separation of the rigid glass support, 5) transfer of the screen onto a holding support, which can be flexible, if necessary.

Production of a Basic Substrate

The basic substrate is fabricated from two glass plates 31 and 32 the shape and size of which are relatively unimportant, depending on the target application for the final device. However, the thicknesses of these plates are chosen to satisfy a number of criteria:

1) the total thickness of the two plates is such that the combination thereof can be manipulated, typically at least equal to approximately 0.4 to 0.7 mm, for example, for an area of the order of 4 m.sup.2, 2) the bottom plate 31 has sufficient thickness for this bulk plate to be rigid.

For example, two plates of borosilicate glass are used, of 100 or 200 mm diameter, 0.7 mm thick and with a roughness of 0.2 nm (as measured by AFM over fields of (1.times.1).mu.m.sup.2).

These plates are intended to be temporarily fastened together. To this end, their roughness is advantageously at most equal to one nanometer, preferably of the order of 0.5 nm or less, which is favorable for good molecular bonding of the facing faces of the plates 31 and 32. If necessary, specific layers can be deposited to obtain the required surface roughness. That roughness can be chosen to enable subsequent debonding at the bonding interface.

The bottom plate, the function of which is to be rigid and to withstand well subsequent component fabrication treatments, can be made from a wide variety of materials. However, as indicated above, it is advantageous if it is also made of glass, preferably a glass with the same properties as that of the top plate in order to avoid thermal expansion problems, for example a standard borosilicate glass as used in the LCD industry.

In practice these plates are cleaned to remove particulate, organic or metallic contamination. This cleaning can be of chemical (wet or dry), thermal, chemical-mechanical polishing or any other type capable of efficiently cleaning the facing surfaces intended to constitute a debondable interface. In the case of wet chemical cleaning, two cleaning compositions can be used: H.sub.2SO.sub.4, H.sub.2O.sub.2, H.sub.2O or NH.sub.4OH, H.sub.2O.sub.2, H.sub.2O. If necessary, the surfaces are then rinsed with water and dried. The person skilled in the art knows how to adapt the mode of cleaning as a function of what is required.

The surfaces to be bonded are advantageously hydrophilic after cleaning.

Once the surface treatment has been effected, the prepared faces of the two surfaces of the plates are brought into contact to proceed to the direct bonding.

The two plates bonded in this way can be annealed, if required, to increase the bonding energy. For example, annealing at 420.degree. C. is carried out for 30 minutes.

One of the two plates, here the top plate, is then thinned to the thickness of glass required for the final device, by any appropriate known mechanical and/or chemical technique. This step is optional if the plate concerned has the required thickness from the outset. For example, one of the substrates is thinned to 100.mu.m, 75.mu.m or 64.mu.m.

The thickness of the thinned plate, here the top plate 32, given the properties of the glass used, is such that this plate has a flexibility compatible with the intended application of the finished product; this thickness is in practice at most equal to 100 microns and preferably at most equal to 50 microns; it is therefore correct to define the thinned top plate 32 as being a thin glass film. By comparison, the bottom plate 31 is a rigid bulk plate.

The stack shown in FIG. 2 is then obtained, in which the surface areas 31A and 32A of the two plates affected by the bonding conjointly form a bonding interface 33.

This interface is debondable, or reversible, by virtue of the measures taken to prepare the surfaces. It will be evident to the person skilled in the art how to draw inspiration from the teachings of the aforementioned PCT patent publication no. WO-02/084722 to control the bonding energy of this interface properly. For example, the bonding energy is very low, of the order of 350 mJ/m.sup.2.

In one embodiment, the bonding energy is controlled by operating beforehand on the microroughness of the faces to be assembled. There is deposited onto one of the glass layers before bonding a layer of one or more oxides (for example SiO.sub.2) the microroughness of which is adjusted. The person skilled in the art knows how to adjust the microroughness, by modifying the thickness of the deposited layer and/or using a specific chemical treatment (for example attack with hydrofluoric acid HF). If the oxide used is SiO.sub.2, the person skilled in the art can further opt to apply or not heat treatment to impart to the SiO.sub.2 layer the properties of thermal silica (see for example the paper "Bonding energy control: an original way to debondable substrates"; in Semiconductor Wafer Bonding: Science, Technology and Applications VII, Bengtsson ed, The Electrochemical Society 2003, p. 49, given at the Paris conference of the Electrochemical Society in May 2003).

In a different embodiment, the bonding energy is controlled by operating on the microroughness of the faces to be assembled and then carrying out cleaning as described hereinabove.

The basic substrate 31-32 is then used like a standard glass plate to fabricate an active matrix with thin layer components, here of TFT type. It is clear that the presence of the debondable interface does not significantly modify the mechanical properties of the stack compared to a one-piece plate of the same thickness. Alternatively, it is of course possible to use for the bottom plate a material other than glass but the stack of which with the top plate can undergo the same mechanical and heat treatments as the stack 31-32: the person skilled in the art knows how to evaluate the characteristics required for this kind of stack (in particular the nature and the thicknesses of the materials to be adopted and the associated thermal limitations).

Fabrication of the TFT Active Matrix

FIG. 3 represents an active matrix plate after producing an array of TFT components corresponding to pixels from amorphous silicon using the bottom gate technology. Other technologies can be used, of course, such as the top gate technology. Similarly, the components can instead be based on other materials, in particular polycrystalline silicon. Production conditions can be exactly the same as for fabrication on a standard glass substrate; in particular, the maximum temperature used can be the same (generally 300.degree. C. to deposit layers using the PECVD technique). This is made possible by the nature of the (glass) layers of the basic substrate and by the capacity of reversible bonding to withstand these temperatures. Moreover, as indicated, the total thickness of the basic substrate is very similar to that of a glass plate conventionally used in this kind of processing (0.7 mm).

The perfect compatibility of processing with existing fabrication lines is a considerable advantage of the invention, especially with respect to processes necessitating the presence of a layer of plastic during fabrication of the TFT (in the "EPLAR" process). Accordingly, as known in the art, this array of thin layer components includes: 1) a metal gate 41 deposited by any appropriate deposition technique on the free surface of the thin glass film, 2) an insulative gate layer 42, typically of silicon nitride SiNx, 3) areas of amorphous silicon 44 deposited on the insulative layer (stack of intrinsic and doped layers), 4) contacts 43 deposited by any appropriate technique on the silicon layer and forming metal sources and drains, 5) an insulative passivating layer 45 covering the insulative layer 42 and the contacts, and 6) pixel electrodes 46, of ITO type for example for an LCD screen, produced on this passivation layer by any appropriate known process. For an OLED screen, the electrodes are of molybdenum or aluminum or any other conductive material enabling injection of holes or electrons into the OLED.

Transverse strands, such as the strands 47 (these transverse strands are not all represented in the figures, for reasons of the legibility thereof), are provided in the insulative layers to establish the appropriate connections.

The next step is to fabricate a display layer on this active matrix of TFT components.

Fabrication of the OLED Screen

FIG. 4 represents the step of adding to the pixel electrodes localized layers comprising appropriate organic electroluminescent materials, in practice red (48A), green (48B) and blue (48C) in color to produce a color OLED screen. These localized layers can be organic layers with small molecules (which yield "OLED" components) or polymer layers (which yield "PLED" components). They can be deposited by evaporation, by ink jet or by a turntable coating process. For more details see the paper "High efficiency phosphorescent OLEDs and their addressing with Poly or amorphous TFTS", M. Hack et al., Eurodisplay 2002 Conference, Proc p. 21-24, Nice, October 2002.

These localized layers are covered by a conductive layer forming a second electrode or counter-electrode, to be more precise a cathode 49, which here is a continuous plane above the localized layers. This cathode cooperates with the electrodes 46 to form electroluminescent components emitting green, red or blue light according to the material sandwiched in this way.

These OLED components are covered with an encapsulation layer 50, which can be of SiNx. In the present example light is emitted toward the bottom of the screen (bottom emission), which is not possible with the SUFTLA or EPLAR processes. It is nevertheless possible, by adapting the materials, to operate with top emission.

The screen formed by the superposition of the TFT components and the OLED components is then covered by one or more layers of plastic material 51 which has a protective function as well as providing a handle for subsequent manipulation of the structure. This layer is deposited by rolling, for example (in particular, by unrolling this layer and pressing it onto the deposit surface).

Fabrication of the screen further includes a step of connecting drivers to the screen; this can be done at this stage.

The product obtained after this stage includes the screen to be produced as well as the rigid glass bulk layer that facilitated manipulating the assembly during the various fabrication steps.

This rigid layer must next be separated from the screen as such.

Separation

The separation step consists in separating the screen and the thin layer of thin glass from the rigid layer of thick glass.

Separation is effected in the direct bonding area. It is advantageously effected by inserting a blade at the places indicated by arrows in FIG. 5. If the plastic encapsulation layer 50 is strong enough not to break during separation, there is no need to use a support handle glued on top as in the prior art processes.

Figure 6:
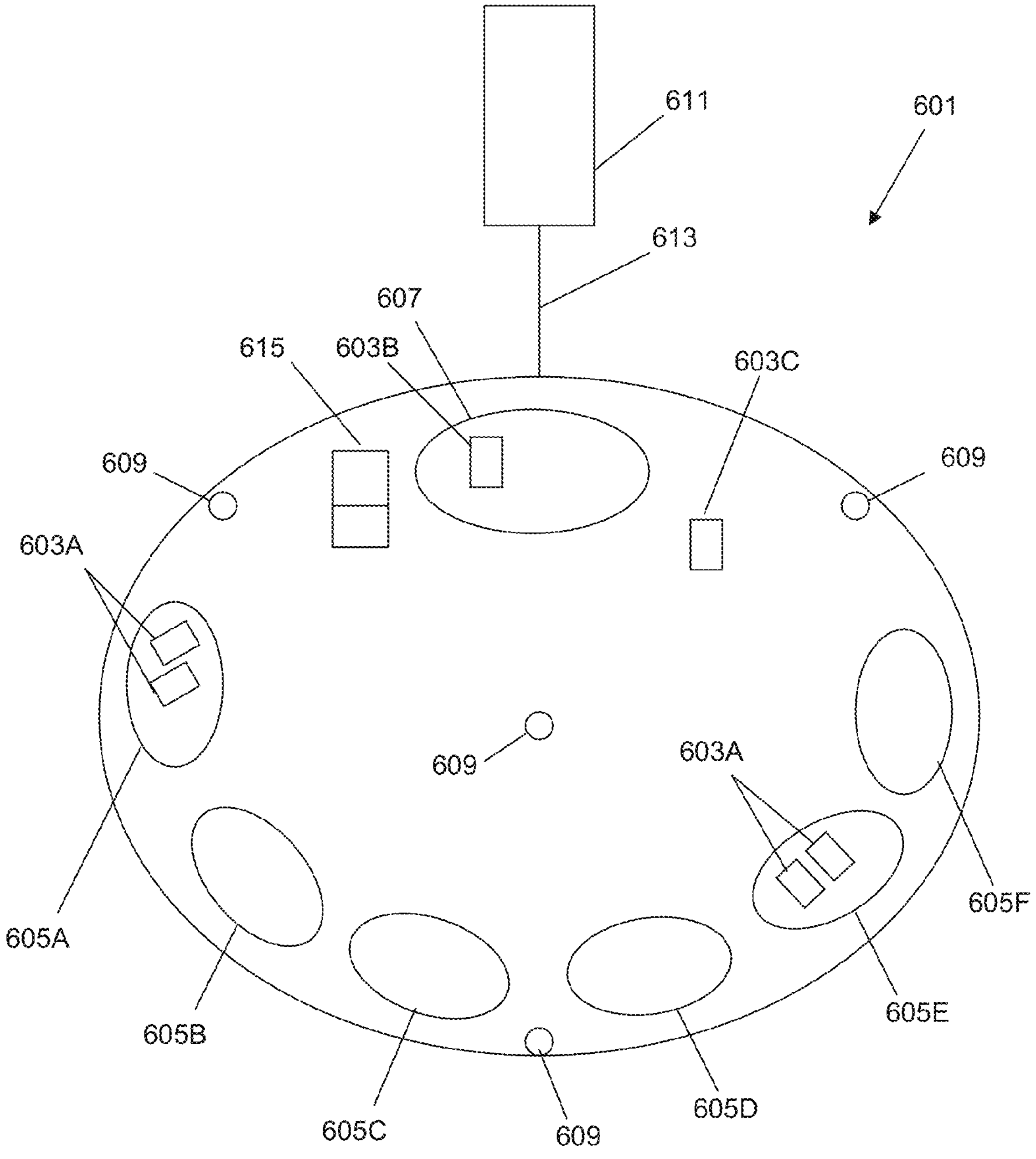
FIG. 6 shows an example table according to some embodiments.

FIG. 6 represents the result of this separation, at the place where the original plates were bonded.

In the embodiment specifically described, plates are therefore separated of which one has been thinned to 75.mu.m or 64.mu.m without breaking that plate.

It is interesting to note that, because the separation is the result of debonding of the interface initially obtained by bonding, the surfaces exposed by the separation are of good flatness and necessitate no costly planarization and/or cleaning treatment. Because of this they are in particular transparent in the case of bottom emission.

Thus the screen is separated from the glass substrate used to manipulate it during the fabrication steps. It is then possible to install this screen at its operating location.

Transfer

The screen is then transferred onto a support 60 of any appropriate material, given the intended application, for example a plastic material support (see FIG. 7); this support is of polymer, for example, such as PET, for example.

This support 60 is preferably rolled onto the screen.

Figure 7:
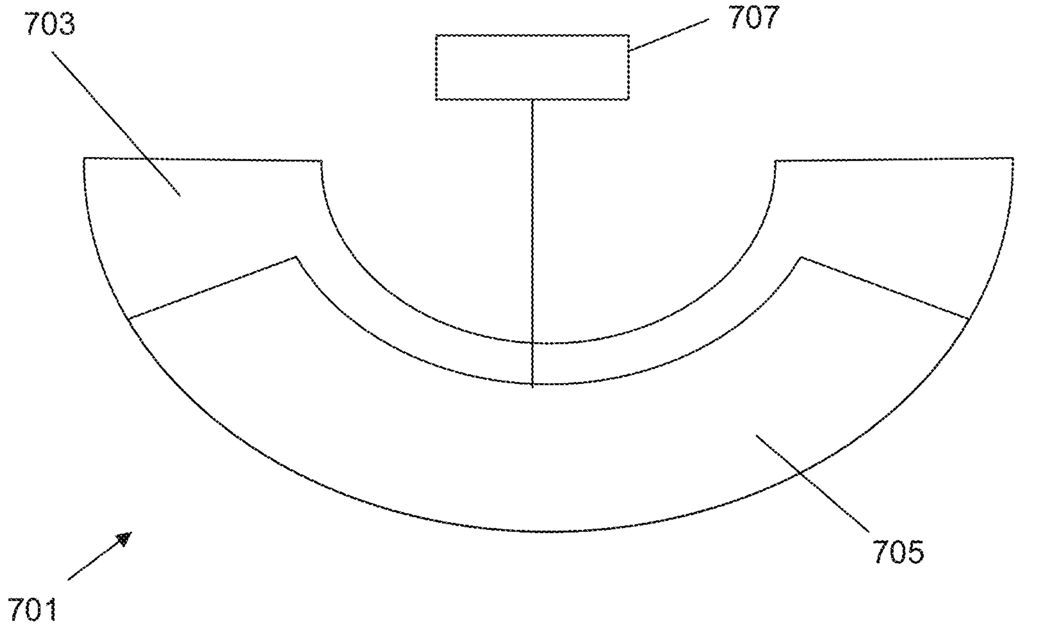
FIG. 7 shows an example gaming area according to some embodiments.

Comparing FIGS. 1 and 7 shows that the product obtained conforms well to the product required. There is seen the area 13 that is the surface area 32A of the plate 32 (see transfer of a basic substrate and FIG. 2) and which is the area of this plate 32 to which reversible bonding relates.

The screen, and therefore its thin layer of glass, can be fixed by bonding.

If a support is chosen that is flexible, because of its nature and/or its thickness (for example with a relatively small thickness in the range from 20 to 50 microns) a flexible screen is obtained.

Of course, the support can be more rigid, for example as a result of choosing greater thicknesses between 200 and 700 microns; the screen is then not particularly flexible, but nevertheless has the advantage of being light in weight and robust compared to an identical screen produced on a glass bulk support, with no separation.

It is therefore clear that, because the screen on its own is flexible, it is according to its application that the person skilled in the art will decide to retain one or both of these properties.

Thus the thin product obtained by the process of the invention can, alternatively as a function of requirements, be transferred in particular to materials such as a thin metal, for example stainless steel with a thickness advantageously between 50 and 200 microns, which preserves the quality of flexibility and improves the robustness and thermal stability of the assembly.

Clearly, although the description has just been given with respect to an OLED or PLED screen, it will be obvious to the person skilled in the art how to adapt the above teachings under item 3 to other applications, such as fabricating electrophoretic, LCD or PDLC screens:

1) for an electrophoretic screen: deposition of an electrophoretic layer by rolling, for example, 2) for an LCD screen, various technologies are possible (TN, PDLC, STN, etc.); the person skilled in the art will know how to adapt the process accordingly. For the TN technology: bonding a thin plate of colored filters (for example of glass) and filling with liquid crystal (for more details see "Liquid Crystal Displays, Addressing Schemes and Electrooptical Effects", Ernst Lueder, Wiley Editor, June 2001).

Of course, the debondable interface can be produced, instead of directly between bared faces of two glass plates, indirectly, between attachment layers deposited on the faces to be fastened together."

U.S. patent application Ser. No. 12/107,164 entitled "ORGANIC LIGHT EMITTING DISPLAY AND MANUFACTURING METHOD THEREOF" is hereby incorporated herein by reference and describes some example components of an organic light emitting diode display and the driving of such a display. Part of this application, in which FIGS. 2, 3, 4, 5, 6, and 7 refer to FIGS. 41, 42, 43, 44, 45, and 46 respectively, recites:

"FIG. 2 is a structure view schematically showing a structure of an organic light emitting display according to an embodiment of the present invention. Referring to FIG. 2, a display region (or pixel unit) 200 is arranged with a plurality of pixels 201, wherein each pixel 201 includes an organic light emitting diode for emitting light corresponding to the flow of current. Also, n scan lines S1, S2, . . . Sn−1 and Sn (for transferring scan signals) and n light emitting control lines E1, E2, . . . , E1 and En are arranged in a row direction, and m data lines D1, D2, . . . Dm−1 and Dm (for transferring data signals) are arranged in a column direction. In addition, the display region 200 is driven by receiving a first power of a first power supply ELVDD and a second power of a second power supply ELVSS. Further, after the pixel 201 is initialized by receiving initialization voltage Vinit by utilizing the scan signal of a previous scan line (e.g., Sn−1), the organic light emitting diode is light-emitted by utilizing the scan signal of a current scan line (e.g., Sn), the data signal, the first power of the first power supply ELVDD and the second power of the second power supply ELVSS, to thereby display an image.

A data driver 210, which is utilized for applying the data signal to the display region 200, generates the data signal by receiving video data with red, blue, and green components. Also, the data driver 210 is coupled to the data lines D1, D2, . . . , Dm−1, and Dm of the display region 200 to apply the generated data signal to the display region 200.

A scan driver 220 is utilized for applying the scan signal to the display region 200. The scan driver 220 is coupled to the scan lines S1, S2, . . . Sn−1, and Sn and the light emitting control lines E1, E2, . . . E1, and En to transfer the scan signal and the light emitting control signal to the display region 200. The data signal output from the data driver 210 is transferred to the pixel 201 to which the scan signal is also transferred, and current corresponding to the data signal flows into the pixel 201 to which the light emitting control signal is transferred so that light is emitted.

FIG. 3 is a circuit view schematically showing a first embodiment of a pixel adopted in the display region shown in FIG. 2, and FIG. 4 is a signal view schematically showing a signal transferred into the pixel of FIG. 3. Referring to FIGS. 3 and 4, the pixel includes a first transistor M1, a second transistor M2, a third transistor M3, a fourth transistor M4, a fifth transistor M5, a sixth transistor M6, a first capacitor Cst, a second capacitor Cboost, and an organic light emitting diode OLED.

The source of the first transistor M1 is coupled to a first node N1, the drain thereof is coupled to a second node N2, and the gate thereof is coupled to a third node N3. The first transistor M1 controls the amount of current flowing in a direction from the first node N1 to the second node N2 corresponding to the voltage of the gate of the first transistor M1.

The source of the second transistor M2 is coupled to a data line Dm, the drain thereof is coupled to the first node N1, and the gate thereof is coupled to a scan line Sn. The second transistor M2 performs turn-on and turn-off operations by utilizing a scan signal sn transferred through the scan line Sn so that the data signal can selectively be transferred to the first node N1.

The source of the third transistor M3 is coupled to the second node N2, the drain thereof is coupled to the third node N3, and the gate thereof is coupled to the scan line Sn. The third transistor M3 performs turn-on and turn-off operations by utilizing the scan signal sn to selectively form the same voltage on the gate and the drain of the first transistor M1 so that the first transistor M1 is diode-connected.

The source of the fourth transistor M4 is coupled to an initialization power supply line Vinit for transferring initialization voltage, the drain thereof is coupled to the third node N3, and the gate thereof is coupled to a previous scan line Sn−1. The fourth transistor M4 performs turn-on and turn-off operations by utilizing a previous scan signal sn−1 transferred through the previous scan line Sn−1 to initialize the first capacitor Cst.

The source of the fifth transistor M5 is coupled to the first node N1, the drain thereof is coupled to the first power supply line ELVDD for transferring a first power, and the gate thereof is coupled to a light emitting control line En. The fifth transistor M5 performs turn-on and turn-off operations by utilizing a light emitting control signal received through the light emitting control line En so that the first power transferred through the first power supply line ELVDD is selectively transferred to the first node N1.

The source of the sixth transistor M6 is coupled to the second node N2, the drain thereof is coupled to an anode electrode of the organic light emitting diode OLED, and the gate thereof is coupled to the light emitting control line En. The sixth transistor M6 allows the current flowing in a direction from the first node N1 to the second node N2 to be selectively transferred to the organic light emitting diode OLED by utilizing the light emitting control signal transferred through the light emitting control line En.

The first electrode of the first capacitor Cst is coupled to the third node N3 and the second electrode thereof is coupled to the first power supply line ELVDD to maintain the voltage of the third node N3.

The first electrode of the second capacitor Cboost is coupled to the gate of the second transistor M2 and the second electrode thereof is coupled to the third node N3. If the scan signal sn transferred through the scan line Sn changes to a high state from a low state, the voltage of the first electrode of the second capacitor Cboost becomes high and thus, the voltage of the third node N3 also becomes high.

The operation of the pixel of FIG. 3 will be described in more detail with reference to FIG. 4. First, the fourth transistor M4 is in an on-state by utilizing the previous scan signal sn−1 transferred through the previous scan line Sn−1 so that the first capacitor Cst is initialized by utilizing the initialization signal Vinit. Then, when the second transistor M2 and the third transistor M3 are in on-states by utilizing the scan signal sn transferred through the scan line Sn−1, voltage corresponding to the equation 2 is transferred to the first electrode of the first capacitor Cst.

$$V\text{.sub.data}-V\text{.sub.}th \qquad \text{Equation 2}$$

Here, V.sub.data represents the voltage of the data signal, V.sub.th represents the threshold voltage of the first transistor M1. Therefore, voltage corresponding to the equation 2 is applied to the gate of the first transistor M1. At this time, current flowing in a direction from the source of the first transistor M1 to the drain thereof corresponds to the equation 3 below.

$$I\text{.sub.}d=(\text{beta}/2)*(V\text{.sub.}gs-V\text{.sub.}th)^2=(\text{beta}/2)*(V\text{.sub.}th-V\text{data}+ELVDD-V\text{.sub.}th)^2=(\text{beta}/2)*(ELVDD*V\text{data})^2 \qquad \text{Equation 3}$$

Here, I.sub.d represents current flowing in the direction from the source of the first transistor M1 to the drain thereof, .beta. represents a constant, V.sub.th represents the threshold voltage of the first transistor M1, ELVDD represents pixel voltage applied to the source of the first transistor M1, and Vdata represents the voltage of the data signal. Accordingly, as can be seen in Equation 2, the unevenness of the threshold voltage of the first transistor M1 can be compensated.

Also, the first capacitor Cst and the second capacitor Cboost are coupled so that when the scan signal sn transferred to the second capacitor Cboost (coupled to the scan line Sn) changes to a high state from a low state, the voltage of the third node N3 becomes high. Accordingly, the gate voltage of the first transistor M1 becomes high so that the pixel can display black (or a black image or a black color).

The organic light emitting diode OLED includes a light emitting layer, an anode electrode and a cathode electrode. If current flows to the light emitting layer, the organic light emitting diode accordingly emits light. The anode electrode of the organic light emitting diode is coupled to the drain of the sixth transistor M6, and the cathode electrode thereof is coupled to the second power supply (or the second power supply line) ELVSS.

Figure 5:
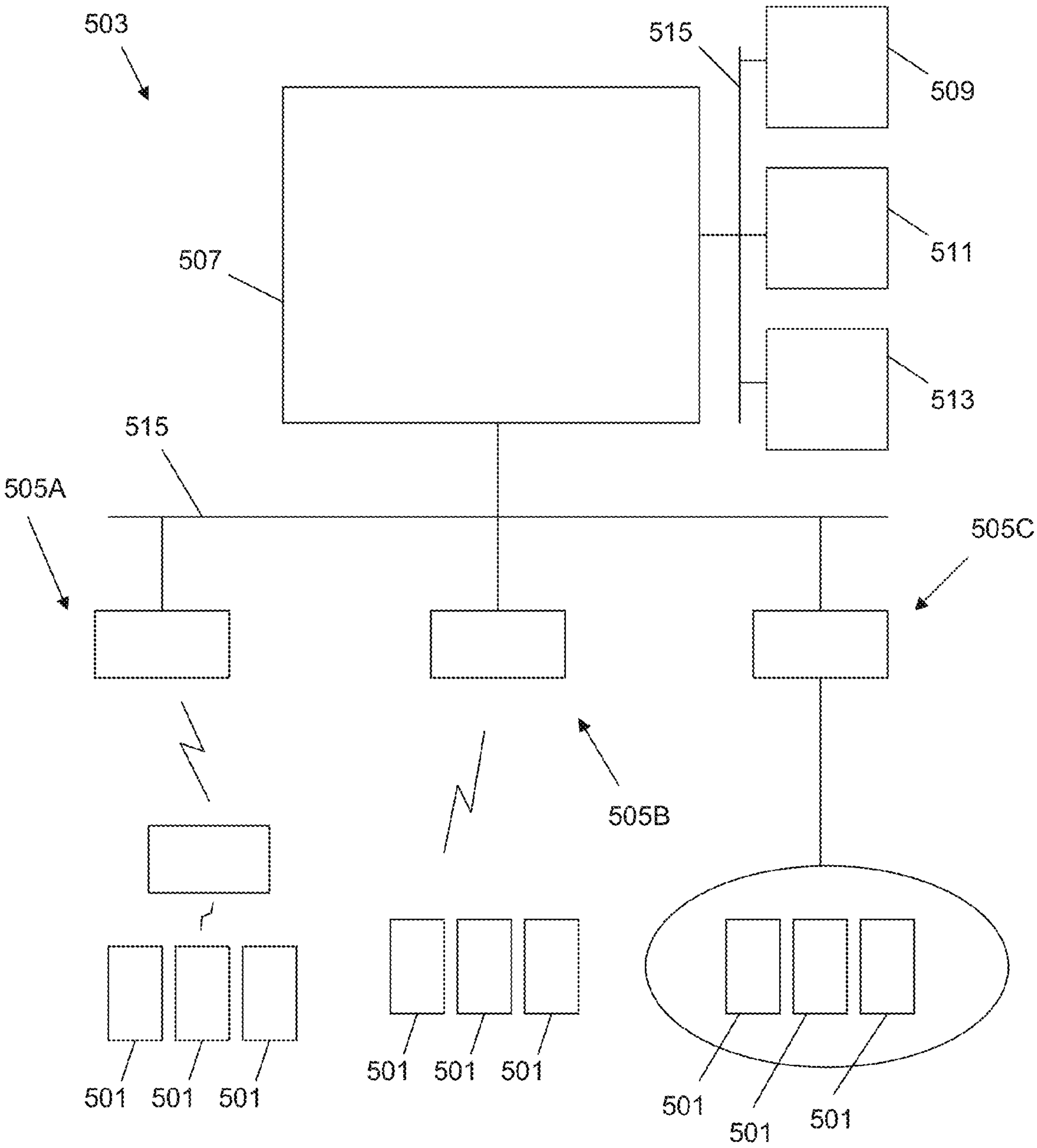
FIG. 5 shows an example system according to some embodiments.

FIG. 5 is a lay-out view schematically showing a structure of the pixel of FIG. 3, and FIG. 6 is a lay-out view schematically showing a structure of a commonly used pixel. Referring to FIGS. 5 and 6, poly silicon layers 301a, 301b, 301c, and 301d or 401a, 401b, 401c, and 401d are firstly formed on a substrate, and the poly silicon layers are etched into desired shapes (or predetermined shapes) in an etching process so that they become active layers 301a, 301c, and 301d or 401a, 401c, and 401d of transistors, and first electrodes 301b or 401b of capacitors, etc. Also, metal layers 302a, 302b, 302c, 302d, 302e, and 302f or 402a, 402b, 402c, 402d, 402e, and 402f are formed thereon to form a scan line (e.g., 302a or 402a), a light emitting control line, a gate electrode of the transistor, and second electrodes 302c, 302e or 402c, 402e of the capacitors, etc.

Here, the first electrodes of the capacitors formed by utilizing the poly silicon layers become the first electrodes of the first and second capacitors Cst and Cboost in FIG. 4, and the second electrodes of the capacitor formed by utilizing the metal layers become the second electrodes of the first and second capacitors Cst and Cboost.

In more detail and as shown in FIG. 5, the poly silicon layer 301b is utilized to form the first electrode of the first capacitor Cst, and the metal layer 302c is utilized to form the second electrode of the first capacitor Cst. Here, the poly silicon layer 301b and the metal layer 302c are formed with bents at their outside portions so that the area sizes of the first and second electrodes of the first capacitor Cst can be small, thereby reducing the capacitance of the first capacitor Cst. The form of bents is not limited to the form as shown in FIG. 5, and any suitable structural form for allowing an etched area to be more widely formed, such as a saw-tooth form, etc. can be used.

In FIG. 6, the first and second electrodes of the first capacitor Cst are formed to not have bents at the outside portion of the first capacitor Cst. By contrast, in the embodiment of present invention as shown in FIG. 5, bents are formed, and the reason why the bents are formed on the first and second electrodes of the first capacitor Cst is to lower the difference between values of the design kickback voltage and the actual kickback voltage generated in actual (or real manufacturing) processes.

The kickback voltage corresponds to the equation 4.

$$\text{.DELTA.}V=(V)*(C\text{boost})/(Cst+C\text{boost}) \qquad \text{Equation 4}$$

Here, .DELTA.V represents the kickback voltage, Cst represents the capacitance of the first capacitor, Cboost represents the capacitance of the second capacitor, and V represents the voltage of the scan signal. The value of the design kickback voltage of the first and second capacitors is shown in Table 1.

TABLE 1

| | Area | Capacitance | Ratio | Cboost/ (Cst/Cboost) | Kickback voltage |
|---|---|---|---|---|---|
| Cst | 1047 | 0.359 | 6.377 | 0.136 | 1.654 |
| Cboost | 164 | 0.0563 | | | |

If the first and second capacitors designed as above are formed as shown in FIG. 6, they have sizes as shown in Table 2.

TABLE 2

| | Area | Capacitance | Ratio | Cboost/ (Cst/Cboost) | Kickback voltage |
|---|---|---|---|---|---|
| Cst | 993 | 0.3405 | 6.893 | 0.127 | 1.546 |
| Cboost | 144 | 0.0494 | | | |

In other words, in a process forming the first and second capacitors, the sizes of the first and second capacitors are represented to be smaller than the values of design. Also, the size of the second capacitor is smaller than that of the first capacitor so that the first capacitor is proportionally reduced less in amount than that of the second capacitor. Therefore, a ratio of the capacitance of the second capacitor in the sum of the capacitances of the first and second capacitors is smaller in the actual (or real) process than the value of the design, so that there is a large difference between the values of the design kickback voltage and the actual kickback voltage.

Therefore, as shown in FIG. 5, the outside portion of the poly silicon layer formed as the first electrode of the first capacitor is formed to have bents, and the outside portion of the metal layer formed as the second electrode of the first capacitor is formed to have bents so that the first capacitor is formed. As shown in FIG. 5, if the outside portions of the poly silicon layer and the metal layer are formed to have bents, the area amount that the poly silicon layer and the metal layer are reduced so that the capacitance of the first capacitance becomes smaller, as shown in Table 3.

TABLE 3

| | Area | Capacitance | Ratio | Cboost/ (Cst/Cboost) | Kickback voltage |
|---|---|---|---|---|---|
| Cst | 938 | 0.319 | 6.457 | 0.134 | 1.635 |
| Cboost | 114 | 0.0494 | | | |

Therefore, the ratio of the capacitance of the second capacitor in the sum of the capacitances of the first and second capacitors becomes larger than that shown in Table 2. Reviewing the differences of the kickback voltages, the kickback voltage shown in Table 3 has a size similar to that shown in Table 1, thereby making it possible to reduce the deterioration of image quality due to the difference of values of the design kickback voltage and the actual kickback voltage.

FIG. 7 is a circuit view showing a second embodiment of the pixel adopted in the display region shown in FIG. 2. Referring to FIG. 7, the pixel includes first to fifth transistors M1 to M5, a first capacitor Cst, a second capacitor Cvth, and an organic light emitting diode OLED, and operates by receiving a signal as shown in FIG. 4.

The first to fifth transistors M1 to M5 includes sources, drains, and gates, and are implemented as transistors in PMOS forms. The sources and drains of each of the transistors do not have a physical difference so that they can be referred to as a first electrode and a second electrode. Also, each of the first capacitor Cst and the second capacitor Cvth includes a first electrode and a second electrode.

The source of the first transistor M1 receives pixel power through a pixel power supply line ELVDD, the drain thereof is coupled to a first node N1, and the gate thereof is coupled to a second node N2. The amount of current flowing in a direction from the source to the drain is determined according to voltage applied to the gate of the first transistor M1.

The source of the second transistor M2 is coupled to a data line Dm, the drain thereof is coupled to a third node N3, the gate thereof is coupled to a scan line Sn. The second transistor M2 performs turn-on and turn-off operations by utilizing a scan signal sn transferred through the scan line Sn to selectively transfer a data signal to the third node N3.

The source of the third transistor M3 is coupled to the first node N1, the drain thereof is coupled to the second node N2, and the gate thereof is coupled to a previous scan line Sn−1. The third transistor M3 performs turn-on and turn-off operations by utilizing a previous scan signal sn−1 transferred through the previous scan line Sn−1 to selectively make the potentials of the first node N1 and the second node N2 equal so that the first transistor M1 is selectively diode-connected.

The source of the fourth transistor M4 is coupled to the pixel power supply line ELVDD, the drain thereof is coupled to the third node N3, and the gate thereof is coupled to the previous scan line Sn−1. The fourth transistor M4 selectively transfers pixel power of the pixel power line ELVDD to the third node N3 according to the previous scan signal sn−1.

The source of the fifth transistor M5 is coupled to the first node N1, the drain thereof is coupled to an organic light emitting diode OLED, and the gate thereof is coupled to a light emitting control line En. The fifth transistor M5 performs turn-on and turn-off operations by utilizing a light emitting control signal received through the light emitting control line En to allow current flowing to the first node N1 to flow to the organic light emitting diode OLED.

The first electrode of the first capacitor Cst is coupled to the pixel power supply line ELVDD, and the second electrode thereof is coupled to the third node N3. The first capacitor Cst selectively stores a voltage having a value that is as much as voltage difference between the pixel power supply line ELVDD and the third node N3 by utilizing the fourth transistor M4.

The first electrode of the second capacitor Cvth is coupled to the third node N3, and the second electrode thereof is coupled to the second node N2. Accordingly, the second capacitor Cvth stores voltage having a voltage that is as much as the voltage difference between the third node N3 and the second node N2.

Therefore, when the third transistor M3 and the fourth transistor M3 are in on-states by utilizing the previous scan signal sn−1 transferred to the previous scan line Sn−1, the first transistor M1 is diode-connected so that voltage corresponding to the threshold voltage of the first transistor M1 is transferred to the first electrode of the second capacitor Cvth and the pixel power ELVDD is transferred to the second electrode of the second capacitor Cvth. Accordingly, the second capacitor Cvth stores voltage corresponding to the threshold voltage of the first transistor M1. Then, when the scan signal sn is received through the scan line Sn, the second transistor M2 is in an on-state so that a data signal is transferred to the third node N3. As a result, the voltage of the third node N3 is changed to the voltage of the pixel power supply ELVDD, and voltage corresponding to the data signal is stored in the first capacitor Cst. Therefore, the voltage corresponding to the data signal and the threshold voltage is stored in the second node N2, and driving current with a compensated threshold voltage is generated and flows in a direction from the source of the first transistor M1 to the drain thereof. Accordingly, the unevenness of brightness due to the difference of the threshold voltages of transistors can be compensated.

Even in the pixel constructed as above, the design value of the capacitance difference between the first capacitor Cst and the second capacitor Cvth may still be different from the actual (or real) value in an actual (or real manufacturing) process. As such, in order to allow the capacitance of the first capacitor Cst to become smaller, the outside portions of the first electrode and second electrode of the first capacitor Cst can be formed to have bents.

In view of the foregoing, with the organic light emitting display and the manufacturing method thereof according to embodiments of the present invention, the deterioration of image quality due to the unevenness of the threshold voltages can be prevented (or reduced), and the deterioration of image quality due to the difference in the design and actual values of the capacitance differences (or capacitance ratios or kickback voltages) between the capacitors caused by an error generated in the actual (or real manufacturing) process can be prevented (or reduced), thereby making it possible to further improve the image quality."

Figure 47:
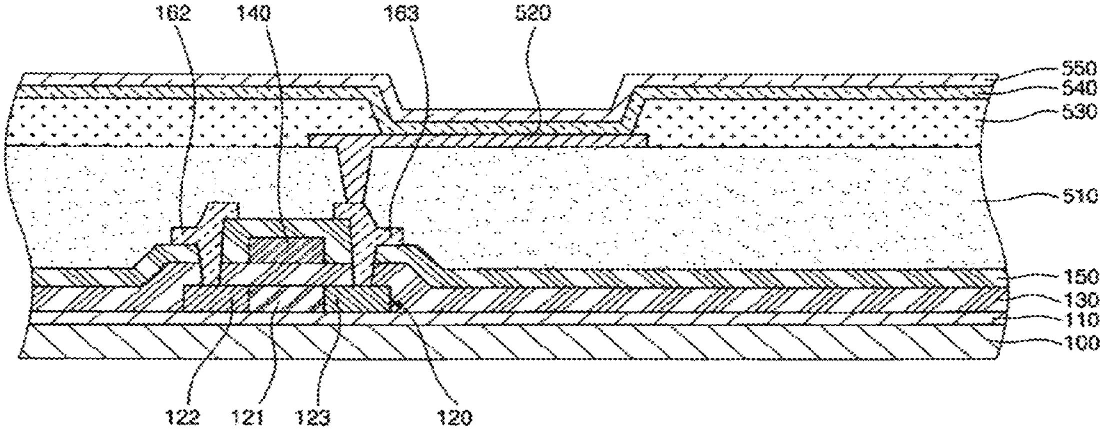

U.S. patent application Ser. No. 12/163,074 entitled "THIN FILM TRANSISTOR, METHOD OF FABRICATING THE SAME, ORGANIC LIGHT EMITTING DIODE DISPLAY DEVICE INCLUDING THE SAME AND METHOD OF FABRICATING THE SAME" is hereby incorporated herein by reference and describes some example manufacture and use of some example organic light emitting diode display components and thin film circuitry. Part of this application, with FIG. 5 referring to FIG. 47, recites:

"FIG. 1 is a cross-sectional view of a thin film transistor according to an embodiment of the present invention.

Referring to FIG. 1, a substrate 100 is provided. The substrate 100 may be formed of glass or plastic. A buffer layer 110 may be disposed on the substrate 100. The buffer layer 110 serves to prevent diffusion of moisture or impurities generated in the substrate 100 and to control a heat transfer rate in crystallization such that an amorphous silicon layer can be easily crystallized. The buffer layer 110 may be formed of a single layer using an insulating layer such as a silicon oxide layer and a silicon nitride layer or a multilayer thereof.

A patterned semiconductor layer 120 is disposed on the buffer layer 110. The semiconductor layer 120 is a semiconductor layer crystallized by a method using a metal catalyst such as an MIC method, an MILC method, or an SGS method, and includes a channel region 121, and source and drain regions 122 and 123. For example, the semiconductor layer 120 may be crystallized by an SGS method such that the concentration of the metal catalyst that diffuses to the amorphous silicon layer is controlled to be low.

The SGS method is a crystallization method in which the concentration of metal catalyst that is diffused into the amorphous silicon layer is controlled to be low, so that the grain size is controlled to several .mu.m to hundreds of .mu.m. As an example, a capping layer may be formed on the amorphous silicon layer, a metal catalyst layer may be formed on the capping layer and an annealing process may be performed to diffuse the metal catalyst such that the capping layer provides control over the diffusion of the metal catalyst. Alternatively, the concentration of the metal catalyst may be controlled to be low in the amorphous silicon layer by forming the metal catalyst layer to have a low concentration without forming the capping layer.

According to an aspect of the present invention, the metal catalyst exists at a concentration exceeding 0 and not exceeding 6.5.times.E.sup.17 atoms per cm.sup.3 within 150.ANG. from a surface of the semiconductor layer in a vertical direction in the channel region 121 of the semiconductor layer 120. As used herein, the term "vertical direction" refers to a direction perpendicular to the surface of the semiconductor layer and more specifically, to a direction extending from the surface of the semiconductor layer that is on an opposite side of the substrate towards the substrate.

FIG. 2 is a graph of leakage current versus concentration of a metal catalyst existing in a channel region of a semiconductor layer that is crystallized using the metal catalyst.

Here, a concentration (atoms per cm.sup.3) of a metal catalyst is plotted on the horizontal axis, and a current leakage value I.sub.off (A/.mu.m) per unit length 1.mu.m is plotted on the vertical axis.

Referring to FIG. 2, when the concentration of the metal catalyst is 9.55.times.E.sup.18, 5.99.times.E.sup.18 or 1.31.times.E.sup.18 atoms per cm.sup.3, which exceeds 6.5.times.E.sup.17 atoms per cm.sup.3, it is observed that a current leakage value I.sub.off (A/.mu.m) per unit length 1.mu.m is 1.0 E.sup.-12 A/.mu.m or higher.

However, when the concentration of the metal catalyst is 6.5.times.E.sup.17 atoms per cm.sup.3 or lower, it is observed that the current leakage value I.sub.off (A/.mu.m) per unit length 1.mu.m is 4.0 E.sup.-13 A/.mu.m or lower. An important factor determining the characteristics of a thin film transistor is leakage current, and when the leakage current is maintained at a current leakage value I.sub.off (A/.mu.m) per unit length 1.mu.m of E.sup.-13 A/.mu.m order or lower, the thin film transistor can have excellent electrical characteristics. Therefore, in order to fabricate a thin film transistor exhibiting excellent electrical characteristics, a metal catalyst in a channel region of a semiconductor layer may be controlled to have a concentration of 6.5.times.E.sup.17 atoms per cm.sup.3 or lower.

FIG. 3A is a table illustrating a concentration value of a metal catalyst that corresponds to each depth from a surface of a semiconductor layer in a vertical direction and is measured using surface concentration measuring equipment, in a thin film transistor having a current leakage value I.sub.off (A/.mu.m) per unit length 1.mu.m of 4.0 E.sup.-13A/.mu.m or lower in FIG. 2, and FIG. 3B is a graph of concentration value versus depth. A depth (.ANG.) in a vertical direction from a surface of a semiconductor layer is plotted on the horizontal axis, and a concentration (atoms per cm.sup.3) of a metal catalyst is plotted on the vertical axis.

Referring to FIGS. 3A and 3B, in the thin film transistor having a current leakage value I.sub.off (A/.mu.m) per unit length 1.mu.m of 4.0 E.sup.-13 A/.mu.m or lower in FIG. 2, calculating the total concentration of the metal catalyst existing from a surface of the semiconductor layer in a vertical direction, it is observed that the total concentration of the metal catalyst existing within 150.ANG. from the surface of the semiconductor layer in a vertical direction is 6.5.times.E.sup.17 atoms per cm.sup.3. Also, it is observed that the total concentration of the metal catalyst at a point exceeding 150.ANG. from the surface of the semiconductor layer in a vertical direction exceeds 6.5.times.E.sup.17 atoms per cm.sup.3. Nevertheless, the electrical characteristics are still excellent. Accordingly, it can be confirmed that the concentration of the metal catalyst at a point exceeding 150.ANG. in a vertical direction rarely has an effect on the determination of the leakage current characteristics of a thin film transistor.

Therefore, referring to FIGS. 2, 3A and 3B, in order to fabricate a thin film transistor of excellent electrical characteristics capable of maintaining a current leakage value I.sub.off (A/.mu.m) per unit length 1.mu.m of E.sup.-13 A/.mu.m order or lower, the concentration of a metal catalyst in a channel region of a semiconductor layer should be controlled to be 6.5.times.E.sup.17 atoms per cm.sup.3 or lower, and in particular, the concentration of the metal catalyst within 150.ANG. from the surface of the semiconductor layer in a vertical direction should be controlled to be 6.5.times.E.sup.17 atoms per cm.sup.3 or lower.

Referring again to FIG. 1, after the semiconductor layer 120 is formed, a gate insulating layer 130 is disposed on the entire surface of the substrate including the semiconductor layer 120. The gate insulating layer 130 may be a silicon oxide layer, a silicon nitride layer or a combination thereof.

A gate electrode 140 is disposed on the gate insulating layer 130 to correspond to a predetermined region of the semiconductor layer 120. The gate electrode 140 may be formed of a single layer of aluminum (Al) or an aluminum alloy such as aluminum-neodymium (Al—Nd) or a multilayer, in which an aluminum alloy is stacked on a chrome (Cr) or molybdenum (Mo) alloy.

An interlayer insulating layer 150 is disposed on the entire surface of the substrate 100 including the gate electrode 140. The interlayer insulating layer 150 may be a silicon nitride layer, a silicon oxide layer or a combination thereof.

Source and drain electrodes 162 and 163 electrically connected to the source and drain regions 122 and 123 of the semiconductor layer 120 are disposed on the interlayer insulating layer 150. The source and drain electrodes 162 and 163 may be formed of one selected from the group consisting of molybdenum (Mo), chrome (Cr), tungsten (W), molybdenum-tungsten (MoW), aluminum (Al), aluminum-neodymium (Al—Nd), titanium (Ti), titanium-nitride (TiN), copper (Cu), a molybdenum (Mo) alloy, an aluminum (Al) alloy, and a copper (Cu) alloy. As a result, a thin film transistor according to an embodiment is fabricated.

FIG. 4 is a cross-sectional view of a thin film transistor according to another embodiment of the present invention.

Referring to FIG. 4, a substrate 400 is prepared. A buffer layer 410 may be disposed on the substrate 400. A gate electrode 420 is disposed on the buffer layer 410. A gate insulating layer 430 is disposed on the gate electrode 420.

A patterned semiconductor layer 440 is disposed on the gate insulating layer 430. The semiconductor layer 440 is a semiconductor layer crystallized by a method using a metal catalyst such as an MIC method, an MILC method, or an SGS method, and includes a channel region 441, and source and drain regions 442 and 443. The semiconductor layer 440 may be crystallized by the SGS method such that the concentration of the metal catalyst that diffuses into the amorphous silicon layer is low.

The metal catalyst is present at a concentration of 6.5.times.E.sup.17 per cm.sup.3 or lower within 150.ANG. from a surface of the semiconductor layer 440 in a vertical direction in the channel region 441 of the semiconductor layer 440. As described in the embodiment of FIG. 1, referring to FIGS. 2, 3A and 3B, in order to fabricate a thin film transistor of excellent electrical characteristics capable of maintaining at a current leakage value I.sub.off (A/.mu.m) per unit length 1.mu.m of E.sup.-13 A/.mu.m order or lower, the concentration of a metal catalyst in a channel region of a semiconductor layer should be controlled to be 6.5.times.E.sup.17 atoms per cm.sup.3 or lower, and in particular, the concentration of a metal catalyst within 150.ANG. from the surface of the semiconductor layer in a vertical direction may be controlled to be 6.5.times.E.sup.17 atoms per cm.sup.3 or lower.

Sequentially, source and drain electrodes 462 and 463 electrically connected to the source and drain regions 442 and 443 are disposed on the semiconductor layer 440. An ohmic contact layer 450 may be disposed between the semiconductor layer 440 and the source and drain electrodes 462 and 463. The ohmic contact layer 450 may be an amorphous silicon layer into which impurities are doped.

As a result, a thin film transistor according to the embodiment of FIG. 4 is fabricated. FIG. 5 is a cross-sectional view of an organic light emitting diode (OLED) display device including a thin film transistor according to an exemplary embodiment of the present invention.

Referring to FIG. 5, an insulating layer 510 is formed on the entire surface of the substrate 100 including the thin film transistor according to the embodiment of FIG. 1. The insulating layer 510 may be formed of one selected from the group consisting of a silicon oxide layer, a silicon nitride layer and spin on glass layer, which are inorganic layers, or one selected from the group consisting of polyimide, benzocyclobutene series resin and acrylate, which are organic layers. Also, the insulating layer may be formed of a stacked layer thereof.

The insulating layer 510 may be etched to form a via hole exposing the source or drain electrode 162 or 163. A first electrode 520 is connected to one of the source and drain electrodes 162 and 163 through the via hole. The first electrode 520 may be formed as an anode or a cathode. When the first electrode 520 is an anode, the anode may be a transparent conductive layer formed of one selected from the group consisting of indium-tin-oxide (TTO), indium-zinc-oxide (IZO), and indium-tin-zinc-oxide (ITZO), and when the first electrode 520 is a cathode, the cathode may be formed of Mg, Ca, Al, Ag, Ba or an alloy thereof.

A pixel defining layer 530 having an opening exposing a portion of a surface of the first electrode 520 is formed on the first electrode 520, and an organic layer 540 including a light emitting layer is formed on the exposed first electrode 520. One or more layers selected from the group consisting of a hole injecting layer, a hole transport layer, a hole blocking layer, an electron blocking layer, an electron injection layer, and an electron transport layer may be further included in the organic layer 540. Sequentially, a second electrode 550 is formed on the organic layer 540. As a result, an OLED display device according to an exemplary embodiment of the present invention is fabricated.

Therefore, in the channel region of the semiconductor layer of the thin film transistor and the OLED display device according to an embodiment of the present invention, a metal catalyst for crystallization exists up to 150.ANG. from a surface of the semiconductor layer at a concentration of 6.5.times.E.sup.17 atoms per cm.sup.3 or lower, so that a current leakage value I.sub.off (A/.mu.m) per unit length 1.mu.m becomes 4.0 E.sup.-13 A/.mu.m or lower. Accordingly, when a thin film transistor is used in a display, excellent electrical characteristics are exhibited.

According to aspects of the present invention, in a thin film transistor and an OLED display device using a semiconductor layer crystallized by a metal catalyst, the concentration of the metal catalyst is adjusted depending on the location of a channel region, thereby providing a thin film transistor having excellent electrical characteristics, a method of fabricating the same, an OLED display device, and a method of fabricating the same."

Figure 48:
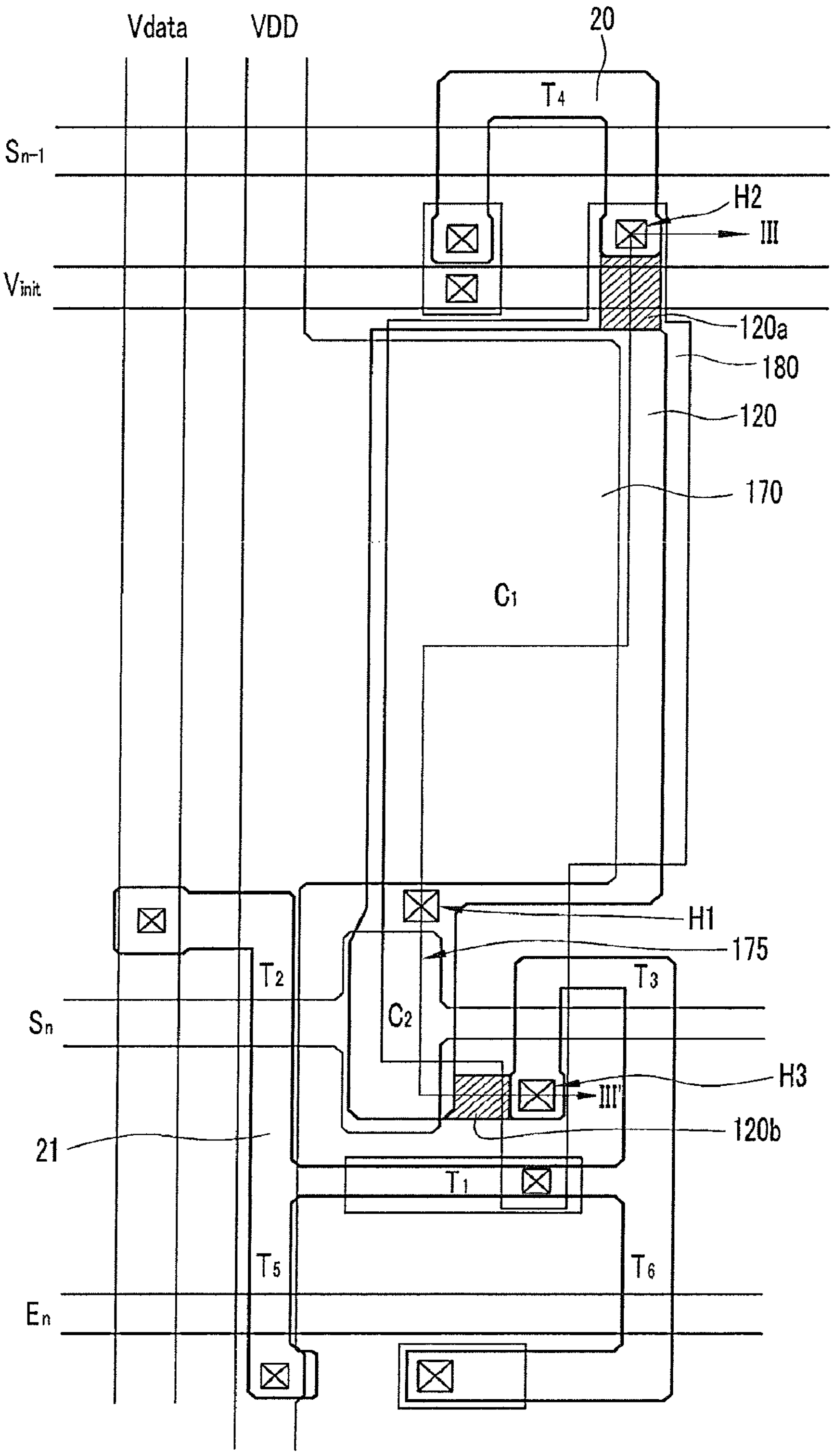
Figure 49:
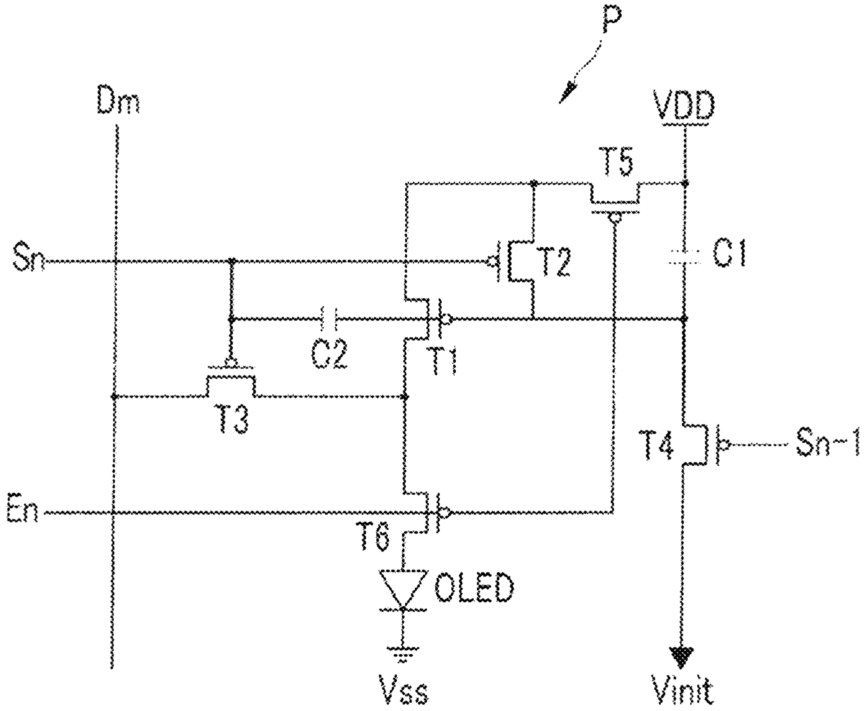

U.S. patent application Ser. No. 11/923,917 entitled "ORGANIC LIGHT EMITTING DIODE DISPLAY" is hereby incorporated herein by reference and describes some further example manufacture methods and uses of some further example organic light emitting diode display components. Part of this application, with FIGS. 2 and 5 referring to FIGS. 48 and 48 respectively, recites:

"FIG. 1 is a schematic view of an OLED display according to an exemplary embodiment of the present invention. Referring to FIG. 1, an OLED display includes a display unit 100, a scan driver 200, a data driver 300, and a light emitting signal driver 400. The display unit 100 includes a plurality of data lines D1, D2 . . . , and Dm extending in a column direction, a plurality of scan lines S1, S2 . . . , and Sn extending in a row direction, a plurality of light emission control lines E1, E2 . . . , and En, and a plurality of pixels P.

The pixels P are red, green, and blue pixels. The pixels P are applied with respective data signals from the data driver 300. In more detail, the data lines D1, D2 . . . , and Dm transmit data signals representing image signals to the pixel circuit formed on each pixel P and the scan lines S1, S2 . . . , and Sn transmit selection signals to the pixel circuit. The red, green, and blue pixels P have identical circuit structures. The red, green, and blue pixels P respectively emit red, green, and blue light corresponding to currents applied to the organic light emitting elements. Accordingly, a variety of colors are emitted by combining light emitted from the red, green, and blue pixels P forming color pixels 110 that are basic units for representing the image.

The scan driver 200 generates selection signals and sequentially applies the generated selection signals to the scan lines S1, S2 . . . , and Sn. Hereinafter, a scan line that transmits a current selection signal will be referred to as "current scan line." Further, a scan line that transmits a selection signal just before the current selection signal is transmitted will be referred to as "former scan line."

The data driver 300 generates data voltages Vdata corresponding to the image signals and applies the same to the data lines D1, D2 . . . , and Dm.

The light emission control driver 400 sequentially applies light emission control signals that control the light emission of the organic light emitting elements to the light emission control lines E1, E2 . . . , and En.

The scan driver 200, data driver 300, and/or light emission control driver 400 may be electrically connected to the display panel (not shown). Alternatively, the scan driver 200, data driver 300, and/or light emission control driver 400 may be provided in the form of chips that are mounted on a tape carrier package (TCP) electrically connected to the display panel. Alternatively, the scan driver 200, data driver 300, and/or light emission control driver 400 may be mounted on a flexible printed circuit (FPC) or a film that is electrically connected to the display panel.

As a further alternative, the driver 200, data driver 300 and/or light emission control driver 400 may be directly mounted on a glass substrate of the display panel. As a further alternative, the scan driver 200, data driver 300, and/or light emission control driver 400 may be replaced with a driving circuit formed on a layer identical to the scan lines, data lines, light emission control lines, and the TFTs, or may be directly mounted.

FIG. 2 is a schematic view of a layout of a major part of one of the pixels of FIG. 1. Referring to FIG. 2, the pixel P includes former and current scan lines Sn−1 and Sn, a data line Vdata, a light emission control line En, first and second semiconductor layers 20 and 21 constituting a plurality of TFTs, and a plurality of electrodes 120, 170, 175, and 180 constituting capacitors C1 and C2.

The former scan line Sn−1, current scan line Sn, and light emission control line En are formed in parallel with each other. The lines are used as gate electrodes of the fourth, second, third, fifth, and sixth transistors T4, T2, T3, T5, and T6.

Further, the data line Dn and the common power line VDD extend to be perpendicular to the former scan line Sn−1, current scan line Sn, and light emission control line En. Source and drain regions and a channel region are formed on the first and second semiconductor layers 20 and 21. The first semiconductor layer 20 constitutes the fourth transistor and the second semiconductor layer 21 constitute the first, second, third, fifth, and sixth transistors T1, T2, T3, T5, and T6.

The drain region of the first semiconductor layer 20 constituting the fourth transistor T4 is connected to an active pattern of the first capacitor C1 through a first extending pattern 120a.

In addition, the drain region of the third transistor T3 of the second semiconductor layer 21 is connected to the active pattern 120 of the second capacitor C2 through a second extending pattern 120b.

In the present embodiment of the present invention, each of the pixels P includes the two capacitors C1 and C2, and each of the capacitors C1 and C2 is formed as a dual-structure capacitor. The first electrode, the second electrode, and the third electrode are layered on one another with insulation layers interposed therebetween. The first and third electrodes contact each other to form a lower electrode, and the second electrode forms an upper electrode. A capacitor having such lower and upper electrodes is called a dual-structure capacitor.

In particular, in the first capacitor C1, the active pattern 120 functioning as the first electrode and the source/drain metal 180 functioning as the third electrode are connected to each other through a first contact hole H1 to form the lower electrode, and the gate pattern 170 functioning as the second electrode connected to the common power line VDD forms the upper electrode.

Further, as described above, the active pattern functioning as the first electrode of the first capacitor extends to be connected to the semiconductor layer included in the transistor connected between a power source VDD that supplies a power supply voltage and a power source Vinit that supplies an initial voltage. That is, the active pattern 120 is connected to the drain region of the fourth transistor T4. The active pattern 120 and the source/drain metal 180 are further connected to each other through a second contact hole H2.

Like the first capacitor C1, the second capacitor C2 includes a lower electrode formed by the connection of the active pattern 120 functioning as the first electrode with the source/drain metal 180 functioning as the third electrode through the first contact hole H1, and a second electrode formed by the gate pattern 175 functioning as the second electrode connected to the current scan line Sn.

As described above, the active pattern 120 functioning as the first electrode of the second capacitor extends to be connected to the semiconductor layer included in the transistor that transmits the data voltage to the driving transistor in response to the selection signal from the current scan line. That is, the active pattern 120 extends to be connected to the drain region of the third transistor T3. Further, the active pattern 120 and the source/drain metal 180 are further connected to each other through a third contact hole H3.

Meanwhile, in the present embodiment, the first and second capacitors C1 and C2 share the lower electrode with each other. However, the upper electrode is divided into two second electrodes 170 and 175 between which the first contact hole H1 is formed. One of the second electrodes 170 or 175 is connected to the power line VDD and the other of the second electrodes 170 or 175 is connected to the current scan line Sn.

As described above, the lower electrode shared by the first and second capacitors C1 and C2 is formed by two sections interconnected through at least two contact holes including the first contact hole H1. Therefore, the active pattern always functions as the lower electrode of the capacitors.

The following will describe a dual-structure of the capacitor of the OLED display in more detail. FIG. 3 is a sectional view taken along line III-III' of FIG. 2.

According to an embodiment of the present invention, a buffer layer 115 is formed on the substrate 110 and the drain regions 23 and 24, and the active pattern 120 of one of the semiconductor layers 20 and 21, which constitutes the third and fourth transistors T3 and T4, is formed on the buffer layer 115.

The active pattern 120 is connected to the drain region 23 of the semiconductor layer constituting the third transistor T3 and the drain region 24 of the semiconductor layer constituting the fourth transistor T4 by the respective first and second extending patterns 120a and 120b.

The first and second extending patterns 120a and 120b may be formed on the substrate in a process for forming the active pattern in the transistor or capacitor areas. Further, the first and second extending patterns 120a and 120b may be doped with impurities to minimize connection resistance. For example, the first and second extending patterns 120a and 120b may be doped with P.sup.+ ions.

A gate insulation layer 130 is formed on the drain regions 23 and 24 of the semiconductor layer constituting the third and fourth transistors and the first and second extending patterns 120a and 120b. Further, the second electrodes 170 and 175 of the respective first and second capacitors C1 and C2 corresponding to the active pattern 120 are formed on the gate insulation layer 130 with the first contact hole H1 formed between the second electrodes 170 and 175.

An interlayer insulation layer 150 is formed on the gate insulation layer 130 and the second electrodes 170 and 175 of the respective first and second capacitors C1 and C2, and the source/drain metal 180 constituting the lower electrode shared by the first and second capacitors C1 and C2 is formed on the interlayer insulation layer 150.

The source/drain metal 180 is further connected to the active pattern 120 through the second and third contact holes H2 and H3 and the first and second extending patterns 120a and 120b as well as through the first contact hole H1. Accordingly, the lower electrode of the first and second capacitors C1 and C2, which is formed by the active pattern 120 and the source/drain metal 180, can be more securely formed.

FIG. 4 is a schematic view of a contact structure and an equivalent structure of the dual-capacitor of FIG. 3.

Referring to FIG. 4, the active pattern 120 and the source/drain metal 180, which constitute the lower electrode of the first and second capacitors C1 and C2, are electrically connected to each other through the first contact hole H1. Further, the first and second extending patterns 120a and 120b extending from the active pattern 120 are further connected to the source/drain metal 180 through the second and third contact holes H2 and H3.

As described above, the active pattern 120 may be connected to the source/drain metal 180 through the second and third contact holes H2 and H3.

Therefore, even when the first contact hole H1 is not successfully formed due to particles generated during a process for forming the active pattern 120 or when a portion of the active pattern 120 where the first contact hole H1 will be formed is eliminated, the active pattern 120 can be securely connected to the source/drain metal 180.

Accordingly, a reduction of the capacity of the capacitors, which may be caused when the first contact hole is not successfully formed such that the active pattern cannot function as the lower electrode, can be prevented. Further, the generation of a bright point or a dark point, which is caused by a proportional imbalance between the storage capacitor and the boost capacitor as the active pattern is eliminated during the forming of the contact hole, can be prevented.

The following will describe an operation of the OLED of the exemplary embodiment of the present invention with reference to the pixel circuit included in each pixel.

FIG. 5 is a circuit diagram of a pixel circuit for driving each pixel P of FIG. 1.

Referring to FIG. 5, the pixel P includes an OLED, a data line Dm, former and current scan lines Sn−1 and Sn, a light emission control line En, and a driving circuit. The driving circuit is coupled to a line of the power source VDD and a line of the power source Vinit to generate a driving current by which the OLED emits light.

The OLED has a diode characteristic, including an anode, an organic thin film, and a cathode. Here, the anode is coupled to the driving circuit and the cathode is coupled to the power line VSS. The second power source VSS may apply a voltage that is lower than that applied by the power source VDD. For example, the second power source VSS may apply a ground voltage or a negative voltage. Therefore, the OLED emits light corresponding to the driving current applied from the driving circuit.

The driving circuit includes six transistors T1, T2, T3, T4, T5, and T6 and two capacitors C1 and C2. As non-limiting examples, the transistors may be P-type metal-oxide-semiconductor field effect transistors (MOSFETs). Each of the transistors has two electrodes forming source and drain electrodes, and a gate electrode.

The first transistor T1 is a driving transistor for driving the OLED. The first transistor T1 is connected between the power source VDD and the OLED and controls a current flowing along the OLED using an initial voltage applied from the power source Vinit to the gate.

The second transistor T2 is a switching transistor having a gate electrode connected to the current scan line Sn and a source electrode connected to the data line Dm. The second transistor T2 diode-connects the first transistor T1 by being turned on hv the scan sinnql transmitted through the current scan line Sn.

The third transistor T3 is a threshold voltage compensation transistor. The third transistor T3 is connected between the data line Dm and the source electrode of the first transistor T1, and transmits a data voltage to the source electrode of the first transistor T1 in response to a scan signal transmitted through the scan line Sn.

The fourth transistor T4 is an initializing transistor. The fourth transistor T4 is connected between the power source Vinit and a first terminal of the first capacitor C1. The fourth transistor T4 transmits an initial voltage to the gate electrode of the first transistor T1 by being turned on in response to a scan signal of the former scan line Sn−1 connected to the gate electrode.

The fifth transistor T5 is a switching transistor. The fifth transistor T5 is connected between the power source VDD and the source electrode of the first transistor T1. The fifth transistor T5 applies a voltage to the source electrode of the first transistor T1 by being turned on in response to a light emission control signal transmitted through the light emission control line En connected to the gate electrode.

The sixth transistor T6 is a light emission control transistor. The sixth transistor T6 is connected between the first transistor T1 and the OLED, and transmits a driving current generated from the first transistor T1 to the OLED in response to a light emission signal transmitted through the light emission control line En connected to the gate electrode.

The first capacitor C1 is a storage capacitor and is connected between the fourth transistor T4 and the line of the power source VDD. When the fourth transistor T4 is turned on, a voltage difference (VDD-Vinit) between the voltage applied from the power source VDD and the initial voltage applied from the power source Vinit is charged in the first capacitor C1. The first capacitor C1 uniformly maintains a voltage between the gate electrode and the power source applying the voltage.

The second capacitor C2 has a first electrode connected to the current scan line Sn and a second electrode connected to the gate electrode of the first transistor T1. The second capacitor C2 maintains a voltage difference between a selection signal from the current scan line Sn and a gate of the first transistor T1 to be a predetermined level.

The OLED is connected between the drain electrode of the sixth transistor T6 and the second power source VSS.

With the above-described structure, a voltage corresponding to the data signal is stored in the second capacitor C2 as the data signal is applied, and the voltage stored in the second capacitor C2 is applied to the pixels as the scan signal is applied. As described above, since the voltage stored in the second capacitor C2 is simultaneously applied to each pixel, an image having uniform luminance can be realized.

In the exemplary embodiment of the present invention, although a case where six transistors and two capacitors are used is illustrated, the present invention is not limited to this embodiment. For example, more than two capacitors may be used.

According to the OLED display of the present invention, even when the contact hole of the dual-capacitor is blocked by particles generated during a manufacturing process, the connection between the active pattern and source/drain metal is maintained through additional contact holes and thus, a high capacity of the capacitor can be ensured. Therefore, the dark point problem can be solved.

Further, even when a portion of the active pattern where the first contact hole will be formed is eliminated due to the particles, the active pattern can be securely connected to the source/drain metal. Therefore, a ratio between a storage cap and a boost cap can be uniformly maintained and thus the generation of the bright point or dark point problem can be prevented."

Figure 8:
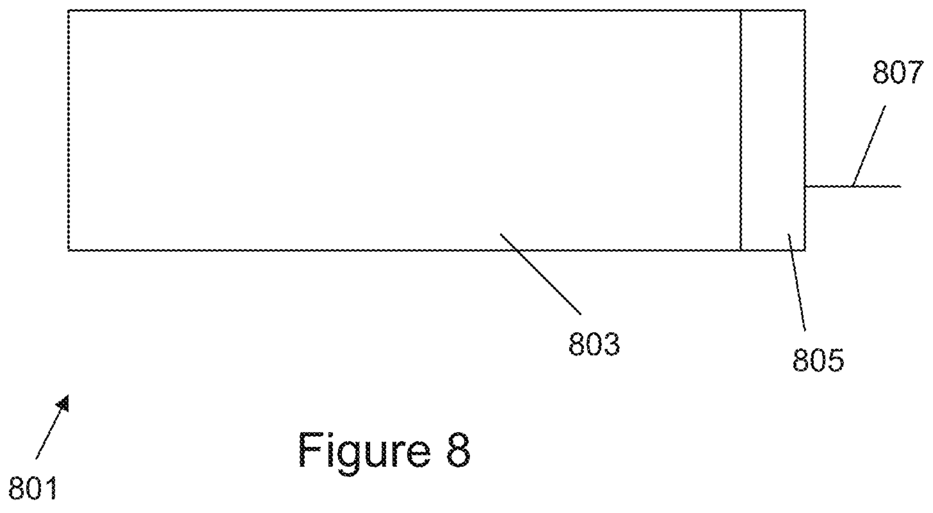
FIG. 8 shows an example inductive charger according to some embodiments.

U.S. patent application Ser. No. 11/570,093 entitled "Oled Display Apparatus" is hereby incorporated herein by reference and describes some example uses of inputs to adjust an output of an organic light emitting diode display. Part of this application recites:

"FIG. 8 is a block diagram showing a structure according to one embodiment of the present invention. An R signal, a G signal, and a B signal are input to an RGB to RGBW conversion circuit 10, and are also supplied to an M value calculation circuit 12. The M value calculation circuit 12 detects, in real time, high frequency components from an image signal of the input RGB signals for a predetermined plural number of pixels (portion) and calculates a conversion coefficient M to be used for conversion from RGB to RGBW in accordance with the detected amount of the high frequency components. More specifically, the M value calculation circuit 12 outputs a coefficient M (0.5, for example) with which all the RGBW dots emit light for edge portions or portions with significant change in brightness in an image, and outputs M whose value is 1 or close to 1 for flat portions or portions with slight change in brightness in an image.

The calculated M is then supplied to the RGB to RGBW conversion circuit 10. The RGB to RGBW conversion circuit 10 uses the conversion coefficient M to calculate F2(S) and F3(S), and further computes RGBW signals using F2(S) and F3(S).

R', G', B' and W signals output from the RGB to RGBW conversion circuit 10 are subjected to gamma correction in corresponding gamma correction circuits 14 before being converted to analog signals by corresponding D/A converters 16, and the analog signals are supplied to an OLED panel 18. The OLED panel 18 includes a horizontal driver and a vertical driver, and supplies a data signal concerning each pixel to be input to each of the OLED elements (also referred to electroluminescence (EL) elements) arranged in a matrix in a pixel circuit. More specifically, the OLED panel 18 of the present embodiment is an active matrix type panel, in which each pixel circuit includes a selection transistor, a driving transistor, a storage capacitor, and an OLED element. The data signal of each pixel is written, via the selection transistor of a corresponding pixel, into the storage capacitor. When a driving current in accordance with the data voltage written into the storage capacitor is supplied from the driving transistor to the OLED element, the OLED element emits light.

It is also preferable to perform data processing for adjusting the black level, contrast, and brightness in the gamma correction circuit 14. Further, it is possible that the D/A converters 16 are omitted and the digital data are input to the OLED panel 18 for digitally driving each pixel circuit in the OLED panel 18.

Here, the conversion from RGB to RGBW will be described with reference to the flowchart of FIG. 9. Specifically, the RGB to RGBW conversion circuit 10 calculates S=F1(Rn, Gn, Bn) based on the RGB input signals (which have been converted to Rn, Gn, and Bn in this example). On the other hand, the M value calculation circuit 12 detects an amount of high frequency components at the portion of a target pixel (which is located at the i-th in the horizontal direction and at the j-th in the vertical direction) from a predetermined number of pixel blocks arranged in the horizontal and vertical directions, calculates a coefficient Mij in accordance with the detected amount of high frequency components, and supplies the coefficient Mij to the RGB to RGBW conversion circuit 10.

The RGB to RGBW conversion circuit 10, using the supplied coefficient Mij, calculates F2(S, Mij) and F3(S, Mij), F3(S, Mij) being output as it is as a W value and F2(S, Mij) being added to Rn, Gn, and Bn, respectively and output as Rn', Gn', and Bn'.

In the above manner, RGB is converted into RGBW.

Here, as a predetermined number of image data items are necessary for calculation of Mij, it is necessary to store an amount of input data. For example, it is possible to provide a frame memory for the input RGB signals and supply necessary data from this frame memory.

Further, Mij can be expressed by the following expression.

$$Mij = f\left(\left|\frac{\sum_{k1=-\infty}^{\infty}\sum_{k2=-\infty}^{\infty} h(k1, k2)C(i-k1, j-k2)}{\sum_{k1=-\infty}^{\infty}\sum_{k2=-\infty}^{\infty} l(k1, k2)C(i-k1, j-k2)}\right|\right)$$

Figure 10:
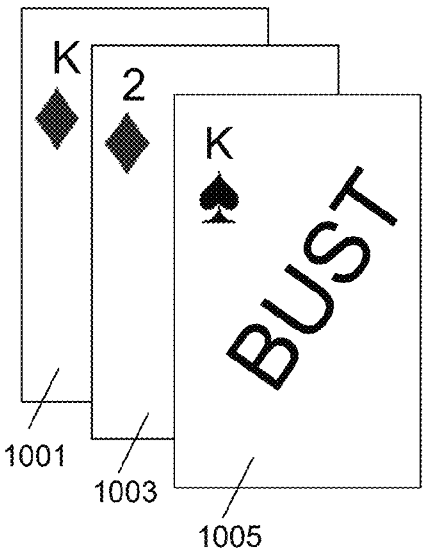
FIGS. 10-15 show example operation of card devices according to some embodiments.

Here, (i,j) represents a spatial position of a dot to be processed (i.e., the i-th in the horizontal direction and the j-th in the vertical direction); h(k1, k2) represents response characteristics of a two-dimensional high pass filter with respect to the unit impulse .delta.(k1, k2); l(k1, k2) represents response characteristics of a two-dimensional low pass filter with respect to the unit impulse .delta.(k1, k2); and C(i−k1, j−k2) represents a signal level corresponding to a dot at the position (i−k1, j−k2). Further, f(X) is an arbitrary function which has characteristics of approaching 0.5 from 1 with the increase of X, as shown in FIG. 10, for example.

While the signals Rn, Gn, Bn, the brightness (Y), or the like may be arbitrarily selected as the signal C, it is preferable to use brightness components which contribute to the resolution. The following are representative example expressions for F2 and F3:

$$F2=-MijxS$$

$$F3=MijxS$$

When dots are arranged in stripes extending in the vertical direction as shown in FIG. 2, a one-dimensional high pass filter and a one-dimensional low pass filter may be provided, considering only the resolution in the horizontal direction. In this case, the above expressions (6) to (8) are changed as follows:

$$Mi = f\left(\left|\frac{\sum_{k=-\infty}^{\infty} k(k)C(i-k)}{\sum_{k=-\infty}^{\infty} l(k)C(i-k)}\right|\right)$$

$$F2 = -MixS$$

$$F3 = MixS$$

EXAMPLES

The conversion process as described above will be described with reference to specific examples.

First Example

Here, assuming that dots are arranged in stripes in the vertical direction, the above expressions (9) to (11) are used. The following expressions are used for h(k) and l(k), and Mi is set such that it is not over 1.

$h(k)$: $h(-1)=-½$, $h(0)=1$, $h(1)=-½$, $h(k)=0$ when $k>1$ or $k<-1$.

$l(k)$: $l(-1)=1$, $l(0)=2$, $l(1)=1$, $h(1)=0$ when $k>1$ or $k<-1$.

When brightness Yi at the position i is used for signal C, the expression (9) can be expressed as follows:

$Mi=f(|(-Y.sub.i-1+2Y.sub.i-Y.sub.i+1)/2(Y.sub.i-1+2Y.sub.i+Y.sub.i+1)|)$

Assuming that f(X)=1−X, the above expression is expressed as $Mi=1-|(-Y.sub.i-1+2Y.sub.i-Y.sub.i+1)/2(Y.sub.i-1+2Y.sub.i+Y.sub.i+1)|$.

Accordingly, Mi is a variable which always satisfies 0.ltoreq.Mi.ltoreq.1. (However, $Mi=1$ when $Y.sub.i-1+2Y.sub.i+Y.sub.i+1=0$)

As described above, according to the above example, it is possible to adaptively change the coefficient M in accordance with the amount of partial high frequency components. It is therefore possible to comparatively reduce the usage ratio of W dots in edge portions or the like for achieving clear display. On the other hand, it is possible to increase the usage ratio of W dots in the portions with less change in the image for achieving effective display.

Second Example

As described above, the coefficient M is calculated in the M value calculation circuit 12. However, there are cases in which the calculated coefficient M(Mij) varies too much among dots. Accordingly, by inserting a low pass filter after the calculation output Mij from the M value calculation circuit 12, it is possible to preferably prevent the usage ratio of W dots from excessively varying for each dot and causing unnatural image.

In addition, it is also preferable to set $F2=-AixS$ $F3=AixS$

In the above expressions, Ai is a predetermined coefficient (A1, A2, A3, . . . An) and is selected in accordance with the value of Mi (or Mij). With the use of such a coefficient Ai, redundancy is increased compared to when the coefficient M is used, and RGB to RGBW conversion considering the viewability of actual display can be performed. Further, by rewriting the table of the coefficient Ai, the conversion characteristics can be adjusted simply. It is therefore preferable to use a rewritable table for Ai.

Further, in the above example, a simple filter as described below can be used.

$h(k)$: $h(-1)=-1$, $h(0)=1$, $h(k)=0$ when $k<-1$ $l(k)$: $m$

Here, m is a constant selected such that it always satisfies 0.ltoreq.Mi.ltoreq.1. With this structure, a filter structure can be simplified and adaptive control in accordance with input image data can be secured.

Third Example

As described above, the electric current flowing in each dot of an OLED panel is proportional to brightness of the corresponding dot, and power consumption for the whole image corresponds to the total sum of the electric current. Accordingly, the higher the average brightness of an image, the greater the power consumption of the panel. When the maximum power source current of a display device is limited, for example, M having a great value can be used so as to increase the usage ratio of W, in addition to the increase of the average brightness.

An example which considers the average brightness as described above is shown in FIG. 11. In this example, RGB input signals are supplied to an average brightness calculation section 30, which calculates the average brightness (or the sum) from data of the RGB input signals corresponding to one screen. The resultant average brightness is supplied to the low pass filter (LPF) 32 so as to remove a rapid change component and then supplied to the M value calculation circuit 34. The M value calculation circuit 34 has stored therein tables and expressions concerning M values corresponding to the average brightness, computes an M value for the input average brightness, and supplies the M value to the RGB to RGBW conversion circuit 10.

Figure 12:
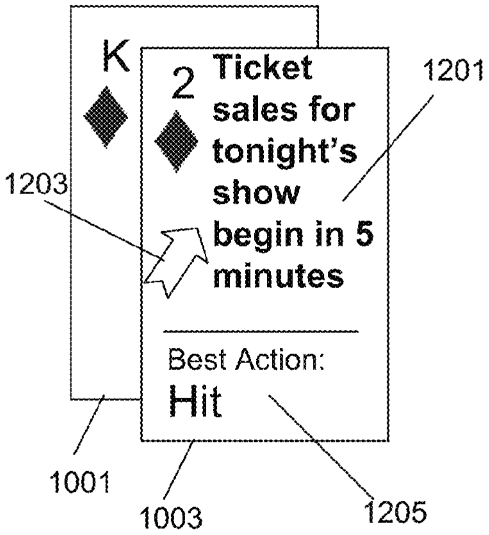
Figure 13:
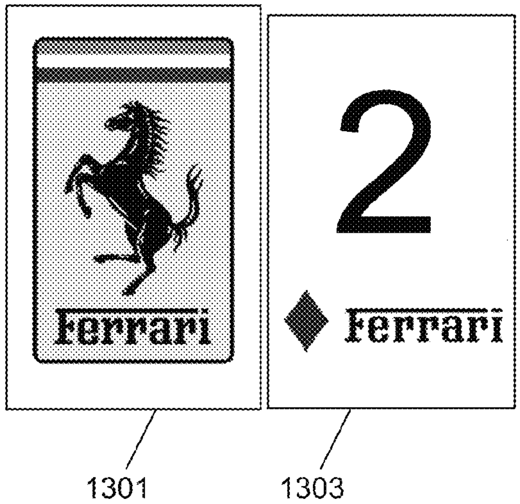

A setting example of the characteristics of M with respect to average brightness is shown in FIG. 12. As shown, with the increase of brightness, M is gradually increased from 0.5. FIG. 13 exemplifies power consumption versus average brightness in a certain image when such a setting is used. As shown in FIG. 13, with this setting, it is possible to suppress increase in the amount of current consumed in the panel when the average brightness of the image is high, compared to when M is fixed to 0.5 (M=0.5).

Figure 14:
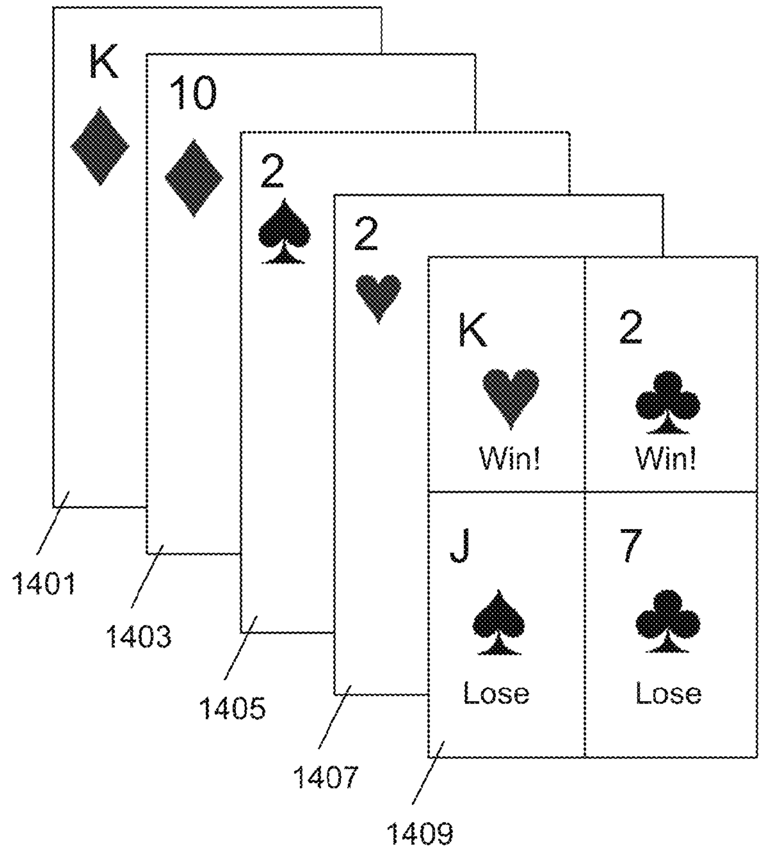

Further, as shown in FIG. 14, it is also possible to estimate a CV current from the converted RGBW data considering emission efficiency of RGBW dots and use the estimated CV current for calculation of the M value. More specifically, each output of RGBW from the RGB to RGBW conversion circuit 10 is supplied to a CV current calculation section 40. The CV current calculation section 40 estimates an electric current (CV current) for all the pixels in the OLED panel 18 in accordance with each data signal of RGBW. The resultant estimated CV current is then supplied to the M value calculation circuit 44 via the low pass filter (LPF) 42. The M value calculation circuit 44 calculates M corresponding to the CV current and supplies the result to the RGB to RGBW conversion circuit 10.

Figure 15:
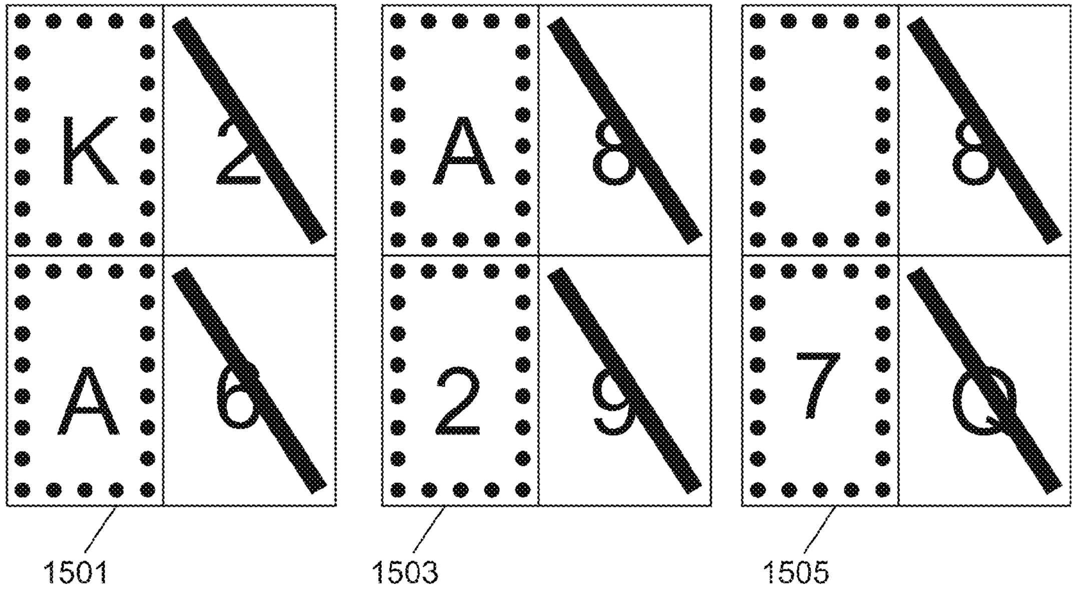

With regard to this example, FIG. 15 shows an example setting of characteristics of M with respect to the CV current calculation value and FIG. 16 exemplifies a relationship between the average brightness and the power consumption of a panel in a certain image. With this structure, it is also possible to effectively suppress an increase in panel current. A similar effect can also be achieved by measuring the CV current of the OLED panel 18 and applying feedback to the M value. An example structure in this case is shown in FIG. 17. Specifically, the CV current is detected by a current detection circuit 50, and the output of the current detection circuit 50 is converted to digital data by an A/D converter 52 and is supplied to an M value calculation circuit 56 via a low pass filter 54. With such a circuit, control similar to that performed by the above structure can be achieved.

Figure 18:
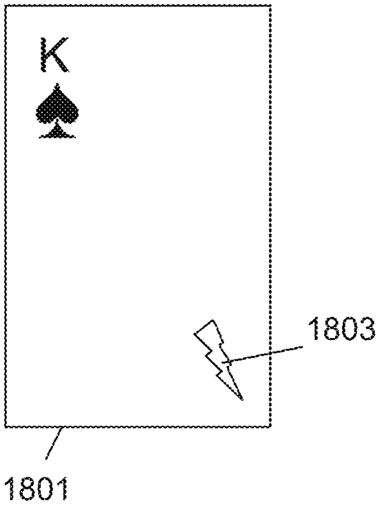

Further, to simplify control can be performed in the following manner, rather than based on the content of an image. Specifically, when the image quality is to be emphasized, M is selected such that the apparent resolution is the highest, whereas when the power consumption is to be emphasized, M is switched to a greater value so as to increase the usage ratio of W dots. For example, it is possible that an input means (an input button, for example) concerning saving-power display is provided, and when this button is pressed on, a saving-power instruction signal instructs the M value calculation circuit 12 to increase the value of M. The structure for achieving this control is shown in FIG. 18. Also, in portable devices such as OLED display devices, such as, for example, cellular phones, digital still cameras, portable AV equipment, and the like, there is a demand that power consumption be reduced when the battery capacity becomes low.

Figure 19:
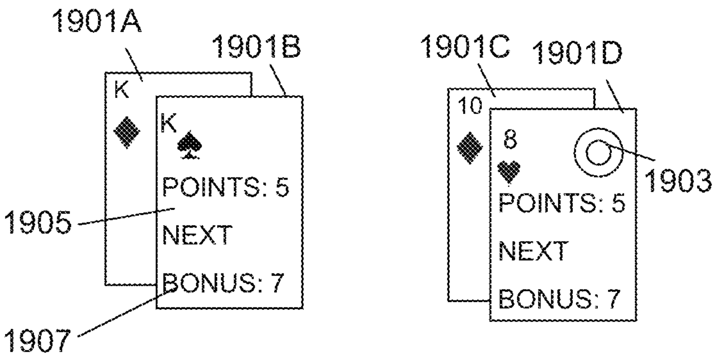

A structure example which meets the above demand is shown in FIG. 19. Specifically, the capacity (a voltage, for example) of a battery 60 is detected by a battery capacity detection circuit 62. When the detection result from the battery capacity detection circuit 62 indicates that the battery capacity is less than a predetermined value, an M value determination circuit 64 changes the M value to a greater value. This structure allows control to make the M value greater when the battery capacity is small than when the battery capacity is sufficient, so that power consumption can be reduced in low power situations. It is further preferable that, the battery capacity be determined in a plurality of increments so as to increase the M value in the plurality of steps.

It is also preferable that the above structures be combined as necessary to constitute a display apparatus."

Figure 50:
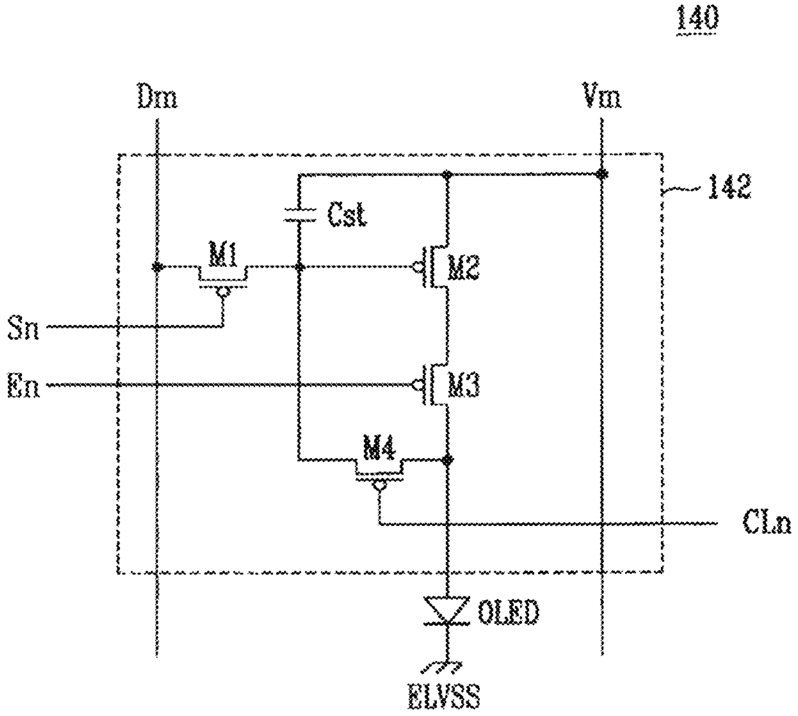
Figure 51:
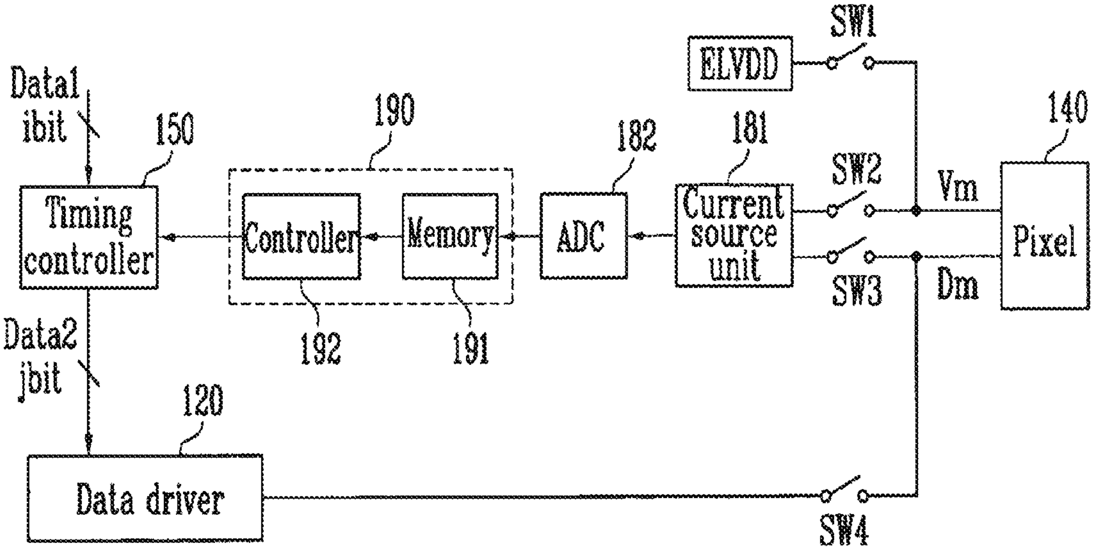
Figure 53:
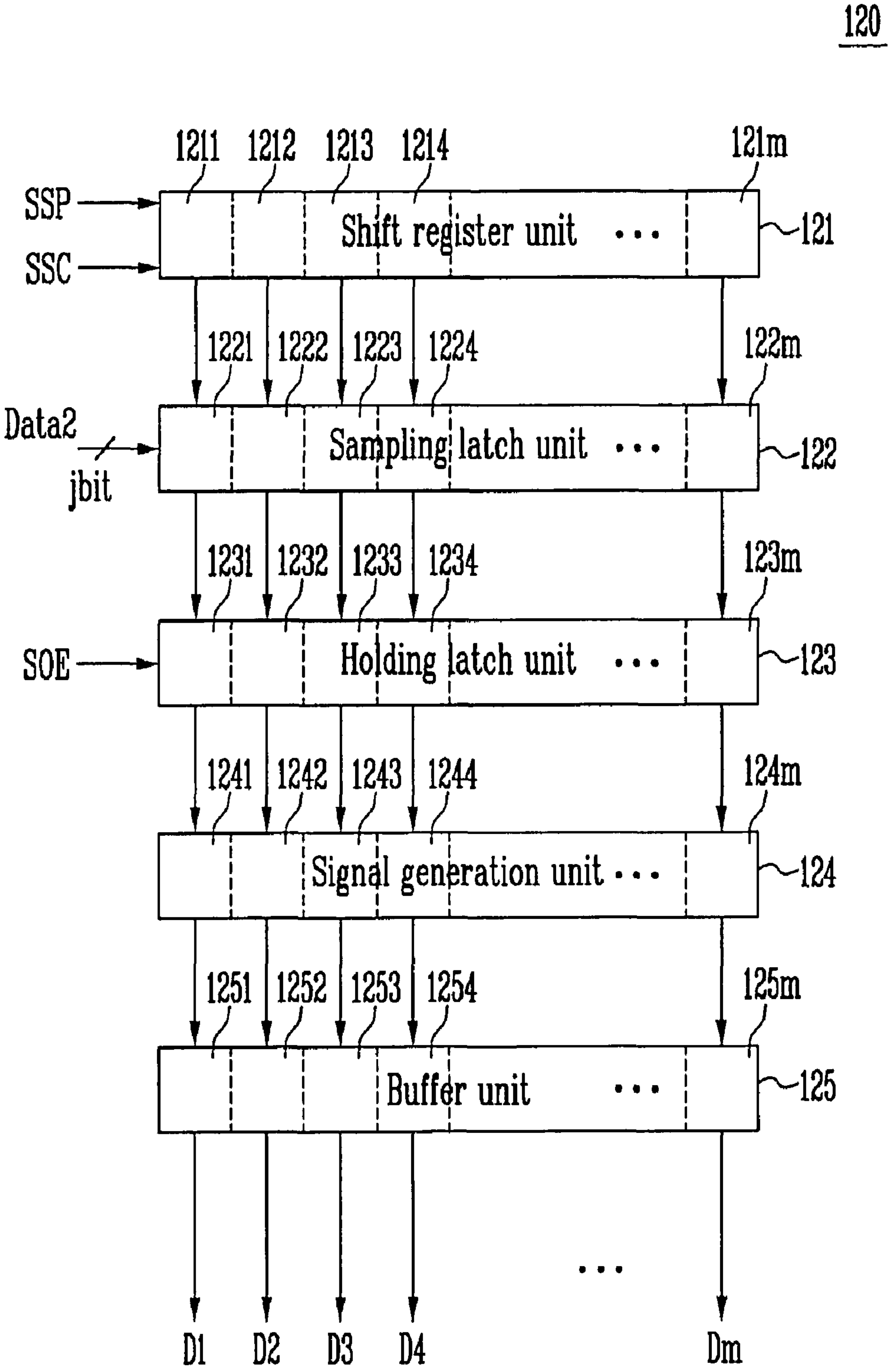
Figure 54A:
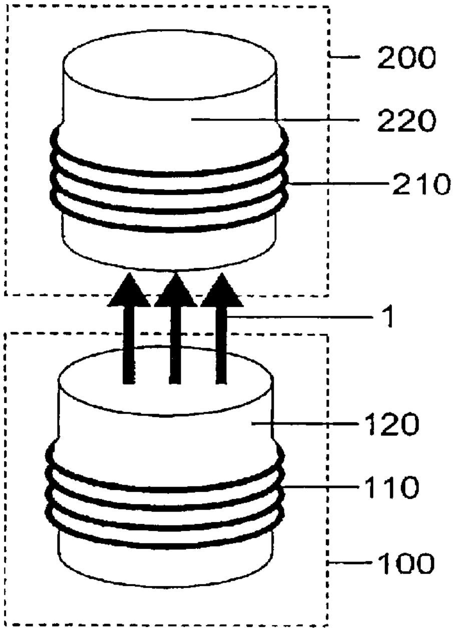
Figure 54B:
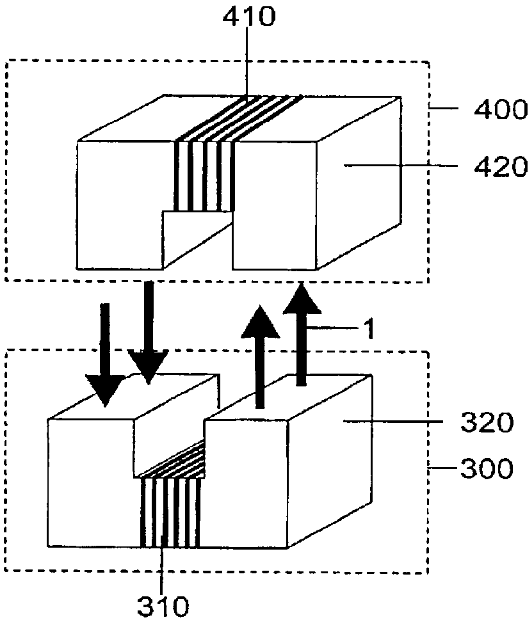
Figure 55A:
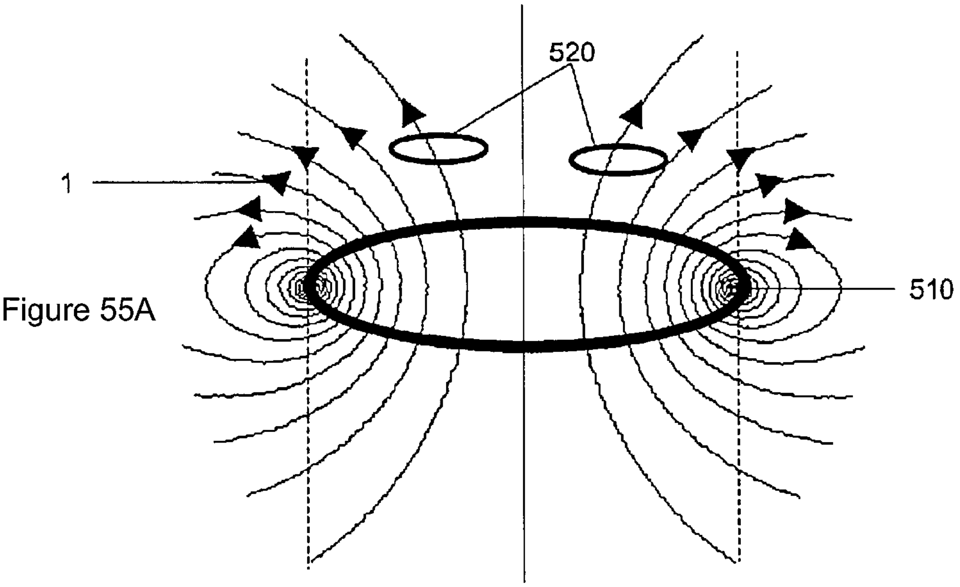
Figure 55B:
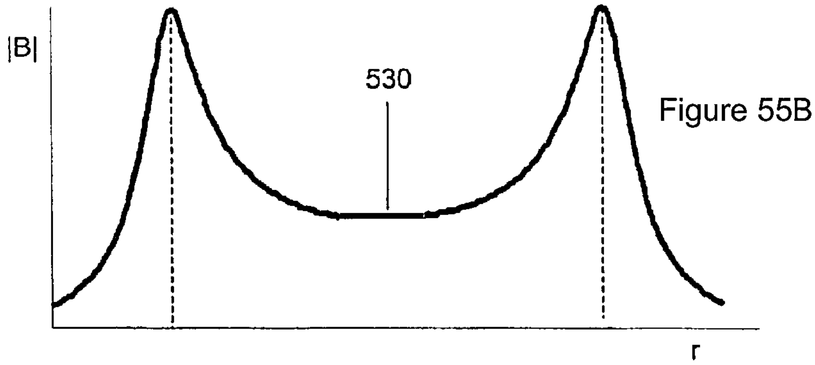
Figure 56:
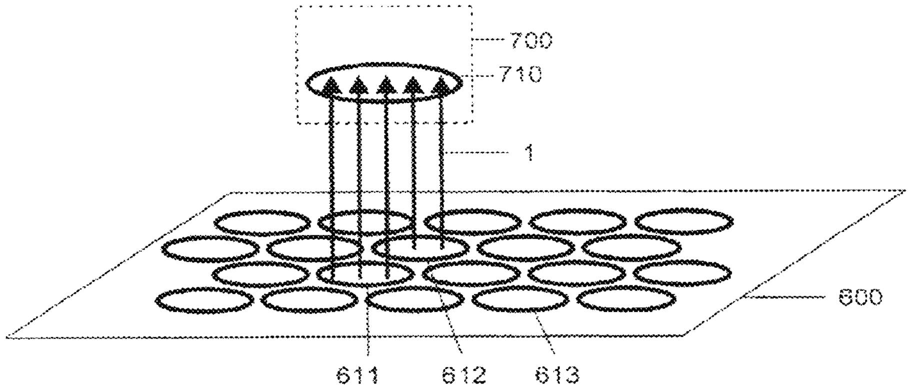
Figure 57A:
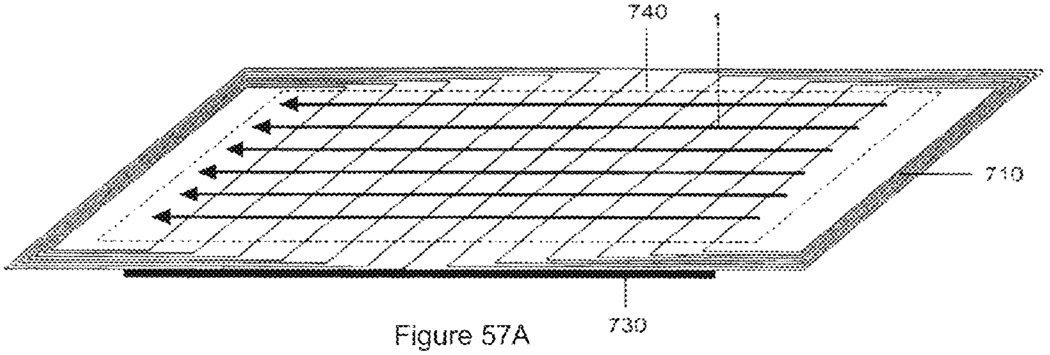
Figure 57B:
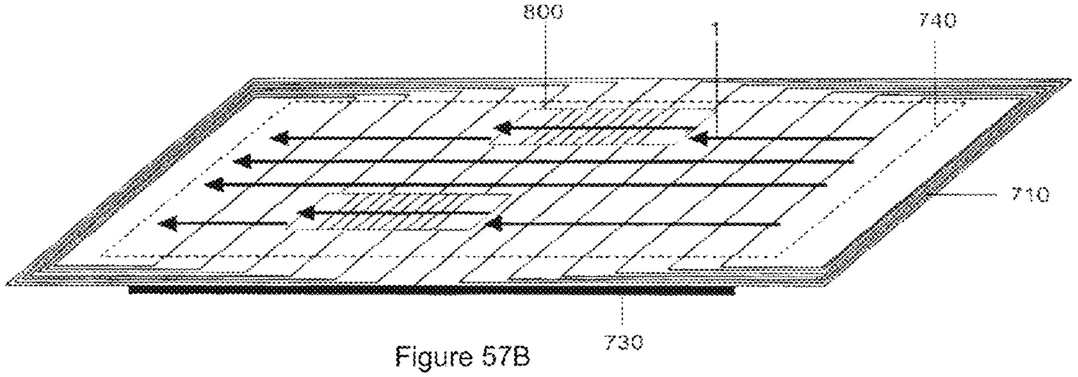
Figure 57C:
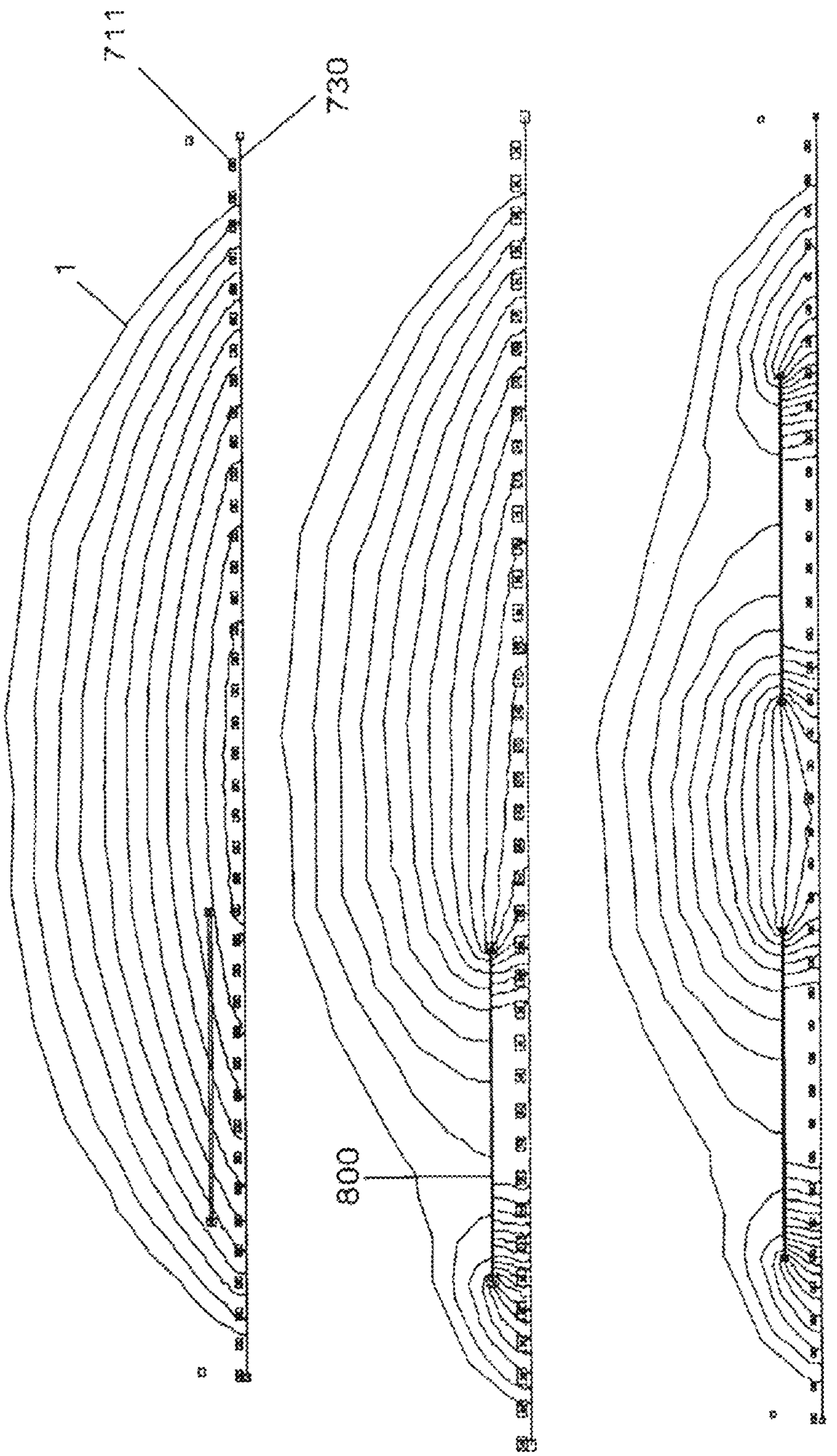
Figure 57D:
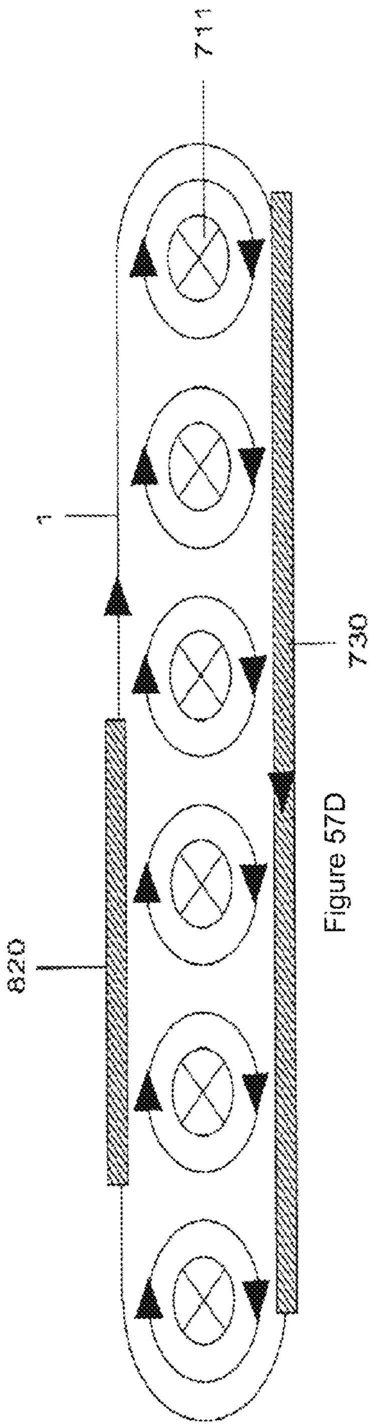
Figure 58:
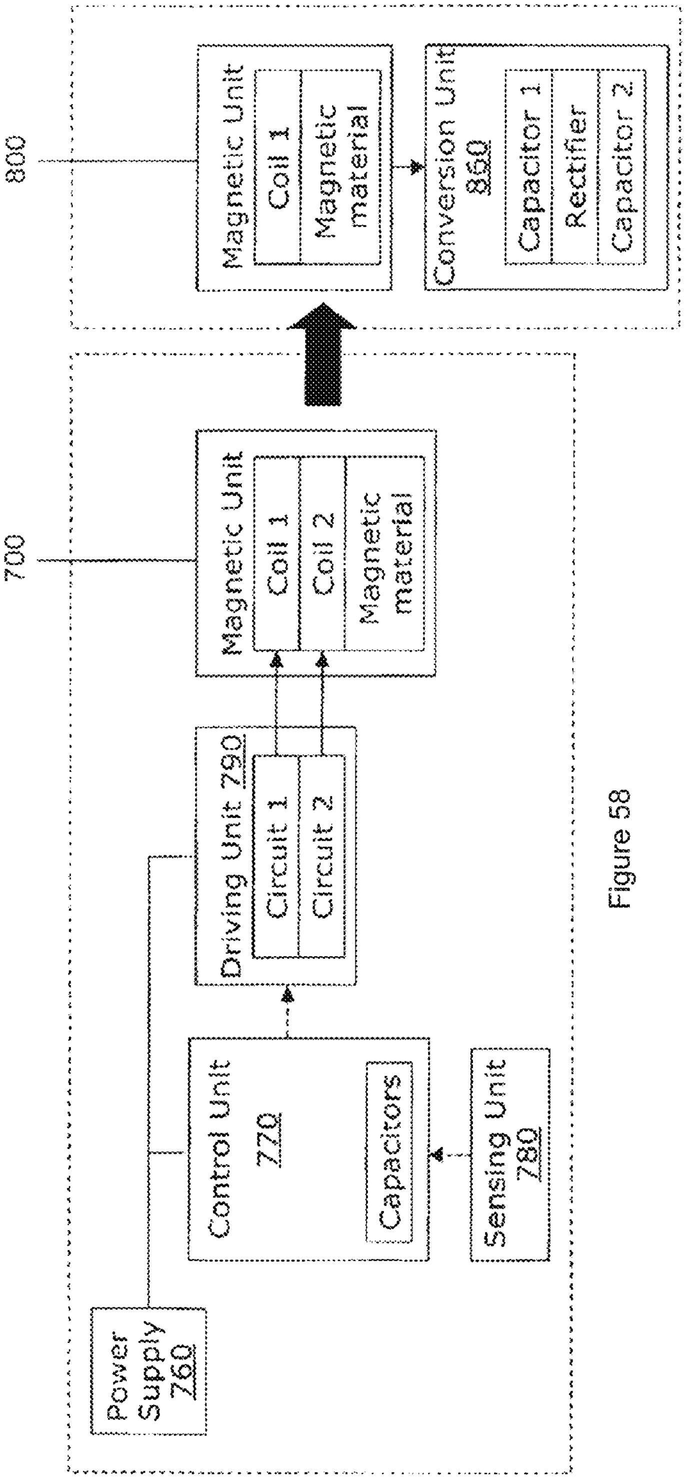
Figure 59A:
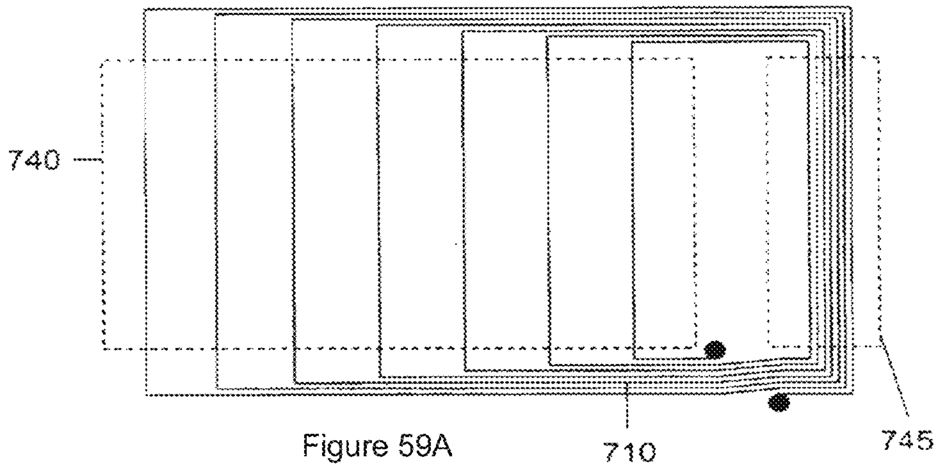
Figure 59B:
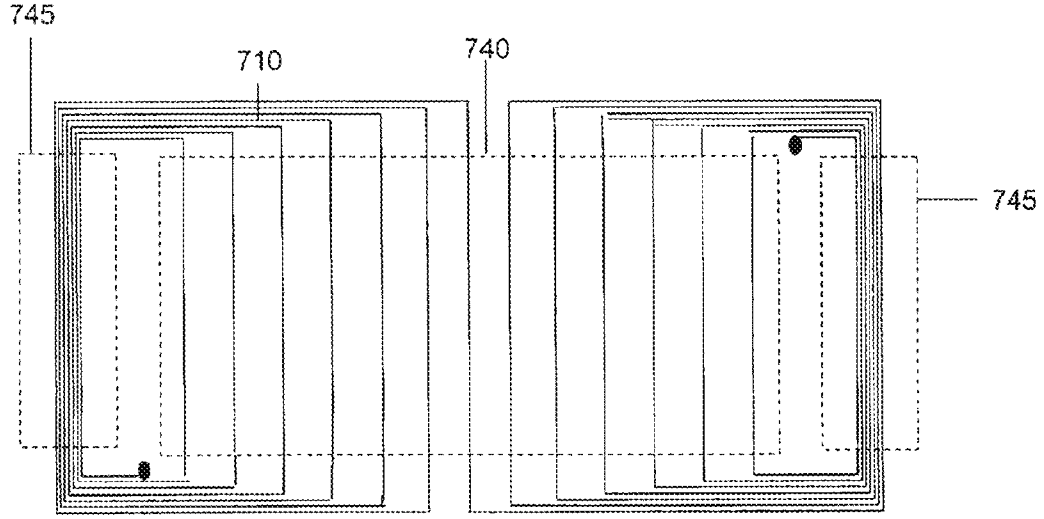
Figure 59C:
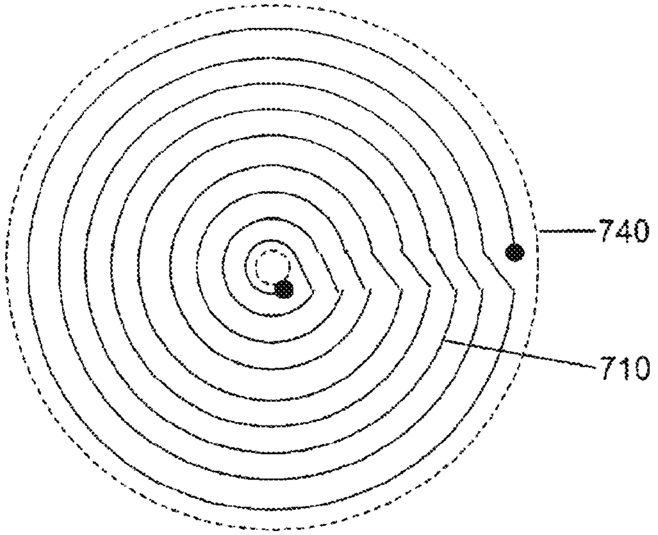
Figure 59D:
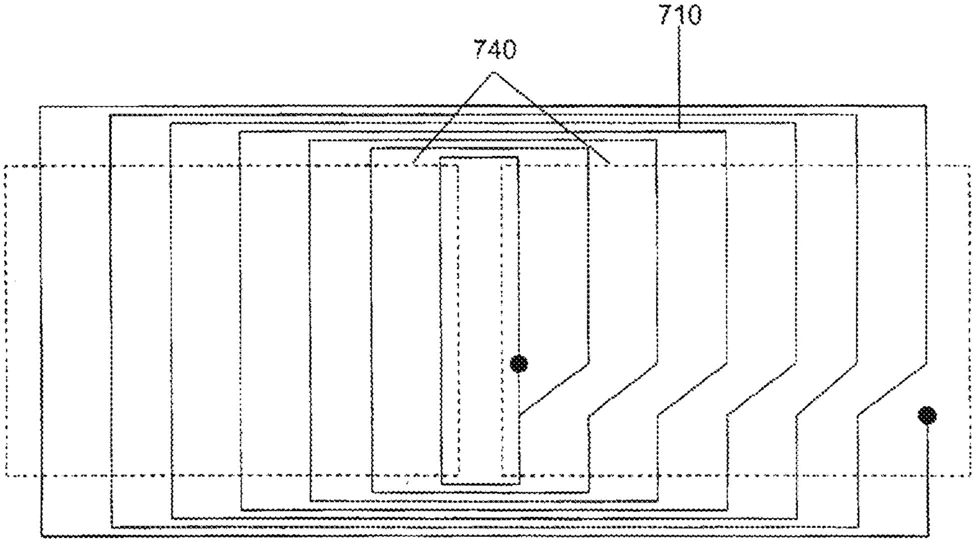
Figure 59E:
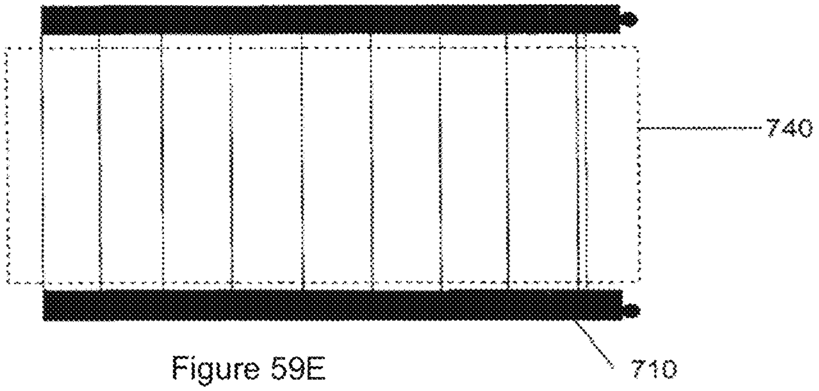
Figure 59F:
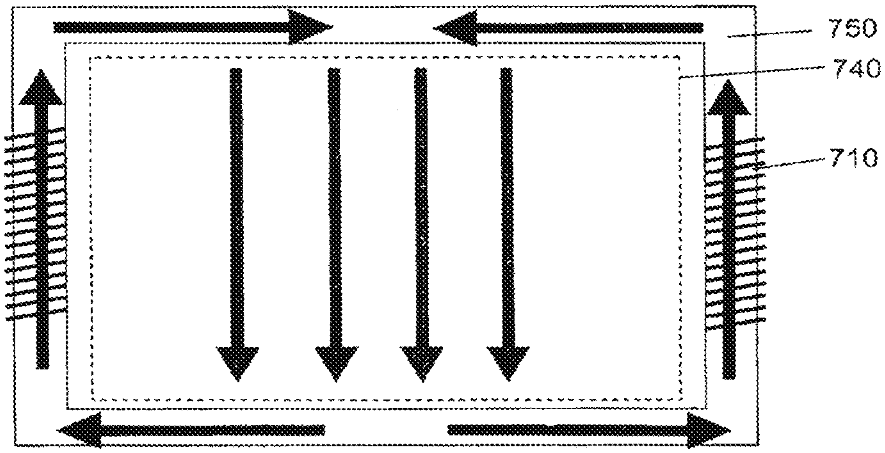
Figure 60A:
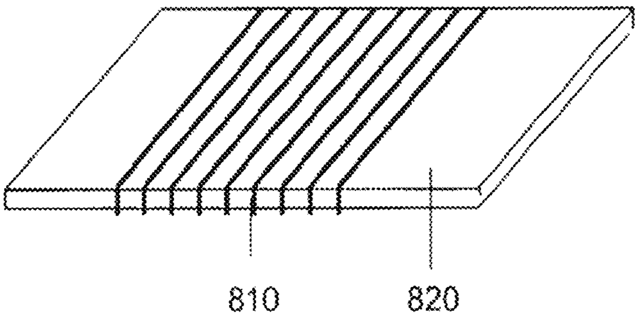
Figure 60B:
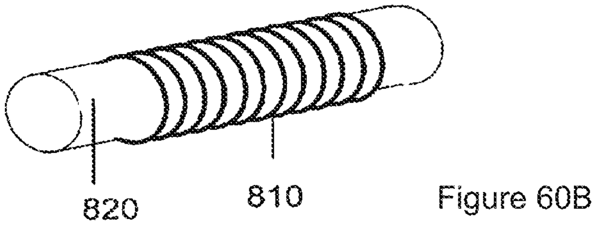
Figure 61A:
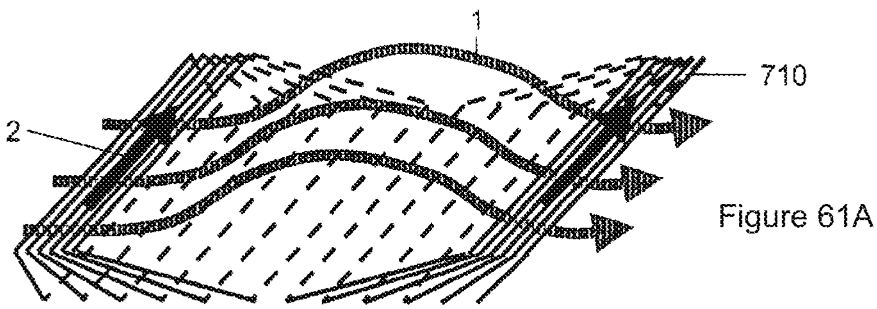
Figure 61B:
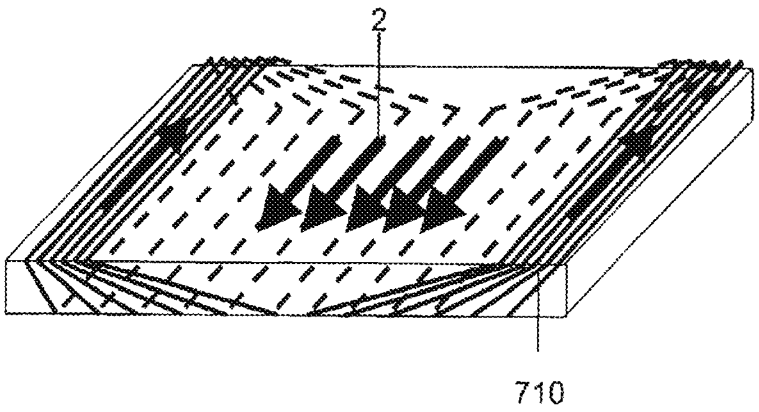
Figure 62A:
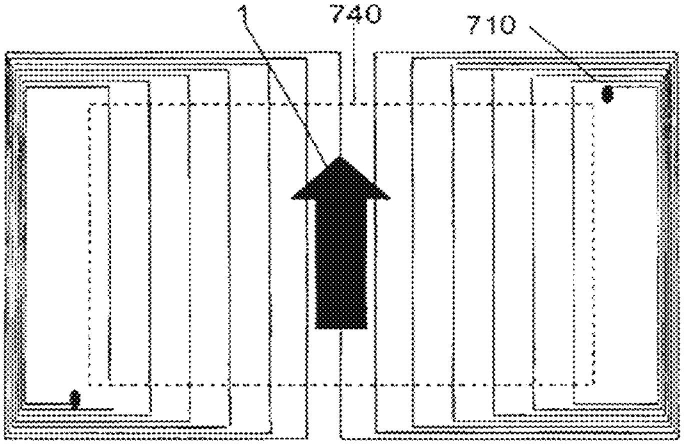
Figure 62B:
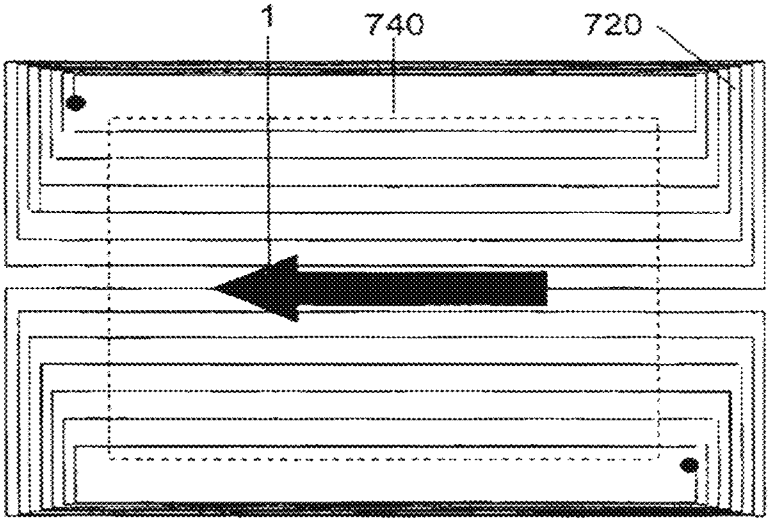
Figure 62C:
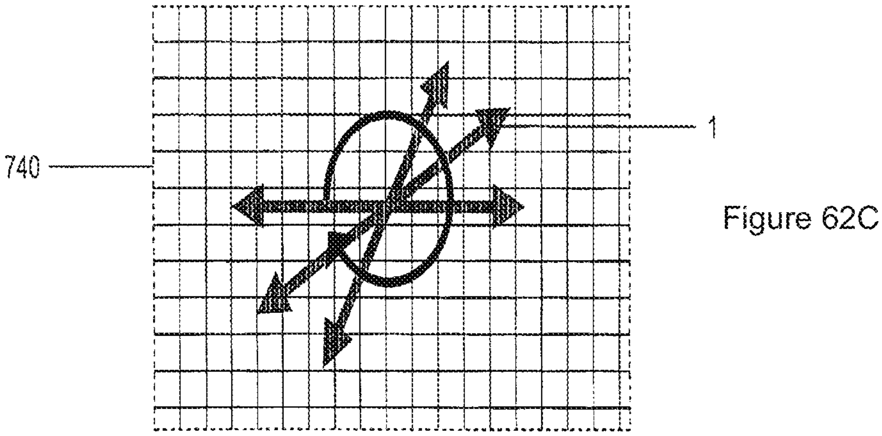
Figure 64B:
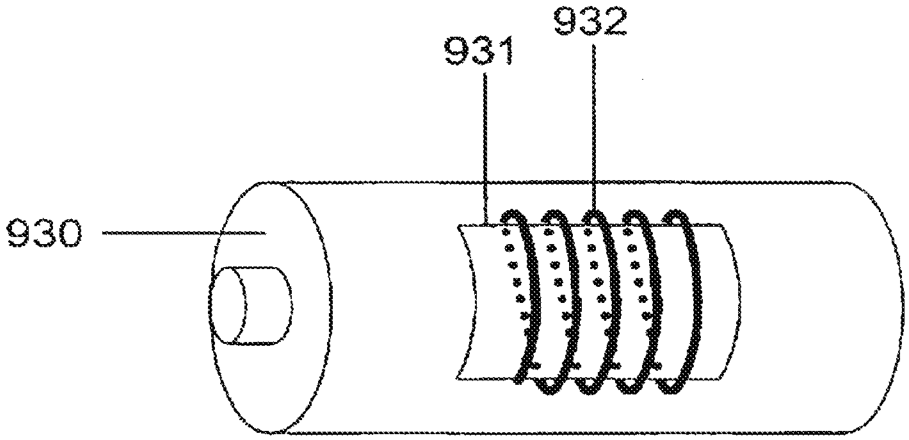
Figure 64C:
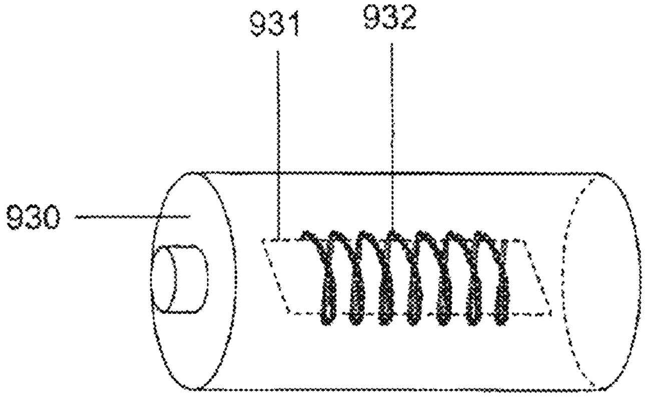
Figure 65A:
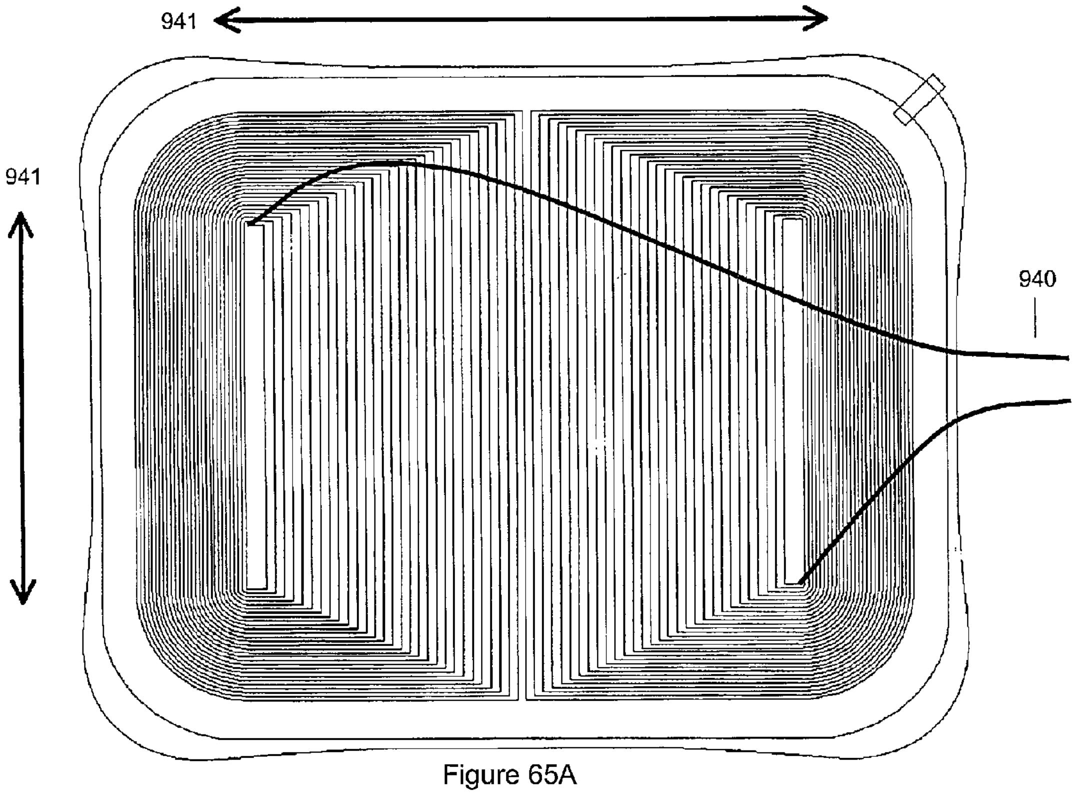
Figure 65B:
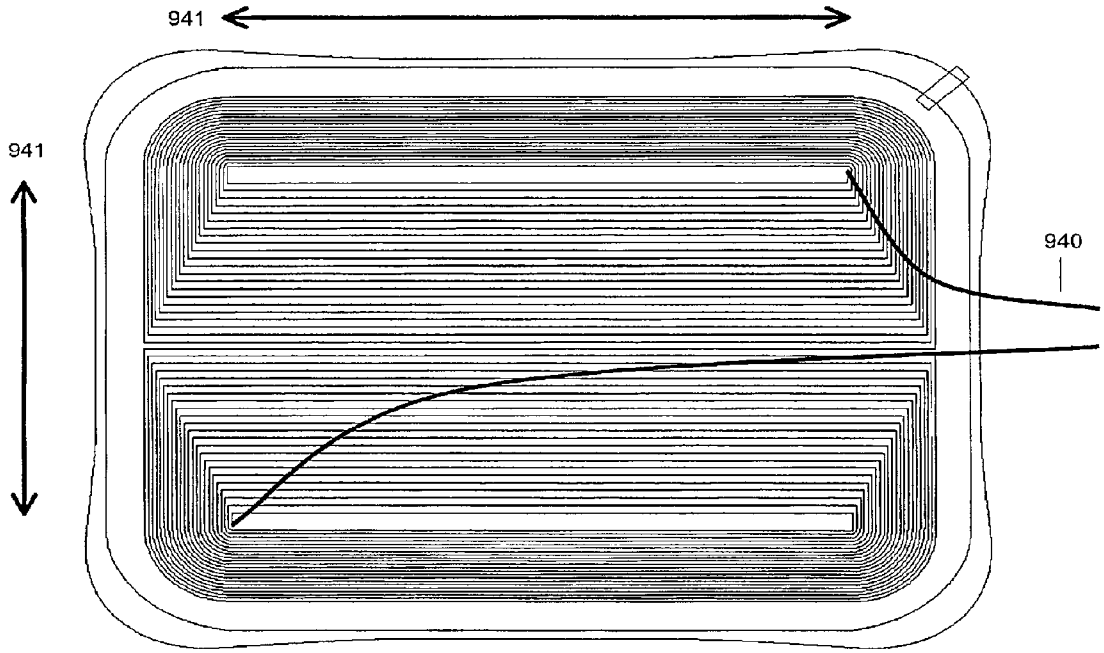
Figure 66:
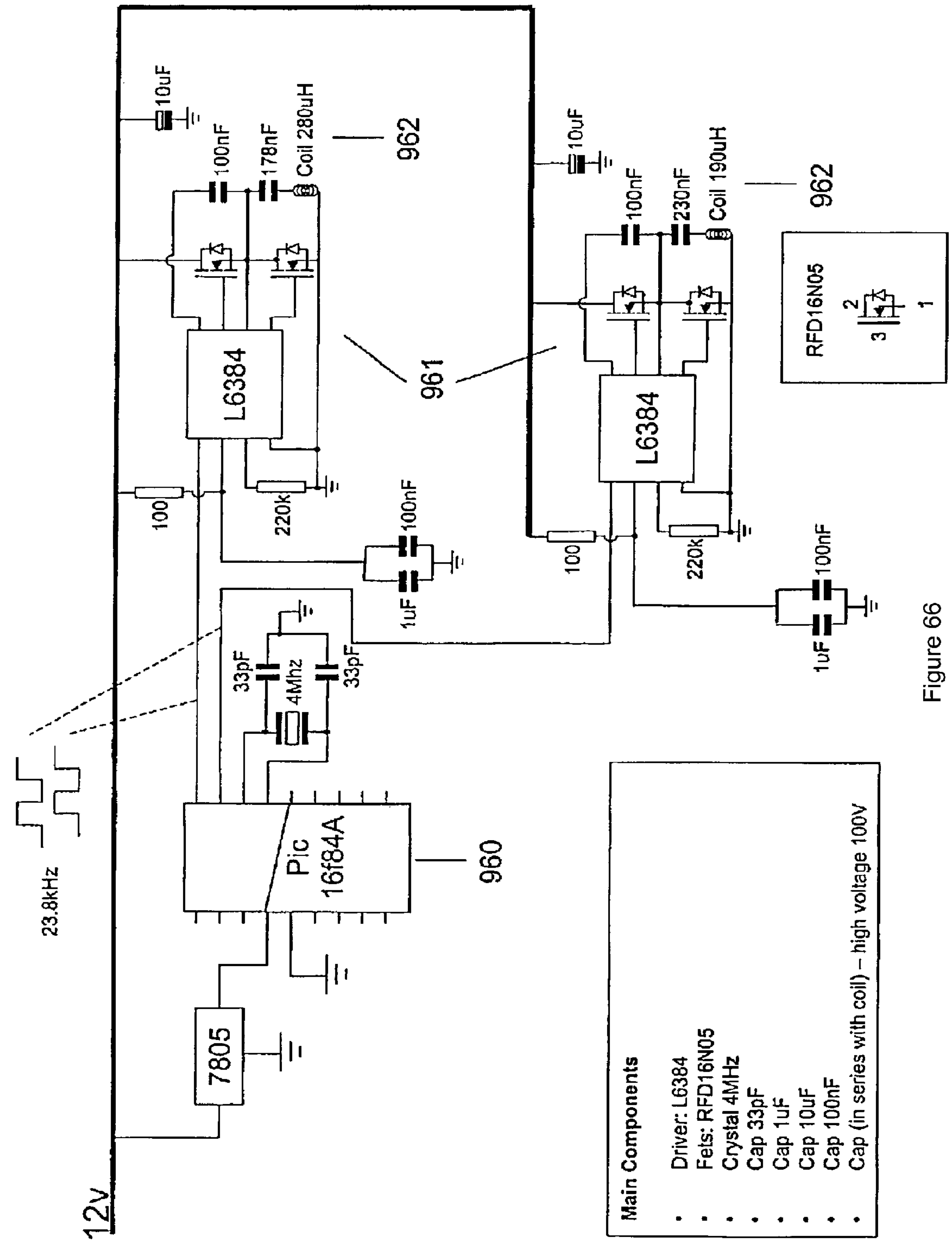
Figure 67:
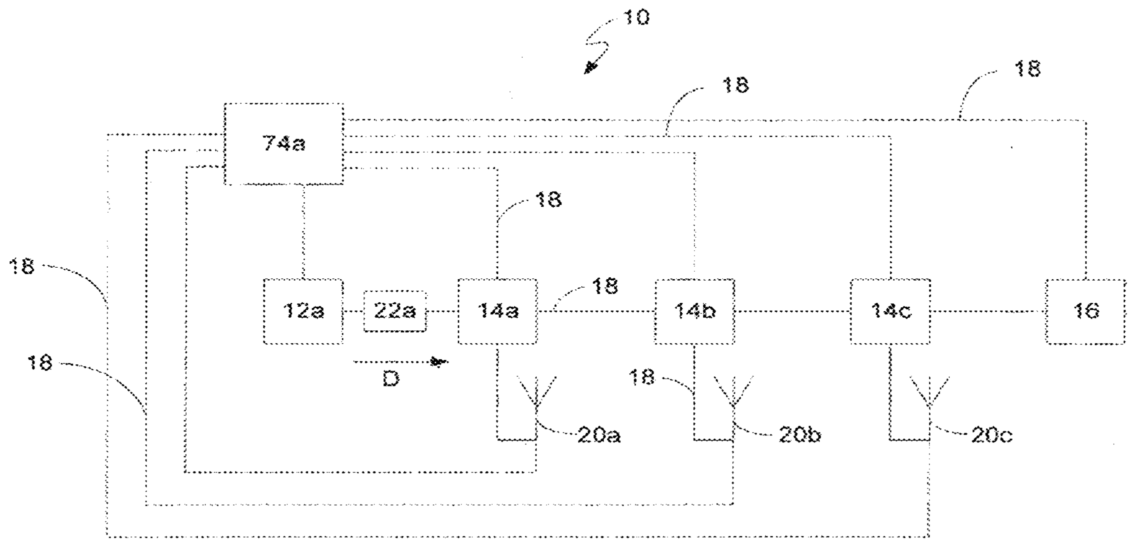
Figure 68:
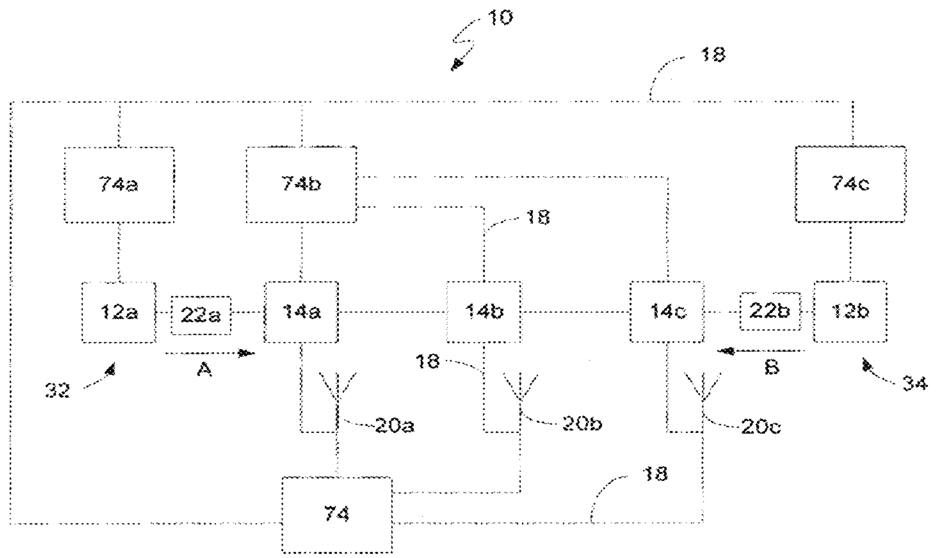
Figure 69:
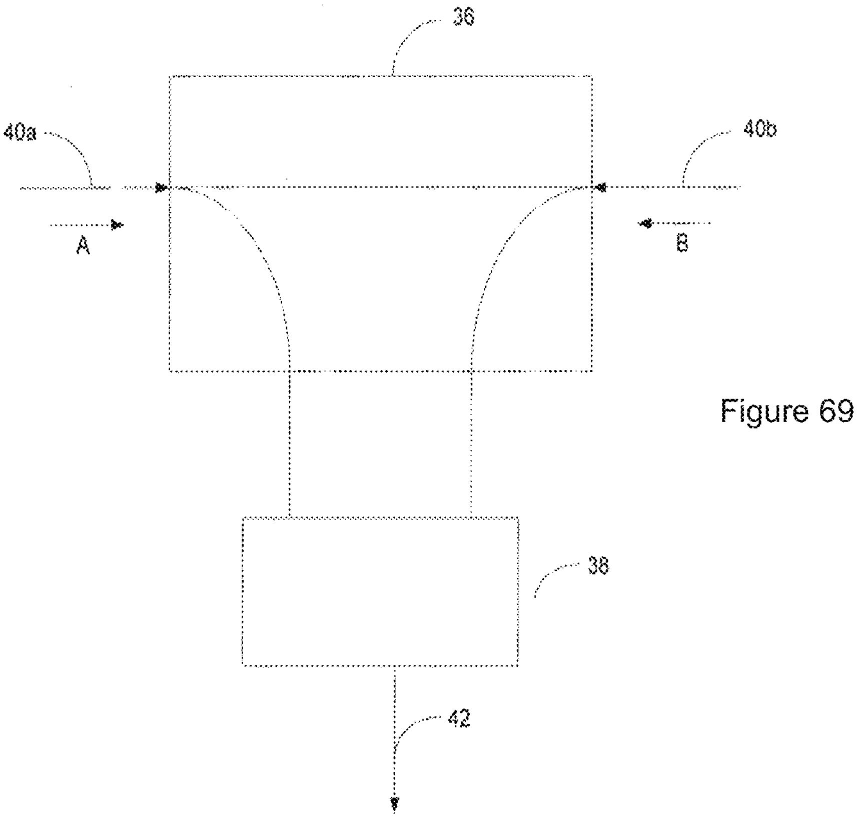
Figure 70:
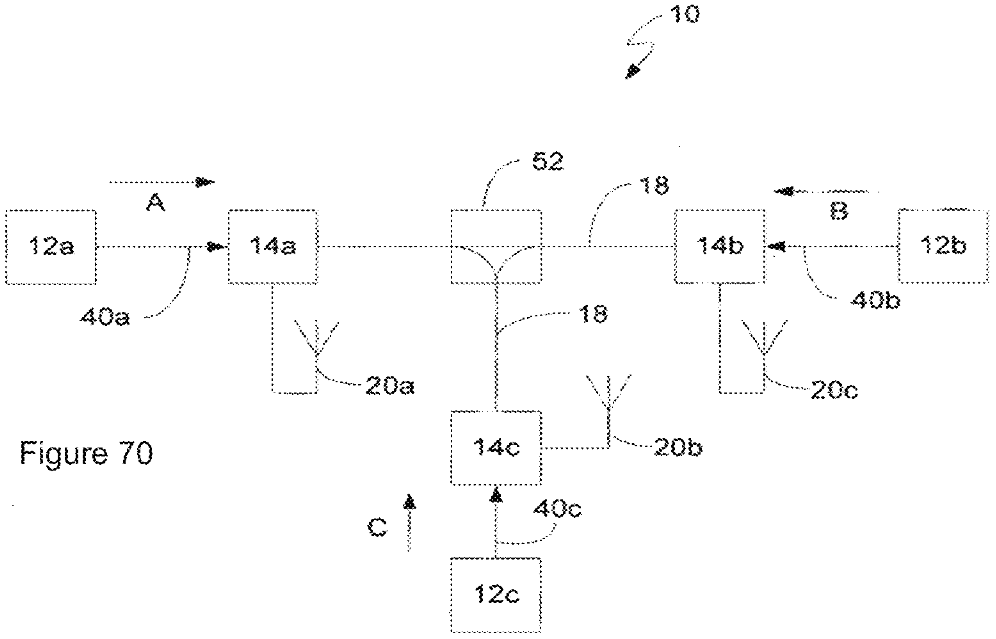
Figure 71:
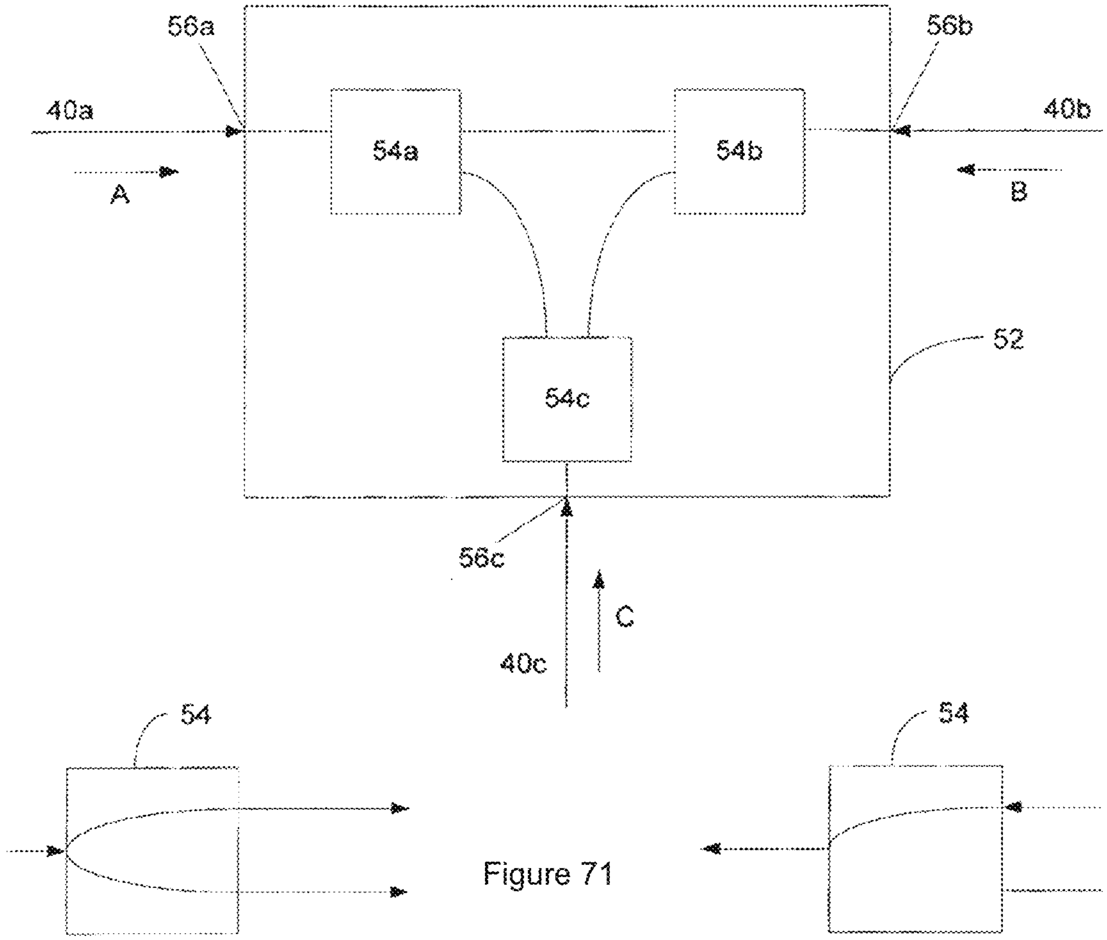
Figure 72:
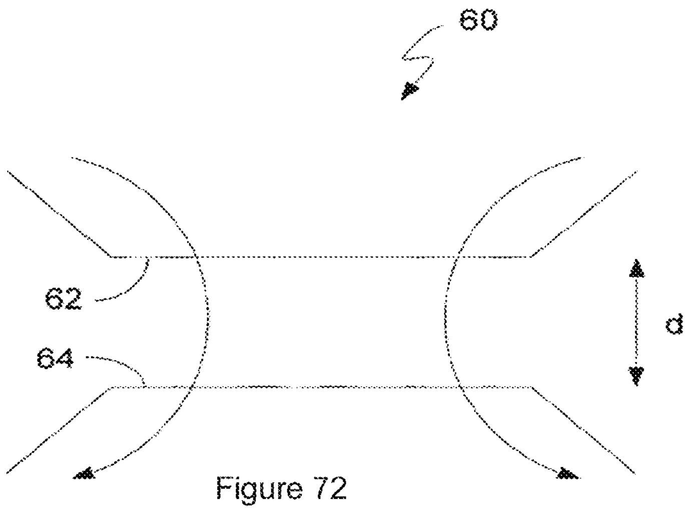
Figure 73:
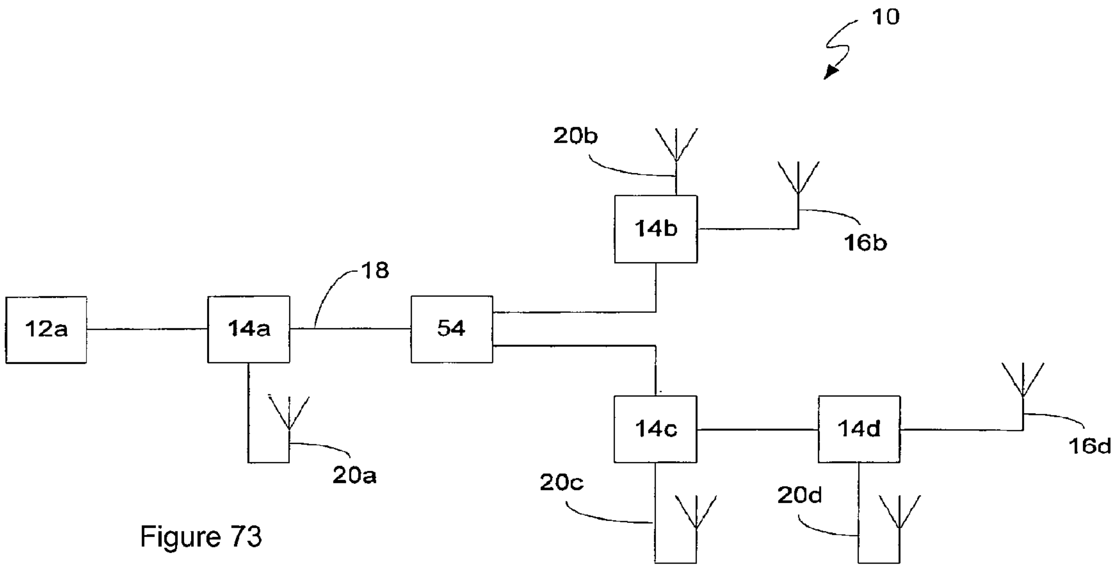
Figure 74:
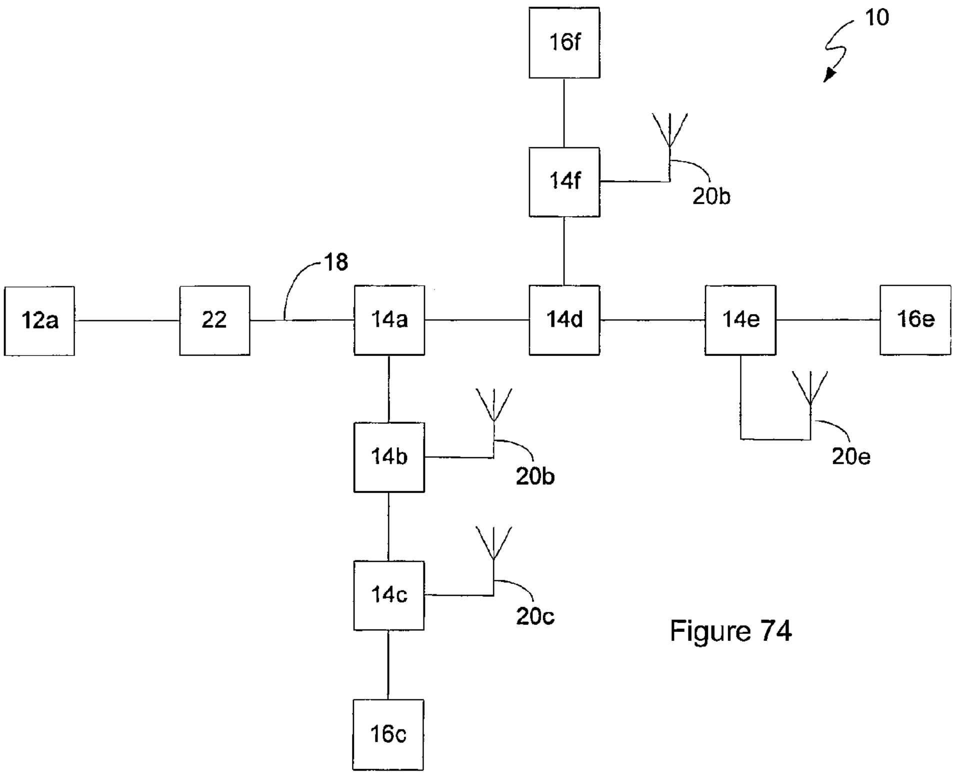
Figure 75:
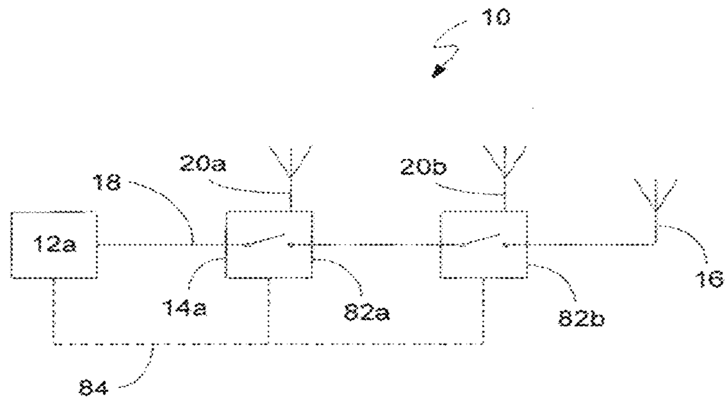
Figure 76:
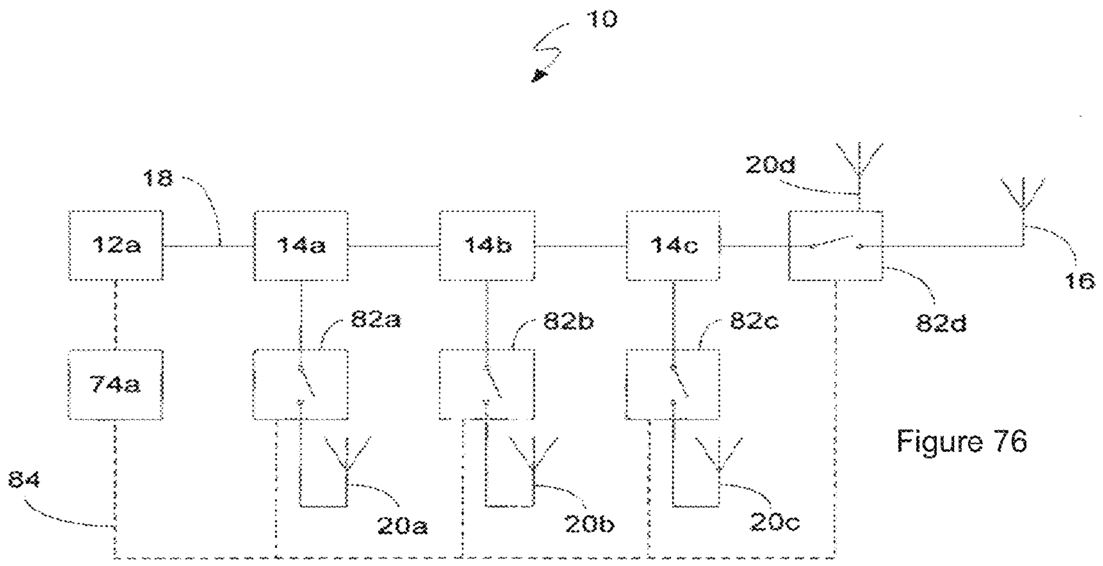
Figure 77:
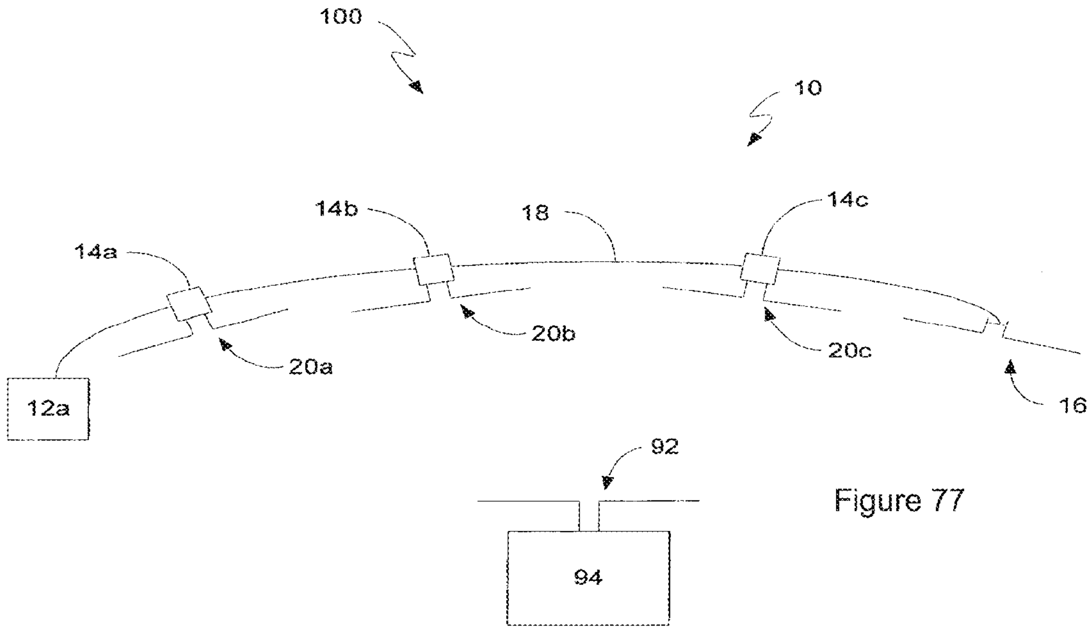

U.S. patent application Ser. No. 12/082,147 entitled "Organic light emitting display and driving method thereof" is hereby incorporated herein by reference and describes some further example uses of inputs to adjust output of an organic light emitting diode display. Part of this application, with FIGS. 3, 4, and 5 referring to FIGS. 50, 51, and 53 respectively, recites:

"FIG. 2 is a diagram showing an organic light emitting display according to one embodiment.

Referring to FIG. 2, an organic light emitting display includes pixels 140 connected to scan lines (S1 to Sn), light emitting control lines (E1 to En) and data lines (D1 to Dm); a scan driver 110 for driving the scan lines (S1 to Sn) and the light emitting control lines (E1 to En); a control line driver 160 for driving control lines (CL1 to CLn); a data driver 120 for driving the data lines (D1 to Dm); and a timing controller 150 for controlling the scan driver 110, the data driver 120, and the control line driver 160.

Also, the organic light emitting display according to one embodiment of the present invention further includes a sensing unit 180 for extracting the information about the deterioration of the organic light emitting diode and the threshold voltage/mobility of the drive transistor, the organic light emitting diode and the drive transistor being included in each of the pixels 140; a switching unit 170 for selectively connecting the sensing unit 180 and the data driver 120 to the data lines (D1 to Dm) and selectively connecting the sensing unit 180 and the first power source (ELVDD) to the power lines (V1 to Vm); and a control block 190 for storing the information sensed in the sensing unit 180.

The pixel unit 130 includes pixels 140 arranged near intersecting points of the scan lines (S1 to Sn), the light emitting control lines (E1 to En), the power lines (V1 to Vm), and the data lines (D1 to Dm). The pixels 140 charge a voltage according to the data signal and supply an electric current corresponding to the charged voltage to the organic light emitting diode, thereby generating light having a desired luminance.

The scan driver 110 supplies a scan signal to the scan lines (S1 to Sn) according to the control of the timing controller 150. Also, the scan driver 110 supplies a light emitting control signal to the light emitting control lines (E1 to En) according to the timing controller 150.

The control line driver 160 supplies a control signal to the control lines (CL1 to CLn) according to the control of the timing controller 150.

The data driver 120 supplies a data signal to the data lines (D1 to Dm) according to the control of the timing controller 150.

The switching unit 170 selectively connects the sensing unit 180 and the first power source (ELVDD) to the power lines (V1 to Vm). When the sensing unit 180 is connected to the power lines (V1 to Vm) by the switching unit 170, information about deterioration of the organic light emitting diode and threshold voltage of the drive transistor are extracted. When the power lines (V1 to Vm) are connected to the first power source (ELVDD) by the switching unit 170, light is generated in the pixel 140, wherein the light corresponds to the data signal.

Also, the switching unit 170 selectively connects the sensing unit 180 and the data driver 120 to the data lines (D1 to Dm). When the sensing unit 180 is connected to the data lines (D1 to Dm) by the switching unit 170, information about deterioration of the organic light emitting diode in the pixel 140 is extracted. When the data lines (D1 to Dm) are connected to the data driver 120 by the switching unit 170, a data signal is supplied to the data lines (D1 to Dm). For this purpose, the switching unit 170 includes at least two switching elements installed in each of the channels.

The sensing unit 180 extracts the information about deterioration of the organic light emitting diode and threshold voltage/mobility of the drive transistor from the pixels 140 via the power lines (V1 to Vm). Furthermore, the sensing unit 180 extracts the information about deterioration of the organic light emitting diode from the pixels 140 via the data lines (D1 to Dm). For this purpose, the sensing unit 180 includes an electric current source unit in each of channels.

The control block 190 stores the information about deterioration and the threshold voltage and/or mobility of the drive transistor supplied from the sensing unit 180. For this purpose, the control block 190 includes a memory; and a controller for transmitting the information stored in the memory to the timing controller 150.

The timing controller 150 controls the data driver 120, the scan driver 110 and the control line driver 160. Also, the timing controller 150 converts a bit value of a first data (Data1) received from another circuit according to the information supplied from the control block 190 to generate a second data (Data2). Here, the first data (Data1) is set to i bits (i is an integer), and the second data (Data2) is set to j bits (j is an integer greater than i).

The second data (Data2) stored in the timing controller 150 is supplied to the data driver 120. The data driver 120 uses the second data (Data2) to generate a data signal and supplies the generated data signal to the pixels 140.

FIG. 3 is a diagram showing one embodiment of the pixels shown in FIG. 2. In FIG. 3, the pixel shown is connected to an m.sup.th data line (Dm) and an n.sup.th scan line (Sn). Referring to FIG. 3, the pixel 140 includes an organic light emitting diode (OLED) and a pixel circuit 142 for supplying an electric current to the organic light emitting diode (OLED).

The anode electrode of the organic light emitting diode (OLED) is connected to the pixel circuit 142, and the cathode electrode is connected to the second power source (ELVSS). Such an organic light emitting diode (OLED) generates light having a predetermined luminance to correspond to the electric current supplied from the pixel circuit 142.

The pixel circuit 142 controls the capacity of an electric current flowing in the organic light emitting diode (OLED) to correspond to the voltage stored in the storage capacitor (Cst). The pixel circuit 142 supplies the information about threshold voltage and/or mobility of the drive transistor and deterioration of the organic light emitting diode (OLED) to the sensing unit 180 when the third transistor (M3) and the fourth transistor (M4) are turned on. Further, the pixel circuit 142 supplies the information about deterioration of the organic light emitting diode (OLED) to the sensing unit 180 when the first transistor (M1) and the fourth transistor (M4) are turned on. For this purpose, the pixel circuit 142 includes four transistors (M1 to M4) and a storage capacitor (Cst).

A gate electrode of the first transistor (M1) is connected to the scan line (Sn), and a first electrode is connected to the data line (Dm). A second electrode of the first transistor (M1) is connected to a first terminal of the storage capacity (Cst). The first transistor (M1) is turned on when a scan signal is supplied to the scan line (Sn).

The gate electrode of the second transistor (M2) is connected to a first terminal of the storage capacity (Cst), and a first electrode is connected to a second terminal and to power line (Vm) of the storage capacity (Cst). The second transistor (M2) supplies electric current to the organic light emitting diode (OLED), the electric current corresponding to a voltage value stored in the storage capacity (Cst), when the power line (Vm) is connected to the first power source (ELVDD). Accordingly, the organic light emitting diode (OLED) generates light corresponding to an electric current supplied from the second transistor (M2).

The gate electrode of the third transistor (M3) is connected to the light emitting control line (En), and a first electrode is connected to a second electrode of the second transistor (M2). A second electrode of the third transistor (M3) is connected to the organic light emitting diode (OLED). The third transistor (M3) is turned off when a light emitting control signal is supplied to the light emitting control line (En), and turned on when the light emitting control signal is not supplied to the light emitting control line (En).

The gate electrode of the fourth transistor (M4) is connected to the power line (CLn), and a first electrode is connected to the second electrode of the third transistor (M3). Also, a second electrode of the fourth transistor (M4) is connected to the gate electrode of the second transistor (M2). The fourth transistor (M4) is turned on when the first control signal is supplied.

The storage capacitor (Cst) is connected between the gate electrode and the first electrode of the second transistor (M2). The storage capacitor (Cst) is charged a voltage corresponding to the data signal.

FIG. 4 is a block diagram showing a switching unit, a sensing unit and a control block shown in FIG. 2. In FIG. 4, the switching unit, the sensing unit, and the control block are connected to an m.sup.th power line (Vm) and an m.sup.th data line (Dm).

Referring to FIG. 4, each of the channels of the switching unit 170 includes four switching elements (SW1 to SW4). Each of the channels of the sensing unit 180 includes an electric current source unit 181 and an analog-digital converter (ADC) 182. One ADC may be shared by one or all of a plurality of channels. The control block 190 includes a memory 191 and a controller 192.

The first switching element (SW1) is between the power line (Vm) and the first data line (ELVDD). The first switching element (SW1) is maintained in a turned-on state during a period when the light having a luminance corresponding to the data signal is generated in the pixel 140.

The second switching element (SW2) is between the electric current source unit 181 and the power line (Vm). The second switching element (SW2) is turned on when the information about the deterioration of the organic light emitting diode (OLED) and the threshold voltage and/or mobility of the second transistor (M2) are sensed.

The third switching element (SW3) is between the electric current source unit 181 and the data line (Dm). The third switching element (SW3) is turned on when the information about the deterioration of the organic light emitting diode (OLED) is sensed.

The fourth switching element (SW4) is between the data driver 120 and the data line (Dm). The fourth switching element (SW4) is turned on when the data signal is supplied to the data line (Dm).

The electric current source unit 181 senses the information about deterioration of the organic light emitting diode and threshold voltage and/or mobility of the drive transistor while supplying a constant electric current to the power line (Vm) and the data line (Dm). The electric current source unit 181 generates a voltage, and supplies the generated voltage to the ADC 182.

The constant electric current supplied from the electric current source unit 181 to the power line (Vm) is supplied to the second power source (ELVSS) via the second transistor (M2), the third transistor (M3) and the organic light emitting diode (OLED) of the pixel 140. The electric current source unit 181 extracts a first voltage corresponding to the information about threshold voltage and/or mobility of the second transistor (M2) and deterioration of the organic light emitting diode (OLED), and supplies the extracted first voltage to the ADC 182.

The constant electric current supplied from the electric current source unit 181 to the data line (Dm) is supplied to the second power source (ELVSS) via the first transistor (M1), the fourth transistor (M4), and the organic light emitting diode (OLED) of the pixel 140. At this time, the electric current source unit 181 extracts a second voltage corresponding to the information about deterioration of the organic light emitting diode (OLED), and supplies the extracted second voltage to the ADC 182.

The resistance of the organic light emitting diode (OLED) increases as the organic light emitting diode (OLED) deteriorates. Accordingly, when the constant electric current is supplied, the voltage at the organic light emitting diode (OLED) changes according to the deterioration of the organic light emitting diode (OLED). In this case, a level of the deterioration of the organic light emitting diode (OLED) may be determined by sensing the voltage at the organic light emitting diode (OLED) while applying the constant electric current. Also, if the constant electric current is supplied via the second transistor (M2), a voltage is applied to the gate electrode of the second transistor (M2). Here, the threshold voltage and/or mobility of the second transistor (M2) may be determined by applying the voltage to the gate electrode of the second transistor (M2) since the voltage applied to the gate electrode of the second transistor (M2) is determined by the threshold voltage and/or mobility of the second transistor (M2).

The electric current value of the constant electric current supplied to the pixel 140 is experimentally determined so that the information about the threshold voltage and/or mobility of the second transistor (M2) and the deterioration of the organic light emitting diode (OLED) can be extracted from the electric current source unit 181. For example, the constant electric current may be set to an electric current value that will be supplied to the organic light emitting diode (OLED) when the pixel 140 is allowed to emit the light with the highest luminance.

The ADC 182 converts the first voltage supplied to the electric current source unit 181 into a first digital value, and converts the second voltage into a second digital value. The memory 191 stores the first digital value and the second digital value supplied to the ADC 182. The memory 191 stores the information about the threshold voltage and/or mobility of the second transistor (M2) and the deterioration of the organic light emitting diode (OLED) of each of the pixels 140 in the pixel unit 130. For this purpose, the memory 191 may be a frame memory.

The controller 192 supplies the first digital value and the second digital value to the timing controller 150, wherein the first digital value and the second digital value are extracted from the pixel 140 to which a first data (Data1) will be supplied, the first data (Data1) being received from the current timing controller 150.

The timing controller 150 receives a first data (Data1) and receives the first digital value and the second digital value from the controller 192. After the timing controller 150 receives the first digital value and the second digital value, it converts a bit value of the first data (Data1) to generate a second data (Data2), thereby displaying an image having a uniform luminance.

For example, the timing controller 150 generates a second data (Data2) with reference to the second digital value since the value of the first data (Data1) is increased as the organic light emitting diode (OLED) deteriorates. Accordingly, the second data (Data2) reflects the information about the deterioration of the organic light emitting diode (OLED) and therefore the timing controller 150 prevents the emitted light from having a lower luminance from being generated as the organic light emitting diode (OLED) is deteriorates. Also, the timing controller 150 generates a second data (Data2) to compensate for threshold voltage and/or mobility variation of the second transistor (M2) based on the first digital value. Accordingly, with the timing controller 150 an image may be displayed, which has a uniform luminance regardless of the threshold voltage and/or mobility of the second transistor (M2). Here, the information about the threshold voltage and/or mobility of the second transistor (M2) may be obtained using the second digital value of the first digital value.

The first digital value and the second digital value supplied from the ADC 182 may be supplied to the controller 192. The controller 192 may use the first digital value and the second digital value to generate a new first digital value including only the information about the threshold voltage and/or mobility of the second transistor (M2). The controller 192 stores the second digital value supplied from the ADC 182; and the newly generated first digital value in the memory 191. In this case, the second digital value stored in the memory 191 includes the information about the deterioration of the organic light emitting diode (OLED), and the first digital value includes the information about the threshold voltage and/or mobility of the second transistor (M2), and therefore extracting the information about the threshold voltage and/or mobility of the second transistor (M2) from the timing controller 150 may be omitted.

The data driver 120 uses the second data (Data) to generate a data signal and supplies the generated data signal to the pixel 140.

FIG. 5 is a diagram showing one embodiment of a data driver.

Referring to FIG. 5, the data driver includes a shift register unit 121, a sampling latch unit 122, a holding latch unit 123, a signal generation unit 124, and a buffer unit 125. The shift register unit 121 receives a source start pulse (SSP) and a source shift clock (SSC) from the timing controller 150. The shift register unit 121 receiving the source shift clock (SSC) and the source start pulse (SSP) sequentially generates the sampling signals while shifting the source start pulse (SSP) during each period of the source shift clock (SSC). For this purpose, the shift register unit 121 includes m shift registers (121l to 121m). In some embodiments, m is greater than 9.

The sampling latch unit 122 sequentially stores the second data (Data2) in response to the sampling signal sequentially supplied from the shift register unit 121. For this purpose, the sampling latch unit 122 includes the m number of sampling latch 122l to 122m so as to store the m number of the second data (Data2).

The holding latch unit 123 receives a source output enable (SOE) signal from the timing controller 150. The holding latch unit 123 receiving the source output enable (SOE) signal receives a second data (Data2) from the sampling latch unit 122 and stores the received second data (Data2). The holding latch unit 123 supplies the second data (Data2) stored therein to the signal generation unit 124. For this purpose, the holding latch unit 123 includes the m number of holding latches 123l to 123m.

The signal generation unit 124 receives second data (Data2) from the holding latch unit 123, and generates the m number of data signals according to the received second data (Data2). For this purpose, the signal generation unit 124 includes the m number of digital-analog converters (hereinafter, referred to as a "DAC") 124l to 124m. That is, the signal generation unit 124 uses the DACs (124l to 124m), arranged in each channel to generate the m number of data signals and supplies the generated data signals to the buffer unit 125.

The buffer unit 125 supplies the m number of the data signals supplied from the signal generation unit 124 to each of the m number of the data lines (D1 to Dm). For this purpose, the buffer unit 125 includes the m number of buffers (125l to 125m).

FIG. 6a and FIG. 6b are diagrams showing a driving waveform supplied to the pixel and the switching unit.

FIG. 6a show a waveform view for sensing information about the threshold voltage and/or mobility of the second transistor (M2) and the deterioration of the organic light emitting diode (OLED) in the pixels 140. The second switching element (SW2) and the third switching element (SW3) are maintained in a turned-on state.

An operation of the organic light emitting display will be described in more detail with reference to FIG. 6a and FIG. 7. First, when a control signal is supplied to the control line (CL1n), the fourth transistor (M4) is turned on. Also, the third transistor (M3) is turned on since a light emitting control signal is not supplied to the light emitting control line (En).

When the fourth transistor (M4) and third transistor (M3) are turned on, the second transistor (M2) is connected in a diode configuration. As a result, an electric current is supplied from the electric current source unit 181 to the second power source (ELVSS) through the second transistor (M2), the third transistor (M3), and the organic light emitting diode (OLED). As a result, a first voltage is generated according to the electric current flowing in the electric current source unit 181. For example, the first voltage is the result of a combination of the threshold and/or mobility of the second transistor (M2) and the resistance of the organic light emitting diode (OLED), showing the deterioration thereof. As described above, the first voltage applied to the electric current source unit 181 is converted into a first digital value in the ADC 182, and the converted first digital value is then supplied to the memory 191.

To characterize the organic light emitting diode (OLED) without the second transistor (M2) the third transistor (M3) is turned off when the light emitting control signal is supplied to the light emitting control line (En), and the first transistor (M1) is also turned on when the scan signal is supplied to the scan line (Sn).

When the first transistor (M1) is turned on, the constant electric current supplied from the electric current source unit 181 is supplied to the second power source (ELVSS) through the first transistor (M1), the fourth transistor (M4), and the organic light emitting diode (OLED). As a result, a second voltage is generated according to the constant electric current flowing in the electric current source unit 181 applied to the organic light emitting diode (OLED). The second voltage applied to the electric current source unit 181 is converted into a second digital value in the ADC 182, and the converted second digital value is supplied to the memory 191.

The first digital value and the second digital value corresponding to each of all the pixels 140 are stored in the memory 191 through the aforementioned procedures. The procedure of sensing the information about the threshold voltage and/or mobility of the second transistor (M2) and the deterioration of the organic light emitting diode (OLED) may be carried out, for example, whenever power is supplied to the organic light emitting display.

The first digital value and the second digital value generated in the ADC 182 may be supplied to the controller 192. In this case, the controller 192 converts the first digital value so that it can have the information about the threshold voltage and/or mobility of the second transistor (M2), and then stores the converted first digital value in the memory 191.

FIG. 6b shows a waveform view for carrying out a normal display operation. During a normal display period, the scan driver 110 sequentially supplies a scan signal to the scan lines (S1 to Sn), and sequentially supplies a light emitting control signal to the light emitting control lines (E1 to En). The first switching element (SW1) and the fourth switching element (SW4) are maintained in a turned-on state during the normal display period. Also, the fourth transistor (M4) is maintained in a turned-off state during the normal display period.

An operation of the organic light emitting display will be described in more detail with reference to FIG. 6b and FIG. 7. First, a first data (Data1) is supplied to the timing controller 150. The controller 192 supplies a first digital value and a second digital value to the timing controller 150, the first digital value and the second digital value being extracted from the pixel 140 connected with the data line (Dm) and the scan line (Sn), as described above.

The timing controller 150 receiving the first digital value and the second digital value converts the first data (Data1) to generate a second data (Data2). The second data (Data2) is set to compensate for the deterioration of the organic light emitting diode (OLED) and the threshold voltage and/or mobility of the second transistor (M2).

For example, a "00001110" may be the first data (Data1). The timing controller 150 may generate "000011110" as the second data (Data2) to compensate for the deterioration of the organic light emitting diode (OLED) and/or a shift in the threshold voltage and/or mobility of the second transistor (M2).

The second data (Data2) generated in the timing controller 150 is supplied to a DAC 124m via a sampling latch 122m and a holding latch 123m. The DAC 124m then uses the second data (Data2) to generate a data signal and supplies the generated data signal to the data line (Dm) via a buffer 125m.

Because the first transistor (M1) is turned on if the scan signal is supplied to the scan line (Sn), the data signal supplied to the data line (Dm) is supplied to the gate electrode of the second transistor (M2). The storage capacity (Cst) is charged with a voltage corresponding to a difference between the first power source (ELVDD) and the data signal supplied to the power line (Vm).

Meanwhile, because the scan signal is supplied to the scan line (Sn) and the light emitting control signal is supplied to the light emitting control line (En) at the same time, unnecessary electric current is not supplied to the organic light emitting diode (OLED) during a period when the voltage corresponding to the data signal is charged in the storage capacitor (Cst).

Then, the first transistor (M1) is turned off when the supply of the scan signal is suspended, and the third transistor (M3) is turned on when the supply of the light emitting control signal is suspended. The second transistor (M2) controls the electric current to correspond to the voltage charged in the storage capacitor (Cst), the electric current flowing from the first power source (ELVDD) to the second power source (ELVSS) through the second transistor (M2), the third transistor (M3) and the organic light emitting diode (OLED). Then, the organic light emitting diode (OLED) generates light having a luminance corresponding to the supplied electric current. The electric current supplied to the organic light emitting diode (OLED) is set to compensate for the deterioration of the organic light emitting diode (OLED) and the threshold voltage and/or mobility of the second transistor (M2), and therefore the electric current may be used to uniformly display an image having a desired luminance.

The pixel 140 as shown in FIG. 3 is provided with PMOS transistors, but the present invention is not limited thereto. The pixels 140 in FIG. 3 may be configured with NMOS transistors. In this case, polarity of a driving waveform of the NMOS transistors is set to a polarity that is opposite to the polarity of the PNMOS transistors, as is well known in the art.

As described above, the organic light emitting display and the driving method thereof stores information about the threshold voltage and/or mobility of the drive transistor and the deterioration of the organic light emitting diode in a memory. The organic light emitting display generates a second data to compensate for the deterioration of the organic light emitting diode and the threshold voltage and/or mobility of the drive transistor using the information stored in the memory, and supplies the generated second data signal to the pixels. As a result, the organic light emitting display displays an image having a uniform luminance regardless of the deterioration of the organic light emitting diode and the threshold voltage and/or mobility of the drive transistor."

U.S. patent application Ser. No. 11/816,336 entitled "Oled-Device With Pattered Light Emitting Layer Thickness" is hereby incorporated herein by reference and describes some example color control methods of an organic light emitting diode display. Part of the application recites:

"One preferred embodiment of a color-tunable OLED device according to the present invention is shown in FIG. 1 and comprises a substrate 1, an anode 2 arranged on the substrate 1, a hole transporting buffer layer 3 arranged on the anode 2, a light emitting polymer (LEP) layer 4 arranged on the hole transporting buffer layer 3 and a cathode 5 arranged on the LEP-layer 4.

The light emitting polymer layer 4 is of a first thickness 41 in a first domain 11 and of a second thickness 42 in a second domain 12 of the device.

The anode 2 and the cathode 5 are connected to a LED-driving unit 6, which drives the anode and the cathode such that domains of the device, corresponding to different domains of the patterned light emitting polymer layer 4, may be driven independently to emit light. The patterning of the light emitting layer into domains and the independent driving of those domains gives that the device is patterned into a plurality of different domains 11, 12.

When driven at the same voltage, the different domains 11, 12 of the device emit light of different color-points, and thus, by driving the different domains independently, the total color emitted by the device may be tuned in a range defined by the color-points for the individual domains of the device.

As used herein, the term "color-point" refers to a certain coordinate in a chromaticity diagram, for example a (x,y)-coordinate in the 1931 CIE standard diagram or (u',v')-coordinate in the 1976 CIE standard diagram.

As used herein, the term "white light" refers to light having a color point inside the area of "white" light as defined in, for example, the 1931 or 1976 CIE standard diagram.

As used herein, the term "OLED" refers to all light emitting diodes (LEDs) based on organic electroluminescent compounds, such as light emitting materials based on electroluminescent small organic molecules (smOLED), polymers (polyLED), oligomers and dendrimers. Examples of suitable substrates include, but are not limited to glass and transparent plastic substrates. Plastic substrates are attractive alternatives when suitable, because they are lightweight, inexpensive and flexible, among other advantages. The anode is arranged on the substrate and may be of any suitable material known to those skilled in the art, such as indium tin oxide (ITO).

Typically, the light emitted by the light emitting polymer layer leaves the device via the anode side. Thus, the anode is preferably transparent or translucent. A hole-transporting and injecting buffer layer is arranged on the anode to transport holes (positive charges) towards and injecting holes into the light emitting layer under the influence of an electric field applied between the anode and the cathode.

Suitable hole transporting and injecting buffer layers for use in the present invention include, but are not limited to PEDOT:PSS (polyethylenedioxythiophene polystyrenesulfonate salt) and PANI (polyaniline). Other hole-transporting buffer materials, suitable for use in a device of the present invention, are known to those skilled in the art.

The hole transporting and injecting buffer layer is optional and may or may not be comprised in a device of the present invention. However, it is typically used as it improves the functionality of commonly used OLED-devices.

A device of the present invention may further in some embodiments comprise an electron transporting and injecting buffer layer, located between the cathode and the light emitting layer, as such layers in some embodiments may improve the functionality of the device. Examples of suitable materials having electron injecting and/or transporting functionality includes, but are not limited to TPBI: 2,2',2"-(1,3,5-benzenetriyl)tris[1-phenyl-1H-benzimidazole], DCP: 2,9 dimethyl-4,7-diphenyl-phenantroline, TAZ: 3-phenyl-4-(1'naphtyl)-5-phenyl-1,2,4-triazole and OXD7: 1,3-bis(N,N-t-butyl-phenyl)-1,3,4-oxadiazole. More examples of such materials are described in Adv. Mater. 16 (2004) 1585-1595 and Appl. Phys. Lett. (2002) 1738-1740.

A device of the present invention may also comprise other additional layers with optical and/or electrical functionality, as is known to those skilled in the art. The light emitting layer may comprise any organic electroluminescent light emitting compound or combinations of such compounds known to those skilled in the art. Light of virtually every color is possible to achieve by such organic electroluminescent compounds. Examples of organic electroluminescent compounds include electroluminescent small organic molecules, oligomers, polymers and dendrimers.

Examples include, but are not limited to Alq3: tris(8-hydroxy-quinoline)aluminium and Ir(py)3: tris(2-phenylpyridine)iridium. More examples are described in for example Adv. Mater. 16 (2004) 1585-1595 and Appl. Phys. Lett. (2002) 1738-1740.

Conventional electroluminescent polymers include organic material such as derivatives of poly(p-phenylene vinylene) (PPV) or polyfluorenes and poly (spiro-fluorenes). Other electroluminescent polymers are well known to those skilled in the art.

Any electroluminescent polymer or combination of such polymers may be used in a light emitting polymer layer of the present invention to obtain any desired color. For example, essentially white light may be obtained by a blended combination of a blue-emitting polymer and a red-emitting polymer. One example of such a combination will be described in the following examples. Other combinations of light emitting polymers for providing light of different colors are known to those skilled in the art, as well as single component polymers incorporating different dye monomers on one polymer chain.

The light emitting layer in the embodiment shown in FIG. 1 is patterned into domains of two different thicknesses. However, as will be apparent to those skilled in the art, the light emitting layer may also be patterned into domains of more than two different thicknesses, such as a third domain of a third thickness and a fourth domain of a fourth thickness. The more thicknesses available, the more fine-tuning is allowed in the device. A number of techniques for forming the light emitting layer with patterned thickness are contemplated as possible. For example, the light emitting layer may be deposited by ink-jet printing of the material on the hole transporting buffer layer, to control the amount of material deposited in, and thus the thickness of the material of an area. Other techniques include use of a retractable shadow mask when evaporation is used to deposit material(s), and molding as discussed in e.g. U.S. Pat. No. 6,252,253.

The light emitting layer may independently vary in thickness in different domains. The light emitting layer may have any thickness at which the light emitting layer is capable of emitting light under the influence of an electrical field, and will be different for different types of devices, where the minimum thickness in some smOLED devices is of the order of 10 nm, and the maximum in LEEC-devices in of the order of 500 nm.

The above description relates to a single light emitting layer. However, in some embodiments the light emitting layer may comprise more than one, such as for example two or three, separate sub-layers arranged on top of each other. For example, a blue-emitting layer may be arranged on top of an orange-emitting layer in order to provide white light. In such an embodiment, the thickness of one or more of such sub-layers may be patterned in thickness to provide a device of the present invention.

The above description mentions mostly electroluminescent polymers. However, the present invention also relates to other light emitting materials based on organic electroluminescent compounds, such as electroluminescent small organic molecules, oligomers and dendrimers. As will be apparent to those skilled in the art, also different combinations of such organic electroluminescent compounds may be useful in a device of the present invention. The cathode is arranged on the light emitting layer, optionally with an electron transporting and injecting layer being sandwiched between the light emitting layer and the cathode, as described above. Several cathode materials are well known to those skilled in the art, and all of them are contemplated as suitable. Examples of suitable cathode materials include calcium, barium, lithium fluoride, magnesium and aluminum.

Typically, a device of the present invention is arranged such that light emitted by the light emitting layer leaves the device via the anode. However, in some embodiments of the present invention, light may also leave the device via the cathode layer. Thus, in such embodiments, the cathode may be formed by a material that is transparent or translucent to the emitted light. In a device of the present invention, the anode and the cathode are arranged such that the different domains of the device, corresponding to different domains of the patterned light emitting layer, are possible to drive independently.

As used herein “independently addressable domains” refers to that a domain is possible to drive, i.e. it is possible to apply an electrical field over a domain, irrespective of the driving of an adjacent domain.

It will be apparent to those skilled in the art how to arrange the anode and the cathode layers in order to obtain a domain-specific driving, and both active and passive driving of a device of the present invention may be suitable.

Thus, the color point of the total light emitted by a device of the present invention may be varied by mixing light from different domains of the device having different individual color points.

The above description of preferred embodiments are illustrative only, and modifications to and variants of these embodiments will be apparent to those skilled in the art. Such modifications and variants are also included within the scope of the appended claims. For example, it has been shown, see example 2 below, that the color point of light emitted by a device of the present invention is dependent of the voltage that drives the device. This effect could be combined with the color-effect of varying the thickness of layer, as described above, to obtain a color variable light emitting device.

In one embodiment of the present invention, the plurality of independently addressable domains are arranged on a single substrate, forming a single multi-domain LED-device. In another embodiment of the present invention the different independently addressable domains are arranged on different substrates, forming a multi-LED-device.

EXAMPLES

Example 1

Different LEP-Layer Thicknesses Lead to Different Color Points

Three polyLED-devices were manufactured, which were identical except for the LEP-layer thickness, which were 55 nm, 84 nm and 124 nm thick, respectively. A 205 nm, 200 nm and 206 nm thick layer of PEDOT:PSS, respectively, was used in the three devices as hole transport layer. The light emitting polymer (LEP) consisted of a mixture of 99% of blue emitting polymer (blue 1, formula I) and 1% of a red emitting polymer (NRS-PPV, formula II)

The spectra from the three different devices were compared at a bias of 5 Volts, and the results show clearly that an increase in LEP-layer thickness leads to an increase, both in x- and y-coordinate (FIGS. 2 and 3).

Example 2

Different Voltages Lead to Different Color Points

The three devices from example 1 were used and the color points of the emitted light were analyzed when the devices were driven at different voltages at 4, 4, 5, 5, 5, 5 and 6 Volts.

The results clearly show that the color coordinates decreases with increasing voltages, both in x- and y-coordinate (FIGS. 3 and 4). As shown in example 1 and 2, the color point of light emitted by the device depends on the thickness of the light emitting polymer layer.

Not wishing to be bound by any specific theory, different effects may account for this change of the color points.

One aspect of the tuning is the degree of quenching of the excited state in the presence of an electric field or charge carriers. The blue and the red emitting components of the polymer blend show a different degree of quenching owing to a difference in exciton binding energy, leading to a voltage-dependent color point. To a first approximation, the quenching scales with field applied or charge carrier concentration. Both field and charge carrier concentration do not scale linearly with current density or luminance when the thickness is varied, which creates an opportunity to tune quenching, and therefore, color point, independently from the luminance.

A second aspect of the tuning mechanism is the relative formation rate of excitons on the blue and red emitting components of the LEP-blend. Certain saturation or carrier mobility effects may occur when the carrier concentration is increased, shifting the balance of charge carrier concentration on either component, and thereby changing the ratio of blue and yellow light emission. Again, these saturation or mobility effects do not scale linearly with current or field when the thickness is varied, creating the possibility to achieve different colors points at the same luminance by variation of the thickness.

A third aspect of colors tuning is related to optical out-coupling. The exact position of the exciton, in particular the distance to anode and cathode, determines the colors of the light emission. Obviously, variation of the polymer film thickness leads to changes therein.

The above description of preferred embodiments and examples are illustrative only, and modifications to and variants of these embodiments will be apparent to those skilled in the art. Such modifications and variants are also included within the scope of the appended claims.

Example 1 and Example 2 showed color point variation as a function of thickness and voltage. However, these parameters also affect the luminance ('brightness') of the emitted light. In FIG. 5 the (x,y) CIE coordinates are plotted as a function of luminance for the three devices with different LEP-thickness in example 1. It is evident that meaningful variation of the color point may be achieved in an interesting luminance range. FIG. 6 plots the CIE-coordinates at 300 cd/m.sup.2 (nit) for the different layer thicknesses of the three devices in example 1 and 2.

The color variation is similar in scope as a variation of the white point from 4,000 K to 10,000 K. This fits nicely into the range of white CIE coordinates used for lighting. Moreover, the thickness range used is of practical use. The efficiency does not drop to very low values, which would lead to high power consumption, and the voltage required is not extreme.

A practical implementation would be to have three types of pixels with the thickness shown in the graphs. By appropriate driving all colors between the extremes in FIG. 6 may then be generated. For example, 100 nit (0.20; 0.22) would need 300 nit driving of the 55 nm pixel, in case of equal surface area of each thickness.

It should be noted that the thickness dependence of the color point in the luminance range from 100-1,000 nits is significantly larger than the voltage dependence in that same luminance range. Therefore, 300 nit (0.20; 0.22) may also be generated by driving the 55 nm pixel at 900 nit. Thus, the combination of driving current and thickness dependence allows meaningful color tuning in an interesting luminance range."

Figure 52:
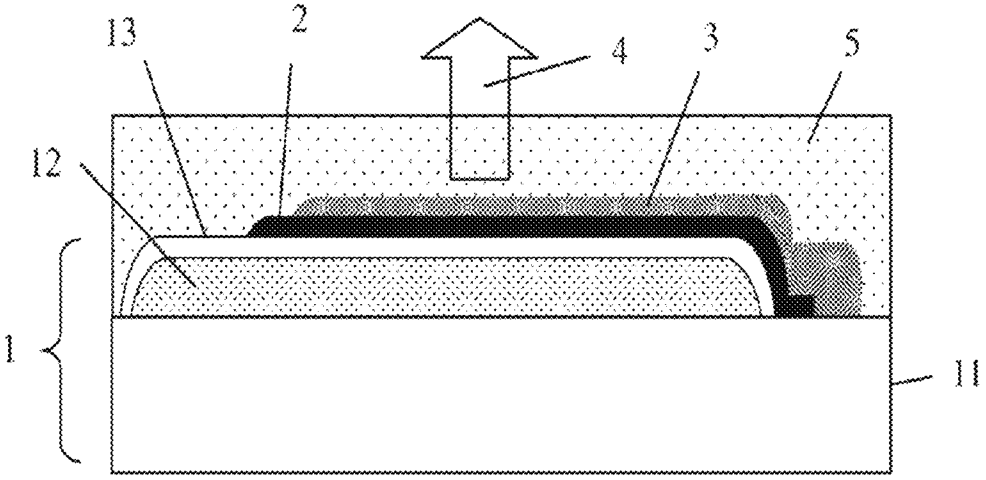

U.S. patent application Ser. No. 12/097,348 entitled "Organic Led Device" is hereby incorporated herein by reference and describes some example manufacturing methods and uses of flexible organic light emitting diode displays. Part of this application, with FIG. 1 referring to FIG. 52, recites:

"FIG. 1 shows an example of a top emitting organic OLED device according to the present invention with a layer stack 1, 2, 3 and 5 for emitting light 4 through an at least partly transparent top electrode 3 and an at least partly transparent protection element 5. The bottom electrode 12, the top electrode 3, and the organic layer stack 2 are covered by a protection element 5 in order to protect the organic layer stack 2 against the environment and thus to obtain a sufficient lifetime.

The organic layer stack 2 consists of one or more organic layers comprising at least one layer emitting light 4 to the top side of the OLED device. Beside the light-emitting layer, the organic layer stack 2 may comprise an electron transportation layer between the light-emitting layer and the cathode, and/or a hole transportation layer between the light-emitting layer and the anode. The organic layer stack 2 may also comprise more than one light-emitting layer, each emitting light of a different emission spectrum. The organic layers are usually provided by vapor deposition, e.g. evaporation, in the case of small organic molecules or by spin coating in the case of larger molecules. Typical thicknesses of an organic layer stack are between 50 nm and 500 nm. One example of an organic layer stack 2 is AlQ.sub.3 (hole transportation layer)/.alpha.-NPD (light-emitting layer)/m-MTDATA doped with F4-TCNQ (electron transportation layer). Those skilled in the art are able to apply also other organic materials disclosed in the prior art.

The organic OLED device according to this invention as shown in FIG. 1 comprises a conducting foil 1 with a carrier material 11 having an upper and a lower side as a substrate and a first metal layer 12 with a thickness resulting in a sheet resistance less than 0.05.OMEGA./square on the upper side of the flexible carrier material 11, the latter comprising at least a first metal area as a bottom electrode. In the example shown in FIG. 1, the first metal layer is identical with the first metal area. The carrier material 11 may be rigid or flexible, depending on the application of the present OLED device, for example glass or plastic. If the carrier material 11 is flexible, the OLED device will exhibit an additional feature of a flexible light source. An OLED device with a bottom electrode area and a light-emitting area of 1 m.sup.2 requires a driving current of 20 A to generate 1000 Cd/m.sup.2 at 50 Cd/A. Given a sheet resistance of 0.05.OMEGA./square, a maximum voltage drop of 0.5 V is obtained across the bottom electrode. Voltage drops of up to 0.7 V are acceptable.

For example, single-sided flexible conducting foils are commercially available, for example from Nippon Mektron Ltd, comprising a 25.mu.m thick polyimide film and a 35.mu.m copper layer adhesively bonded to the polyimide film. Double-sided foils with copper foils on both sides of the polyimide film are also available. First metal layers of 35.mu.m thickness have sheet resistance values far below 0.01.OMEGA./square, in the case of copper of about 0.001.OMEGA./square. In other embodiments, other metals with good adhesion properties on flexible substrates, for example silver or gold, and also copper with a gold or silver coating, also have very low sheet resistance values and are suitable for low-resistance bottom electrode materials. The polyimide film acts as the flexible carrier material 11. As regards rigid carrier materials, very similar resistance values are obtained for metal layers of similar thicknesses.

The first metal layer 12 may further comprise a conducting diffusion barrier layer 13 at the interface with the organic layer stack 2. Diffusion of electrode material into the organic material leads to an increased level of impurities disturbing the properties of the organic material. For example, copper exhibits a relatively high diffusion rate. Suitable conducting diffusion barrier layers with thicknesses of a few nanometers consist of noble metals such as gold.

The transparent top electrode 3 on top of the organic layer stack 2 may comprise a transparent conducting material such as ITO or a metal. In the latter case, the metal layer thickness is limited to a thickness at which a metal layer is still at least partly transparent in the visible range of the spectrum. ITO layers are commonly deposited by sputtering, an additional protection layer between the ITO electrode 3 and the organic layer stack 2 being required to avoid deposition damage to the organic layers. An example of a suitable material for such a protection layer is a thin film of copper phthalocyanine (CuPc). The thickness of the ITO layer may be much greater than the thickness of a metal electrode. However, if ITO is used as a top electrode 3, the optimization of the electrical parameters of the ITO is compromised by optical requirements and deposition process temperature restrictions. Typical thicknesses of ITO electrodes are around 100 nm. One example of metal top electrodes 3 is an aluminum layer with a thickness below 20 nm with a layer, for example LiF, at the interface with the organic layer stack 2 in order to lower the work function of the top electrode 3. To achieve a good transparency of the top electrode 3, the thickness should be even lower, for example below 10 nm. Another suitable material for the top electrode 3 is silver in combination with highly doped electron injection/transport layers.

In FIG. 1, the protection element 5 covers not only the bottom electrode 12, but also the top-electrode 3 and the organic layer stack 2. The minimum requirement for the extension of the protection element 5 is to cover the organic layer stack 2 and the top-electrode 3 in order to prevent diffusion of critical gases, for example oxygen or water, from the environment into the organic layer stack 2. Suitable transparent materials for acting as a diffusion barrier are known to those skilled in the art, for example silicon nitride. A rigid, at least partly transparent cover lid may be glued on top of the upper side of the carrier material 11 as an alternative to a protection layer as a protection element 5 for providing a closed and sealed volume above the organic layer stack, which may be evacuated or filled with chemically inert gases or liquids.

Another embodiment of the present invention is shown in FIG. 2. Here, the diffusion barrier layer 13 of FIG. 1 is not shown, but may be present. The metal layer 12 comprises a first 121 and a second metal area 122, both with a sheet resistance according to this invention of less than 0.05.OMEGA./square on the upper side of the flexible carrier material 11. The upper side of the flexible carrier material 11 is the side where the organic layer stack 2 is deposited, the other side (lower side) can be considered as the backside of the OLED device. The separation of first 121 and second metal area 122 can be achieved, for example, by photolithography and etching. The term "separated" here means that no conductive path is present between the first 121 and the second metal area 122 before the deposition of the organic layer stack 2 and the top electrode 3.

The second metal area 122 has to be directly connected to the top electrode 3 as shown in FIG. 2 if it is to act as a shunt providing an overall lower resistance to the top electrode metal track. To obtain a good electrical contact between the two layers 3 and 122, any organic material has to be avoided on top of the second metal area 122. This can be achieved by proper masking techniques during the thin-film deposition. The organic layer stack is deposited on the first metal area 121 by suitable thin-film deposition techniques, for example evaporation and/or spin coating. An appropriate metal finishing may be applied to the first and second metal areas in order to modify roughness, reflectivity, and work function before the organic layer stack is deposited.

As shown in FIG. 2, the first 121 and second metal area 122 can be electrically separated by a insulating filling material 6 in order to avoid layer faults within the layers to be subsequently provided on the existing layer stack caused by edges/curves in some of the subjacent layers and to avoid leakage currents flowing directly from the first 121 to the second metal area 122 or vice versa. Without additional protection measures such leakage currents may be triggered, for example, by remaining metal materials after the laser structuring process of the conductive foil for obtaining separated first and second metal areas. A suitable material for suppressing leakage currents is any standard resin. The insulating filling material 6 is located below the organic layer stack 2, seen in light emission direction 4, therefore this insulating filling material 6 may be transparent or non-transparent. The presence of an insulating filling material 6 will improve the device's reliability.

Another embodiment is shown in FIG. 3. In contrast to the previous figures, the conductive foil 1 additionally comprises a second metal layer 14 at the lower side of the carrier material 11 with a sheet resistance according to this invention of less than 0.05.OMEGA./square, which second metal layer 14 is connected to the second metal area 122 at the upper side of the carrier material 11 via at least one conducting path 15 through the carrier material 11. So, the current supply to the top electrode 3 is achieved via the backside of the OLED device. This makes it easier on the one hand to contact the top electrodes 3 in the case of an OLED of a complicated structure with a multitude of sub-tiles, and on the other hand it reduces the surface area required for non-emitting areas on the upper side of the carrier material 11. There may be a non-conducting layer 16 on top of the second metal layer 14 for the purpose of electrical insulation. Very similar embodiments are also conceivable without the present insulating filling material 6 and/or with a diffusion barrier layer not shown in FIG. 3. The third metal layer 14 provides an additional protection against moisture penetration from the lower side of the carrier material into the OLED device.

In other embodiments, the second metal layer 14 may alternatively be contacted to the first metal area 121. In this case, the second metal area 122 will be electrically insulated from the second metal layer 14 and be contacted via the upper side of the carrier material 11 to the power supply not shown here.

FIG. 4 is a plan view of a sub-tile OLED device comprising first 121 and second metal areas 122 deposited on the upper side of the carrier material 11, separated by insulating filling materials 6 and with organic layer stacks 2 on top. The layers 121, 122, 2 and 3 are patterned into sub-areas in order to form light-emitting sub-tiles (four sub-tiles are shown here by way of example) separated from each other by non-emitting areas (areas where no organic layer stack 2 is present) to provide conducting metal tracks 121 and 122 to each sub-tile. A light-emitting sub-tile covers a local portion (sub-area) of the OLED device comprising the OLED layer stack for emitting light. The total light-emitting area of the OLED is the sum of the sub-tile areas, here shown as black areas 2.

In FIG. 4, the top electrode 3 has been given a slightly smaller size to clarify the layer structure. In a sub-tile OLED device, the top electrode may also have the same size as the organic layer stack. Besides, a sub-tile may consist of a number of OLED devices in series. Also, the number and the shape of sub-tiles may be different from the example shown in FIG. 4. The top electrodes 3 cover the light-emitting organic layer stack 2 (black areas) and are electrically connected to the second metal layer 13.

Two OLED devices were successfully constructed on flexible copper foils. In both examples the copper layer (first metal layer) has a thickness of 35.mu.m and a resistance below 0.001.OMEGA./square. The substrate size was 49.times.49 mm.sup.2, comprising 16 sub-tiles of 20 mm.sup.2 size.

Example 1

The organic electroluminescent device comprises the following layer stack on top of the carrier material 11. In this example, gold was used as a diffusion barrier layer 13: Cu (35.mu.m)/Au (1.mu.m)/PEDOT (100 nm)/ .alpha.-NPD (15 nm)/.alpha.-NPD:rubrene (15 nm)/ AlQ.sub.3 (60 nm)/LiF (1 nm)/Al (10 nm)

Example 2

The organic electroluminescent device comprises the following layer stack on top of the carrier material 11. In this example, silver was used as a diffusion barrier layer 13: Cu (35.mu.m)/Ag (1.mu.m)/PEDOT (100 nm)/ .alpha.-NPD (15 nm)/.alpha.-NPD:rubrene (15 nm)/ AlQ.sub.3 (60 nm)/LiF (1 nm)/Al (10 nm) PEDOT was used to overcome the work function mismatch of silver or gold with the hole transport layer.alpha.-NPD. Rubrene is a doping material and the actual fluorescent material in this stack. A homogeneous luminance was observed over the entire light-emitting area of all sub-tiles for both examples without any difference."

U.S. patent application Ser. No. 11/816,103 entitled "Oled Device" is hereby incorporated herein by reference and describes some further example manufacturing and uses of flexible organic light emitting diode displays. Part of this application recites:

"An OLED device according to a first embodiment of this invention, as shown in FIG. 1, comprises a substrate 103, a first conducting layer, constituting a bottom electrode layer, 105 overlying the substrate 103, a set of organic layers 107 overlying the bottom electrode layer 105, and a second conducting layer, constituting a top electrode layer 109 overlying the set of organic layers 107. In this embodiment the bottom electrode layer 105 is an anode and the top electrode layer 109 is a cathode. On top of the top electrode layer 109 a metal foil 111 is arranged. A sealant in the form of glue strings 113 is applied between the foil 111 and the top surface of the anode 105. Thus a hermetic enclosure of the intermediate layers 107, 109 is obtained. The foil 111 is in direct contact with the cathode 109, and provide for a low ohmic connection of driving circuitry to the cathode. It is to be noted that the resistivity of the metal foil, typically having a thickness of some tens of microns, is in the order of 0.001 ohm/square. In comparison, plated metal, typically having a thickness of about 5 micron, has a resistivity of about 0.01 ohm/square; Al thin film, typically having a thickness of 500 nm, has a resistivity of about 0.1 ohm/square; and ITO has a resistivity of about 15 ohm/square. Because the foil 111 is arranged on top of the top electrode layer, it is possible to have it cover substantially the whole area of the device. That is, the area of the foil 111 is approximately equal to the area of the substrate 103.

The OLED device can have a plurality of pixels arranged on the substrate 103, wherein each pixel comprises a portion of said bottom electrode layer, said organic layers and said top electrode layer. FIG. 1 shows but a portion of the device constituting one pixel. In this embodiment, the sealant 113 can be provided such that a hermetic package is obtained for each individual pixel.

Since the device is emitting through the substrate 103, the substrate preferably is made of glass and the anode 105 preferably is made of a commonly used transparent material, such as ITO (Indium Tin Oxide). The cathode 109 is made of any commonly used metal. The electrode and organic layers 105, 107, 109 generally are deposited by means of any commonly used technology. The foil preferably is made of Copper, while other low resistivity metals are also possible to use.

In FIG. 2 a portion of an OLED device having a plurality of metal foils is shown. In this figure two pixels are shown. The structure shown is typical for a simple single colour device, such as a display having monochrome icon addressing. This embodiment comprises a substrate 203, a bottom electrode layer 205, applied as a blanket metallization, which thus is common for all pixels, a set of organic layers 207, which set is also common for all pixels, and a top electrode layer 209, which is divided into separate portions 209a, 209b, one for each individual pixel, such as a first pixel 219 and a second pixel 221 respectively, shown in FIG. 2. The bottom electrode layer 205 is an anode, and the top electrode layer 209 is a cathode.

The device further comprises a first metal foil 211, arranged on top of but separated from the top electrode layer 209, a second metal foil 215, on top of and separated from the first metal foil 211, and a third metal foil 217, on top of and separated from the second metal foil 215. An insulating foil is arranged beneath each metal foil 211, 215, 217, although not shown in the figure due to reasons of clarity. The insulating foils are preferably made of polyamide. However, there are many useful alternative materials, such as Teflon® based foils and liquid crystal polymers. First connection portions 212, preferably strings of a conductive material, connect the first foil 211 with the anode 205. Second connection portions 214 connect the second foil 215 with the cathodes, i.e. cathode portions, of a subgroup of the pixels including the cathode portion 209a of the first pixel 219. Third connection portions 216 connect the third foil 217 with the cathodes of another subgroup of the pixels, including the cathode 209b of the second pixel 221. With this structure it is possible to address individual pixel groups.

In FIG. 3 a more complex structure is shown. The difference from the structure of FIG. 2 is that the set of organic layers is divided into separate portions, one for each pixel, as well. Thus, an anode 305 overlay a substrate 303, a set of organic layers 307 overlay the anode 305, and is divided into pixel portions 307a, 307b, a cathode 309 overlay the set of organic layers 307, and is divided into pixel portions 309a, 309b corresponding to the pixel portions 307a, 307b of the set of organic layers 307, and first, second and third metal foils 311, 315, 317 are stacked on top of the cathode 309 with insulating foils in between. Connection portions are arranged in the same way as in the embodiment shown in FIG. 2.

With the embodiment of FIG. 3, it is possible to build a multi colour device, for example for the above-mentioned applications, such as a white light emitter.

In FIG. 4 a further embodiment is shown. This embodiment corresponds to that of FIG. 3 except for the anode layer that is divided into separate portions 405a and 405b one for each pixel the existence of a fourth metal foil and slightly differently connected foils. Thus, the device has a substrate 403, an anode 405 on top of the substrate 403, a pixilated set of organic layers 407 on top of the anode 405, and first, second, third and fourth metal foils 411, 415, 417 and 423 stacked thereon. The first foil 411 is connected via connection portions 412 to the cathodes of a first subgroup of pixels including the cathode 409a of a first pixel 419 as shown. The second foil 415 is connected by means of connection portions 414 to the cathodes of a second subgroup of pixels including the cathode 409b of a second pixel 421 as shown. The third foil 417 is connected via connection portions 416 to the anodes of the first subgroup of pixels, including the anode 405a of the first pixel 419. The fourth foil 423 is connected via connection portions 418 to the anodes of the second subgroup of pixels including the anode 405b of the second pixel 421.

With this structure it is possible to provide a multi colour device with segmented display features.

In FIG. 5 a portion of 3-foil device having both anode and cathode connections at the top metal foil is shown in more detail. An ITO layer 505 divided into portions 505a-c is deposited on the substrate 503. Organic layers 507 divided into portions comprising first and second portions 507a-b are deposited on the ITO layer portions 505a-c. A cathode layer 509 divided into portions comprise first and second cathode portions 509a-b deposited on the organic layer first and second portions 507a-b. A first metal foil 511 is arranged above and distanced from the cathode layer 509. A first insulating foil 513 is arranged on top of the first metal foil 511. A second metal foil 515 is arranged on top of the first insulating foil 513. A second insulating foil 517 is arranged on top of the second metal foil 515. A third metal foil 519 is arranged on top of the second insulating foil 517. A first ITO portion 505a is connected to the cathode layer 509 via bridging portions 521 of the cathode layer extending past the organic layers 507 between the cathode layer 509 and the ITO layer, i.e. protruding downwards from the cathode layer 509. The first metal foil 511 is connected to the first ITO portion 505a via a connection portion 523 consisting of a suitable ITO copper interconnect, for instance ACF (Anisotropic Conductive Film). Further, the first metal foil 511 is connected to a separate portion 520 of the third metal foil 519 by means of a via portion 522 through the second insulating foil 517, a separate portion 524 of the second metal foil 515, and a via portion 526 through the first insulating foil 513. A major portion 534 of the second metal foil 515 is connected by means of a via portion 525 in the first insulating foil 513, a separate portion 527 of the first metal foil 511, and an ACF portion 529 to the second ITO portion 505b, which act as an anode. A further connection, similar to the one just described, between the major portion 534 of the second metal foil 515 and another portion 505c of the anode is shown at 535, 537 and 539. The third metal foil 519 is connected to the first ITO portion 505c by means of a via portion 531 through the second insulating foil 517, a separate portion 533 of the second metal foil 515, a via portion 535 through the first insulating foil 513, a separate portion 537 of the first metal foil 511 and an ACF portion 539.

Thus, in this embodiment the bottom conductive layer (ITO) is divided into at least two anode planes and one or more separate portions, which are used as intermediate contact elements between the first metal foil and the cathode. This solution for connecting the first metal foil to the cathode is advantageous in that only one type of interconnect technology is used throughout the OLED device, i.e. interconnect between ITO and Copper. By using ACF for this interconnect, a well known interconnect technology is applied. The use of an anisotropic interconnect also provide further ease of fabrication. If for instance anode and cathode connections are arranged in line, one line of interconnect foil can be used for both contacts. Other interconnection solutions are useful as well, although they may be less desirable.

FIG. 6 is an overall view of the just-described embodiment. Here it is shown that, in this embodiment, the sealant 604 is limited to edge portions of the substrate 603. The stack of metal foils and insulating foils is shown schematically at 606, and the ACF portions 605 are shown between the substrate 603 and the stack 606.

In FIG. 7 a portion of a 2-foil device having anode connections at the top metal foil and cathode connections to the bottom metal foil is shown in more detail. Since the principles for the connection portions are the same as already explained, only a brief explanation of this figure will be made.

The OLED device comprises a substrate 703, a bottom electrode layer 705, a set of organic layers 707, a top electrode layer 709, a first metal foil 711, an insulating foil 713, and a second top most metal foil 715.

The first metal foil 711 is connected to the cathode layer 709 via a connection portion 723 comprising an ACF portion, a separate portion of the bottom electrode layer 705, and bridging portions past the organic layers 707. The second metal foil 715 is connected via connection portions 717, 719, in a similar way as the second foil of the 3-foil embodiment shown in FIG. 5 to the bottom electrode layer 705, and more particularly to the major portion thereof constituting the anode.

In FIG. 8 the embodiment of FIG. 7 is also shown, though in an overall view. The substrate is denoted 803 and the structure arranged on the substrate is denoted 805. External connections 807, 809 are schematically illustrated, where an electrically positive connection 807 is attached to the top electrode layer and an electrically negative connection 809 is attached to the bottom electrode layer.

Above, embodiments of the OLED device according to the present invention have been described. These should be seen as merely non-limiting examples. As understood by those skilled in the art, many modifications and alternative embodiments are possible within the scope of the invention.

It is to be noted, that for the purposes of this application, and in particular with regard to the appended claims, the word "comprising" does not exclude other elements or steps, that the word "a" or "an", does not exclude a plurality, which per se will be apparent to those skilled in the art.

Thus, in accordance with the present invention, there is provided an OLED structure having at least one metal foil on top of the electrode and organic layers arranged onto the substrate. The metal foil(s) is(are) used for a combination of providing low resistivity connections for external connectors to one of or, preferably, both the electrodes, and providing a package that is tight and flexible. The invention is particularly useful for driving large area OLEDs."

U.S. patent application Ser. No. 11/758,638 entitled "METHOD AND APPARATUS FOR HAPTIC ENABLED FLEXIBLE TOUCH SENSITIVE SURFACE" is hereby incorporated herein by reference and describes some example flexible displays that may include haptic elements. Part of this application recites:

"The present invention discloses an electronic interactive device having a haptic enabled flexible touch sensitive surface. Haptic feedback can also be referred to as tactile effect, tactile feedback, haptic effect, force feedback, or vibrotactile feedback. In one embodiment, the electronic interactive device includes a flexible touch sensitive surface, a flexible screen (or display), and an actuator. By flexible it is meant that gross deformations are possible with the touch panel as opposed to slight flexures that occur in current touch screens. The flexible screen, for example, can be a rollable display, a foldable display, or a bendable display. A rollable display is a case where a bendable display is capable of bending back on itself to form a roll. The flexible touch sensitive surface can also be a flexible touch panel, a flexible touch sensitive pad, a flexible touch keyboard, or a flexible touch display. The surface of flexible touch sensitive surface is divided into multiple regions wherein each region is capable of sensing a touch or contact on the region by a user. Alternatively, the surface of flexible touch sensitive surface is a continuous borderless input screen with fine input resolution.

The flexible touch sensitive surface generates an input in accordance with the particular region, which senses the touch, and the graphic displaying content that the user "touches". The actuator, which can be a flexible actuator, is configured to provide haptic feedback in response to the input. In another embodiment, the electronic interactive device also includes a flexible battery and a flexible chip. The flexible battery or power supply is used for supplying power to the device while the flexible chip is used for processing data.

Turning now to the figures, FIG. 1A illustrates an electronic interactive device 100 having a rollable flexible screen and a haptic enabled flexible touch sensitive surface in accordance with one embodiment of the present invention. Interactive device 100 includes a flexible or a rollable screen having an open portion 102 and a rolled-up portion 103. In one embodiment, open portion 102 is configured to have a display window for displaying images 108. Rolled-up portion 103, on the other hand, is configured to be inactive for conserving power. In an alternative embodiment, open portion 102 is configured to be opaque, which is capable of providing haptic feedback in response to an input.

In another embodiment, the display window extents to the entire flexible screen including both open portion 102 and rolled-up portion 103 although rolled-up portion 103 usually can not be viewed and/or touched. In other words, the display window does not change regardless of the flexible position or status of the rollable display. The flexible position or status indicates the flexible condition of the rollable display in which it identifies whether the display is in a rolled-up condition, in a partially rolled-up condition, and so forth. It should be noted that the rollable display could be an electronic paper, an e-paper, a digital paper, an electronic ink, or a power paper.

A rollable display is an electronic display capable of displaying images and the display can be rolled up into a tube or a scroll. The rollable display is designed to mimic the appearance and the physical properties of regular paper. Unlike a conventional display, the rollable display looks and acts like an ordinary sheet of paper, and it is capable of holding displaying images for a long period of time with limited or no power consumption. The shape of the rollable display may be changed from a planar (or flat) to a rolled up (or a tube) shape. An advantage of the rollable display (such as electronic paper) is lightweight, durable, and flexible.

An example of rollable display, which can be employed in the present invention, is a Gyricon™ sheet, which is a type of electronic paper developed at the Xerox PARC™ (Palo Alto Research Center). The Gyricon™ sheet has similar physical properties as a traditional sheet of paper except that it can be rewritten many times. The Gyricon™ technology is essentially a technique of manipulating millions of small toner particles in a thin layer of transparent plastic wherein the toner particles are arranged in response to an application of voltage patterns. The image displayed by the Gyricon™ sheet will be maintained until new voltage patterns are applied. It should be noted that other flexible display technologies for manufacturing rollable displays may be available, such as organic light-emitting diode (OLED) and/or organic/polymer TFT (Thin Film Transistor), which may be used to manufacture flexible displays.

Referring back to FIG. 1A, the flexible touch sensitive surface is deposited over the rollable display thereby a user can use his or her fingertips to contact a region of the flexible touch sensitive surface to emulate a button press according to the graphics displayed behind the region on the flexible display device. In one embodiment, the flexible touch sensitive surface is further configured to dynamically adjust effective touch sensitive surface 110 in accordance with the displaying window of the rollable display. In order for a user to correctly touch an intended region on effective touch sensitive surface 110, the user needs to see the graphics displayed behind the region from the rollable display.

As such, matching the size of effective touch sensitive surface 110 to the display window is, in one embodiment, desirable.

The flexible touch sensitive surface is further configured to divide its touchable or contactable area into multiple regions 111-126 separated by borders 130. Each region of the flexible touch sensitive surface is used to accept an input when a region is touched or pressed by a user. Conversely, the flexible touch sensitive surface rejects a user's input when a border 130 is touched.

The flexible position or status of the rollable display, in one embodiment, identifies the rollable status of a rollable flexible screen in real-time since a user may continuously fold or unfold the flexible display just as, for example, folding or unfolding a page of newspaper. The size of effective touch sensitive surface 110 is adjusted by activating and/or deactivating regions in accordance with the value of flexible position. In other words, the flexible position identifies what percent of the display is rolled up and what percent of display is open. Flexible position is used to determine the actual size of display window and effective touch sensitive surface 110. For example, the flexible position, as shown in FIG. 1A, should indicate that an approximately fifty percent (50%) of the rollable display is in an open position 102 while other fifty percent (50%) of the rollable display is in a rolled up (or closed) position 103. Since a user cannot see and touch the image displayed by rolled-up portion 103, effective touch sensitive surface 110, in one embodiment, is not extend into rolled-up portion 103.

The display window of a rollable flexible screen, in one embodiment, can be set to the full size as the rollable display regardless of whether the display is in a rolled up position. If the size of effective touch sensitive surface 110 tracks with the size of display window, the size of effective touch sensitive surface 110 is adjusted according to the size of display window. As such, the flexible touch sensitive surface could extend effective touch sensitive surface 110 to the entire flexible screen if the display window is set to the entire flexible screen. The size of effective touch sensitive surface 110, in another embodiment, is configured to be set in accordance with the flexible position although the display window is extended to the entire rollable display. The display window, in an alternative embodiment, is configured to be dynamically set and/or rearranged in response to the flexible position. As FIG. 1A illustrated, while rolled-up portion 103 is turned off, open portion 102 contains effective touch sensitive surface 110 and display window, which displays images 108.

Device 100 further includes an actuator, not shown in FIG. 1A. Depending on the orientation, the actuator can excite either in-plane or out-of-plane motion with respect to effective touch sensitive surface 110 for haptic sensation. In addition to traditionally mechanical based actuators, the present invention also employs a flexible actuator or flexible actuators. A flexible actuator may be a fiber (or nanotube) of electroactive polymers ("EAP"), a strip of piezoelectric element, and/or a fiber of shape memory alloy ("SMA"). For example, EAP, also known as biological muscles or artificial muscles, is capable of changing its shape in response to an application of voltage. The physical shape of an EAP may be deformed when it sustains large force. EAP may include Electrostrictive Polymers, Dielectric elastomers, Conducting Polyers, Ionic Polymer Metal Composites, Responsive Gels, Bucky gel actuator or any combination of the above-mentioned EAP materials.

Piezoelectric elements are another type of flexible actuators that can be used in the present invention. Piezoelectric element may be manufactured in a fiber-like device, a strip-like device or a film-like layer. The dimension of piezoelectric element can be expanded or shrunk depending on the applied voltage.

SMA, also known as memory metal, is another type of a flexible actuator wherein SMA could be made of copper-zinc-aluminum, copper-aluminum-nickel, nickel-titanium alloys, or a combination of copper-zinc-aluminum, copper-aluminum-nickel, and/or nickel-titanium alloys. Upon deforming from SMA's original shape, it regains its original shape in accordance with an ambient temperature and/or surrounding environment. It should be noted that the present invention may combine the EAP, piezoelectric elements, and/or SMA to achieve a specific haptic sensation.

Device 100 further includes a flexible battery 104 and a flexible chip 106. Because flexible battery 104 can be manufactured in an ultra-thin structure, it should have similar physical flexibility as the rollable display thereby they can be rolling up and/or unrolling without difficulty. Alternatively, instead of using flexible battery 104, device 100 includes a power supply, which is capable of generating sufficient power for device 100 to operate. In one embodiment, the power supply includes an array of solar cells or photovoltaic cells, wherein solar cells, for example, are capable of converting light energy into electrical energy. Flexible chip 106, also known as flexible electronics and/or flexible circuitry, may be used in device 100, and it can be rolled up like a window shade, a tube, or a scroll. While flexible chip 106 provides data processing capability for electronic interactive device 100, flexible battery supplies the power to device 100. During an operation, electronic interactive device 100, in one embodiment, identifies and monitors its flexible position and displays graphic images on a rollable display in accordance with the flexible position. Effective touch sensitive surface 110 is subsequently defined and activated in response to the flexible position. When one of regions 111-126 is touched, a haptic feedback is generated by an actuator in accordance with the region that is touched. It should be noted that different haptic feedbacks may be generated for different regions of the flexible touch sensitive surface.

FIG. 1B illustrates an electronic interface device 140 having a foldable flexible screen and a haptic enabled flexible touch sensitive surface in accordance with one embodiment of the present invention. Device 140 includes an open portion 142 and a fold portion 143 wherein open portion 142 is capable of displaying images. Folded portion 143 is folded behind open portion 142 and, in one embodiment, does not display any images since it can not be viewed. Alternatively, folded portion 143 is configured to display images even though these images can not be viewed and touched. Device 140 is a paper-like flexible electronic device including a layer of a foldable display and a layer of a flexible touch sensitive surface. The foldable display could be an electronic paper, an e-paper, a digital paper, an electronic ink, electronic reusable paper, or a power paper.

Similar to a rollable display, a foldable display is capable of displaying images through its display window. The foldable display can be folded into a smaller displaying device in which the display window should be adjusted accordingly, as shown in FIG. 1B. For example, a foldable display is designed to mimic the physical properties of a regular piece of paper. Unlike a conventional display, the foldable display acts as an ordinary paper and it is capable of retaining displaying information (or images) for a long period of time with limited power consumption. In one embodiment, the display window of device 140 is capable of continuously adjusting in response to actions of folding and unfolding of device 140 by a user. An advantage of a foldable display (such as electronic paper) is lightweight, durable, and flexible, which is almost as flexible as a regular piece of paper. As discussed above, various technologies involving in manufacturing rollable displays can also be used to manufacture foldable displays.

Referring back to FIG. 1B, a flexible touch sensitive surface is deposited over the foldable display. It should be noted that the flexible touch sensitive surface may be a separate layer that is adjacent to the screen. In one embodiment, the flexible touch sensitive surface is organized in a plurality of regions 111-126, and at least a set of regions forms an effective touch sensitive surface 110. In one embodiment, device 140 dynamically adjusts the size of effective touch sensitive surface 110 in accordance with the flexible position of foldable flexible screen 140. The flexible position determines whether the foldable display is in a folding position or in an unfolding position. It should be noted that the flexible position also indicates the size of a viewable and touchable displaying window on the foldable display. For example, the flexible position, as illustrated in FIG. 1B, indicates an approximately a fifty percent (50%) folding position of device 140, which further indicates that the size of the display window is also adjusted to about half of the device 140. In one embodiment, effective touch sensitive surface 110 is also adjusted to the size of the display window.

Device 140 is configured to dynamically adjust the size of display window on the foldable display according to the flexible position. Various sensors are installed on device 140 and sensors are used to determine the flexible position. While the foldable display projects images on the display window of open portion 142, the foldable display ignores or turns off folded portion 143. The size of effective touch sensitive surface 110 is adjusted in accordance with the display window.

Referring back to FIG. 1B, device 145 illustrates a foldable display that is in a flat or planar position. The display window of device 145 extends to the entire foldable display. Similarly, the flexible touch sensitive surface also extends effective touch sensitive surface 110 to the entire screen, which includes both open portion 142 and folded portion 143 of device 140. It should be noted that device 140 or 145 also includes a flexible actuator, flexible battery, and/or flexible chips. To confirm a receipt of an intended input, actuators generate haptic feedback when a user touches a region of the flexible touch sensitive surface.

During an operation, device 140, in one embodiment, identifies and monitors its flexible position and displays graphic images on the folded display in accordance with the flexible position. Effective touch sensitive surface 110 is subsequently defined and activated in response to the flexible position. When one of regions 111-126 is touched, a haptic feedback is generated by an actuator to confirm that the region is touched. It should be noted that different haptic feedbacks may be generated for different regions of the flexible touch sensitive surface.

FIG. 1C illustrates an interface device 150 having a bendable flexible screen and a haptic enabled flexible touch sensitive surface in accordance with one embodiment of the present invention. Device 150, in one embodiment, includes a bendable display, a flexible touch sensitive surface, a flexible actuator, a flexible battery, and flexible circuitry. The bendable display, also known as an electronic paper, an e-paper, a digital paper, an electronic ink, electronic reusable paper, or a power paper, is capable of displaying images even if it is in a bending position. In an alternative embodiment, the bendable flexible screen is configured to be opaque, which is capable of providing haptic feedback in response to an input. An advantage of the bendable display (such as electronic paper) is lightweight, durable, and flexible.

A bendable display is designed to mimic the physical properties of a regular sheet of paper and is capable of retaining displaying information (or images) for a long period of time with limited power consumption. A feature of the bendable display is capable of projecting vivid color images and the quality of the images is typically unaffected when the display is bent. A bendable display, in another embodiment, further includes an image memory function, which provides continuous display of the same image without the power consumption. The bendable display also allows the shape of display to be bent as indicated in FIG. 1C. A method of manufacturing a bendable display is to use the technology of film substrate-based bendable color electronic paper with an image memory function. Furthermore, the technique of manufacturing the rollable displays, as discussed above, can also be used to manufacture the bendable displays.

Referring back to FIG. 1C, a flexible touch sensitive surface is deposited over the bendable display. In one embodiment, the flexible touch sensitive surface is arranged in a plurality of regions 111-126 wherein at least a set of regions forms an effective touch sensitive surface 110. Device 150, in one embodiment, sets the size of the display window to the entire bendable display and extends effective touch sensitive surface 110 to the entire flexible touch sensitive surface or the entire bendable display. The flexible actuator is used to provide haptic feedback while flexible battery 104 is the power source for device 150.

During an operation, when one of regions 111-126 of effective touch sensitive surface 110 is touched or pressed by a user, a haptic feedback is generated by an actuator to confirm the intended input. In one embodiment, a unique haptic feedback is initiated for a particular region of the flexible touch sensitive surface. The unique haptic feedback provides a confirmation message indicating which region or object has been touched.

FIG. 1D illustrates a haptic handheld device 160 with an expandable display in accordance with one embodiment of the present invention. In one embodiment, haptic handheld device 160 includes a first handle 162, a second handle 164, and a flexible display 166. Haptic handheld device 160 can be a cellular phone, a mobile device, a personal digital assistant ("PDA"), a video game, a pocket PC, et cetera. It should be noted that haptic handled device 160 is designed to be operated by hand(s). In another embodiment, only one handle, either first handle 162 or second handle 164, is necessary to perform the features of the present invention. Haptic handheld device 160 shows that flexible display 166 is stowed away and the device is in a closed position. Conversely, haptic handheld device 161 shows that flexible display 166 is fully extended and the device is in an open position.

Referring back to FIG. 1D, a flexible touch sensitive surface is deposited over flexible display 166. Alternatively, a portion of the flexible touch sensitive surface is deposited over flexible display 166 and another portion of the flexible touch sensitive surface is deposited over first handle 162. In another embodiment, the flexible touch sensitive surface is deposited over first handle 162, second handle 164, and flexible display 166. In yet another embodiment, the flexible touch sensitive surface is deposited over first handle 162.

First handle 162 further includes a key pad 109, which could be a portion of the flexible touch sensitive surface, and an actuator, not shown in FIG. 1D. Second handle 164 is configured to include a battery 104 and circuits 106. A set of conventional actuators may be installed in first handle 162 and/or second handle 164 for generating haptic feedback in response to inputs. The mechanical based actuator, which contains in one embodiment vibrotactile motors such as eccentric rotating mass ("ERM") or linear resonant actuators ("LRA"), can be installed in first handle 162 or second handle 164 or both. Alternatively, Eccentric Rotating mass or Linear Resonant Actuator flexible actuator may be incorporated in flexible display 166 to generate haptic feedback when effective touch sensitive surface 110 was touched.

Flexible display 166, in one embodiment, is a rollable display that can be stored between first and second handles 162-164 when it is not in use. Flexible display 166, also known as an electronic paper, an e-paper, a digital paper, an electronic ink, electronic reusable paper, or a power paper, is an electronic display capable of displaying images in a display window on flexible display 166. Haptic handheld device 160 or 161 allows the size of flexible display 166 to change according to the user's desire. It should be noted that the display window may vary depending on whether flexible display 166 is fully extended or half-way extended. As discussed above, the method of manufacturing the rollable display may be used to manufacture flexible display 166.

In one embodiment, effective touch sensitive surface 110 disposed over flexible display 166 is configured to be dynamically adjusted in accordance with the flexible position of flexible display 166. Various sensors and detecting circuitry are employed in haptic handheld device 160 to determine the flexible position of the flexible display 166. Alternatively, the display window of flexible display 166 is set to the full size of the flexible display 166 regardless of whether flexible display 166 is partially extended or fully extended.

Flexible display 166 enables a user to read messages, news, movies, email, navigation information, and/or interactive transactions which may be delivered and bought through wireless and/or wired communications network. Users will feel the haptic feedback when they touch or contact a region or regions of the flexible touch sensitive surface. Unique haptic feedback may be generated to indicate which region or regions had been touched. It should be noted that haptic handheld device 160 may contain additional circuits and components that are not necessary to understand the present invention.

FIG. 1E illustrates an alternative embodiment of an electronic interactive device 180 having a rollable flexible screen and a haptic enabled flexible touch sensitive surface in accordance with one embodiment of the present invention. Interactive device 180 includes a flexible or a rollable screen having an open portion 102 and a rolled-up portion 103. In one embodiment, open portion 102 is configured to have a display window for displaying images 108. Rolled-up portion 103, on the other hand, is configured to be inactive for conserving power. Alternatively, the display window extents to the entire flexible screen including both open portion 102 and rolled-up portion 103 although rolled-up portion 103 usually can not be viewed and/or touched.

The flexible touch sensitive surface is deposited over the rollable display thereby a user can use his or her fingertips to contact a region of the flexible touch sensitive surface to emulate a button press according to the graphics displayed behind the region on the flexible display device. The flexible touch sensitive surface is further configured to dynamically adjust effective touch sensitive surface 110 in accordance with the displaying window of the rollable display. In order for a user to correctly touch an intended region on effective touch sensitive surface 110, the user needs to see the graphics displayed behind the region from the rollable display. As such, matching the size of effective touch sensitive surface 110 to the display window is desirable. Effective touch sensitive surface 110 includes high resolution input points that are configured to behave as a continuous borderless input region within surface 110. Surface 110, in one embodiment, includes an icon or a pointer 182, which is used to point where the input is made. In other words, icon 182 is used in a similar way as a mouse icon on a typical computer screen, in which a mouse click initiates an action in accordance with the location pointed by the mouse icon. Alternatively, when a user's finger moves over an object on the display, the object is highlighted in different color to indicate which object is selected for input.

During an operation, electronic interactive device 180, in one embodiment, identifies and monitors its flexible position and displays graphic images on a rollable display in accordance with the flexible position. Effective touch sensitive surface 110 is subsequently defined and activated in response to the flexible position. When an input point pointed by the pointed icon 182 is touched, a haptic feedback is generated by an actuator in accordance with the input point that is touched. It should be noted that different haptic feedbacks may be generated for different regions of the flexible touch sensitive surface.

Having briefly described several embodiments of flexible display devices or screens in which the present invention operates, FIG. 2 illustrates a data processing system 200, which may be used in an interactive device having a flexible display and haptic enabled flexible touch sensitive surface in accordance with one embodiment of the present invention. Computer system 200, which could be implemented in flexible chip 106, includes a processing unit 201, an interface bus 211, and an input/output ("IO") unit 220. Processing unit 201 includes a processor 202, a main memory 204, a system bus 211, a static memory device 206, a bus control unit 205, a mass storage memory 207, and an actuator control 230. Bus 211 is used to transmit information between various components and processor 202 for data processing. Processor 202 may be any of a wide variety of general-purpose processors or microprocessors such as Pentium™ microprocessor, Motorola™ 68040, or Power PC™ microprocessor. Actuator control 230 generates haptic feedback in response to user inputs.

Main memory 204, which may include multiple levels of cache memories, stores frequently used data and instructions. Main memory 204 may be RAM (random access memory), MRAM (magnetic RAM), or flash memory. Static memory 206 may be a ROM (read-only memory), which is coupled to bus 211, for storing static information and/or instructions. Bus control unit 205 is coupled to buses 211-212 and controls which component, such as main memory 204 or processor 202, can use the bus. Bus control unit 205 manages the communications between bus 211 and bus 212. Mass storage memory 207, which may be a magnetic disk, an optical disk, hard disk drive, floppy disk, CD-ROM, and/or flash memories for storing large amounts of data. Actuator control module 230, in one embodiment, is an independent component (IC) that performs functions of haptic effect control. A function of actuator control 230 is to drive one or more haptic actuators 224. In another embodiment, actuator control module 230 may reside within the processor 202, main memory 204, and/or static memory 206.

I/O unit 220, in one embodiment, includes a flexible display 221, keyboard 222, cursor control device 223, and communication device 225. Keyboard 222 may be a conventional alphanumeric input device for communicating information between computer system 200 and computer operator(s). Another type of user input device is cursor control device 223, such as a conventional mouse, touch mouse, trackball, a finger or other type of cursor for communicating information between system 200 and user(s). Communication device 225 is coupled to bus 211 for accessing information from remote computers or servers, such as server 104 or other computers, through wide-area network. Communication device 225 may include a modem or a wireless network interface device, or other similar devices that facilitate communication between computer 200 and the network.

FIG. 3 is a side-view block diagram illustrating a structure of a flexible displaying device 300 having multiple layers in accordance with one embodiment of the present invention. Flexible displaying device 300 includes a flexible touch sensitive surface 302, a first flexible actuator layer 304, a flexible display 306, a second flexible actuator layer 308, and a flexible circuitry layer 310. It should be noted that the thickness of each layer is not drawn to scale. Flexible touch sensitive surface 302, which is deposited over flexible display 306, is capable of receiving inputs from a user. Flexible touch sensitive surface 302, in one embodiment, is substantially transparent thereby the contents displayed by flexible display 306 can be viewed through flexible touch sensitive surface 302. As discussed earlier, flexible touch sensitive surface 302 is divided into multiple regions, wherein each region is configured to represent a specific function. For example, if a displaying image shown behind a region is a symbol of "quit", the current application is terminated if the region showing the "quit" symbol is touched. In an alternative embodiment, flexible touch sensitive surface 302, first flexible actuator layer 304, flexible display 306, second flexible actuator layer 308, and/or flexible circuitry layer 310 are combined and/or integrated into a single flexible touch sensitive display device. Flexible actuator layer 304, in one embodiment, is placed between flexible touch sensitive surface 302 and flexible display 306 for generating haptic feedback. As mentioned earlier, flexible actuator layer 304 can be composed of EAPs, piezoelectric elements, and/or SMA. For example, thin strips of piezoceramic (or piezoelectric), SMA, and/or EAP may be interlaced with flexible display 306 or flexible touch sensitive surface 302 or both for creating haptic sensation. The strips of flexible actuator can either be made in a layer or multiple individual strips. Alternatively, the strips could be placed on the back side of flexible display 306 as flexible actuator layer 308. It should be noted that flexible actuator layer 308 and flexible actuator layer 304 can be substantially the same layer. Alternatively, one of flexible actuator layers 304 and 308 may be required in flexible display device 300. If the strips are anchored at several places on flexible display 306, the strips would create a vibration when they are activated. A single or multiple strips may be used to vibrate entire flexible display 306.

Flexible display 306 can either be a rollable display, a foldable display, or a bendable display. Flexible display 306, also known as an electronic paper, an e-paper, a digital paper, an electronic ink, electronic reusable paper, or a power paper, is capable of displaying images and capable of maintaining the images with limited power consumption. It should be noted that the physical property of flexibility of flexible display 306, flexible touch sensitive surface 302, and flexible circuitry layer 310 are substantially similar thereby they can be folded, rolled, or bent at the substantially same rate.

Flexible circuitry layer 310 includes various processing and computing components as discussed in FIG. 2. In one embodiment, upon receipt of input from flexible touch sensitive surface 302, flexible circuitry 310 receives the input signal via connection 324. Flexible circuitry 310 processes the input information and initiates haptic feedback in response to the input information via connection 320. Flexible display 306 receives image information for displaying from flexible circuitry 310 via connection 322. It should be noted that flexible display device 300 may contain other layers but they are not necessary to understand the present invention.

FIG. 4 illustrates a thin strip of flexible actuator 402 attached to a flexible display 400 in accordance with one embodiment of the present invention. The thin strip of flexible actuator 402 may be a strip of piezoelectric element or a fiber of SMA or EAP. In one embodiment, the fibers are very fine and they are almost invisible. Alternatively, the fibers can be made by the materials almost transparent or clear thereby the image from the flexible display can penetrate the fibers or a fiber layer.

Fiber 402 expands and contracts depending on the voltage applied. In one embodiment, when fiber 402 is activated, the entire screen vibrates. For example, the similar actuator materials can be used to local deform or bend the entire flexible screen. A fiber of SMA, for instance, decreases in length when it is activated. If an SMA fiber 402 is attached to both ends of display 400, fiber 402 can pull both ends of the flexible display 400 together and consequently flexible display 400 bows as shown bent flexible display 404. Depending on the amount of actuation the bowing can be macroscopic or perceived as a vibration.

FIG. 5 illustrates an alternative embodiment of a flexible display device 500 having flexible actuators in accordance with one embodiment of the present invention. Flexible display device 500 includes multiple strips (or fibers) of flexible actuators 510-514, which could be piezoelectric elements, SMA fibers, EAP nanotubes, or a combination of piezoelectric elements, SMA and EAP fibers. Each of multiple fibers 510-514 anchors (or attaches) at a different point of flexible display 504, and consequently, each of multiple fibers 510-514 delivers a unique vibrating function. For example, when fiber 514 shrinks (or contracts) due to the application of voltage, the middle portion of flexible display 504 starts to buckle (or warp). On the other hand, when fiber 512 shrinks, a portion of flexible display 504 buckles and causes various vibrations. The edge of flexible display 504 buckles when fiber 510 is activated. It should be noted that various different patterns of fibers can be anchored to flexible display 504 to achieve different haptic sensation.

Flexible display device 502 illustrates an alternative layout of various fibers to achieve the same or similar haptic sensations or feedback. Various fibers 522 are anchored along the edge of flexible display 506 and the advantage of this layout is to reduce the interference of image displayed in a display window 520. A unique fiber 522 or a combination of fibers 522 may be activated to generate a predefined haptic feedback. It should be noted that other types of layouts are available such as mesh design to achieve specific haptic feedback sensation.

The present invention includes various processing steps, which will be described below. The steps of the present invention may be embodied in machine or computer executable instructions. The instructions can be used to cause a general purpose or special purpose system, which is programmed with the instructions to perform the steps of the present invention. Alternatively, the steps of the present invention may be performed by specific hardware components that contain hard-wired logic for performing the steps, or by any combination of programmed computer components and custom hardware components.

A method of generating force feedback for an input and output ("I/O") device includes: monitoring multiple regions on a first surface of a flexible touch sensitive surface, wherein a second surface of the flexible touch sensitive surface is deposited over a flexible display; detecting a user input on a touched region of said plurality of regions; generating an input signal associated to said touched region and sending said input signal to a processing unit; and generating haptic feedback on said device in response to said input signal. The generating haptic feedback on said device in response to said input signal further includes: generating a partial imaging signal when said flexible display is in a flexible position; initiating a haptic signal in response to said input signal and said partial imaging signal; and providing said haptic signal to an actuator. The monitoring a plurality of regions on a first surface of a flexible touch sensitive surface further includes arranging said plurality of region in accordance with an image displayed by said flexible display and the detecting a user input on a touched region of said plurality of regions further includes receiving a touch by a user.

FIG. 6 is a flowchart illustrating a process of providing a haptic enabled flexible touch sensitive surface deposited over a flexible display in accordance with one embodiment of the present invention. At block 602, a process monitors a plurality of regions on a first surface of a flexible touch sensitive surface. The process arranges the plurality of regions of the flexible touch sensitive surface in accordance with a display window of a flexible display. The process, in one embodiment, determines the flexible position of the flexible display by reading sensors, and subsequently, uses the flexible position to determine an effective touch sensitive surface of the flexible touch sensitive surface. The second surface of said flexible touch sensitive surface is deposited over the flexible display. After block 602, the process moves to the next block.

At block 604, the process detects a user input from a touch or contact of a region on the flexible touch sensitive surface. When a user touches with a finger or stylus or pushes or presses a region of the flexible touch sensitive surface, the process detects a deformation of the region. Alternatively, some touch surfaces detect inputs by measuring capacitance change in response to a touch. An input is identified in response to the touched region and the graphic image displayed behind the touched region. After block 604, the process moves to the next block.

At block 606, the process generates an input signal associated to the touched region, and then sends the input signal to a processing unit. In one embodiment, the process continuously monitors and adjusts the size of the effective flexible touch sensitive surface since the flexible display can change continuously over a period of time. For example, when a flexible display changes from a planar position to a partially rolled up position, the effective display window needs to change accordingly. As such, the effective flexible touch sensitive surface is also adjusted in accordance with the display window. After block 606, the process proceeds to the next block.

At block 608, the process generates haptic feedback on the device in response to the input signal. In one embodiment, the process generates a partial imaging signal when the flexible display is in a flexible position. The process subsequently initiates a haptic signal in response to the input signal and the partial imaging signal. After the haptic signal is generated, the process forwards it to an actuator. In one embodiment, the process sets the flexible position when the flexible display is in a bending position. Alternatively, the process identifies the flexible position when the flexible display is in a rolled-up position. Also, the process identifies the flexible position when the flexible display is in a folding position. The process, in one embodiment, activates at least one strip (or fiber) of SMA to generate force feedback sensation. Alternatively, the process activates at least one fiber of EAP to create force feedback. In yet another embodiment, the process activates at least one strip of piezoelectric materials to create force feedback. After block 608, the process ends."

B. Example Card Device

The example of FIG. 3 illustrates one example embodiment in which a card device includes a flexible display 303 on one side. The card device may have dimensions that are remind a player of a typical playing card. The card device may be of dimensions substantially similar to a typical playing card. For example, in one embodiment, the dimensions may be the same as a typical playing card (e.g., poker cards, bridge cards, etc.). For example, in one embodiment, a card device may be about 2.5 inches wide, and 3.5 inches high. For example, in one embodiment, a card device may be about 2.25 inches wide, and 3.5 inches high. In some embodiments, a card device may have a combined thickness of less than about 0.02 inches. In some embodiments a card device may have a combined thickness of less than about 0.011 inches. It should be recognized that exact dimensions may vary from embodiment to embodiment. The card device may have rounded or pointed edges in various embodiments. In another example, the dimensions may be within millimeters of a typical poker playing card.

The flexible display 303 may include a flexible organic light emitting diode. In some embodiments, such a display may span the width and the height of the card device. In some embodiments, a card device may include a border portion that is not part of the display. In some embodiments, the display may make up a large portion of the width of the card device. In some embodiments, the display may be less than about 0.02 inches thick. In some embodiments, the display may be about 0.01 inches thick such as flexible OLED displays produced by Samsung. The display may be integrated with a substrate to which other circuitry of the card device and/or may be formed on its own substrate that is coupled to the rest of the card device. It should be recognized that the particular display technology, display dimensions, substrate, and/or other details of the display are not limited by the disclosure and may be as desired for a particular embodiment. For example, various forms of electronic paper and/or electronic ink (e.g., electrophoretic displays, cholesteric LCD) may be used in some embodiments. Various electronic paper products have been used in electronic book readers, cell phone displays, and other displays (e.g. Amazon kindle, Motorola FONE F3, etc.). E Ink corporation of Cambridge Mass. manufacturers various forms of electronic paper displays and/or other components that may be used in various embodiments. Readius manufactures some example book reading devices using flexible display technology that may be used in some embodiments.

The card device 301 may include a body portion 305. The body portion may include a substrate to which one or more elements of a card device are coupled (e.g., mounted, housed in, printed on, attached, etc.). The substrate may include a front face, and a back face. The substrate may include four edges. The substrate may be generally rectangular. In some embodiments, a substrate may be made up of multiple substrates. For example, in some embodiments, one substrate may include a substrate to which a display device is coupled, one substrate may include a substrate to which circuitry is coupled, and so on. In some embodiments such multiple substrates may be coupled together to form a single element and may be referred to as a single substrate herein. In some implementations, a first display may be coupled to a front side. In some implementations, a second display may be coupled to the back side. The substrate may be the substrate on which the display is attached, or may be a different substrate. The substrate may include a flexible substrate. The substrate may include a flexible plastic in some embodiments. The substrate may include any other desired material. The circuitry may include flexible circuitry, and/or circuitry coupled to a flexible substrate. Some examples of such circuitry are described in more detail below. The circuitry may make up a large portion of the thickness of the card device. The circuitry may be less than about 0.02 inches thick. The circuitry may be less than 0.01 inches thick. The combined thickness of the circuitry and the display may be less than about 0.02 inches thick. It should be recognized that particular substrates, circuitry, dimensions, and other details of the body portion are not limited by the disclosure and may be as desired for a particular embodiment.

In some embodiments, the substrate may be bendable during operation of one or more displays. In some embodiments, the substrate, display(s), processor, communication element, power element, touch input element may have a combined structure that is flexible substantially similar to a playing card. Unlike traditional electronics that are rigid and therefore unbendable during operation, some embodiments of card devices may include flexible components that may be bendable during their operation.

In some embodiments, the card device may include a second flexible display facing an opposite direct as the display 303. In such an embodiment, the body portion may be positioned between the two displays. In such an embodiment, each side of the card device 301 may act as a respective display device. The second display may be substantially similar to the first display, and/or may have different properties than the first display (e.g., lower resolution, lower refresh rates, different dimensions, etc.).

In some embodiments, the card device may include a coating. The coating may cover some or all elements of the outside of the card device. The coating may be a protective coating. The coating may facilitate a touch sensitivity of the card device. Different coatings may be used on different portions of the card device. For example, a touch sensitive layer/coating may be used on the display portion, and a non-touch sensate coating may be used elsewhere. In some embodiments, a coating may include a solvent based coating such as is used on typical playing cards. In some embodiments, a coating may be used to provide a feel that is similar to a typical playing card. It should be recognized that particular details of a coating are not limited by the disclosure and may be as desired for a particular embodiment.

As illustrated in FIG. 3, the display(s) may display gaming information, such as a card value (e.g., the four of diamonds), a back of a card, and/or other information (e.g., advertising, event information, directions, etc.). Information provided through the display(s) may be controlled by circuitry in the body portion 303 and/or by a remote system. The card device may be controlled or otherwise in communication with a remote system (e.g., a central server system of a casino, etc.) through communication circuitry disposed in the body portion of the card device.

It should be recognized that the described elements of a card device are given as examples only. Other embodiments may include additional elements, fewer elements, combined elements, and so on.

C. Example Components of a Card Device

Figure 4A:
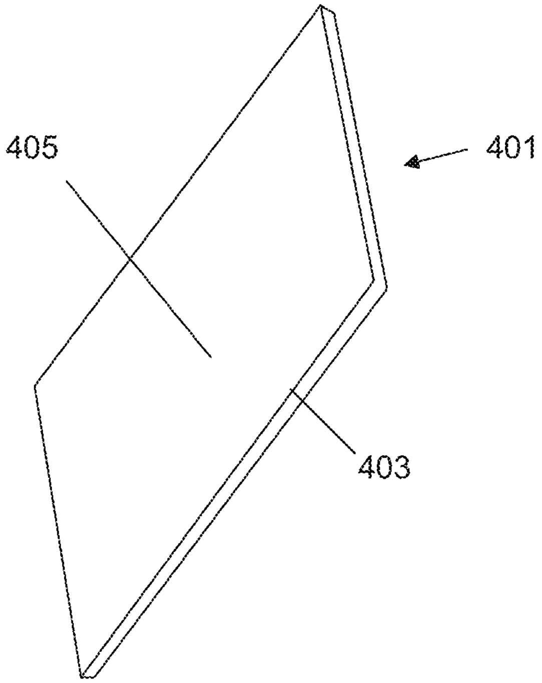
FIGS. 4A, B, and C show an example card device according to some embodiments.
Figure 4B:
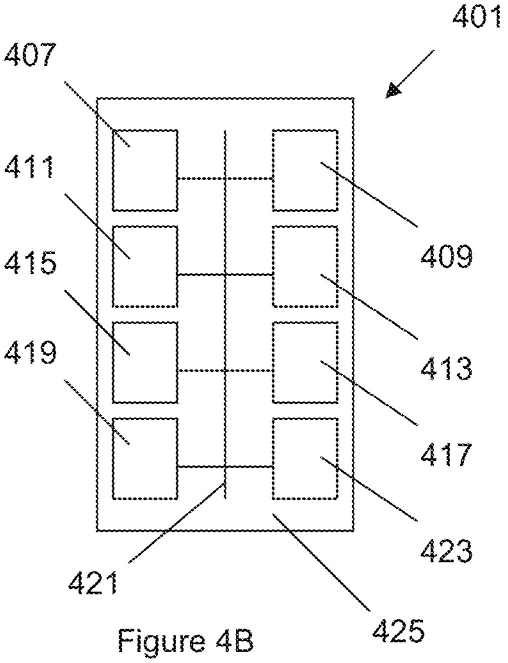
Figure 4C:
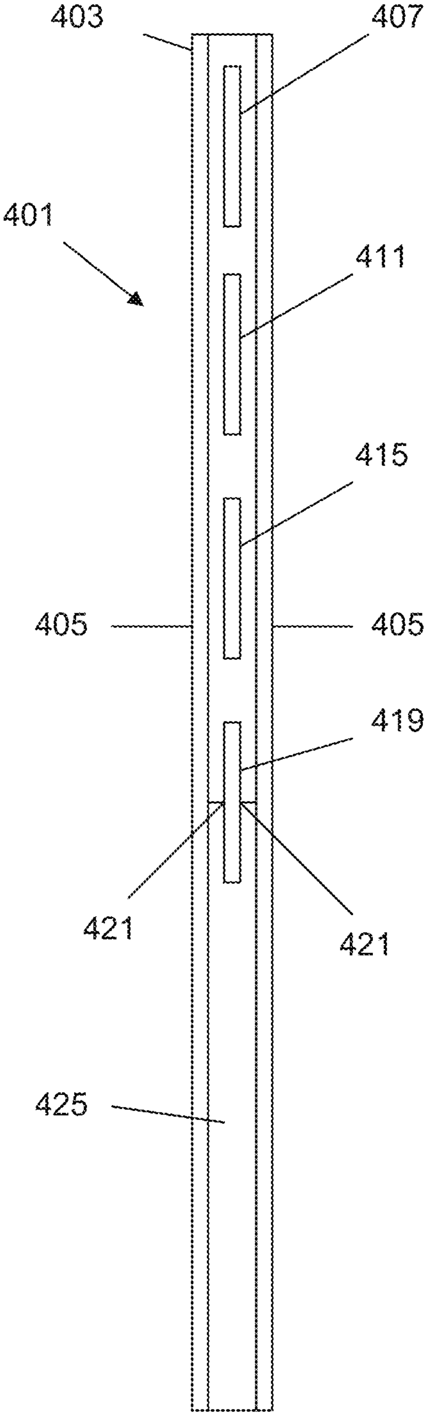

FIGS. 4A, 4B, and 4C illustrate an example card device 401. FIG. 4A illustrates a view of an outside of the card device similar to the view illustrated in FIG. 3. FIG. 4B illustrates a view of a side of card device 401 with internal circuitry visible. FIG. 4C illustrates an edge view of card device 401 with internal circuitry visible.

1. Flexible Circuitry

As is illustrated in FIG. 4B and FIG. 4C, card device 401 may include internal circuitry. Such circuitry may allow control of a display of the card device and/or any other desired functionality. Such circuitry may include flexible electronics and/or flex circuits. Flexible electronics may include wiring, processors, memory, batteries, transmitters, and so on. Some examples of such circuits include circuits screen printed on polyester, traditional circuits mounted on a flexible substrate, ribbons of silicon mounted on a flexible plastic substrate, and/or any other type of circuit. One example resource, which is incorporated herein by reference, discussing such electronics includes D.-H. Kim and J. A. Rogers, "*Stretchable Electronics: Materials Strategies and Devices,*" *Advanced Materials* 20, 4887-4892 (2008).

Another reference regarding the manufacture and use of flexible circuitry includes U.S. patent application Ser. No. 11/756,905 entitled "FLEXIBLE CIRCUIT," which is hereby incorporated herein by reference. It should be recognized that while several examples of flexible circuitry are give, embodiments are not limited to by these examples and/or to flexible circuitry at all. Part of this application recites:

"The present application is directed to a multilayer flexible circuit. The circuit is capable of delivering an electric current. The method comprises providing an electrically insulating layer. The electrically insulating layer is bonded to a conductive layer. The layers may be bonded by a permanent bond or may be removable from each other. The connection may be made by a number of methods. In some embodiments, the connection is made by a mechanical process. That is, the bond is formed between two separate layers, and the conductive layer is not chemically deposited onto the electrically insulating layer. For example, a lamination process or joining the electrically insulating layer and the conductive layer together with an adhesive. FIG. 1 illustrates an embodiment of the present method. In FIG. 1, the process 10 comprises an electrically insulating layer 12. The insulating layer 12 is then bonded with a conductive layer 14. The method of the present application is performed at a sustained rate. A sustained rate, for the purpose of the present application, is defined that a section of the circuit (MINIMUM LENGTH??), during any phase in manufacture, is moving at a constant speed. For example, at each step in the method, the electrically insulating layer and the conductive layer move at the same rate as the resulting multilayer circuit containing those sections of electrically insulating layer and conductive layer.

In some embodiments, the electrically insulating layer is perforated prior to connecting the layer with the conductive layer. The perforations form apertures in the electrically insulating layer. The apertures may be arranged on the electrically insulating layer in an orderly pattern or in a random pattern. Subsequent layers on the multilayer circuit are then registered with the apertures on the electrically conductive layer. For the purpose of the present application, an item is in registry with another item when is has the correct alignment or positioning with respect to the other item.

An electrically insulating layer is non-conductive. The electrically insulating layer is generally a flexible substrate. In certain embodiments, the electrically insulating layer is also thermally insulating. In other embodiments, the electrically insulating layer is thermally conductive. In some embodiments, the flexible substrate is a polymer film, for example a light enhancement film.

The conductive layer is generally a self supporting layer, and may be formed from any material that is conductive. Generally, the conductive layer is formed from a material that is can be prepared into a sheet.

The conductive layer may be continuous or discontinuous. In embodiments where the conductive layer is discontinuous, the circuit is broken at the point the conductive layer is disrupted. The conductive layer may be a full sheet or in a pattern. Examples of suitable patterns include a grid pattern, a series string pattern, series/parallel pattern, a series of parallel patterns, a parallel array of strings, or combinations thereof.

The adhesive used in the present invention may be any adhesive suitable to connect the electrically insulating layer to the conductive layer. In some embodiments, the adhesive is a pressure sensitive adhesive. In some embodiments, the adhesive is a heat processed adhesive, for example a hot melt adhesive.

In many embodiments, the multilayer circuit comprises a second electrically insulating layer and a second conductive layer. FIG. 1 shows the second electrically insulating layer 16 and the second conductive layer 18. Additionally, the method may comprise a bottom film 19 covering the multilayer circuit. The bottom film may be an additional electrically insulating layer or a separate polymer film, or a combination of both.

FIG. 2 illustrates an embodiment of a multilayer circuit resulting from the process of the present application. A first conductive layer 42 may consist of a metal foil, such as a copper foil or other suitable conductor fashionable as a sheet or layer. Disposed on the first conductor layer 42 is a first electrical insulating or non-conductive layer 44. In some embodiments, another electrical insulating or non-conducting layer can be disposed beneath the first conductive layer 42, sandwiching the conductive layer 42 between the two non-conductive layers. The first electrical insulator layer 44 includes one or more apertures 46 through the layer. The first electrical insulator layer 44 may consist of any known electrical insulator or dielectric capable of being fashioned as a sheet or layer, or a light reflective layer, as described above. Additionally, layer 44 may include an adhesive on one or both sides for adhering layer 44 to adjoining layers such as first conductive layer 42.

In the embodiment shown in FIG. 2, device 40 further includes a second conductive layer 48 disposed on the upper surface of first electrical insulating layer 44. Additional, multiple layers may be added within the scope of the present application. Second conductive layer 48 includes one or more apertures 50 through the layer and may consist of a metal foil, such as a copper foil or other suitable conductor fashionable as a sheet or layer. Apertures 50 and 46 are configured to align or be in register with each other. Finally, device 40 includes film layer 52. Film layer 52 may consist of a reflective material or have some other light manipulative property, as the light reflective films described above. Layer 52 includes one or more pairs of apertures 54, each pair 54 having first 56 and second 58 apertures. First aperture 56 aligns with or is in register with holes 46 and 50 in the first conductive layer 44 and the second conductive layer 50, respectively. FIG. 2 shows this alignment with vertical dashed line. Thus, an illumination source having at least two terminals, such as an LED with anode and cathode terminals, disposed on the upper surface of layer 52 may make electrical contact with first conductive layer 42 through apertures 56, 50, and 46. The other terminal of the light illumination source can be in electrical communication with the second conductive layer 48 through apertures 58. In some embodiments, layer 52 includes a single large aperture that replaces each pair 54 of first 56 and second 58 apertures.

Device 40 also includes one or more light or illumination sources 60, which may be one or more light emitting diodes (LEDs) having two contacts (i.e., an anode and cathode), but are not limited to such. Examples of LEDs that may be used include LEDs of various colors such as white, red, orange, amber, yellow, green, blue, purple, or any other color of LEDs known in the art. The LEDs may also be of types that emit multiple colors dependent on whether forward or reverse biased, or of types that emit infrared or ultraviolet light. Furthermore, the LEDs may include various types of packaged LEDs or bare LED die, as well as monolithic circuit board type devices or a configuration using circuit leads or wires.

It is noted that either the upper surface of second conductor layer 48 or the bottom surface of the optical film layer 52 may include an adhesive to affix layers 48 and 52 together. Additionally, the layers of assembled device 40 are laminated together to achieve a unitary construction.

FIG. 3 illustrates an exploded cross section of the device of FIG. 2 through section line 3-3 extending the entire vertical cross section distance of device 40. As illustrated, a portion 62 of an illumination source 60 is positioned over aligned apertures 56, 50, and 46 to allow electrical communication between portion 62 and the first conductor layer 42. Another portion 64 of the illumination devices 60 is positioned over aperture 58, affording electrical communication between portion 64 and second conductive layer 48. Accordingly, a source of power, such as a voltage source 66, may then be connected across the first and second conductor layers 42 and 48, as illustrated, to supply power to drive the illumination source 60.

As noted above, in some embodiments, the light source is a compact light emitting diode (LED). In this regard, "LED" refers to a diode that emits light, whether visible, ultraviolet, or infrared. It includes incoherent encased or encapsulated semiconductor devices marketed as "LED", whether of the conventional or super radiant variety. If the LED emits non-visible light such as ultraviolet light, and in some cases where it emits visible light, it is packaged to include a phosphor (or it may illuminate a remotely disposed phosphor) to convert short wavelength light to longer wavelength visible light, in some cases yielding a device that emits white light. An "LED die" is an LED in its most basic form, i.e., in the form of an individual component or chip made by semiconductor processing procedures. The component or chip can include electrical contacts suitable for application of power to energize the device. The individual layers and other functional elements of the component or chip are typically formed on the wafer scale, and the finished wafer can then be diced into individual piece parts to yield a multiplicity of LED dies. More discussion of packaged LEDs, including forward-emitting and side-emitting LEDs, is provided herein.

If desired, other light sources such as linear cold cathode fluorescent lamps (CCFLs) or hot cathode fluorescent lamps (HCFLs) can be used instead of or in addition to discrete LED sources as illumination sources for the disclosed backlights. In addition, hybrid systems such as, for example, (CCFL/LED), including cool white and warm white, CCFL/HCFL, such as those that emit different spectra, may be used. The combinations of light emitters may vary widely, and include LEDs and CCFLs, and pluralities such as, for example, multiple CCFLs, multiple CCFLs of different colors, and LEDs and CCFLs. In some embodiments, the light source includes light sources capable of producing light having different peak wavelengths or colors (e.g., an array of red, green, and blue LEDs). In some embodiments, a transparent film, or other light controlling film, is bonded to the multilayer circuit over the electronic component of light source. This transparent film then protects the light source from external damage. In other embodiments, a translucent film is bonded to the multilayer circuit over the electronic component of light source. This translucent film then protects the light source from external damage and diffuses the light that is emitted to improve uniformity of the light.

The method disclosed in the present application may be run in a continuous process. That is, the length of the multilayer circuit is limited only by the length of the feed film for the layers. The method may also be set for a roll to roll continuous process. Such a method may run at speeds in excess of 300 feet per minute.

In additional embodiments, the multilayer circuit is cut from its roll form to form smaller circuits."

As mentioned above, circuitry of card device 401 may include a flexible battery. In some embodiments, a flexible battery may include paper infused with carbon nanotubes, redox active organic polymer film, polymer matrix electrolyte separator, and/or any other elements. One example flexible circuit that includes a flexible battery is described in U.S. patent application Ser. No. 10/789,108 entitled "FLEXIBLE CIRCUIT HAVING AN INTEGRALLY FORMED BATTERY," which is hereby incorporated herein by reference. Part of this application recites:

"FIG. 1 illustrates one possible embodiment of a circuit 100 having a battery as an integral part of a circuit board. In FIG. 1, the circuit 100 includes a circuit board 105, such as a flexible circuit board, formed by one or more layers 106a-c, each layer having associated surfaces (e.g., surface 110). The layers are formed by any appropriate fabrication process. The circuit 100 includes one or more surface-mounted components 115, 120, 125, 130, 135, 140, 145, 150, 155 populating, for example, one surface 110 of the circuit 100. However, the embodiment is not limited to populating only one surface and components can be positioned on other surfaces associated with each layer 106a-c. Additionally, the surface mounted components 115, 120, 125, 130, 135, 140, 145, 150, 155 illustrate only one exemplary embodiment. The circuit 100 can include any combination or type of electrical component, microstrip or conductor. Conductive paths or traces 160 can be formed on the external surface 110 or on one or more of the internal surfaces or the multiple layers 106a-c that form the circuit 100.

During a fabrication process, a battery 165, such as a flexible thin-film battery 165, can be positioned on the circuit board 105. The battery 165 can be positioned by embedding the battery in one or more layers of the circuit board 105, by forming the battery 165 on a surface of the circuit board 105, or by sandwiching the battery between any two layers 106a-c of the circuit board 105. One advantage of positioning a battery 165 as an integral part of a circuit board 105 is that more surface area on the circuit board 105 is available to mount components. Additionally, area required by a target device to house the circuit board 105 is reduced. For example, in one embodiment, a battery 165 is only 6 microns thick and has a surface area of 0.5 to 10 cm.sup.2. Hence, a reduction in the dimensions of battery 165 helps reduce the overall size of the circuit board 105 incorporating that battery. However, this embodiment is not limited to these dimensions and the thickness and overall area dimensions can be larger or smaller.

The battery 165 can include at least two terminals. The first terminal can be an anode current collector 166 and the second terminal can be a cathode current collector 167. The anode current collector 166 and the cathode current collector 167 can be electrically connected to, for example, component 115, 120, 125, 130, 135, 140, 145, 150, 155 by through-holes or vias 175, 185. The anode current collector 166 and the cathode current collector 167 can also can be electrically connected to components positioned in other layers 106a-c of the circuit board 105. The anode current collector 166 and the cathode current collector 167 can be connected to vias 185, 175, respectively, by conductive paths 180, 170, respectively, formed in or on a same layer as the anode current collector 166 and cathode current collector 167.

An advantage to having the battery 165 positioned in the flexible circuit board 105 is to allow more surface area for the population of components 115, 120, 125, 130, 135, 140, 145, 150, 155. Further, the battery 165 being positioned in the flexible circuit board 105 allows the overall circuit 100 to become thinner and therefore taking up less space in a target device.

FIG. 2 illustrates one possible embodiment of a battery 200. The battery 200 illustrated in FIG. 2 includes at least two contacts or current collectors, an anode current collector 166 and a cathode current collector 167. The anode current collector 166 is connected to an anode layer 210. The cathode current collector 167 is connected to a cathode layer 215. An electrolyte layer 220 is positioned between the anode layer 210 and the cathode layer 215 to insulate the anode layer 210 from the cathode layer 215.

The battery 200 can be, for example, a rechargeable flexible thin-film battery. However, the embodiment is not limited to flexible thin-film batteries and any suitable composition can be used. For example, in one embodiment, the composition and location of the battery 200 is such that the battery 200 can be recharged using solar energy, inductive coupling, or recharged by any other suitable means. Also, the battery 200 can be customized in any physical size 230 and energy capacity required by the circuit 100 or a system. In one possible embodiment, the battery 200 has a thickness in a range of approximately 5 to 25 microns. One advantage of using the battery 200 having these dimensions is that the battery 200 uses only a small amount of area on the circuit board 105 allowing the circuit board 105 to be smaller and thus can be positioned in locations having limited space.

The battery 200 can be fabricated as a standalone battery-source on a flexible or rigid substrate, fabricated on the circuit or device that it is intended to power, such as on a housing for an integrated circuit, or on the surface of a printed circuit board. The combination of the battery 200 and circuit board 105 can be used in for any number of different applications. For example, the battery 200 and flexible circuit board 105 can be used for portable computing and telephony devices, for storing electricity produced by photovoltaic solar panels, and in integrated circuit packages, and any application in which the circuit may flex or otherwise bend. Moreover, the battery 200 is designed to satisfy applications such as non-volatile SRAMs, real-time clocks, supply supervisors, active RFID tags, and nanotechnology devices, wherein a small, localized, low energy power source is required.

FIG. 3 illustrates a cross-sectional view of a battery 300 substantially similar to that shown in FIG. 2. The battery 300 can be fabricated to have any shape provided that an electrolyte 310 completely isolates a cathode 320 from an anode 330. However, any acceptable fabrication process can be used. An anode current collector 166 and a cathode current collector 167 provides electrical connectivity to conductive paths or other devices. The anode and cathode current collectors 166, 167 can be in a same plane as illustrated in FIG. 3 or in different planes as illustrated in FIG. 2. In one possible embodiment, protective coating 360 can be deposited to cover and protect the battery 300, but as to leave a portion of the battery current collectors 166, 167 exposed to provide electrical conductivity and a conductive path.

In one embodiment, the anode 330 is a lithium or lithium-ion anode. The cathode 320 is a mixture of carbon, polyvinyl chloride (PVC), and silver tungstate. The tungstate acts as the lithium acceptor, the carbon provides the electrical conductivity, and the PVC binds everything together. This anode 330 and cathode 320 can then sandwich a polymer electrolyte 310 to produce a complete battery 300. However, the embodiment is not limited to this composition of materials and any suitable composition of material can be used to fabricate the anode 330, cathode 320 and electrolyte 310.

The structure or stacking of the battery components 310, 320, 330 can be accomplished by any acceptable means, such as lamination, sputtering, vacuum deposition, or photolithography using standard techniques. The battery 300 can be fabricated on virtually any solid or resilient substrate such as silicon, alumina, glass, metals, and plastics. However, the substrate is not limited to these materials.

Performance characteristics of the battery 300 are determined by at least the type of anode and cathode material, area and thickness of the material, and by operating temperature. For example, applications requiring high discharge rates can use a crystalline LiCoO.sub.2 for the cathode 320 while for low rate applications, or those requiring ambient temperature battery fabrication, amorphous LiMn.sub.2O.sub.4 can be used for the cathode 320. Similarly, anode materials such as CoO and Li.sub.4Ti.sub.5O.sub.12 are used to obtain a high discharge capacity. However, the embodiment is not limited to the above materials, for example, inorganic anode materials can also be used to form the anode 330.

Various applications of the above-mentioned batteries 200, 300 positioned in various circuit board structures will be show with reference to the following embodiments illustrated in FIGS. 4-6.

FIG. 4A is a top view of a single battery positioned as an integral part of a circuit 400A. In the top view, a single battery 410 can be positioned on any layer of a circuit board 415. In one possible embodiment, the battery 410, such as a battery substantially similar to FIG. 3, is positioned on an external surface 420 of the circuit board 415. In another possible embodiment, the battery 410 can be positioned in one or more internal layer of the circuit board 415 as illustrated in the following diagrams.

In one embodiment, components 450, 460, 465 are mounted on the external surface 420 of circuit board 415. In another possible embodiment, the components 450, 460, 465 are mounted or embedded in various layers of the circuit board 415. The components 450, 460, 465 are connected to a cathode current collector 440 and an anode current collector 435 of battery 410 by conductive paths 445, 446, respectively. When components 450, 460, 465 are mounted on the external surface 420 of circuit board 415, and the battery 410 is embedded in an internal layer of circuit board 415, vias 425, 430 provide an electrical path between the anode and cathode current collectors 435, 440 and the conductive paths 446, 445, respectively. However, the above embodiments are not limited to the above path configuration, for example, vias can be formed where necessary to provide conductive paths between anode and cathode current collectors 435, 440 and the conductive paths 446, 445.

FIG. 4B is a cross-sectional view of the circuit illustrated in FIG. 4A. The circuit 400B as shown in FIG. 4B can be fabricated by any acceptable means, such as by lamination or DC magnetron sputter deposition in a presence of an applied magnetic field. An insulating layer 462 formed by one or more layers of an insulating material, such as a polyimide material, is deposited by any acceptable means, such as being sputter deposited or laminated on a substrate 464. The polyimide material may be, for example, ESPANEX or DUPONT KAPTON® brand polyimide. The substrate 464 can be a flexible substrate formed using a semiconductor material or fiberglass material such as ROGERS 4003 brand fiberglass. However, the embodiment is not limited to the above materials or process for forming the insulating layer 462 or the substrate 464.

A conductive layer 466, such as a copper (Cu) layer, is deposited onto the insulating layer 462. The conductive layer 466 can be used to form conductive paths on the surface of the insulating layer 462. The conductive layer 466 provides electrical connectivity between, for example, the anode current collector 435 and/or the cathode current collector 440 of battery 410 and other components on the exterior surface or embedded within the circuit board 415. Next, the battery 410 is positioned on or embedded in the conductive layer 466 in a variety of ways.

In one possible embodiment, the battery 410 is embedded in the conductive layer 466 by removing a portion of the conductive layer 466 large enough to accommodate the battery 410. The portion of the conductive layer 466 is removed by any acceptable means, such as etching or photolithographic techniques. The battery 410 can be formed in the removed portion by any acceptable means, such as lamination, sputter deposition or photolithographic techniques. In another possible embodiment, the battery 410 can be preformed before being embedded in the removed portion of the conductive layer 466. In another possible embodiment, the battery 410 can be formed on the conductive layer 466 by any acceptable means, such as by lamination, sputter deposition or photolithographic techniques. The battery 410 can also be preformed before being positioned on the conductive layer 466.

A second insulating layer 468 formed by one or more layers of an insulating material, such as a polyimide, is deposited over the conductive layer 466 and the battery 410. Vias 425, 430 are formed in the second insulating layer 468 by any acceptable means, such as ion etching or photolithographic techniques. The vias 425, 430 provide electrical connectivity between a conductive path 446, 445, respectively, and the anode and the cathode current collectors 435, 440, respectively, on the battery 410.

Conductive paths 445, 446 are formed on the second insulating layer 468. In one embodiment, conductive paths 445, 446 are formed by depositing or laminating a second conductive layer on the second insulating layer 468 and etching the conductive paths 445, 446 from the second conductive layer. However, other processes such as photolithography can be used to form conductive paths 445, 446 and any number of additional conductive paths. The conductive paths 445, 446 electrically connect components 450, 460, 465 with the anode current collector 435 and the cathode current collector 440 of battery 410. Also, multiple insulating and conductive layers may be formed throughout the fabrication process as desired, each of the insulating and conductive layers being able to incorporate a battery as described above.

In one possible embodiment of the circuit 400B in FIGS. 4A-B, the material and number of layers used to form the substrate 464, first insulating layer 462, conductive layer 466, second insulating layer 468, second conductive layer 445, and battery 410 allow a flexing of the circuit board 415 for providing a bend radius of approximately 0.5 mm. However, this embodiment is not limited to the number of layers in, for example, FIG. 400B, and fewer or more layers can be removed or added allowing greater or lesser flexibility, respectively, in the circuit board 415.

One advantage of a flexible circuit board 415 is its ability to be folded into a smaller space, or to round a corner. Another advantage is that the flexible circuit board 415 tends to be thinner than conventional printed circuit boards, e.g., 0.02 inches for the flexible circuit board 415 vs. 0.10 inches a standard circuit board. Hence, the thinner flexible circuit board 415 provides more design options for a designer.

In another embodiment, the substrate 464, first insulating layer 462, conductive layer 466, second insulating layer 468, second conductive layer 445 and battery 410 are each formed by combining one or more thinner layers by any acceptable means. For example, laminating together several thinner layers of a conductive material forms the single conductive layer 466. Each one or more layers can be formed to any desired thickness. The addition or subtraction of one or more layers allows the circuit board 415 to flex to a desired degree. In one embodiment, the circuit board 415 is able to flex to a bend radius of approximately 0.5 mm. However, this embodiment is not limited to the number of layers in the one or more layers of circuit board 415, and fewer or more layers can be removed or added allowing greater or lesser flexibility, respectively, in the circuit board 415.

The flexibility of the circuit board 415 allows the circuit to be positioned in various types of devices that flex due to any number of conditions. For example, the circuit board 415 can be placed in a medical device that is implanted in a human body, wherein the location of implantation induces substantial flexing of the circuit board 415. In another embodiment, the circuit board 415 can be placed in a mechanical device. The location where the circuit board 415 is positioned in such a device may be subjected to substantial flexing.

FIG. 4C is a cross-sectional view of an alternate embodiment of a circuit board having an embedded battery. In one possible embodiment of the circuit 400C, a battery 411 which is substantially similar to the battery illustrated in FIGS. 4A, 4B or FIG. 2 is fabricated on conductive layer 466. In FIG. 4C, the conductive layer 466 is formed as an internal layer of the circuit board 415. The battery 411 has a cathode current collector 470 contacting the conductive layer 466. The conductive layer 466 also forms conductive paths for connecting, for example, the cathode current collector 470 with internal or external components (not shown). The battery 411 also has an anode current collector 440 in electrical contact with via 430. However, the embodiment is not limited to an anode current collector 440 or cathode current collector 470 being positioned as discussed above, and the anode and cathode current collectors 440, 470 can be positioned or formed in any acceptable location.

A third insulating layer 475 can be formed by any acceptable means between the conductive layer 466 and the battery 411. The third insulating layer 475 prevents shorting between the battery 411 and the conductive layer 466 while allowing electrical contact between the cathode current collector 470 and the conductive layer 466.

FIG. 4D is another cross-sectional view of an alternate embodiment of a circuit board having an embedded battery. The circuit 400D as shown in FIG. 4D is fabricated by any acceptable means. In one embodiment, an insulating layer 462, such as a polyimide, is deposited by any acceptable means, such as being laminated or sputter deposited on a substrate 464. The substrate 464 is a flexible substrate formed by a semiconductor material or a fiberglass material. However, the embodiment is not limited to the above materials or process for forming the insulating layer 462 or the substrate 464.

A battery 410 is positioned on the insulating layer 462. The battery 410 can be preformed or formed by any acceptable means, such as lamination, sputter deposition or photolithographic techniques as discussed above. A second insulating layer 468, such as a polyimide, is deposited over the insulating layer 462 and the battery 410. Both vias 425, 430 (FIG. 4A) are formed in the second insulating layer 468 by any acceptable means, such as ion etching or photolithographic techniques. The vias 425, 430 provide electrical connectivity between the anode and the cathode current collectors 435, 440 (FIG. 4A) on the battery 410 and various components, such as component 450 mounted on the external surface 420 or any other layer of the circuit board 400D. However, the embodiment is not limited to the number of insulating 462, 468 layers, and any number of insulating layers may be formed throughout the fabrication process as desired, each of the insulating layers being able to incorporate any number batteries.

FIG. 5A is a top view illustrating multiple batteries positioned as an integral part of a single layer of a circuit board. In the top view of circuit 500A, multiple batteries 510, 520 are positioned on or embedded in any layer of the circuit board 530 as discussed above. In one possible embodiment, the batteries 510, 520 are positioned on an external surface 540 of the circuit board 530 and/or on one or more internal layers of circuit board 530. Vias or through-holes 542, 546 are formed to electrically connect anode current collectors 550, 554, respectively, of the batteries 510, 520, respectively, to conductive paths formed on the external surface 540 and/or in internal layer of the circuit board 530. Similarly, vias 544, 548 are formed to electrically connect cathode current collectors 552, 556, respectively, of the batteries 510, 520, respectively, to conductive paths formed on the external surface 540 and/or in internal layer of the circuit board 530. In FIG. 5A, vias 546, 544 electrically connect the anode current collector 554 of battery 520 and cathode current collectors 552 of battery 510, respectively, to a conductive path 558 formed at one or more internal layers of the circuit board 530. However, vias 542, 548 are also used to establish connectivity of anode current collector 550 and cathode current collector 556, respectively, with various components (not shown). For example, surface mounted components (not shown) or components embedded in various layers of circuit board 530 (not shown) can be electrically connected to the vias 542, 544, 546, 548.

FIG. 5B is a cross-sectional view of the circuit illustrated in FIG. 5A. As discussed above, the circuit 500B as shown in FIG. 5B can be fabricated by any acceptable means, such as lamination, DC magnetron sputter deposition in a presence of an applied magnetic field. An insulating layer 562, such as a polyimide, is deposited by any acceptable means, such as being laminated or sputter deposited on a substrate 564. However, the embodiment is not limited to the above materials and processes for forming the insulating layer 562 and the substrate 564.

A conductive layer 566, such as a copper (Cu) layer, is deposited onto the insulating layer 562. The conductive layer 566 is used to form conductive paths on the surface of an insulating layer 562. Next, batteries 510, 520 are positioned on or embedded in the conductive layer 566 in a variety of ways as discussed above. For example, in one possible embodiment the anode current collector 554 is electrically connected to the cathode current collector 552 by a conductive path 558 creating multiple batteries connected in series. However, the embodiment is not limited to this configuration, and other connective paths are possible.

A second insulating layer 568 is formed over the conductive layer 566 and the batteries 510, 520. Vias 542, 544, 546, 548 are formed in the second insulating layer 568 by any acceptable means, such as ion etching or photolithographic techniques. In FIG. 5B, the vias 542, 546 provide electrical connectivity between conductive paths (not shown) formed on the external surface 540 of circuit board 530 and the anode current collectors 550, 554, respectively, of the batteries 510, 520, respectively. Similarly, the vias 544, 548 provide electrical connectivity between conductive paths (not shown) on the external surface 540 of circuit board 530, and the cathode current collectors 552, 556, respectively, of the batteries 510, 520, respectively. At least a second conductive layer can be formed on the surface 570 of the second insulating layer 568 to forms additional conductive paths. However, the embodiment is not limited to the number of insulating 568 and conductive 566 layers, and any number of insulating and conductive layers may be formed throughout the fabrication process as desired, each of the insulating and conductive layers being able to incorporate any number batteries.

FIG. 6A illustrates a top view of multiple batteries positioned in multiple layers of a circuit 600A. In the top view, multiple batteries 610, 620, 630 are each positioned on a separate layer of the circuit board 630. One or more batteries 610, 620, 630 can be positioned on or embedded in an external surface 631 of the circuit board 630 or on one or more internal layers of the circuit board 630. Vias or through-holes 632, 638, 642 are formed to electrically connect anodes current collectors 646, 650, 654, respectively, of the batteries 610, 620, 630, respectively, to conductive paths formed on the external surface 631 or conductive paths formed at one or more internal layers or circuit board 630. Similarly, vias or through-holes 634, 636, 640 are formed to electrically connect cathodes 648 (FIG. 6B), 652, 658, respectively, of the batteries 610, 620, 630, respectively, to conductive paths formed on the external surface 631 or conductive paths formed at one or more internal layers of the circuit board 630. Surface mounted components (not shown) or components embedded in various layers of circuit board 630 (not shown) can be connected to the vias 632, 634, 636, 638, 640, 642. However, the embodiment is not limited to the number of insulating and conductive layers, and any number of insulating and conductive layers may be formed throughout the fabrication process as desired, each of the insulating and conductive layers being able to incorporate any number batteries.

FIG. 6B is a cross-sectional view of the circuit illustrated in FIG. 6A. In the circuit 600B of FIG. 6B, a substrate 659 supports multiple insulator/conductive layers 660/665, 670/675, 680/685, wherein at least one battery 610, 620, 630 is positioned on a respective conductive layer. The batteries 610, 620, 630 are positioned on their respective conductive layer 665, 675, 685 in a variety of ways as discussed above.

At least one additional insulator/conductive layer 690/695 can be formed. Vias or through-holes 632, 634, 636, 638, 640, 642 are then formed. The vias 632, 638, 642 connect the external surface 631 or any conductive layer 665, 675, 685, respectively, with any anode current collector 646, 650, 654, respectively, of the batteries 610, 620, 630 formed on or embedded in one or more layers of the circuit board 630. Similarly, vias 634, 636, 640 connect the external surface 631 or any conductive layer 665, 675, 685 with any cathode 648, 652, 658 current collector, respectively, of the batteries 610, 620, 630, respectively, formed at one or more layers of the circuit board 630. Accordingly, the vias can connect multiple anodes 646, 650, 654 and/or multiple cathodes 648, 652, 658 or any combination thereof. For example, the anodes current collectors 646, 650, 654 and cathodes current collectors 648, 652, 658 can be connected as to create multiple batteries connected in series. However, the embodiment is not limited to this configuration, for example, a parallel configuration can also be formed. FIG. 7 is a flow chart 700 illustrating the formation of one embodiment of a battery enabled flexible circuit. In the formation of a battery enabled flexible circuit, a first insulating layer is formed. The first insulating layer is formed on a substrate such as any suitable semiconductor material or fiberglass material 710.

At least one battery is positioned on the first insulating layer. The battery has at least first and second terminals 720. However the embodiment is not limited to at least one battery having only a first and second terminal and additional terminals can be formed as required. A second insulating layer is then formed on the first insulating layer and the battery. However the embodiment is not limited to only a second insulating layer and multiple insulating/conducting layers can be formed. The first and second insulating layer form a flexible circuit board 730. Vias are formed through the second insulating layer to connect an anode and a cathode of the battery positioned to components mounted on an external surface of the circuit board, or to components embedded within one or more internal layers of the circuit board."

Some examples of flexible battery technology are described in U.S. patent application Ser. No. 10/566,788 entitled "Silicone based dielectric coatings and films for photovoltaic applications," U.S. patent application Ser. No. 11/578,045 entitled "Thread-Type Flexible Battery," U.S. patent application Ser. No. 11/938,414 entitled "PRINTED BATTERY," and U.S. patent application Ser. No. 11/355,584 entitled "Lithium-based active materials and preparation thereof," which are all hereby incorporated herein by reference.

U.S. patent application Ser. No. 11/938,414 recites, in part:

"Referring to the drawings, wherein like numerals indicate like elements, there is shown in FIG. 1 a first embodiment of the printed battery 10. Printed battery 10 includes a flexible substrate 12. A first conductive layer 14 is printed on substrate 12. A first electrode layer 16 is then printed on first conductive layer 14. A second electrode layer 18 is then printed on the first electrode layer. Finally, a second conductive layer 20 is printed on the second electrode layer 18.

In FIG. 2, a second embodiment of the printed battery 30 is illustrated. Printed battery 30 is substantially the same as printed battery 10 except that a separator/electrolyte layer 32 has been printed between the first electrode layer 16 and the second electrode layer 18. In the printed battery, the current collectors or conductive layers 14, 20, the first and second electrode layers 16, 18, and the separator/electrolyte layer 32 are each printed onto the flexible substrate 12. Printing is a process of transferring with machinery an ink to a surface. Printing processes include screen-printing, stenciling, pad printing, offset printing, jet printing, block printing, engraved roll printing, flat screen-printing, rotary screen-printing, and heat transfer type printing.

Printing inks are a viscous to semi-solid suspension of finely divided particles. The suspension may be in a drying oil or a volatile solvent. The inks are dried in any conventional manner, e.g., catalyzed, forced air or forced hot air. Drying oils include, but are not limited to: linseed oil, alkyd, phenol-formaldehyde, and other synthetic resins and hydrocarbon emulsions. Suitable inks may have an acrylic base, an alkyd base, alginate base, latex base, or polyurethane base. The acrylic based inks are preferred. In these inks, the active material (finely divided particles discussed below) and the ink base are mixed. For example, in the conductive layers, an electrically conductive carbon and the ink base are mixed. Preferably, the conductive carbon comprises at least 60% by weight of the ink, and most preferably, at least 75%. Preferred carbons have particle sizes less than or equal to 0.1 micron.

The battery chemistry used is not limited. Exemplary chemistries include, but are not limited to: Leclanche (zinc-anode, manganese dioxide-cathode), Magnesium (Mg-anode, MnO.sub.2-cathode) Alkaline MnO.sub.2 (Zn-anode, MnO.sub.2-cathode), Mercury (Zn-anode, HgO-cathode), Mercad (Cd-anode, Ag.sub.2O-cathode), and Li/MnO.sub.2 (Li-anode, MnO.sub.2-cathode). Particles of the anode material are mixed into the ink base. The anode active materials are preferably selected from the group consisting of zinc, magnesium, cadmium, and lithium. The anode particles comprise at least 80% by weight of the ink; preferably, at least 90%; and most preferred, at least 95%. The anode particle sizes are, preferably, less than or equal to 0.5 micron. Particles of the cathode material are mixed into the ink base. The cathode active materials are preferably selected from the group consisting of manganese dioxide, mercury oxide, silver oxide and other electroactive oxides. The cathode particles comprise at least 80% by weight of the ink base; preferably, at least 90%; and most preferred, at least 95%. The cathode particle sizes are, preferably, less than or equal to 0.5 micron.

A separator may be interposed between the electrodes. The separator is used to facilitate ion conduction between the anode and the cathode and to separate the anode form the cathode. The separator includes electrolyte salts and a matrix material. The electrolyte salts are dictated by the choice of battery chemistry, as is well known. The matrix material must not unduly hinder ion conduction between the electrodes. The matrix material may be porous or thinly printed. The matrix material include, for example, highly filled aqueous acrylics, polyvinylidene fluoride (PVDF), PVDF copolymers (e.g., PVDF:HFP), polyacrylonitrile (PAN), and PAN copolymers. The preferred matrix material is the highly filled aqueous acrylics (such as calcium sulfate or calcium carbonate), which are inherently porous due to discontinuities in the polymer coating/film upon drying. The filler preferably comprises at least 80% by weight of the layer. The filler preferably has particle sizes less than or equal to 0.5 microns.

The flexible backing sheet may be any permeable or impermeable substance and may be selected from the group consisting of paper, polyester, polycarbonate, polyamide, polyimide, polyetherketone, polyetheretherketone, polyethersulfone, polyphenolynesulfide, polyolefins (e.g., polyethylene and polypropylene), polystyrene, polyvinylidine chloride, and cellulose and its derivatives.

The instant invention will be better understood with reference to the following example.

Example

A 2 cm.times.2 cm cell was printed using a 2 cm.times.2 cm faced, smooth rubber pad into a sheet of standard office bond paper and a sheet of polyester film (each having an approximate thickness of about 0.07-0.08 mm). The impact of printing stock were negligible on cell performance, but were noticeable on drying times which were accelerated using forced hot air (e.g., from a hair dryer). Three ink suspensions were prepared. First, a conductive ink suspension was made. This suspension consisted of 79% weight of conductive carbon (particle size<0.1.mu.) in an acrylic binder (Rohm & Haas HA-8 acrylic binder). A positive electrode (cathode) ink suspension was made. This suspension consisted of 96+% weight of manganese dioxide (particle size <0.4.mu.) in an acrylic binder (Rohm & Haas HA-8 acrylic binder). A negative electrode (anode) ink suspension was made. This suspension consisted of 96+% weight of zinc powder (particle size <0.3.mu.) in an acrylic binder (Rohm & Haas HA-8 acrylic binder). The cell had an overall thickness (including the base sheet) of about 0.4 mm. The cell had a ‘no load’ voltage of about 1.4 volts; a continuous current density of about 0.09 mA/cm.sup.2 (the curve is relatively linear and has a flat discharge curve); a capacity of about 2-3 nAh/cm.sup.2; a maximum capacity (not sustainable for over 2 milliseconds) of about 6 mA/cm.sup.2; an internal resistance (at near discharge) of 3.75-5 ohms/cm.sup.2; and an internal resistance (at outset, first 1 minute of use at 0.16 mA drain rate) of 4 ohms."

U.S. patent application Ser. No. 11/578,045 recites in part:

"FIG. 2 is a diagram showing the configuration of a ring type optical transmission system, more particularly, a WDM PON system having a redundancy structure according to an embodiment of the present invention.

Referring to FIG. 2, the WDM MUX/DEMUX 200 of a CO functions to multiplex optical signals of different wavelengths, and demultiplex a multiplexed optical signal, which is received through an optical communication line to be described later, for respective wavelengths. Optical signals of different wavelengths are respectively generated by a plurality of optical transmission units, and each of the optical transmission units forms a pair with a corresponding optical reception unit.

For reference, an optical circulator or optical coupler is coupled and used between each of a pair of optical transmission and reception units TX and RX, which generates optical signals of different wavelengths within the CO and receives such optical signals, and a WDM MUX/DEMUX 200, as shown in FIG. 3.

Meanwhile, an optical coupler 210 functions to divide optical signals of different wavelengths, which are multiplexed in the WDM MUX/DEMUX 200, and then transmit the divided optical signals to different communication lines, and transmit an optical signal, which is output from one of the optical communication lines, to the WDM MUX/DEMUX 200.

The different communication lines coupled to the optical coupler 210 form one ring type distribution network through the optical wavelength add/drop multiplexers 220. The optical wavelength add/drop multiplexers 220 function to drop only signals having wavelengths in a predetermined band from optical signals transmitted through the optical communication lines, and add optical signals, which are output from subscriber devices, to the optical communication lines. For reference, the optical wavelength add/drop multiplexer 220 is also called a node n in the optical transmission system. This optical wavelength add/drop multiplexer 220 is described in detail in a patent application that is entitled "WDM PON System" and was previously filed with the Korean Industrial Property Office by the applicant of the present invention. A detailed description thereof is omitted here.

Meanwhile, a master optical circulator, which outputs an optical signal, dropped by a corresponding optical wavelength add/drop multiplexer, to a first port and outputs an optical signal, received from a second port, to an optical wavelength add/drop multiplexer 220 connected thereto, and a slave optical circulator, which outputs an optical signal, dropped by the optical wavelength add/drop multiplexer 220, to a first port and outputs an optical signal, received from a second port, to an optical wavelength add/drop multiplexer 220 connected thereto, are coupled to each of the optical wavelength add/drop multiplexers 220.

As an example, the first and second ports of the master optical circulator are connected to a master optical reception unit and a master optical transmission unit within the redundancy MC, respectively. The first and second ports of the slave optical circulator are also connected to a slave optical reception unit and a slave optical transmission unit within the redundancy MC, respectively.

In the optical transmission system having the above-described construction, power loss depending upon the movement of an optical signal is examined below. Optical signals output through the WDM MUX/DEMUX 200 of the CO are transmitted to the optical wavelength add/drop multiplexers 220 through the optical communication Lines. Only optical signals having wavelengths in a predetermined band are dropped by each of the optical wavelength add/drop multiplexers 220, and are applied to the redundancy MC through the optical circulator of a master channel.

In this case, the optical circulator entails a small amount of power loss (about 1 dB) compared to an optical coupler, so that it is possible to construct a system having low power loss compared to a system employing optical couplers.

However, in the case where a ring type optical transmission system having a redundancy structure is constructed using only optical circulators as shown in FIG. 2, there is an disadvantage in that the system construction cost increases. This is because the price of an optical circulator is higher than that of an optical coupler.

Therefore, it is necessary to design a system structure having low power loss while minimizing the increase of the system construction cost. The structure of such a system is shown in FIG. 3.

FIG. 3 is a diagram showing the configuration of a ring type optical transmission system according to another embodiment of the present invention. This ring type optical transmission system also includes a WDM MUX/DEMUX 200 that generates optical signals of different wavelengths, multiplexes the optical signals and outputs the multiplexed optical signal, and an optical coupler 210 that divides a multiplexed optical signal into different communication lines. Further, the different communication lines connected to the optical coupler 210 form a ring type distribution network through a plurality of optical wavelength add/drop multiplexers.

Meanwhile, master and slave optical couplers having different channels, which separately output optical signals dropped by a corresponding optical wavelength add/drop multiplexer to different ports, and output an optical signal received from any of the ports to the optical wavelength add/drop multiplexer connected thereto, are connected to each of optical wavelength add/drop multiplexers n3, n4 and n5 located between the downstream portions of the bidirectional (clockwise and counterclockwise) transmission path of optical signals. An optical circulator, which outputs optical signals, dropped by a corresponding optical wavelength add/drop multiplexer, to a first port and outputs an optical signal, received from a second port, to the optical wavelength add/drop multiplexer connected thereto, and an optical coupler, which separately outputs optical signals, dropped by the optical wavelength add/drop multiplexer, to different ports and outputs an optical signal, received from one of the ports, to the optical wavelength add/drop multiplexer connected thereto, are connected to each of optical wavelength add/drop multiplexers n7 n8, n2 and n1 located in the downstream portions of the bidirectional transmission path of optical signals.

In that case, it is to be noted that the optical circulators that are coupled to the optical wavelength add/drop multiplexers n7 and n8 located in the downstream portion of the clockwise transmission path of the bidirectional transmission path must be coupled to master channel sides, and the optical circulators that are coupled to the optical wavelength add/drop multiplexers n1 and n2 located in the downstream portion of the counterclockwise transmission path of the bidirectional transmission path must be coupled to slave channel sides.

The reason for this is that, if an optical signal is transmitted clockwise, the nodes n7 and n8 have much higher power loss than do upstream nodes in light of both power loss caused by the use of the optical coupler and power loss incurred by the upstream nodes themselves.

Accordingly, higher power loss at the nodes n7 and n8 than that at other nodes can be compensated for to some degree by substituting the optical couplers of the master channels with optical circulators at the nodes n7 and n8.

In the same manner, an optical signal can be transmitted counterclockwise, so that power loss at the downstream portion of the transmission path of the optical signal can be compensated for by substituting the optical couplers of the slave channels with optical circulators at the nodes n1 and n2 in consideration of the above-described problem. Furthermore, the power loss of the system can be further reduced by adopting optical circulators between the optical transmission and reception units of the CO, which generate the optical signals of different wavelengths that are dropped by the optical wavelength add/drop multiplexers n1, n2, n7 and n8 to which the optical circulators are coupled, and the WDM MUX/DEMUX 200.

As described above, by disposing the optical circulators in the downstream portions of the bidirectional transmission path of optical signals and the optical couplers at the nodes located between the downstream portions, a system structure having low power loss as well as minimally increased system construction cost can be designed.

FIG. 4 is a diagram showing the configuration of a ring type optical transmission system according to still another embodiment of the present invention. The ring type optical transmission system has a structure in which a master optical circulator and a slave optical coupler are connected to each of optical wavelength add/drop multiplexers n1 to n8.

The master optical circulator functions to allow optical signals to be applied to the master optical reception unit of a redundancy MC by outputting the optical signals, which are dropped by a corresponding optical wavelength add/drop multiplexer, to a first port, and receive an optical signal, which is generated by a master optical transmission unit, through a second port and then output the optical signal to the optical wavelength add/drop multiplexer connected thereto.

Meanwhile, the slave optical coupler functions to allow optical signals to be applied to the slave optical reception unit of the redundancy MC by separately outputting optical signals, which are dropped by a corresponding optical wavelength add/drop multiplexer, to different ports, and receive an optical signal, which is generated by a slave optical transmission unit through one of the ports, and then output the received optical signal to the optical wavelength add/drop multiplexer connected thereto.

As described above, by coupling one optical circulator and one optical coupler to each of optical wavelength add/drop multiplexers, a system structure having low power loss as well as minimally increased system construction cost can be designed."

It should be recognized that although various components and their constructions may be described above, embodiments are not limited by these example descriptions.

2. Edge View of Card Device

FIG. 4A illustrates an example card device 401. As illustrated card device 401 may include dimensions (e.g., thickness, height, width) and/or properties (e.g., shape, flexibility, feel) substantially similar to a typical playing card. Card device 401 may include a coating 403 to protect components of the card device and/or provide a desired feel for users of the card device when they touch the card device. In some embodiments, a coating may include one or more layers of a touch sensitive coating that allows a user of the device to provide input by touching the card device and/or bending, flexing, rolling, folding, and/or manipulating the shape of the card device. The coating may include a flexible coating such as a plastic and/or other polymer coating.

Card device 401 may include one or more displays 405. The display(s) may include flexible organic light emitting diode display(s) as discussed above and/or any other desired display(s).

In some embodiments, a card device may have combined width and height of all the components of the card device that are substantially similar to a playing card. For example, in some embodiments, a card device may have a width and height that are within 25% of a playing card's width and height. For example, in some embodiments, a card device may have a width and height that are within 10% of a playing card's width and height. A playing card may be a poker card or a bridge card. In a poker card embodiment, a width may be less than about 2.7 inches and greater than about 2.3 inches. In a bridge card embodiment, a width may be less than about 2.5 inches and greater than about 2.0 inches. In a poker or bridge card embodiment, a height may be less than about 3.9 inches and greater than about 3.1 inches. In a poker card embodiment, a width may be about 2.5 inches and a height may be about 3.5 inches. In a bridge card embodiment, a height may be about 3.5 inches and a width may be about 2.25 inches.

In some embodiments, a card device may have a combined thickness that is substantially similar to a playing card. For example, in some embodiments, the thickness may be less than about 0.02 inches. In some embodiments, the thickness may be about 0.011 inches. In some embodiments, the thickness may be less than about 0.011 inches. In some embodiments, the thickness may be greater than about 0.08 inches.

In some embodiments, a card device and/or components thereof may have a shape that is generally rectangular substantially similar to a playing card. For example, in some embodiments, a card device and/or components thereof may have a front face and a back face that are shaped like a front face and a back face of a playing card. A card device may include one or more edges that may be linear and/or curvilinear similar to the edges of a playing card.

3. Internal View of Card Device

As illustrated in FIG. 4B and mentioned above, card device 401 may include circuitry and/or other operative components. For example, card device 401 may include a processor element 407, a memory element 409, a communication element 411, a movement and/or orientation element 413, a battery or other power element 415, a haptic/touch element 417, a display drive element 419, a communication network element 421, and/or any other desired elements 423. Some examples of such components and/or the manufacture of such components are described above. Some or all of the components of a card device may be flexible. In some embodiments, such elements may include flexible circuits. In some embodiments such elements may be embedded and/or printed on a substrate 425. Various examples of flexible circuitry, including processors and memory, are produced by Seiko Epson Corp. of Japan. Some of such products are produced using low-temperature polysilicon thin-film transistors (LTPS-TFTs) on a flexible plastic substrate. In other embodiments, such elements may not be flexible and/or may not be coupled to and/or include any substrate. In some embodiments, such elements may include rigid circuits. In some embodiments, the substrate is bendable without interfering with operation of a display coupled to the substrate (e.g., such as with a flexible OLED).

a. Processor

Processor 407 may include any desired processor or processors coupled to card device 401 in any way and configured to perform any desired functions. In some embodiments, for example, processor 407 may include a single core or multi core processor configured to process data and/or instructions. In some implementations, a processor may include one or more registers on which data and/or instructions used for processing may be stored. In some embodiments, the processor may include a flexible circuit. In some embodiments, the processor may be mounted on a flexible substrate. The processor may receive instructions for performing actions as desired (e.g., such as some actions described herein). The processor may process such instructions to carryout the desired actions. The processor may receive input (e.g., instructions, data, etc.) from various sources (e.g., other components of the card device, external sources, etc.). In some implementations, the processor may be formed to perform actions (e.g., hardwired) rather than/in addition to receiving instructions about actions to perform. Such an implementation may be useful, for example, if the card device acts as a dumb terminal that performs little or no processing. In such an implementation, a processor may perform no processing or routine data processing (e.g., converting received data into a useable form, etc.) based on data received from an external device that performs a bulk of data processing.

In some embodiments, the processor may be configured to control one or more displays coupled to the card device so that the one or more displays display gaming information, advertising information, and/or any other information. Such information may, in some embodiments, be transmitted to the processor from an external system. Such information may, in some embodiments, be determined by the processor. In some embodiments, some information to be displayed may be determined by the processor and some information to be displayed may be transmitted to the processor from an external system. In some embodiments, transmitting information to the processor may include transmitting the information to a communication element of the card device which is configured to provide received information to the processor.

In some embodiments, a processor may be configured to receive information identifying a first card value. The processor may be configured to control a display to display a first card value (e.g., a four of diamonds). The processor may be configured to receive information identifying a second cad value. The processor may be configured to control the display to alter the display of the first card value to the second card value. In some implementations, a processor may be configured to perform some or all of such actions with respect to information other than card values in addition to and/or instead of the card values.

In some embodiments, the processor may be configured to control a first display and second display to display different information. For example, in one implementation, gaming information may be displayed on a first display and non-gaming information may be displayed on a second display. The displays may be on opposite sides of a substrate.

In various embodiments, control of a display by a processor may include transmitting information about what to display to a display driver and/or providing desired voltages across various portions of a display. Some examples of operating a display to display particular information are described above and/or known in the art. Such examples of controlling a display are given as non-limiting examples only.

b. Memory

Memory element 409 may include any desired element capable of storing information. For example, memory element 409 may include RAM or ROM. Memory element 409 may include static and/or dynamic memory. Memory element 409 may include a solid state device. Memory element 409 may include an eeprom. Memory element 409 may include flexible circuitry. Memory element 409 may include circuitry mounted on a flexible substrate. Memory element 409 may store information such as instructions and/or data (e.g., application data, historic data, graphical data, security data, and/or any other desired data). Memory element 409 may store instructions for execution by a processor, may store data such as graphical data that may be displayed, may store data used by other components of the card device, may store application data referenced by instructions executed by the processor, and/or may store any other information. Memory element 409 may provide information to any desired destination, including, for example, processor 407, other components of a card device, and/or any external destinations (e.g., a central server, etc.). Memory element 409 may respond to requests for information, may be configured for direct memory access, and/or may allow access to information in any other desired way. Memory element 409 may receive data from any source including processor 407, other components of a card device, and/or any external destinations (e.g., a central server, etc.). Information may be stored for example by instructing the memory element 409 to store the information in a desired location, by direct memory access of the memory element 409, and/or by any other desired method.

c. Communication

Communication element 411 may include any device that facilitates communication with an external source. Communication may be duplex and/or simplex at one or different times (i.e., communication to the card device from a remote source, communication to a remote source from the card device, and/or both at a time and/or at different times as desired). Communication element 411 may include a transceiver and/or a transceiver-receiver. Communication element 411 may include a radio frequency communication device, an infrared communication device and/or any other type of communication device. Communication element 411 may include flexible circuitry. Communication element 411 may include circuitry mounted on a flexible substrate. Communication element 411 may include a single element and/or multiple elements. Multiple elements may allow, for example location determination, movement determination, specialization of communication elements, redundancy, and/or orientation determination based on triangulation to using one or more outside sources. Communication element 411 may include one or more antennas configured to send and/or receive communications to and/or from a remote location. In some embodiments, communication element may include one or more processing elements configured to process signals for transmission to the remote location and/or process signals received from the remote location. In some embodiments, communication element may receive signals for transmission from another component of the card device (e.g., the processor) and transmit the received signals (e.g., to a central system). In some embodiments, communication element may receive signals from a remote source and transmit the signals to another component of the card device (e.g., for processing, to a processor). Communication element may receive information for transmission and/or provide information received from and/or to any desired element of a card device. In some embodiments, a communication element may include an antenna. Such an antenna may include, for example, devices substantially similar to various RFID devices and/or tags, flexible circuitry, and so on as desired.

In some embodiments, the communication element may be configured to receive an indication of information to be displayed on one or more displays of the card device. Such information may include gaming information (e.g., card values, outcomes, etc.), advertising information, and so on. The communication element may provide such information to the processor, to a display driver, and/or otherwise provide the information any desired component of a card device to facilitate displaying the information on the display.

In some embodiments, the communication element may be configured to receive information from one or more components of the card device. The communication element may transmit such information (e.g., to an external system). The information may include, for example, information from the processor (e.g., identifying actions requested), information from a location determination element (e.g., identifying a location of the card device), information from a touch input element (e.g., identifying a location that was touched), information from an orientation element (e.g., identifying an orientation of the card device), and so on.

d. Movement and/or Orientation

Movement and/or orientation element 413 may include any element configured to provide functionality to a card device based on movement and/or orientation of the card device. As described above, some such functionality may be provided by a communication element 411 in addition to and/or as an alternative to a separate movement and/or orientation element 413. Movement and/or orientation element 413 may include flexible circuitry. Movement and/or orientation element 413 may include circuitry mounted on a flexible substrate. Movement and/or orientation element may include micro-electronic mechanical systems configured to determine motion of a card device and/or to determine an orientating of a card device. Such devices are well known and used in applications such as Apple's iPhone and Nintendo's Wii. Some examples of a movement and/or orientation device include the KXPS5 series accelerometer offered by Kionix Inc. of Ithaca N.Y., and various accelerometers and/or gyroscopes offered by STMicroelectronics, which is headquartered in Geneva, Switzerland. Other embodiments may include a mercury switch. Movement and/or orientation device 415 may provide information about movement and/or orientation of the card device to processor 407, memory 409 any/or any other component of the card device and/or any external device (e.g., through communication element 411).

e. Battery/Power Element

Battery/power element 415 may provide energy storage and/or energy supply to components of a card device. Battery/power element 415 may include flexible circuitry. The battery element may include circuitry mounted to a flexible substrate. The battery element may be coupled to other components of the card device to provide power for operation of the components. Some example battery elements may include an organic radical battery such as those developed by NEC Corporation, which is headquartered in Tokyo, Japan; a standard, ultra-thin and/or high drain series battery offered by Blue Spark Technologies of Westlake, Ohio, and/or any other desired device. In some implementations, battery/power element 415 may include a recharge input that allows the battery to be charged and/or that allows energy production to occur. Such a charge device may include a solar energy device that allows charging through solar energy (e.g., a solar device may be part of a display device such as a solar collecting OLED element that operates as both a display and a solar charge device). Some examples of such a solar element may include embodiments described in U.S. patent application Ser. No. 12/254,766 entitled Display with integrated photovoltaic device, which is hereby incorporated herein by reference. In some embodiments, a charge device may include an induction charging device that allows charging through induction, a traditional input device that allows charging through traditional means such as by a cord or other physical connection to a power supply and/or any other desired device that allows the battery element to be charged.

It should be recognized that any battery/power element may be used in various embodiments that may or may not include batteries to store power. The battery/power elements may provide power to other elements to operate a card device. In one example implementation, a battery/power element may include an induction element configured to provide power through magnetic induction from a power source that is not in physical contact with the power element. Such an element may include an arrangement of conductive material such that a changing magnetic field induces an electric charge that may be used to power elements of the card device. In another example implementations, a battery/power element may include an RF power collector that is configured to collect power from an RF signal.

In some embodiments, a card device may include one or more electrodes. The electrodes may allow a contact based charge device to provide power to the card devices. The electrodes may be part of an external portion of a card device so that they may make electrical contact with other electrodes of a charger. In some embodiments, electrodes may be arranged so that a stack of card devices may be charged in parallel and/or in series.

f. Haptic/Touch Element

Haptic and/or touch element 417 may include any component that provides haptic output and/or touch input capabilities to a card device. Haptic and/or touch element 417 may include flexile circuitry. Haptic and/or touch element 417 may include circuitry mounted on a flexible substrate. The haptic and/or touch element may include a multi touch interface and/or a single touch interface. Such interfaces are well known and used in devices such as Apple's iPhone and Research In Motion's Blackberry. In some implementations, haptic and/or touch element 417 may include a resistive touch screen, a capacitive touch screen, a surface acoustic wave touch screen, a projected capacitance touch screen, an optical/IR touch screen, a strain gauge touch screen, an optical imaging touch screen, a dispersive signal technology touch screen, an acoustic pulse recognition touch screen, an inductive touch screen and/or any other desired type of touch screen. One example haptic and/or touch element 417 may include an induction based touch screen that uses a thin-film plastic material made by DuPont called Teonex polyethylene napthalate (PEN) as a backpanel, such as those developed by the Flexible Display Center at Arizona State University. In some embodiments, a haptic and/or touch element 417 may be operated using a finger, using a stylus (e.g., a plastic stylus, a magnetic stylus, etc.), and/or using any other desired device. Haptic and/or touch element 417 may provide touch related input information to any desired component of a card device, external device, and so on.

In some embodiments, a touch input element may be configured to determine a location on a side of the substrate that is touched by a user of the card device. The location may correspond to an action identified in an interface displayed on the display. The touch input element may be configured to provide an indication of the location to the processor, which may determine an action that corresponds to the location and carryout the action or communicate with an external system to facilitate carrying out the action, provide an indication of the location to an external system (e.g., through the communication element) that may control one or more card devices to carry out the action, and so on as desired.

Haptic and/or touch element 417 may receive haptic output from any desired component of a card device, external device, and so on, and may in response to such output may provide a haptic output to a user (e.g., force feed back, temperature change, rumble or other movement, and so on). Some example haptic elements are described above.

g. Display Driver

Display drive element 419 may include any desired element configured to drive the display element. Display drive element 419 may include flexible circuitry. Display drive element 419 may include circuitry mounted to a flexible substrate. Display drive technology is well known and used in a wide range of electronic displays. Some example OLED display driving is described above. The display drive element 419 may receive input from other components of card device (e.g., the processor), external sources, and so on. As illustrated in FIG. 4C, display drive element may be coupled to one or more display elements. If multiple displays are used, multiple display drive elements may be used and/or one display drive element may drive both displays. Display drive element 419 may provide a voltage to a display element so that the display element provides an output. Display drive element 419 may be coupled to display element in a matrix so that individual pixels may be driven as desired to produce an output on the display. One example display drive element may include thin film and/or printed circuitry. In some embodiments, processor 407 may directly drive a display.

h. Communication Network

Communication network element 421 may include any desired element or elements that allow communication of information and/or power among one or more components of a card device. In some embodiments, communication network element 421 may include one or more communication networks coupling some or all of the components of the card device (e.g., a wired and/or wireless communication network). Data may be transferred from one or more components through the communication network to one or more of the components. In some embodiments, dedication communication networks between some or all components may be used. In some embodiments shared communication networks between some or all components may be used. In some embodiments, one or more communication networks may be dedicated to particular information. In some embodiments, one or more communication networks may be used for generic information. In some embodiments, a communication network may include a communication bus. Communication network element 421 may include flexible circuitry. Communication network element 421 may include circuitry mounted to a flexible substrate.

i. Miscellaneous

Other element(s) 423 may include any other component that may provide any other desired functionality to a card device. Other element(s) may include flexible circuitry. Other element(s) may include circuitry mounted to a flexible substrate. Some example functionality that may be provided may include global positioning functionality, security functionality, biometric functionality, and/or any other desired functionality.

Substrate 425 may include any desired substrate. Some or all components may be mounted on/in and/or otherwise coupled to (e.g., embedded in) substrate 425. Components may be coupled to substrate 425 in one or more layers and/or to one or more sides. Substrate 425 may include a flexible substrate, such as a plastic, nylon, polymer films, glass, metallic foils, and/or any other desired material. Some example substrates that may be used include a LEXAN film produced by Piedmont Plastics, Inc., which is headquartered in Charlotte, N.C., and various films (e.g., Lexan) produced by Sabic Innovative Plastics, which is headquartered in Pittsfield, Mass.

Some embodiments may include a location determination element configured to facilitate the determination of a location of the card device. Such a location determination element may take any desired form. In some embodiments, a movement and/or orientation element and/or a communication element may be used to provide location information. In other embodiments, a location element may be used separately and/or in connection with one or more other components to provide location information. Location determination element may include flexible circuitry. Location determination element may include circuitry mounted to a flexible substrate. Various examples of location determination elements are known in the art.

In some embodiments, such an element may include an element capable of determining the location. For example, such an element may include a global positioning system element that may communicate with a global positioning system to determine the location. As another example, such an element may include a processor (e.g., the processor element above, part of the communication element, a separate processor, etc.) configured to receive an indication of a characteristic of one or more communication signals and determine the location based on the characteristics. For example, a plurality of signal strengths may be used to identify the location relative to the locations of the sources of the signals. In some implementations, the processor may know the location of the sources and determine the location of the card device through triangulation. In other implementations, a location determination element may include, for example, a global positioning element configured to communicate a location with a global positioning system.

In some embodiments, such an element may provide information that may be used for determining the location. For example, in some embodiments, such an element may include the communication element. A signal strength of a signal received by each of a plurality of outside communication elements (e.g., of an external system) may be used to triangulate the location (e.g., by the external system). As another example, a visually distinct element, such as a bar code, an infra red output from a display, and so on may be used to identify the card device to a camera that is arranged to view a particular location. Footage from the camera may be analyzed to determine if the visually distinct element is present and thereby determine the location of the card device.

In some embodiments, a card device may include an audio element. An audio element may include a flexible component. An audio element may include flexible circuitry. An audio element may be coupled to a substrate. An audio element may provide audio functionality to a card device. An audio element may allow a card device to output sound to users. An audio element may be controlled by a processor to output particular sounds (e.g., music, words, sounds identified by a central system, etc.). Some example audio elements that may be used in some embodiments include flat flexible speakers (FFLs) such as those created at Warwick university with a thickness of less than about 0.25 mm and/or flexpeakers created by Taiwan's Industrial Technology Research Institute.

In some implementations, a card device may be a thin client. An example thin client is described in U.S. Pat. No. 7,189,161, which is hereby incorporated herein by reference. In some implementations, a card device may process some or all actions before and/or without contact with one or more servers.

In some embodiments, each card device may be assigned an identifier (e.g., by a manufacturer, by a central system, etc.). The identification number may facilitate communication similar to a MAC and/or IP address. The identification umber may be stored in memory of the card device, hard wired in the card device, and so on. The identification number may be used in communication related to the card device. The identification number may be used in communication from the card device to identify a source of the communication. The identification number may be used in communication to the card device to identify the destination of the communication. For example, a field in a communication message may include the identification number so that the card device can identify that it is the destination of the communication and/or so that an external system can identify that it is the source of the communication. The identification number may be used by a server to track information about a particular card device.

It should be recognized that the described embodiments of card devices, components, and/or functionality of such embodiments are given as examples only. Other embodiments may include some or all such components and/or functionality described, may include alternative and/or additional components and/or functionality, and/or may not include any described components and/or functionality.

D. Example System

FIG. 5 illustrates an example of card devices 501 interacting with an example system 503. System 503 may include a system configured to communicate with card device 501. System 503 may be configured to receive information from card devices 501, process information received from card devices 501, and transmit information resulting from that processing and/or other information to card devices 503. System 503 may be configured to provide advertising services, location based services, security services, authentication services, encryption services, gaming services, communication services, information services, and/or any other desired services to one or more card devices.

As illustrated in FIG. 5, example system 503 may include one or more communication elements 505A, 505B, and 505C, a gaming server 507, a security server 509, an advertising server 511, another server 513, and a communication network 515. It should be recognized that the example system is given as an example only and that any other embodiments with any other elements may be used as desired.

1. Communication

As illustrated in FIG. 5, communication elements 505 may allow communication to and/or from one or more card device 501. Communication with a card device may be performed by radio frequency, infrared, and/or any other interaction with, for example, communication element 411 of a card device and/or in any other desired fashion. Communication elements 505 may include one or more mobile devices and/or stationary devices. Commutation elements 505 may include one or more wireless and/or wired communication devices. Communication elements 505 may include routers, switches, access points, and so on. In some embodiments, communication elements 505 may be used to determine locations of a card device using triangulation, signal strength, and/or any other method. In some embodiments, communication elements 505 may receive information from one or more card devices 501, may authenticate the one or more card devices with security service 509, may forward received information to gaming server 507 and/or any other desired server, may receive information from the gaming server 507 or other source, may forward the information to the one or more card devices 501, and/or may perform any other desired communication related actions.

As illustrated by communication element 505A, a communication element may include a wireless communication device that communicates with a mobile communication element which in turn communicates with card elements 501. A wireless communication device may include a wireless access point, router, switch, and so on that receives communication to and/or from card device 501 and forwards the communication to an appropriate device (e.g., game server 507, mobile communication device, etc.). A mobile communication element may include a device that may be transported from one location to another, such as a deck device as is discussed below. Such a mobile communication element may be moved by a player and/or by a service provider. In some implementations, a plurality of such mobile communication elements may communicate with a single stationary communication device that may then forward such communication to other elements of system 503. For example, a single stationary communication device may communicate with a plurality of mobile communication elements in a particular area of a casino (e.g., in a bar area, a pool area, etc.). A plurality of stationary communication elements may be used to determine a location of a mobile communication element. A plurality of mobile communication elements may be used to determine a location of a card device. A mobile communication element may forward communication between/among card devices and/or elements of system 503.

As illustrated by communication element 505B, a communication element may include a wireless communication device that communicates with one or more card devices 501. Such a wireless communication device communicate with card devices 501 that are in a particular area (e.g., at a table, in a bar, in a gaming area, at a pool, etc.). A plurality of such devices may be used to determine locations of card devices 505. A wireless communication device may include a wireless access point, router, switch, and so on that receives communication to and/or from card devices 501 and forwards the communication to an appropriate destination.

As illustrated by communication element 505C, a communication element may include a wired communication device. In some embodiments, a wired communication device may communicate with card devices 501 (e.g., through a wired connection with the card devices 501). In some embodiments, a wired communication device may communicate with a table or other play area on which card devices 501 may be used as illustrated in FIG. 5. The table may include a wireless communication device that communicates with card devices 501 used at the table or area. Communication between and/or among card devices 501 at the table or area and/or elements of system 503 may include communication through the wireless communication device of a table or area and/or the wired communication device. In some implementations, for example, card devices may communicate directly with each other. In some implementations, for example, card devices may communicate with each other through the wireless communication device. In some implementations, card devices may communicate with system 503 through the wireless communication device and the wired communication device. For example, wireless communication device may forward communication to and/or from card devices 501. Wired communication device may forward communication to and/or from the wireless communication device.

In some embodiments, wireless communication may include radio frequency communication, such as wifi, infrared communication, and so on as desired. In some embodiments, communication may be encrypted, for example, using WPA, WPA2, WEP, and so on as desired. In various embodiments, a card device may authenticate itself with an external system before full communication is allowed. For example, in some embodiments, a RADIUS authentication system may be used to authenticate card devices.

It should be recognized that the example communication elements are given as examples only and that any other type of communication element including any or no type of communication device(s) may be used as desired.

2. Servers

Gaming server 507 may facilitate gaming functionality for one or more card devices 501. Gaming server 507 may, for example, receive information about one or more card devices 501 (e.g., through communication elements 505 and/or communication network 515). Gaming server 507 may process such inputs and/or any other information to determine gaming results, gaming actions, gaming options, a hand and/or game to which card devices belong, and/or any other desired gaming information and/or other information. Gaming server 507 may provide such information to the one or more card devices (e.g., a same card device about which the information was received, a different card device, through communication elements 505 and/or communication network 515).

In one example, a user of a gaming device 501 may request a hit in a game of blackjack being played using the gaming device (e.g., press a button on the gaming device, make a motion of the gaming device, operate a deck device, ask for another card from a dealer, etc.). Information identifying the request for a hit may be transmitted to the gaming server 507 (e.g., from the gaming device 501, from a dealer interface, etc.). The gaming server 507 may determine a card value to be displayed in response to the hit command (e.g., using a random number generator, by selecting a next card from a virtual deck maintained in memory, etc.). The gaming server 507 may transmit the card value to a card device (e.g., the same card device from which the request was received, another card device that was dealt by the dealer or selected from a deck device or pile of cards, etc.). The card device may receive the information and display the card value in response.

In some embodiments, gaming server 507 may determine gaming information for display on card devices 501. The gaming information may be determined based on a random event generation, based on other information such as other gaming information, and/or in any desired way. Such a random event generation may include a pseudo random number generation, a random number generation, a random event occurrence (e.g., a stock market value, etc.). In some embodiments, the gaming server 507 may determine gaming information for an initial hand, a final hand, intermediate hands, a single card, a plurality of cards, and so on of games played using gaming device. In some embodiments, gaming server 507 may determine gaming information based on and/or in response to a gaming action. For example, a card value may be determined for a game of blackjack in response to receiving an indication that a player desires a hit game action. In some embodiments, gaming server 507 may determine gaming information before an action is requested. For example, in some embodiments, gaming server 507 may maintain a virtual deck in memory. The make up of the deck may be determined before the action is requested (e.g., at the start of a gaming session, etc.) In some embodiments, when a card value is requested for a card device, the gaming server 507 may determine the card value by referencing the next card in the virtual deck.

In some implementations, the gaming server may provide functionality related to other aspects of game play that do not affect a play of a game, such as screen displays, advertising displays, social aspects of play, haptic elements, location elements, and so on. In some implementations, some or all of such functionality may be provided by other servers and/or by the card devices in any desired combination.

Security server 509 may provide security and/or auditing functionality. Such functionality may be required by legal statutes to ensure proper functionality of gaming deices, for monitoring gaming device operation, and so on. For example, in some implementations, the security server 509 may record outcomes and/or intermediate results of each game so that actions taken using the card devices can later be verified. Security server may record information to verify such outcomes, such as camera footage of game play, for example, from camera devices positioned proximately to the card devices.

Security server 509 may track actions taken by players on a plurality of card devices to maintain the security of the card devices. For example, security server 509 may maintain an identifier or other security token for each card device in operation. A change to a card device (e.g., an attempt to replace one card device with another to fool a system, an attempt to tamper with the workings of the card device, etc.), may corrupt a token stored in the card device and be detectable by the security server.

Security server 509 may track actions taken by players to detect collusion among players. Player actions in a group game may be monitored and analyzed for collusion by a security server. Various methods of collusion detection in the play of card games is known in the art, and some are described above.

A security server may provide encryption services as desired, and/or authentication services as desired (e.g., may allow authentication of each card device before the card device communicates with other devices on network 515). In some embodiments, a security server may include a RADIUS based authentication system that may authenticate card devices for communication with one or more servers of system 503. In some embodiments, various personal authentication (e.g., periodically, before play, etc.) may be required (e.g., by law, by a casino, etc.) for players to use card devices (e.g., entering a password, biometric, etc.). In some embodiments, a security server may process such information to authenticate a user for play with the card devices.

Advertising server 511 may provide advertising functionality to card devices 501. Advertising server may receive information about game play, demographics of a player, location information, and so on (e.g., from the card device, from a dealer, from a player, from a front desk check in, etc.). Advertising server 511 may accept advertising information from advertisers (e.g., through an interface such as a web portal). Such information may include an advertising plan that includes one or more criteria describing when an advertisement should be displayed. Such advertising information may include information about when to provide advertising (e.g., after certain outcomes, after a certain amount of money is won, after a certain amount of play time, to people with certain characteristics, at a certain time, in a certain location, up to a certain cost, and so on). Such advertising information may include advertising content (e.g., images, sounds, haptic outputs, videos, etc). Such advertising information may include an indication of how such content should be displayed (e.g., on one card device of a player, on all card devices of a player, on all card devices on a table, in conjunction with a sound played over a speaker system, and so on). Various examples of advertising, display of information, and other uses of various electronic devices that may be applied in some embodiments is described in U.S. patent application Ser. No. 11/868,013, entitled GAME OF CHANCE PROCESSING APPARATUS, which is hereby incorporated herein by reference.

Advertising server 511 may receive information about player(s), action(s) and/or outcome(s) in a game(s) and determine based on that information that one or more advertisements should be presented. Advertising server 511 may provide information to card devices 501 to cause a presentation of advertising information on one or more card devices. Such information may include images, videos, sounds, haptic outputs, and/or any desired advertising content. Such information may include identifications of a memory location of a card device where advertising content may be stored so that a processor may access the memory location to retrieve the content. In some implementations, other devices than a card device may be involved in an advertisement and may receive information from advertising server 511 as well (e.g., displays or monitors around a casino, other card devices of other players, displays and/or speakers of a slot machine, etc.).

In some embodiments, advertisement information may be processed by gaming server 507. Gaming server 507 may verify that an advertisement display does not affect an outcome of a game being played unless otherwise desired to do so. In some implementations, gaming server 507 may be solely responsible for communicating information to be displayed to a card device. In such an implementation, gaming server 507 may incorporate advertising information into a display (e.g., replace a heart with a graphic, play a video, and so on). In other implementations, separate servers may be responsible for providing separate elements for display on a card device (e.g., card values determined by gaming server, background determining by advertising server, etc.).

Other server 513 may provide any other functionality desired. Other servers may include for example, location servers, accounting servers, social networking services, and so on.

For example, in some embodiments, an account server may track player account information to facilitate wagering through the card devices. For example, such a system may add winnings, subtract loses, add deposits, provide funds for play, and so on to a user. A user may deposit money in such an accounting system for use in game play.

In some embodiments, a server may record historic events that may be used for display to players, used to create strategic advice, and so on. In some embodiments, a server may determine strategy suggestions for players in a game (e.g., based on a desire strategy and a current state of a game). In some embodiments, a server may allow purchasing of items form a merchant. In some embodiments, a server may receive, process, provide, and so on outside information, such as stock market values, sport event information, and so on.

Communication network 515 may include one or more communication networks through which one or more elements of system 503 may communicate. As illustrated, in some implementations, communication network 515 may be separated into multiple elements allowing communication in separate sub domains. Other implementations may not include such separate and/or may include any desired network topology. Communication network 515 may include wired and/or wireless elements (e.g., Ethernet, wifi, etc.). Portions may include one or two way communication elements (i.e., simplex or duplex). It should be recognized that any communication network in any desired configuration may be used in various embodiments.

In various embodiments, various types of information may be transmitted to and/or from card devices from and/or to one or more servers. For example, in some implementations, images, videos, text, and/or other content may be transmitted. In some implementations, such data may be compressed, encrypted, indications of memory locations in which such information is located may be transmitted, commands that indicate that such content should be displayed may be transmitted, and/or any other desired transformation of content may be transmitted.

In some embodiments, content for various portions of a display may be received from respective different sources (e.g., different servers). Such different sources may communicate to card devices through different communication networks. It should be recognized that embodiments are not limited to any particular form of data transmission and/or control of displayed content.

It should be recognized that while various servers are describe determining gaming information and/or other information for that may be displayed on a card device, information may additionally, and/or alternatively be determined elsewhere. For example, in some embodiments, some gaming information may be determined by one server and other gaming information may be determined by another server. Both gaming information may be displayed on a same card device. In other embodiments, gaming information and/or other information may be determined by card deices, deck devices, and so on. Such information may be displayed simultaneously, sequentially with, instead of, as desired with information determined by one or more server. It should be recognized that information displayed on a card device may be determined by any number and/or type of sources.

3. Hands

In some embodiments, system 503 may determine to which hand one or more card devices 501 belongs. In some embodiments, the system may determine winning hands based on a comparison of card values displayed on card devices.

In some embodiments, a system 503 (e.g., gaming serer 507) may receive information identifying that a card device should belong to a hand of a plurality of hands of a game. For example, the hand may be a hand of a player, a hand of a dealer, and so on. The indication may include an indication of a location of the card device. The location information may indicate that the card device is in a location proximate to other card device in the hand, in a player area associate with the hand, on a side of communication device or deck device that is associated with the hand. Some examples of tracking card devices and assigning them to hands are described below with respect to player locations of a table. In response to receiving the indication of the location, the system 503 may determine that the card device belongs to the hand associated with the location. In some implementations, such a determination may be before, after, and/or during a determination of gaming information (e.g., a card value) to display on the card device. For example, system 503 may determine a card value before the card device is assigned to the hand, when the card device is determined to belong to the hand, and/or after the card device is assigned to the hand.

In other implementations, various other indications that a card device should belong to a hand may be used. For example, an indication of a selection through an interface (e.g., of the card device, of another card device in the hand, of a dealer, and so on) may be received that indicates that a card device should belong to the hand. Any other indication that the card device should belong to the hand may be received.

In some embodiments, system 503 may determine a hand value based on the card devices that belong to each hand. For example, a hand value may be based on the card values displayed on each card device that belongs to a respective hand (e.g., blackjack, straight flush, two pair, etc.).

In some embodiments, system 503 may maintain information identifying the hand values and/or card values of each hand in one or more games. For example, a database or other memory may store information identifying the hand value, card values, game, and/or other information to facilitate game play, advertising, and so on. As card values are added and/or changed in each hand, such information may be adjusted to reflect a current situation of a game. Such maintained information may be used, for example, to determine advertising information, winnings and loses in a game, and so on.

In one example, hands in a same game may be determined to belong to the same game. For example, card devices that are in use in a same table, from a same deck device, within proximity of each other and so on may be determined to be playing a same game. In other implementations, an indication such as an indication of location, indication of selection of the game, and so on may be received to facilitate such a determination. In some embodiments, card devices may all be playing the same game. In some embodiments, multiple games may be played with a plurality of different respective sets of card devices around an area (e.g., a casino). Information about some or all of such games may be maintained, tracked, provided, etc.

In some embodiments, a system may determine which hand of a plurality of hands in a game is a winning hand. For example, a system may compare hand values of each hand to determine which hands of a plurality of hands in a game are winning hands. A system may compare hand values to one another to determine if one player's hand wins over another player's hand and/or one player's hand wins over a dealer's hand. Such determinations may be made in accordance with rules of the game being played. In some embodiments, in response to determining the winning hand(s), the system may control an indication that the hand(s) is/are winning hand(s) to be displayed on the card devices, may adjust account information accordingly (e.g., add winnings to the hands, subtract bets from the accounts, etc.), and so on.

In other embodiments, the system may receive an indication of the winning hands (e.g., from a dealer, from an interface, etc.), and may take any desired action in response (e.g., adjusting account information, displaying an indication, etc.).

In some embodiments, a system may determine a beginning and/or an end of a game. For example, a system may determine that a game is beginning based on movement of card devices, input from an interface, and so on. In some embodiments, a system may determine an end of a game based on actions that took place in the game and game rules that indicate that after those actions, the game is over. In some embodiments, an input form an interface may be used to determine that the game is over.

In some embodiments, actions, games, events, and so on of individual card devices may be tracked using a card identifier of the card device. For example, a database may identify which card device belong to which hand based on identifier numbers of the card devices. Communication may be directed to each card device based on the identification number of the card device.

In some embodiments, a card device may be reassigned from one hand to another hand. For example, a system may determine that a location of the card device has changed so that it is no longer in a location associated with a first hand, but rather is in a location associated with a second hand. The system may then dissociate the card device from the first hand and associated the card device with the second hand. In some implementations, an indication that such a change should be made may be received based on an input in an interface requesting such a change.

4. Miscellaneous

It should be recognized that the system of FIG. 5 is presented as a non-limiting example only. Any other desired configuration may be used in various embodiments. For example, other configurations may include other servers, additional servers, no servers, and so on.

E. Example Table at which Card Devices May Be Used

FIG. 6 illustrates an example table 601 on which card devices 603A, B, C may be used. Table 601 may be used for play of games and/or other actions involving card devices 603A, B, C. Table 601 may include one or more player areas 605 A, B, C, D, E, F in which game play may take place associated with a particular player. Table 601 may include one or more dealer areas 607 in which dealer based actions such as play of a dealer hand and/or administration of card devices may take place. Different areas and/or area types may be associated with different available actions. Table 601 may include one or more communication devices 609 which may allow communication between/among card devices, a central system, control elements, and so on. Table 601 may include one or control elements 611, which may control some or all of the gaming and/or other operation of card devices 603A, B, C used at the table 601. Table 601 may include one or more communication networks 613 which may allow communication between/among elements of the table 601 and/or external elements (e.g., an external system). Table 601 may include a card device holder 615 which may house a plurality of card devices for use at the table (e.g., to be dealt by a dealer).

1. Location

Card devices 603A, B, C may be used on and/or near table 601. Card devices 603A, B, C may be used for playing games and/or performing any desired action, some of which may be discussed herein. Card devices 603A, B, C may have options and/or functions enabled and/or disabled based on a location of the card device on the table 601. To facilitate such location based functionality, card devices 603A, B, C may include a location element (e.g., a GPS element, one or more communication elements of the card devices 603A, B, C that provide triangulation functionality, etc) and/or the table may include location determining abilities (e.g., camera footage processing, triangulation functionality provided by communication elements 609, etc.). Card devices 603A, B, C may communicate with a system such as system 503 (e.g., through communication elements 609).

a. Player Areas

Player areas 605 A, B, C, D, E, and F may include areas of a table on which and/or near which players may play games using the card devices. In some implementations, each player area may be marked on the table 601. In some implementations, some or all player areas 605 A, B, C, D, E, and F may include a charge element that may be used to provide power to the card devices (e.g., contact based charge devices, solar based charge devices, inductive based charge devices, RF charge device, etc.). It should be recognized that the configuration of player areas 605 A, B, C, D, E, and F are given as an example only and that in various embodiments player areas may include any shape, size, orientation, number, components, functionality, and/or other configuration.

Card devices 603A, B, C in a respective one of the player areas 605 A, B, C, D, E, and F may be associated with each other (e.g., may be cards of a single hand) and/or a player (e.g., may be cards dealt to a particular player) proximate to the respective area. Based on a position in a play area, a card device may be assigned to a particular hand and/or associated with a particular player. For example, card devices 603A in play area 605A may be associated with a single hand of a game (e.g., a hand of blackjack being played at the table 601) and/or a player proximate to the player area 605A (e.g., two separate hands of a single game both played by the same player). A central system may determine to which hands each card device belongs, as discussed above.

In some embodiments, to facilitate location based play with card devices, a location of each card device may be determined (e.g., using a location element of the card device, using triangulation involving communication elements, using analysis of video camera footage, etc.). For example, in one implementation, a GPS element on a card device may transmit location information to communication elements 609 through a communication element of the card device. In another example, controller 611 and/or some other element of the table or remotely may triangulate a location of a card device based on communication strength of a signal between some or all of the communication elements 609 and a communication element on the card device. Information about the location may be transmitted to a controller 611 and/or some other remote system. The controller and/or remote system may compare the location information to location information for each of the player areas 605 A, B, C, D, E, and F to determine if the card device is any of the player areas. Location information for each player area may be predetermined (e.g., entered by an administrator, entered by a manufacturer, etc.).

Some examples of determining locations of electronic devices and other uses of electronic devices that may be used in some embodiments are described in U.S. patent application Ser. No. 11/553,142 entitled APPARATUS, PROCESSES AND ARTICLES FOR FACILITATING MOBILE GAMING, which is hereby incorporated herein by reference. Various examples of video analysis that may be used to determine a location of a card device in a captured video image are described in U.S. Pat. No. 7,200,266 entitled Method and apparatus for automated video activity analysis and U.S. patent publication number 2009/0087024 entitled Context Processor for Video Analysis System, both of which are hereby incorporated herein by reference.

Based on the location determination of a card device in or out of a player area, controller 611 and/or an external system may transmit information to the card device for display on the card device. Such a determination may also be based on an action in a game being played (e.g., a requested hit in a game of blackjack, etc.). For example, in the illustration of FIG. 6, a dealer may be moving card device 603C from card device holder 615 to player area 605E in response to a player proximate to player area 605E requesting a hit in a game of blackjack. The player may have requested the hit by selecting a hit button on the card device, selecting hit button on another interface, performing a motion indicative of a hit with the card devices, indicating to the dealer that a hit is desired, and so on. Information about the hit request may be transmitted to the controller 611 and/or external system (e.g., from the card device, from the dealer, etc.). While the card device 603C is being moved from the card device holder 615 to the player area 605E, any desired display may be shown on the card device (e.g., an advertisement, a blank screen, a card value, etc.). When the card device enters the player area 605E, the controller 611 and/or external system may process one or both of the location information and the hit request and determine that the card device 603C is the next card dealt in response to the hit request. The card device 603C may be assigned to a hand involving other card devices 603A in player area 605E, any action may be taken based on the resulting hand, and/or any desired display may be shown on the card device (e.g., the card value, an indication of a win or a loss, an advertisement, etc.). It should be recognized that this example interaction is given as a non-limiting example only and that any other desired implementation may include any other desired set of actions, devices, and so on.

b. Dealer Areas

Dealer area 607 may include an area of table 601 in which particular functionality may be enabled. In some implementations, a dealer proximate to dealer area 607 may deal cards to players at the table, may monitor play at the tables, may perform maintenance to devices at the table, and so on. In some implementations, functionality of a card device 603B that is located in the dealer area 607 may include options that may not be available in a player area 605 A, B, C, D, E, F. For example, in some implementations, when it is determined that a card device 603B is located in dealer area 607 (e.g., by controller 611, by a remote system, based on triangulation, based on GPS, based on vide footage, etc.), card device 603B may perform a self diagnosis, may be disabled, may be enabled, may enter an administrator mode, may display a action selection interface, and/or may otherwise be administered.

For example, in one implementation, if a card device 603A stops working properly, a dealer may position the card device in the dealer location 607. In some implementations, the card device 607 may display errors when in the dealer area 607 so that the dealer may determine if the card device may be fixed and/or should be removed from play. In one implementation, a dealer may assign a replacement card device to take the place of a removed card device. For example, a dealer may position both the replacement card device and the card device to be removed in the dealer area 607. Using an interface of one or both of the card devices, the dealer may assign the replacement card device as a replacement for the card device to be removed and then may place the replacement card device into play in the player area where it may be used as if it where the removed card device. In some implementations, to facilitate such replacement, identification information of one or both of the removed and replacement card devices may be transmitted to controller 611 and/or an external system. The controller 611 and/or external system may assign future transmissions of information that would have been destined for the removed card device to the replacement card device (e.g., by replacing a card identifier of the removed card in a database and/or other memory location with a card identifier of the replacement card). In some implementations, only a communication with the replacement card may be needed to facilitate replacement. For example, if communication is lost from a card device (e.g., because of damage, because of a power failure, etc.), a replacement card may be placed in a location of the card device and the controller and/or external system may perform a replacement in response to a determination that the card device is malfunctioning and that the replacement card device is placed in play as a replacement. In some implementations, a dealer may indicate that such a replacement should take place using the replacement card device in the dealer area before positioning it in the location of the card device.

As another example, in some implementations, a dealer may select an action to be taken with respect to a card device 603B. For example, a player may request a hit in a game of blackjack, and in response to the request, a dealer may enter a hit command (e.g., using an interface of the card device, using a separate dealer interface that is not shown such as a keyboard, and so on). The hit command and identification of the card device 603B may be transmitted to controller 611 and/or an external system which may assign the command to the card device 603B. The card device 603B may then be moved to a player area associated with the player that requested the action. The card device may then be assigned to the hand and/or player as discussed above. It should be recognized that the above example of action selection for a card device is given as a non-limiting example only and that other embodiments may include any other desired actions and/or devices.

In some implementations, a card device 603C not located in a dealer area 607 and/or player area 605 A, B, C, D, E, F may have some or all functionality disabled. In some implementations, for example, when a dealer may be placing the card device 603C into a player area 605E, the card device 603C may have gaming functionality disabled. Such disablement of functionality may prevent attempts to manipulate a card device in an unauthorized manner.

2. Communication and Control

Communication elements 609 may include any desired communication devices in any number and/or any arrangements. Communicant devices may include wireless (e.g., wifi, infrared, etc.) access points, for example. Communications devices may be arranged in one or more vertical and/or horizontal levels. For example, a communication device may be in a middle of a table at or below a table surface while one or more other communication devices may be at an edge of a table and above a table surface. In such an arrangement, communication devices may be used to determine a vertical and horizontal location of a card device using triangulation. For example, signal strength between the card device and each of plurality of communication devices may be determined (e.g., measured by each of the communication devices). Such signal strength may be transmitted to controller 611 and/or an external system which may determine a location based on the signal strengths (e.g., based on a lookup table of various signal strength, based on a mathematical equation relating signal strength to distance from a communication device, etc.).

Controller 611 may provide any desired processing functionality and/or communication functionality. In some implementations, controller may include system 503 or some portion of system 503. In some implementations, controller may control some aspects of gaming at the table 601 similar to the gaming server discussed above. In some implementations, controller 611 may include a communication interface with system 503. controller 611 may be coupled to each of communication elements 609 through a communication network 613 to allow communication among, between, to and/or from card devices 603A, B, C, controller 611, and/or an external system such as system 503.

Communication network 613 may include any elements and/or configuration. Communication network 613 may couple one or more elements of table 601, including, for example, controller 611, communication elements 609, and so on. Communication network 613 may include wired and/or wireless elements. Communication network 613 may allow data regarding card devices 603A, B, C to be transmitted in one or more directions.

3. Miscellaneous

Card device holder 615 may include a holder for card devices 603A, B, C. Card device holder 615 may be similar to a card shoe in appearance and operation by a dealer. Card device holder 615 may include a charging element that charges batteries of card device held in the card device holder 615. Such a charge device may include an inductive charge element, a physically contact based charge element (e.g., such as one that contacts a pair of electrodes on a card device to charge the card device), a solar based charge device, an RF charge device, and so on.

In some implementations, card device holder 615 may include a processing element configured to perform one or more desired actions. For example, in some implementations, a card device holder may read a card device identification number from a card device as it is removed from the card device holder (e.g., through a wired and/or wireless communication link with the card device, using a camera or other card reading device positioned at or near the card device holder 615, etc). Such information may be transmitted to controller 611 and/or an external system for card tracking and/or any other desired purpose. In some implementations, a processing element may perform a diagnostic on a card device before the card device is dealt form the card device holder. For example, such a diagnostic may include reading information from a card device (e.g., battery level, card identifier, location information, orientation information, etc.). In other implementations, a diagnostic may include turning on a screen of a card device in the card holder device and determining if the screen is in operation (e.g., by detecting a light level emitted from the card device, by analyzing camera footage, etc.). In some implementations, a screen may be turned on by transmitting a command to the card device (e.g., through a direct connection to a communication network of the card device, through a wireless communication to the card device, etc).

In some implementations, a table may include a camera element that may obtain images of actions at the table. Such images may be transmitted for auditing, and/or other processing from the cameras to a controller 611 and/or external system. For example, in some implementations, movement and/or locations of card may be determined from such video data.

It should be recognized that table 601 is given as a non-limiting example only. Other embodiments may include any desired set of elements, arrangement and/or desired configuration.

F. Example Areas at which Card Devices May Be Used

FIG. 7 illustrates an example playing area 701 that may be used in some implementations. For example, playing area 701 may include a bar, a table (e.g., similar to FIG. 6) and so on. Playing area 701 may include a surface 703, a gaming area 705, a controller/power supply 707 and/or any other desired elements including but not limited to those discussed above with respect to table 601. In some implementations, players may use card devices at playing area 701 with and/or without a dealer. In some implementations, players may use card devices at playing area 701 in games involving multiple players and/or in games involving only a single player.

Surface 703 may include any surface and/or any number of surfaces of a playing area. For example the surface 703 may include a top of a table, a seat of a chair, a desktop, a bar top, and so on. The surface 703 may be flat, curved, solid, flexible, rigid, multileveled, and so on.

Gaming area 705 may include an area in which use of card devices may be encouraged, enabled, supplemented, and/or in any way affected (e.g., by charging from a charge device, etc.). For example, in some implementations, communication device and/or cameras may be used to determine if card devices are in the gaming area and enable play using the card devices in the area. In some implementations, play may be performed anywhere or in an area away from the gaming area, but gaming area 705 may provide advantages for play proximate to the gaming area. For example play proximate to the gaming area may allow for recharge of the card devices during play, provide better odds, earn promotional points, allow a player to receive free/discounted drinks and/or food, and/or have any other desired advantages.

In some embodiments, gaming area 705 may include a charging element. A charging element may allow card devices to be charged while in use, while in a deck, while in a pile, before being put to use, after being discarded, and/or in any other desired situation. In some implementations, a charge element may include a contact based charge element that may charge a card device through contact with electrodes of the card device. For example, card devices may be placed in particular areas of the gaming area so that electrodes of the card devices line up with electrodes of the gaming area. In one implementation, for example, a deck of card devices may be placed in such a location so that all card devices in the deck may be charged (e.g., card devices may include electrodes that allow a card device stacked on top of another card device to be charged by the lower card device so that when a deck of cards is placed over a charge device of the gaming area, the entire deck may be charged through such a daisy chain of card devices). In some implementations, a charge device may include a solar based charge device. For example, card devices may be configured to convert certain wavelengths of light into energy through solar collectors and lights configured to output such wavelengths of light may be aimed at the gaming area so that card devices in use at the gaming area may be charged. In some implementations, a charge device may include an inductive charge device. Inductive charge device may allow card devices to be charged using induction when they are proximate to the gaming area 705. In some implementation, a charge devices may include an RF charge device that may be configured to supply power to card devices through an RF signal. FIG. 8 describes an example charge device.

Controller/power supply 707 may provide control functionality and/or power supply functionality to playing area 701. For example, controller/power supply 707 may supply power to a charge device. Controller/power supply may provide functionality similar to controller 611 and/or other elements of table 601, system 503, gaming server 507 and/or any other desired functionality.

G. Wireless Power Charger

FIG. 8 illustrates an example wireless charge device 801. In this example the wireless charge device includes an inductive charge device. It should be recognized that any wireless charge device 801 may include any desired elements in any desired configuration in various embodiments. For example, an RF wireless power devices and/or an inductive wireless power device may be used in various embodiments. One example inductive charge device may include a SplashPad device manufactured by Splashpower Ltd of Cambridge, United Kingdom and Fulton Innovation of Ada Mich. One example RF power charging devices include Powerharvester receivers and Powercaster transmitters manufactured by Powercast Corporation of Pittsburgh Pa. It should be recognized that these are only examples of wireless power elements and that any other wireless, wired, solar, and/or any or no power elements may be used in various other embodiments as desired.

Some example inductive power charge devices that may be used in some embodiments are described in U.S. Pat. No. 6,906,495, which is hereby incorporated herein by reference. Part of this application, with FIGS. 1-13 referring to FIGS. 54-66, recites:

"Referring firstly to FIGS. 1a and 1b, there is shown two examples of prior art contact-less power transfer systems which both require accurate alignment of a primary unit and a secondary device. This embodiment is typically used in toothbrush or mobile phone chargers.

FIG. 1a shows a primary magnetic unit 100 and a secondary magnetic unit 200. On the primary side, a coil 110 is wound around a magnetic core 120 such as ferrite. Similarly, the secondary side consists of a coil 210 wound around another magnetic core 220. In operation, an alternating current flows in to the primary coil 110 and generates lines of flux 1. When a secondary magnetic unit 200 is placed such that it is axially aligned with the primary magnetic unit 100, the flux 1 will couple from the primary into the secondary, inducing a voltage across the secondary coil 210.

FIG. 1b shows a split transformer. The primary magnetic unit 300 consists of a U-shaped core 320 with a coil 310 wound around it. When alternating current flows into the primary coil 310, changing lines of flux is generated 1. The secondary magnetic unit 400 consists of a second U-shaped core 420 with another coil 410 wound around it. When the secondary magnetic unit 400 is placed on the primary magnetic unit 300 such that the arms of the two U-shaped cores are in alignment, the flux will couple effectively into the core of the secondary 420 and induce voltage across the secondary coil 410.

FIG. 2a is another embodiment of prior art inductive systems typically used in powering radio frequency passive tags. The primary typically consists of a coil 510 covering a large area. Multiple secondary devices 520 will have voltage induced in it when they are within the area encircled by the primary coil 510. This system does not require the secondary coil 520 to be accurate aligned with the primary coil 510. FIG. 2b shows a graph of the magnitude of magnetic flux intensity across the area encircled by the primary coil 510 at 5 mm above the plane of the primary coil. It shows a non-uniform field, which exhibits a minimum 530 at the centre of the primary coil 510.

FIG. 3 is another embodiment of prior art inductive system where by a multiple coil array is used. The primary magnetic unit 600 consists of an array of coils including 611, 612, 613. The secondary magnetic unit 700 may consist of a coil 710. When the secondary magnetic unit 700 is in proximity to some coils in the primary magnetic unit 600, the coils 611, 612 are activated while other coils such as 613 remains inactive. The activated coils 611, 612 generate flux, some of which will couple into the secondary magnetic unit 700.

FIGS. 4a-4d show an embodiment of the proposed invention. FIG. 4a shows a primary coil 710 wound or printed in such a fashion that there is a net instantaneous current flow within the active area 740. For example, if a dc current flows through the primary coil 710, the conductors in the active area 740 would all have current flowing in the same direction. Current flowing through the primary coil 710 generates flux 1. A layer of magnetic material 730 is present beneath the active area to provide a return path for the flux. FIG. 4b shows the same primary magnetic unit as shown in FIG. 4a with two secondary devices 800 present. When the secondary devices 800 are placed in the correct orientation on top of the active area 740 of the primary magnetic unit, the flux 1 would flow through the magnetic core of the secondary devices 800 instead of flowing through the air. The flux 1 flowing through the secondary core would hence induce current in the secondary coil.

FIG. 4c shows some contour lines for the flux density of the magnetic field generated by the conductors 711 in the active area 740 of the primary magnetic unit 700. There is a layer of magnetic material 730 beneath the conductors to provide a low impedance return path for the flux.

FIG. 4d shows a cross-section of the active area 740 of the primary magnetic unit 700. A possible path for the magnetic circuit is shown. The magnetic material 730 provides a low reluctance path for the circuit and also the magnetic core 820 of the secondary magnetic device 800 also provides a low reluctance path. This minimizes the distance the flux has to travel through the air and hence minimizes leakage.

FIG. 5 shows a schematic drawing of an embodiment of the whole system of the proposed invention. In this embodiment, the primary unit consists of a power supply 760, a control unit 770, a sensing unit 780 and a magnetic unit 700. The power supply 760 converts the mains (or other sources of power) into a de supply at an appropriate voltage for the system. The control unit 770 controls the driving unit 790 which drives the magnetic unit 700. In this embodiment, the magnetic unit consists of two independently driven components, coil 1 and coil 2, arranged such that the conductors in the active area of coil 1 would be perpendicular to the conductors in the active area of coil 2. When the primary unit is activated, the control unit causes a 90-degree phase shift between the alternating current that flows through coil 1 and coil 2. This creates a rotating magnetic dipole on the surface of the primary magnetic unit 700 such that a secondary device would be able to receive power regardless of its rotational orientation (See FIGS. 9a-9c). In standby mode where no secondary devices are present, the primary is detuned and current flow into the magnetic unit 700 is minimised. When a secondary device is placed on top of the active area of the primary unit, the inductance of the primary magnetic unit 700 is changed. This brings the primary circuit into resonance and the current flow is maximised. When there are two secondary devices present on the primary unit, the inductance is changed to yet another level and the primary circuit is again detuned. At this point, the control unit 770 uses feedback from the sensing unit 780 to switch another capacitor into the circuit such it is tuned again and current flow is maximised. In this embodiment, the secondary devices are of a standard size and a maximum of six standard-sized devices can receive power from the primary unit simultaneously. Due to the standard-sizes of the secondary devices, the change in inductance due to the change in secondary devices in proximity is quantized to a number of predefined levels such that only a maximum of 6 capacitances is required to keep the system operating at resonance.

FIGS. 6a to 6f show a number of different embodiments for the coil component of the primary magnetic unit. These embodiments may be implemented as the only coil component of the primary magnetic unit, in which case the rotation of the secondary device is important to the power transfer. These embodiments may also be implemented in combination, not excluding embodiments which are not illustrated here. For example, two coils illustrated in FIG. 6a may be placed at 90 degrees to each other to form a single magnetic unit. In FIGS. 6a to 6e, the active area 740 consists of a series of conductors with net current generally flowing in the same direction. In certain configurations, such as FIG. 6c, there is no substantial linkage when the secondary device is placed directly over the centre of the coil and hence power is not transferred. In FIG. 6d, there is no substantial linkage when the secondary device is positioned in the gap between the two active areas 740.

FIG. 6f shows a specific coil configuration for the primary unit adapted to generate electromagnetic field lines substantially parallel to a surface of the primary unit within the active area 740. Two primary windings 710, one on either side of the active area 740, are formed about opposing arms of a generally rectangular flux guide 750 made out of a magnetic material, the primary windings 710 generating opposing electromagnetic fields. The flux guide 750 contains the electromagnetic fields and creates a magnetic dipole across the active area 740 in the direction of the arrows indicated on FIG. 6f. When a secondary device is placed in the active area 740 in a predetermined orientation, a low reluctance path is created and flux flows through the secondary device, causing effective coupling and power transfer.

FIGS. 7a and 7b are embodiments of the proposed secondary devices. A winding 810 is wound around a magnetic core 820. Two of these may be combined in a single secondary device, at right angles for example, such that the secondary device is able to effectively couple with the primary unit at all rotations. These may also be combined with standard coils, as the ones shown in FIG. 2a 520 to eliminate dead spots.

FIGS. 8a-8f show the effect of flux guides 750 positioned on top of the active area. The thickness of the material has been exaggerated for the sake of clarity but in reality would be in the order of millimeters thick. The flux guides 750 will minimize leakage and contain the flux at the expense of reducing the amount of flux coupled to the secondary device. In FIG. 8a, a primary magnetic unit is shown without flux guides 750. The field will tend to fringe into the air directly above the active area. With flux guides 750, as shown in FIGS. 8b to 8f, the flux is contained within the plane of the material and leakage is minimised. In FIG. 8e, when there is no secondary device 800 on top, the flux remains in the flux guide 750. In FIG. 8f, when a secondary device 800 is present with a relatively more permeable material as the core, part of the flux will flow via the secondary device. The permeability of the flux guide 750 can be chosen such that it is higher than that of typical metals such as steel. When other materials such as steel, which are not part of secondary devices 800, are placed on top, most of the flux will remain in the flux guide 750 instead of travelling through the object. The flux guide 750 may not be a continuous layer of magnetic material but may have small air gaps in them to encourage more flux flow into the secondary device 800 when it is present.

FIGS. 9a-9c shows an embodiment of a primary unit whereby more than one coil is used. FIG. 9a shows a coil 710 with an active area 740 with current flow parallel to the direction of the arrow 1. FIG. 9b shows a similar coil arranged at 90 degrees to the one in FIG. 9a. When these two coils are placed on top of each other such that the active area 740 overlaps, the active area would look like the illustration in FIG. 9c. Such an embodiment would allow the secondary device to be at any rotation on top of the primary unit and couple effectively.

FIG. 10 shows an embodiment where the secondary device has an axial degree of rotation, for example where it is, or it is embedded within, a battery cell. In this embodiment the secondary device may be constructed such that it couples to the primary flux when in any axial rotation (rA) relative to the primary unit (910), as well as having the same degrees of freedom described above (i.e. translational (X,Y) and optionally rotational perpendicular to the plane of the primary (rZ).

FIG. 11a shows one arrangement where a rechargeable battery cell 930 is wrapped with an optional cylinder of flux-concentrating material 931 which is itself wound with copper wire 932. The cylinder may be long or short relative to the length of the cell.

FIG. 11b shows another arrangement where the flux-concentrating material 931 covers only part of the surface of the cell 930, and has copper wire 932 wrapped around it (but not the cell). The material and wire may be conformed to the surface of the cell. Their area may be large or small relative to the circumference of the cell, and long or short relative to the length of the cell.

FIG. 11c shows another arrangement where the flux-concentrating material 931 is embedded within the cell 930 and has copper wire 932 wrapped around it. The material may be substantially flat, cylindrical, rod-like, or any other shape, its width may be large or small relative to the diameter of the cell, and its length may be large or small relative to the length of the cell.

In any case shown in FIGS. 10 and 11a-11c, any flux-concentrating material may also be a functional part of the battery enclosure (for example, an outer zinc electrode) or the battery itself (for example, an inner electrode).

In any case shown in FIGS. 10 and 11a-11c, the power may be stored in a smaller standard cell (e.g. AAA size) fitted within the larger standard cell enclosure (e.g. AA).

FIGS. 12a and 12b show an embodiment of a primary unit similar to that shown in FIGS. 9a-9c. FIG. 12a shows a coil generating a field in a direction horizontal to the page, FIG. 12b shows another coil generating a field vertical to the page, and the two coils would be mounted in a substantially coplanar fashion, possibly with one above the other, or even intertwined in some fashion. The wire connections to each coil are shown 940 and the active area is represented by the arrows 941.

FIG. 13 shows a simple embodiment of the Driving Unit (790 of FIG. 5). In this embodiment there is no Control Unit. The PIC processor 960 generates two 23.8 kHz square waves 90 degrees out of phase with one another. These are amplified by components 961 and driven into two coil components 962, which are the same magnetic units shown in FIG. 12a and FIG. 12b. Although the driving unit is providing square waves the high resonant "Q" of the magnetic units shapes this into a sinusoidal waveform.

The preferred features of the invention are applicable to all aspects of the invention and may be used in any possible combination.

Throughout the description and claims of this specification, the words "comprise" and "contain" and variations of the words, for example "comprising" and "comprises", mean "including but not limited to", and are not intended to (and do not) exclude other components, integers, moieties, additives or steps.

In the drawings, "L6384" can denote a high voltage half bridge driver IC made by STMicroelectronics; "Pic16f84a" can denote a CMOS Flash/EEPROM-based 8-bit microcontroller from Microchip Technology Inc.; "RFD16N05" can denote an N-channel power MOSFET from Fairchild Semiconductor; "7805" can denote a generic three terminal regulator, made by many companies—one example is Maplin Electronics Ltd."

Some example RF power charge devices that may be used in some embodiments are described in U.S. patent publication numbers 2008/0169910, 2008/0051043, 2007/0191075, and 2007/0191074 which are hereby incorporated herein by reference. Part of U.S. patent publication number 2008/0051043 entitled RF power transmission network and method, with FIGS. 1-11 referring to FIGS. 67-77, recites:

"The present invention pertains to an RF power transmission network 10, as shown in FIG. 1. The network 10 comprises a first RF power transmitter 12a for generating power. The network 10 comprises at least one power tapping component 14a electrically connected in series to the first RF power transmitter 12a for separating the power received from the first power transmitter 12a into at least a first portion and a second portion. The network comprises at least one antenna 20a electrically connected to the at least one power tapping component 14a for receiving the first portion and transmitting power.

The at least one power tapping component 14a can be a directional coupler 36, as shown in FIG. 3. The network 10 can include a second RF power transmitter 12b electrically connected in series to the at least one power tapping component 14a, as shown in FIG. 2. The network 10 can include at least one controller 74a electrically connected to one or more of the first RF power transmitter 12a, the at least one power tapping component 14a, the at least one antenna 20a, and the second RF power transmitter 12b. The at least one power tapping component 14a can be a bi-directional coupler 36. Alternatively, the at least one power tapping component can be a power distributor 52, as shown in FIG. 4. The network 10 can include at least one additional RF power transmitter 12b electrically connected in series to the at least one power tapping component 14a, as shown in FIG. 2. The network 10 can include at least one controller 74a electrically connected to one or more of the first RF power transmitter 12a, the at least one power tapping component 14a, the at least one antenna 20a, and the at least one additional RF power transmitter 12b. The network 10 can include a terminating load 16. The network 10 can include at least one transmission line 18. In one embodiment, the power transmitted from the first RF power transmitter 12a does not include data.

The network 10 can include at least one controller 74a electrically connected to one or more of the first RF power transmitter 12a, the at least one power tapping component 14a, and the at least one antenna 20a. At least one controller 74a of the at least one controllers can be electrically connected to at least one other controller 74b of the at least one controllers. The network 10 can be configured to transmit the power via the at least one antenna 20a in pulses.

Figure 9:
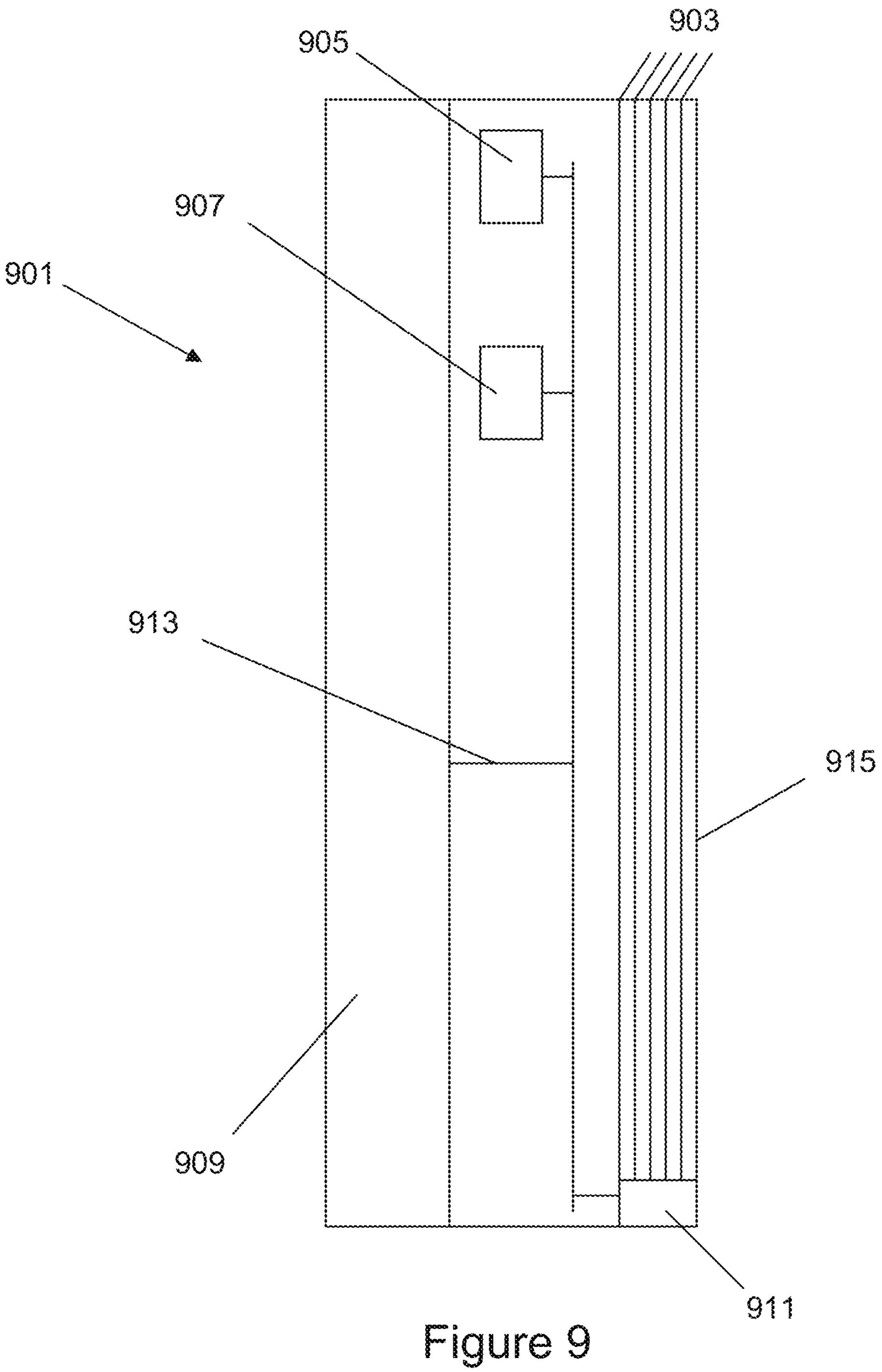
FIG. 9 shows an example deck device according to some embodiments.

At least one of the at least one power tapping component 14 can be a switch 82a, as shown in FIG. 9. The switch 82a can be controlled via a control line. The switch 82a can be controlled by sensing power. The sensed power can be pulses of power. The pulses of power can vary in duration. The pulses of power can vary in timing. The switch 82a can be controlled via a communications signal. The communications signal can be sent via coaxial cable.

The antenna 20a can be a transmission line 18, as shown in FIG. 1. At least a portion of the power received from the first RF power transmitter 12a can be used by the at least one power tapping component 14a as operational power. The network 10 can include a second power tapping component 14b electrically connected in series to the at least one power tapping component 14a, with the at least one power tapping component 14a disposed between the first RF power transmitter 12a and the second power tapping component 14b. The second power tapping component 14b receives the second portion from the at least one power tapping component 14a and separates it into at least a third portion and a fourth portion.

The first RF transmitter 12a may only include a first connector which electrically connects the first RF power transmitter 12a to the at least one power tapping component 14a; and the at least one power tapping component 14a includes a second connector which electrically connects the at least one power tapping component to the second power tapping component 14b.

Figure 11:
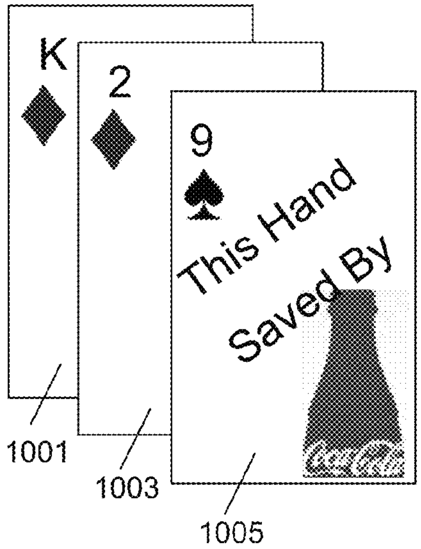

The present invention pertains to a system 100 for power transmission, as shown in FIG. 11. The system comprises a first RF power transmitter 12a for generating power. The system comprises at least one power tapping component 14a electrically connected in series to the first RF power transmitter 12a for separating the power received from the first RF power transmitter 12a into at least a first portion and a second portion. The system comprises at least one antenna 20a electrically connected to the at least one power tapping component 14a for receiving the first portion and transmitting power. The system comprises a device 94 to be powered. The system comprises a receiving antenna 92 electrically connected to the device 94 and configured to receive the transmitted power. The network 10 can include at least one controller 74a electrically connected to one or more of the RF power transmitter, the at least one power tapping component 14a, and the at least one antenna 20a, as shown in FIG. 1. At least one of the at least one power tapping components can be a switch 82a, as shown in FIG. 9. The system 100 can be configured to transmit the power via the at least one antenna 20a in pulses. At least a portion of the power received from the first RF power transmitter 12a can be used by the at least one power tapping component 14a as operational power. In one embodiment, power transmitted from the first RF power transmitter 12a does not include data.

The network 10 can include a second power tapping component 14b electrically connected in series to the at least one power tapping component 14a, with the at least one power tapping component 14a disposed between the first RF power transmitter 12a and the second power tapping component 14b, as shown in FIG. 11. The second power tapping component 14b receives the second portion from the at least one power tapping component 14a and separates it into at least a third portion and a fourth portion; and a second antenna 20b electrically connected to the second power tapping component 14b for receiving the third portion and transmitting power.

As shown in FIG. 3, there is an apparatus for wireless power transmission to a receiver having a wireless power harvester which produces direct current. The apparatus comprises a combiner 38 having a first input 40a having a first power. The apparatus comprises a second input 40b having a second power. The apparatus comprises an output having an output power that is a combination of the first power and the second power and greater than the first power and the second power individually. The apparatus comprises an antenna 20a electrically connected to the output through which the output power is transmitted to the receiver.

As shown in FIG. 6, there is an apparatus for wireless power transmission to a receiver having a wireless power harvester which produces direct current. The apparatus comprises a field adjustable coupler 60 to increase or decrease power to a desired level having a mainline 62 and a secondary line 64 a distance d from the mainline 62. The apparatus comprises an adjustable mechanism that varies the distance d. The apparatus comprises an antenna 20a through which the power is transmitted to the receiver.

The present invention pertains to a method for RF power transmission. The method comprises the steps of generating power with a first RF power transmitter 12a, as shown in FIG. 11. There is the step of separating the power received from the first power transmitter 12a into at least a first portion and a second portion with at least one power tapping component electrically 14a connected in series to the first RF power transmitter 12a. There is the step of receiving the first portion by at least one antenna 20a electrically connected to the at least one power tapping component 14a. There is the step of transmitting power with the at least one antenna 20a.

The method can include the steps of receiving the power transmitted wirelessly from the at least one antenna 20a at a receiving antenna 92 electrically connected to a device 94 and configured to receive the transmitted power; and converting the power received by the receiving antenna 92 with a power harvester disposed in the device 94 electrically connected to the device 94. The method can include the steps of adding a second power tapping component 14b electrically connected in series to the at least one power tapping component, with the at least one power tapping component 14a disposed between the first RF power transmitter 12a and the second power tapping component 14b. The second power tapping component 14b receives the second portion from the at least one power tapping component 14a and separates it into at least a third portion and a fourth portion. There can be the step of receiving the third portion at a second antenna 20b electrically connected to the second power tapping component 14b. There can be the step of transmitting power from the second antenna 20b.

Single Input Series Network

Referring generally to FIG. 1, a single input ("simple") series power distribution/transmission network 10, according to the present invention, includes a single RF power transmitter 12a and at least one power tapping component (PTC) 14a. The single input series network 10 terminates with a load 16. The PTCs 14a-c are connected in series.

Power travels in a direction D from the RF power transmitter 12a. Thus, in the single input series network 10, there is a single power direction. As illustrated in FIG. 1, power travels from left to right.

Connections 18 (generally referred to as transmission line herein) in the network 10 are made via a coaxial cable, transmission line, waveguide, or other suitable means. A load 16 may include, but is not limited to, an antenna, terminator, coupler, directional coupler, bi-directional coupler, splitter, combiner, power distributor, circulator, attenuator, or any other component that acts as a load. The transmission line 18 or the last PTC 14c should be terminated to eliminate reflections using a load 16. It should be noted that the circulator, as well as the splitter and the combiner could also feed the reflected power back into a series connection.

A PTC 14a removes power from a transmission line 18 (or other connection) and supplies the removed power to another component, such as a load 16, an antenna 20a, or other transmission line 18. Preferably, a PTC 14a passes any remaining power to the next component in the series, such as a load 16, an antenna 20a, another PTC 14b, or other transmission line 18.

Preferably, a PTC 14a has three or more input/outputs (connectors) in which power is input, output (accepted), and/or output (passed). For example, a PTC 14a has an input, a first output for accepted power, and a second output for passed power. The PTC 14a receives power at the input. The PTC 14a separates the power into a first portion and a second portion. The first portion is "accepted" and sent to the first output, for example, to an antenna 20a (discussed below). The second portion is "passed" and sent to the next component in the series, for example, another PTC 14b.

A PTC 14a may be a directional coupler, as illustrated in FIG. 1. A directional coupler may be implemented with a splitter or a combiner.

One output of each PTC 14ac is preferably connected to an antenna 20ac, respectively. Each antenna 20ac radiates power into a coverage area (or volume). A coverage area is defined by a minimum electric and/or magnetic field strength. As an example, a coverage area may be defined as an area (or space) in which the electric field strength radiated is greater than two volts per meter (2 V/m). The coverage area from a given antenna 20a may or may not overlap other coverage areas from other antennas 20b, 20c. Other outputs of each PTC 14ac may be connected to a load 16 and other transmission lines 18. When the PTCs 14ac are implemented as directional couplers, the directional couplers may be designed to tap (or remove) a certain percentage (dB) from the transmission line 18. For example, a −20 dB coupler and a 1000 Watt (W) input result with a 10 W output to the terminating load 16. The directional couplers in the network 10 may all have the same coupling (e.g., −20 dB) or may be designed on a case-to-case basis to use standard coupling (e.g., −3, −6, −10 dB) or non-standard coupling (e.g., −3.4, −8, −9.8 dB).

A circulator 22a or isolator may be connected between the RF power transmitter 12 and the first PTC 14a in the series in order to protect against reflected power that would cause damage to the RF power transmitter 12a.

FIG. 1 illustrates the single input series network 10 with an RF power transmitter 12a, a circulator 22a, three PTCs 14ac (implemented as directional couplers) each connected to an antenna 20ac, respectively, and a terminating load 16.

In use, the RF power transmitter 12a supplies power along a transmission line(s) 18 to each PTC 14ac in the network 10. Each PTC 14ac taps power from the line and sends the power to the respective connected antennas 20ac, load 16. The antennas 20ac, load 16 radiate the power to coverage areas corresponding to each antenna 20ac, load 16. When in a coverage area, a device to be powered receives the radiated power. The received power is used to charge or re-charge the device or to directly power the device.

Dual Input Series Network

Referring generally to FIG. 2, a dual input series power distribution/transmission network 10, according to the present invention, includes a first RF power transmitter 12a at a first end 32 of the network 30 and a second RF power transmitter 12b at a second end 34 of the network 10. One or more PTCs 14 are located in series between the first RF power transmitter 12a and the second RF power transmitter 12b.

Preferably, each PTC 14 is also connected to a respective antenna 20ac. Each antenna 20ac radiates power into a coverage area. The coverage area from a given antenna 20a may or may not overlap other coverage areas from other antennas 20b, 20c.

The PTCs 14ac may be bi-directional couplers that couple waves in both directions. This allows for dual power directions—a first power direction A stemming from the first RF power transmitter 12a and a second power direction B stemming from the second RF power transmitter 12b.

A first circulator 22a may be connected next to the first RF power transmitter 12a to be between the first RF power transmitter 12a and the PTC 14a next in line in the series in order to protect against reflected power that would cause damage to the first RF power transmitter 12a. Likewise, a second circulator 22b may be located between the second RF power transmitter 12b and the corresponding PTC 14b next in line in the series.

The first RF power transmitter 12a and the second RF power transmitter 12b may be on the same frequency. Due to component tolerances, however, they will actually be on slightly different frequencies and will drift in and out of phase, averaging to a finite value. This issue is discussed in detail in U.S. patent application Ser. No. 11/699,148 and U.S. Provisional Patent Application No. 60/763,582, both entitled Power Transmission Network, which are incorporated herein by reference. The first RF power transmitter 12a and the second RF power transmitter 12b may also be designed to be on different frequencies or on separate channels.

An advantage of a network 10 with dual (or multiple, discussed below) RF power transmitters 12a, 12b is that the network 10 distributes loss along the transmission line 18 rather than concentrating the loss at one end (as with a single input series network 10). Another advantage is that less power is needed for each RF power transmitter 12a, 12b. For example, a single transmitter 12a could input 1000 W, or two transmitters 12a, 12b could input 500 W each. The two inputs of 500 W would be the cheaper network 10, in terms of power and component costs, etc. The RF power transmitters 12a, 12b may have different power levels if found to be advantageous.

FIG. 2 illustrates a dual input series network 10 having a first RF power transmitter 12a, a first circulator 22a, three PTCs 14ac (implemented as bi-directional couplers) each connected to an antenna 20a, a second circulator 22b, and a second RF power transmitter 12b.

In use, the RF power transmitters 12a and 12b supply power along a transmission line(s) 18 to each PTC 14ac in the network 10. Each PTC 14ac taps power from the line and sends the power to the connected antenna 20ac, respectively. The antennas 20ac radiate the power to coverage areas corresponding to each antenna 20ac. When in a coverage area, a device to be powered receives the radiated power. The received power is used to charge or re-charge the device or to directly power the device.

Referring to FIG. 3, a given bi-directional coupler 36 may need a combiner 38 to combine the power from each power direction A, B. A first input 40a having a first initial power enters the bi-directional coupler 36 from the first power direction A. A second input 40b having a second initial power enters the bi-directional coupler 36 from the second power direction B. A tap of the first input (for example, −20 dB) and a tap of the second input (for example, −20 dB) are combined in the combiner 38 to output a combined power 42 to the antenna 22a or another transmission line 18 (or a combination of the two).

The first input leaving the bi-directional coupler 36, which may be an input to another bi-directional coupler 36, has been decreased by the amount of power tapped and by an amount of loss from the coupler 36 itself (insertion loss). The same holds for the second input leaving the bi-directional coupler 36. In other words, when the first input 40a exits the bi-directional coupler 36, the amount of power now present equals the initial power minus the amount tapped minus power lost within the coupler 36 (insertion loss). Alternatively, the bi-directional coupler 36 may be designed to not sense direction of the power, therefore not requiring a combiner 38. Therefore, the PTC 14a (bi-directional coupler in this case) may be termed simply a coupler.

Multiple Input Series Network

Referring generally to FIG. 4, a multiple input series power distribution/transmission network 10, according to the present invention, includes a first RF power transmitter 12a, a second RF power transmitter 12b, and at least a third RF power transmitter 12c connected via a power distributor 52, for example, in a star or cluster pattern. One or more PTCs 14ac may be located in series between the first, second, and/or third RF power transmitter 12a-c and the power distributor 52.

Preferably, each PTC 14ac is also connected to an antenna 20ac, respectively. Each antenna 20ac radiates power into a coverage area. The coverage area from a given antenna 20a may or may not overlap other coverage areas from other antennas 20b, 20c. The PTCs 14ac may be bi-directional couplers that couple waves in two directions. The power distributor 52 couples waves (or routes power) in multiple directions. This allows for multiple power directions—a first power direction A stemming from the first RF power transmitter 12a, a second power direction B stemming from the second RF power transmitter 12b, and a third power direction C stemming from the third RF power transmitter 12c. The power distributor 52 may be a combiner or a splitter. Compared to the dual input series network 10 (illustrated in FIG. 2), in the multiple input series network 10, the network 10 not only includes a first input 40a from the first RF power transmitter 12a and a second input 40b from the second RF power transmitter 12b, but also includes at least a third input 40c from the third RF power transmitter 12c.

Referring to FIG. 5, the number of ports on the power distributor 52 may be increased by using 1 to N splitters, giving N+1 ports on the power distributor 52. Each of the outputs on one splitter 54a is connected to one of the outputs of another splitter 54b. For example, as illustrated in FIG. 5, a three port power distributor 52 includes three 1 to 2 splitters 54a-c. Power from direction A enters a first port 56a, is split by splitter 54a, and is directed to splitters 54b and 54c. Power from direction B enters a second port 56b, is split by splitter 54b, and is directed to splitters 54a and 54c. Power from direction C enters a third port 56c, is split by splitter 54c, and is directed to splitters 54a and 54b. The multiple input series network 10, shown in FIG. 4, may include additional RF power transmitters and/or additional power distributors connected in various configurations. In other words, the network 10 may be expanded such that more than one power distributor 52 connects multiple RF power transmitters 12ac. Thus, the network 10 may include multiple star patterns or clusters.

FIG. 4 illustrates a multiple input series network 10 having a first RF power transmitter 12a, a second RF power transmitter 12b, a third RF power transmitter 12c, and a power distributor 52. A first PTC 14a (implemented as a bi-directional coupler) is connected between the first RF power transmitter 12a and the power distributor 52. A second PTC 14b is connected between the second RF power transmitter 12b and the power distributor 52. A third PTC 14c is connected between the third RF power transmitter 12c and the power distributor 52. Each PTC 14ac is also connected to an antenna 20a.

In use, the RF power transmitters 12a-c supply power along a transmission line 18 to each PTC 14 in the network 10. Each PTC 14ac taps power from the line and sends the power to the connected antenna 20ac, respectively. The antennas 20ac radiate the power to coverage areas corresponding to each antenna 20ac. When in a coverage area, a device to be powered receives the radiated power. The received power is used to charge or re-charge the device or to directly power the device.

Adjustable PTC

In general, the amount of power exiting a PTC 14a is equal to the amount of power which entered the PTC 14a reduced by the amount of power which was tapped by the PTC 14a. Thus, the initial amount of power from an RF power transmitter 12a is reduced each time it passes through a PTC 14ac.

For example, a network includes two PTCs implemented as −20 dB couplers. If the input to the first coupler is 100 W, the amount tapped would be 1 W (i.e., 100 W/100=1 W) and the amount of power exiting would be 99 W (i.e., 100 W−1 W=99 W). When the 99 W reaches the second −20 dB coupler, the amount tapped would be 0.99 W (99 W/100=0.99 W) and the amount exiting the second coupler would be 98.01 W.

Referring generally to FIG. 6, in order to make all outputs equal or at a desired level, a field adjustable PTC 60 may be utilized with the present invention. The field adjustable PTC 60 allows the power to be increased or decreased to a desired level by changing a coupling factor.

For example, the PTC 60 is a bi-directional coupler. In order to make the bi-directional coupler adjustable an adjustment mechanism, such as but not limited to, a screw or electrical controller is introduced to vary the distance or electrical properties. The coupling factor is dependent on a distance d between a mainline 62 and a secondary line 64 of the bi-directional coupler or the electrical properties of the coupler. It should be noted that changing a length of the coupler would also vary the properties.

By including a field adjustable PTC 60 in the network 10, the power coupled to each antenna throughout the network 10 may be maintained at an approximately constant level.

Referring to FIGS. 7 and 8, multiple paths may be present in a network. For example, referring to FIG. 7, a network 10 includes an RF power transmitter 12a connected in series with a first PTC 14a (implemented as a directional coupler) and a power splitter 54 (1 to 2). A first output of the power splitter 54 is connected to a second PTC 14b and terminates with a first terminating antenna (load) 16b. A second output of the power splitter 54 is connected to a third PTC 14c in series with a fourth PTC 14d and terminates with a second terminating antenna (load) 16d. The first, second, third, and fourth PTCs 14a-d are each connected to an antenna (a first antenna 20a, second antenna 20b, third antenna 20c, and fourth antenna 20d, respectively) and couple power to the respective antenna 20a-d in order to radiate power into various coverage areas. When in a coverage area, a device to be powered receives the radiated power. The received power is used to charge or re-charge the device or to directly power the device.

For another example, referring to FIG. 8, a network 10 includes an RF power transmitter 12a connected in series with a circulator 22 connected to a first PTC 14a (implemented as directional coupler). The first PTC 14a is connected in series to a second PTC 14b and a third PTC 14c and terminates with a first terminating antenna (load) 16c. The first PTC 14a is also connected in series to a fourth PTC 14d, and a fifth PTC 14e, and terminates with a second terminating antenna (load) 16e. The fourth PTC 14d is also connected to a sixth PTC 14f and terminates with a third terminating load 16f. The second, third, fifth, and sixth PTCs 14b, 14c, 14e, and 14f are each connected to an antenna (second antenna 20b, third antenna 20c, fifth antenna 20e, and sixth antenna 20f respectively) for radiating power into various coverage areas. It should be noted that a given PTC may not have an associated antenna for radiating power. When in a coverage area, a device to be powered receives the radiated power. The received power is used to charge or re-charge the device or to directly power the device.

OTHER EMBODIMENTS

Referring generally to FIG. 9, the invention, according to any embodiment, may be implemented as a switching network 10 (a network containing at least one switch 82). In the switching network 10, the PTC 14a, or at least one of the PTCs, is a switch 82a or contains a switch 82a. The components are connected in series.

The switch 82a may be, but is not limited to, electromechanical or solid state, such as a relay or PIN diode, respectively. The switch 82a may have any configuration suitable for the network 10, such as, but not limited to, SPST, DPDT, SP3T, etc.

Preferably, the switch 82a is also connected to an antenna 20a. The antenna 20a radiates power into a coverage area. The coverage area from a given antenna 20a may or may not overlap other coverage areas from other antennas 20b, 20c.

Preferably, the switch 82a either accepts or passes the power. When power is accepted, power is supplied to a particular component of the network 10, such as the antenna 20a. When power is passed, power is supplied to the next component in series. It should be noted that for PTCs 14 without a direct antenna connection, the switch 82a may pass power to one or more components sequentially or simultaneously.

Since each switch 82a, 82b either accepts or passes power, the network 10 may be designed to pulse power. In other words, any antenna 20a, 20b connected to a switch 82a, 82b may be turned on and off as desired. For example, one antenna 20a of the network may be turned on at a time. Pulsing networks were described in U.S. patent application Ser. No. 11/356,892 and U.S. Provisional Patent Application No. 60/758,018, both entitled Pulsing Transmission Network and incorporated herein by reference.

The switch 82a may be controlled by any suitable means. The switch 82a may be controlled by the RF power transmitter 12a using a control line 18. The control line may send communications and/or power to the switch 82a. The switch 82a may have a timer or a clock (e.g., a "smart switch"). A communication signal may be sent over a coaxial cable 18 at the same frequency or a separate frequency in order to tell the switch 82a when to switch. DC power may be sent over the transmission line to power the PTC 14a, in this case, the switch 82a, or any other component in the network. Additionally, any PTC or power distributing component may derive power from the transmission line by consuming some of the RF power, preferably, by rectifying the RF power to DC power. The switch 82a may sense supplied pulses of power from an RF power transmitter 12a to determine when to switch. Pulses may be designed to create node identifications that signal the switch 82a to switch. The pulses may have differing frequencies (timings) or consist of varying durations (long and short pulses).

The switch 82a may sense for power. When power is detected at an input, the switch 82a may cause a pulse of power, and then pass power through for a period of time before pulsing again.

Preferably, the switch 82a may sense the supplied pulses, the pulses forming a node identification, or power by tapping a portion of the power from the transmission line 18 and rectifying the RF power to DC power in order supply switching information to the switch 82a or switch controller 74a (discussed below). The rectified DC power informs the switch 82a or switching controller 74a that the RF power transmitter 12a is supplying pulses, sending a node identification, or sending power.

Additionally, the switch 82a may sense if DC power is available on the transmission line 18 along with the RF power. The DC power may be used to directly power the switch 82a or switch controller 74 or may be used as in input to the switch controller 74. If the DC power is used to directly power the switch 82a, a controller in the RF power transmitter 12a may control the switch(s) 82a, 82b by placing and removing DC power from the transmission line 18 in a pulsing manner.

It should be noted that any outputs of the switch 82a which are not active (i.e., connected to an antenna or other component of the network) may be open circuited or may be connected to a load 16 to ensure that unactive antennas do not significantly influence the radiation from the active antenna.

As illustrated in FIG. 9, for example, a single input series switching network 10 includes an RF power transmitter 12a, a first switch 82a, a second switch 82b, and a terminating antenna 16. The first switch 82a is connected to a first antenna 20a. The second switch 82b is connected to a second antenna 20b.

The first switch 82a may accept the power from the RF power transmitter 12a and send the power to the first antenna 20a. Alternatively, the first switch 82a may pass the power to the second switch 82b. The second switch 82b may accept the power and send the power to the second antenna 20b. Alternatively, the second switch 82b may pass the power to the terminating antenna 16. In this configuration, at any given time, the first antenna 20a, the second antenna 20b, or the terminating antenna 16 is radiating RF energy. The network 10 may be designed to pulse power from each of the first antenna 20a, second antenna 20a, and terminating antennas 16. The network 10 may be designed in such a way that for a given period of time, no antenna is transmitting power. This may be accomplished by turning the RF power transmitter 12a power down or off or by terminating the power into a load.

The network 10 may be configured to radiate RF energy from one or more antenna at any given time. As illustrated in FIG. 10, for example, a single input series switching network 10 includes an RF power transmitter 12a, a first PTC 14a, a second PTC 14b, a third PTC 14c. A first switch 82a is connected to the first PTC 14a and a first antenna 20a. A second switch 82b is connected to the second PTC 14b and a second antenna 20b. A third switch 82c is connected to the third PTC 14c and a third antenna 20c. A fourth switch 82d is also connected to the third PTC 14c. The fourth switch is connected to a fourth antenna 20d and a terminating antenna 16.

The first PTC 14a supplies power to the first switch 82a and the second PTC 14b. The first switch 82a may accept the power and supply the power to the first antenna 20a. Alternatively, the first switch 82a may pass the power to a terminating load (not shown) or open circuit.

The second PTC 14b supplies power to the second switch 82b and the third PTC 14c. The second switch 82b may accept the power and supply the power to the second antenna 20b. Alternatively, the second switch 82b may pass the power to a terminating load (not shown) or open circuit.

The third PTC 14b supplies power to the third switch 82c and the fourth switch 82d. The third switch 82c may accept the power and supply the power to the third antenna 20c. Alternatively, the third switch 82c may pass the power to a terminating load (not shown) or open circuit. The fourth switch 82d may accept the power and supply the power to the fourth antenna 20d or pass the power to the terminating antenna 16.

In this configuration, more than one antenna 20a-d may be active at any desired time. In a given installation of a network 10, the configuration of PTCs and switches should be determined by the desired coverage areas to be obtained from RF energy radiating from the antennas.

Referring generally to FIGS. 1, 2, 4, and 7-11 the invention, according to any of the embodiments, may include a controller 74a to control the operation of the network.

Referring to FIG. 1, the controller 74a is connected to one or more of the components of the network 10. The controller 74a may be used to change the frequency, polarization, or radiation pattern of the antennas 20ac. The controller 74a may be used to create pulses of power from the network 10.

Referring to FIG. 2, more than one controller 74a is utilized to control the components of the network 10. A controller 74a may be in communication with one or more other controllers 74a of the network 10.

Referring to FIG. 10, a controller 74a is connected to a switching network 10. The controller 74a is utilized to control (or assist in controlling) the switching of the switches 82a-d.

Referring to FIG. 11, an implementation of a series power distribution/transmission network 10 is illustrated. The network includes an RF power transmitter 12a connected to a first PTC 14a, a second PTC 14b, a third PTC 14c, and a terminating antenna 16. The RF power transmitter 12a and the first, second, and third PTCs 14a-c are connected in series. Each of the first, second, and third PTCs 14a-c are connected to an antenna 20a-c, respectively (illustrated as dipoles although any antenna or radiating device may be used with this or any embodiment herein). The antennas 20a-c and 16 radiate power to a receiving antenna 92 (illustrated as a dipole) of a device 94 to be powered. The device 94 preferably includes a power harvester that converts the RF power into a form useable by the device 94.

A small scale version of the invention, for example, as shown in FIG. 11, helps to reduce the average power transmitted by a single antenna, thereby reducing safety concerns. This may be important in desktop applications. For example, the device 94 may receive power contribution from multiple antennas 20a-c, 16. The antennas 20a-c, 16 may be positioned in a U-shape or be mounted on a flexible unit so that the user may affix them to the desk area.

A tapping coupler may be used in the present invention to eliminate connector loss. This issue is discussed in detail in U.S. Pat. No. 6,771,143, which is incorporated herein by reference.

A network according to the present invention preferably uses a low loss coaxial cable, transmission line, or waveguide 18.

If a leaky coaxial cable 16 is used in the network, antennas may not be necessary. In this configuration, the coaxial cable 16 would radiate the power.

The various embodiments discussed above, and envisioned as encompassed by the present invention, may be implemented separately or in combinations with each other (in whole or in part).

The invention should not be confused with power transfer by inductive coupling, which requires the device to be relatively close to the power transmission source. The RFID Handbook by the author Klaus Finkenzeller defines the inductive coupling region as distance between the transmitter and receiver of less than 0.16 times lambda where lambda is the wavelength of the RF wave. The invention can be implemented in the near-field (sometimes referred to as inductive) region as well as the far-field region. The far-field region is distances greater than 0.16 times lambda.

In any embodiment of the present invention, the RF power transmitted may be limited to include power only, that is, data is not present in the signal. If data is required by the application, the data is, preferably, transmitted in a separate band and/or has a separate receiver."

Yet another example of wireless power is described in U.S. patent publication umber 2009/0058361, which is hereby incorporated herein by reference.

The example wireless charge device of FIG. 8 may include a charge surface 803, an interface 805, and a power supply 807. Such a charge device may provide power to a card device without being in physical contact with the card device.

Charge surface 803 may include, for example, a flat surface proximate to which one or more card device may be placed (e.g., card device may be laid on the surface, within an inch of the surface, near the surface, etc.). Charge surface 803 may include an inductive charging element such as a coil or other arrangement of conductive elements to which a changing voltage may be applied. In some implementations, such a changing voltage may produce a varying magnetic field proximate to the charge surface 803. Such a varying magnetic field may provide an electric charge to card devices proximate to the charge surface (e.g., card device which include an inductive charge element allowing current to be produced from the magnetic field).

Other embodiments, such as those that use RF power, may not include such a surface. Rather, such embodiments may include an RF transmitting device configured to transmit an RF signal. Such RF transmitting devices may include antennas. Such RF transmitting device may be configured to provide a low frequency RF signal. Such RF transmitting device may be configured to provide a continuous RF signal. Such an RF transmitting device may include multiple devices configured to provide signal coverage to a desired area. In some embodiments, card devices may include RF power gatherers configured to generate power from an RF signal with a particular frequency or frequency range so that when used in an area in which the RF signal is present, the card device may gather power from the RF signal.

Interface 805 may include any control circuitry that may for example provide control of the charge surface 803. The interface may include a driver element configured to apply a voltage to the conductive elements. In some implementations, for example, interface 805 may be coupled to a communication network through which it may receive instructions from a remote system. Such a remote system, for example, may instruct interface 805 to turn charge surface 803 on when card devices are being used proximate to inductive charge device 801, turn charge surface 803 off when no card devices are being used proximate to charge device 801, increase and/or decrease power supplied to charge surface 803 based on a number of card devices being used proximate to charge device 801, and so on. Interface 805 may convert supplied power from power supply 807 to power used for charge surface 803. For example, interface 805 may include one or more transformers. In some embodiments, the interface may be configured to provide a time-varying magnetic field that has a frequency that is resonant with the card devices being powered. Card devices may include a capacitive element to tune the resonant frequency to a desired level.

In an RF power embodiment, such an interface may control an RF transmitting device to provide an RF signal. For example, such an interface may provide a voltage to generate the RF signal at the desired frequency to the desired transmitting device.

Power supply 809 may include any desired supply of power. For example, power supply 809 may include an electric cord connected to a power outlet. Power supply 809 may include a supply of AC and/or DC power. Supplied power may be converted, for example, by interface 805.

It should be recognized that charge device 801 may come in any desired configuration with any desired elements. For example, charge device 801 may be positioned at an edge of a bar or table and shaped and sized to fit comfortably so that players may play games or otherwise use card devices on the bar or table while the card devices are charged. For example, gaming area 705, player areas 605A, B, C, D, E, F, and/or dealer area 607 may include a charge device substantially similar to charge device 801. It should be recognized that RF power elements may be configured to cover desired areas such as bars, and so on.

In some implementations, a charge device 801 may be portable from one location to another location. For example, a player may be provided with a charge device that may be moved form location to location with the player. As another example, a charge device may be positioned in an area with many surfaces and moved similar to a mat and/or napkin from one surface to another by a player as desired. As another example, a transmitter may be moved from location to location and plugged in to provide RF power in an area of play. In some embodiments, a deck device described below may include a wireless power charger.

In various embodiments, one or more elements may be described as generating an RF signal and/or a time varying magnetic field. It should be recognized that the element that is so described may not do the generating alone, but rather may be one element along with others that does the generating. For example, in some implementations, a driver or other voltage provider may be described as performing the generating when that driver provides a voltage to a coil to create a time varying magnetic field and/or provides a voltage to an antenna to generate an RF signal. Similarly, the antenna and/or coil may accurately be described as generating the time varying magnetic field and/or RF signal.

H. Deck Device

FIG. 9 illustrates an example deck device 901. In some implementations, deck device 901 may be given to customers who want to play games on card devices 903. In some implementations deck device 901 may be configured to be substantially similar in size to a box of playing cards, and/or any other desired size. Deck device 901 may be used to hold a plurality of card devices 903. Deck device may include a communication element 905, a control element 907, a battery 909, a charge element 911, a coupling element 913, a holder section 915, and/or any other desired elements in any desired configuration.

Card devices 903 may include any desired implementation of a card device, such as those discussed above. Card devices may include any number of card devices that are desired for play of any desired game. In the illustrated embodiment, 5 card devices are included, but it should be recognized that any number of card device may be included in other implementations, other components may be sized in order to accommodate more or fewer card devices. In some implementations, card devices 903 may be removed from the deck device 901 and placed in the deck device 901 similar to cards being placed in and taken out of a box of cards. For example, holder section 915 may be used to hold card device 903. In some implementations, deck device 901 may include a top element that may be used to hold card device 903 in place and may be opened to allow card devices 903 to be removed.

Communication element 905 may include a communication device configured to communicate with the card devices 903 and/or a remote system (e.g., system 503). Communication element 905 may include a wireless communication device that may wirelessly communicate with other communication elements of a remote system (e.g., as described above with respect to 505A). Communication element 905 may include a wired communication element that may communicate over a wired network to a remote system (e.g., such as described with respect to 505C). For example, in some implementations, an Ethernet cable or other wired connection may be plugged into a wired communication device to allow such communication.

In some implementations, communication element 905 may act as an intermediary between card devices 903 and a central system (e.g., system 503). A central server may perform some processing related to functionality of card devices 903 and may communicate information about such processing to the card devices through using the deck device 901. For example, communication element 905 may act as a repeater of communications from the central system and/or a repeater of communication from the card devices 903. Such a configuration may allow card devices to use a communication element with a lower signal strength, which may conserve power. Such a configuration may enable longer ranges and/or longer times between needed charges of card devices 903.

In some embodiments, some processing related to functionality of card devices 903 may occur at the deck device 901 (e.g., at controller 907, communication element 905, etc.). Information regarding such functionality may be transmitted to the card devices through communication element 905. Similarly, information from card devices 903 may be communicated to the deck device and/or the central system using communication element 905. It should be recognized that in some implementations, card devices may communicate directly with a central system, a communication element may not be included in deck device 901, and or any other desired configuration and/or elements may be used.

Controller 907 may include one or more processors and/or one or more memories. Controller 907 may control one or more elements of the deck device 901 and/or card devices 903. For example, controller 907 may provide instructions to communication element 905, battery 909, charge element 911, card devices 903 (e.g., through communication element 905), and/or any other desired element.

Controller 907 may perform any desired processing related to the card devices 903. For example, in some implementations, controller 907 may perform actions such as some or all of those described above with respect to controller 611 and/or system 503 alone and/or in connection with an external system. In one implementation, for example, controller 907 may provide location based services by performing processing that may enable determination of a location of the card devices 903 (e.g., based on triangulation, reading GPS coordinates, etc.). The controller 907 may for example, communicate a location of the card device 903 to an external system, may use the location information to affect displays on the card devices 903 (e.g., by ordering cards based on location, by determining which card device is being put into play next such as is explained above with respect to FIG. 6, by causing location dependent advertising to be displayed on the card device 903, and so on).

In some implementations, controller 907 may provide processing related to other functionality of the deck device. For example, in some implementations deck device 901 may include a display of its own that may be controller by the controller, may include haptic elements, that may be controlled by the controller, may include input and/or output elements that may be controller by the controller, and so on.

In some embodiments, deck device 901 may processes location based information. For example, in some implementations, information identifying a location of one or more card devices may be received (e.g., by a communication device, by the processor, etc.). In some implementations, the deck device may determine the location. For example, in some implementations, a deck device may triangulate a location of the card device(s) based on signal strength from communication elements of the deck device (i.e., a deck device may include multiple communication devices for use in triangulation) and/or the card devices (i.e., a card device may include multiple communication devices for use in triangulation). In some implementations, a deck device may receive GPS information about a card device.

In some implementations, a deck device may include a location determination element configured to facilitate determination of the deck device. In some implementations, the location information received by the deck device may be relative to the deck device. In some implementations, the deck device may use location information about the deck device to determine a location of the card devices. In some implementations, the location information of the card device may be absolute location information.

Such information may be forwarded to an external system. In some implementations, a deck device may use location information to determine to which hand of a plurality of hands a card device belong. Some examples of such a determination are given above with respect to system 503. In various embodiments deck device 503 may perform some or all features of system 503 in connection with system 503 or apart from system 503.

Battery 909 may include any desired type of battery that may provide power to elements of card device 901. Battery 909 may include a lithium ion battery pack in some implementations. Battery 909 may include a nickel-based battery pack (e.g., a AA battery pack) in some implementations. Battery 909 may be replaceable and/or rechargeable.

Charge element 911 may include a charge device configured to provide power to card devices 903. For example, charge element 911 may include an inductive charge device that charges the card devices 903 using induction when the card devices 903 are near the charge element 911 (e.g., inside the deck device 901). As another example, charge element 911 may include a contact-based charge device that forms a traditional electrical contact with the card devices 903 when they are in the deck device 901 in order to provide power to the card devices 903. As yet another example, charge element 911 may include an RF charge element configured to provide an RF signal to charge card devices 903 in and/or near deck device 901.

In some implementations, card devices 903 may include an electrical contract area or areas along one or more edges that may come into contract with electrodes of the charge element 911 when the card devices are placed in the deck device 901. Such an electrical contact area may include a pair of electrodes through which a battery of one or more card devices 903 may be charged. In other implementations, a charge element may include an induction element that may chard card device 903 using a time varying magnetic field as discussed elsewhere herein. Charge element 911 may transfer power from the battery 909 to the card devices 903. In some implementations, such power transfer may be enabled when one or more card devices are in the deck device 901 (e.g., by location determination, by a switch or other sensor in the deck device, etc.).

Coupling element 913 may include a communication network (e.g., wired, wireless), a power transfer network, and/or any other desired element to couple one or more elements to one or more other elements. Coupling element 913 may allow communication of information between/among components of deck device 901 and/or transfer of power between/among elements of deck device 901.

In some embodiments, deck device 901 may allow a player to carry card devices 903 around a casino or other area while charging the devices from the battery 909. A player may remove the card devices 903 from the deck device 901 to play one or more games with the card devices 903. If the card devices 903 run low on power, they may be returned to the deck device 901 for charging. In some implementations, extra card devices 903 may be provided, so that when some of the card devices in use run low on power they may be swapped with the extra card devices that may be charged. The low power devices may be placed back in the deck device 901 to be recharged, so that a player may not need to stop gaming due to card device power. In some implementations, a battery of the card device may be charged on an inductive power charge device (e.g., such as one described above), may be charge by a contact charge device, may be charged by swapping batteries, may be charged by solar power, may be charged by an RF power charger, and so on. For example, if a box device becomes low on power, a player may swap a battery pack or batteries within a battery pack. In some implementations, the battery 909 may provide a substantially larger amount of power than batteries of the card devices 903.

In some embodiments, a deck device may include audio output elements. Such elements may include any desired speaker technology. Such elements may be used to output sounds as desired (e.g., sounds identified by an external system).

In some embodiments, a deck device may be used to display advertising or other information substantially similar to a card device as discussed elsewhere.

It should be recognized that the example deck device is given as an example only, and that other embodiments may include any devices capable of communicating with, carrying, and/or providing functionality to card devices.

I. Example Card Device Uses

FIG. 10 illustrates an example game played on card devices 1001, 1003, and 1005. This example game includes a game of blackjack, but it should be understood that any desired game may be played using any number of card devices in other embodiments. The game may be played against a dealer (e.g., as is common in blackjack), against other players (e.g., as is common in poker), against a predetermined metric (e.g., as is common in video poker), and so on.

In this example implementation, a player may be dealt an initial set of card devices for a hand in a round of a game (e.g., 1001 and 1003) by a dealer. In some implementations, card devices forming a hand of the player may be tracked as they are dealt to the player (e.g., by an external system such as system 503). In some implementations, as described above, a dealer at table 601 may deal card devices 1001 and 1003 to the player. In some implementations, as the card devices 1001 and 1003 enter a player area associated with the player, they may be assigned to a hand that is associated with the player by an external system (e.g., system 503). In some implementations, a dealer may assign the card devices to the hand (e.g., through a dealer interface in communication with an external system). In some implementations, rounds of game play may be tracked as they begin and/or end (e.g., by an external system such as system 503). In some implementations, a dealer may indicate that a new round of the game has begun before dealing the card devices (e.g., through a dealer interface in communication with an external system). In some implementations, an external system may determine that a new round of the game has begun based on an ending of a previous game round (e.g., all players stand in a game of blackjack) and/or movement of previously dealt card devices (e.g., a collection by the dealer).

In other example implementations, a player may be dealt an initial set of card devices (e.g., 1001 and 1003) by another player, by a dealer, and/or by himself or herself (e.g., from a deck of card devices, from a deck device, etc.). In some implementations, card devices forming a hand of the player may be tracked as they are dealt to the player (e.g., by an external system such as system 503). In some implementations, for example, a location of a card device may be used by an external system to determine a hand to which a card device is to be assigned (e.g., card devices in one area are assigned to a first hand, card devices in a second area are assigned to a second hand, card devices on one side of a deck device are assigned to a first hand, card devices on another side of a deck device are assigned to a second hand, card devices that are within a distance from one another are in a same hand, etc.). As cards enter such a location, they may be assigned to a hand by an external system. In some implementations, a player may indicate that a card device should be part of a hand. For example, a player may use an interface of a card device to indicate that it should be part of a hand, may use an interface of a deck device to indicate that a next selected card device should be part of a hand, and so on. Such indication may be received by an external system and used to track and/or facilitate gaming activity. In some implementations, beginning and/or ends of rounds of game play may be tracked (e.g., by an external system). For example, a player may indicate that a round has ended and/or begun through an interface of a card device, deck device, and/or other interface. As another example, movement and/or actions occurring at card devices may be used to determine that a round of a game has ended (e.g., when all players stand in a game of blackjack).

In some implementations, a card device may be assigned to a second hand after being assigned to a first hand. For example, in some implementations, a card device may be mistakenly assigned to the first hand when it should have been assigned to a second hand. In some implementations, a dealer and/or player may use a dealer interface, a card device interface, a deck device interface and/or some other interface to indicate to an external system that the card device should be assigned to a different hand. In some implementations, to facilitate such proper assignment to hands, an indication may be presented on a card device to allow players and/or dealers to determine which card devices make up a hand (e.g., all card devices in a hand may display a same symbol, etc.).

In some implementations a card device may be assigned a card value (e.g., by an external system such as system 503), and/or may display the card value. The card value may be assigned before a card is dealt, after the card is dealt, etc. For example, in one implementation, when a card is assigned to a hand by an external system, the external system may transmit card value information to the card device for display on the card device. The card value information may be determined, as described above, in any way, such as using a lookup table, a random number generator, pseudo random information, and so on.

In some implementations, after an initial set of card devices have been dealt to a player, a player may decide to take an action based on card values of the card devices, card values of other card devices dealt to other players, and/or any other information. For example, a player may choose to increase a bet, request additional cards, exchange cards for new cards, buy insurance, end a game, and so on. In response to a player indicating a desired action, one or more card values of the initial set of card devices may be replaced with new card values, one or more card devices of the initial set of card devices may be replaced with new card devices, one or more of a second set of card devices may be added to a hand, one or more card devices of the initial set of card devices may be removed from the hand, and so on.

A player may indicate to a dealer, another player, and/or an external system what if any action is desired in any desired way in various embodiments. For example, in some implementations, a player may tell a dealer, and a dealer may use an interface to identify the action to an external system (e.g., an interface of a card device to be dealt to the player, a separate dealer interface, etc.). In some implementations, a player may tell a dealer, an a dealer and/or player action to determine the action (e.g., a deal of a card to a player in a game of blackjack may be determined to be a hit action, a deal of a card to another player may be determined to be a stand action by the first player, etc.). In some implementations, a player may use an interface of a card device, an interface of a deck device, a separate interface, etc. to indicate the desired action. In some implementations, a movement of a card device may indicate the desired action.

Any number of rounds of any desired actions may be taken by a player in a game according to the rules of the game. In some embodiments, other players and/or a dealer may be dealt one or more initial and/or additional card devices and may be able to select one of more actions according to the rules of a game being played. Play may include any number of actions by players according to the rules of the game.

In the example of FIG. 10, a player may indicate that the player desired to "hit" in the game of blackjack after the initial set of cards is dealt. In response to indicating the desired "hit" an additional card device may be dealt to the player (e.g., 1005). Dealing may be by the player, from a deck device, by another player, from a deck of card devices, by a dealer, etc. An external system may determine that the card device 1005 should be added to a hand made up of the initial set of card devices 1001 and 1003. Some examples of such a determination are given above with respect to the initial dealing of card devices 1001 and 1003. Similarly, in instances where card devices are removed from a hand, location, separate indications, movement, and so on may be used to determine that a card device should be removed from the hand.

In some implementations, an external system (e.g., system 503) may track the play of the game. In response to certain events occurring in the game, the external system may cause a presentation to be made on one or more card devices. For example, the external system may determine that an event has occurred based on a set of card values dealt in the game, actions taken in the game, and so on. An event may include, for example, a win, a loss, a particular hand, a tie, and so on. In response to the determination, the external system may transmit information to one or more desired card devices (e.g., card devices associated with the event) indicating that a presentation (e.g., a display of an image, a video, a sound, a haptic response, and so on) should be made by the card devices. In some implementations, other devices (e.g., monitors, speakers, etc.) may be involved in such a presentation.

1. Outcome, Advertising, and Other Information Display

In the example of FIG. 10, the external system may determine that the hand has a total value of a 12 after the initial two card devices 1001 and 1003 are dealt. The system may determine that the hand has a total value of a 22 after a hit action was requested and card device 1005 was added to the hand. Because a 22 is considered a busted value, the system may indicate to the card devices that a indication that the hand busted should be displayed on one or more of card devices 1001, 1003, and 1005. As shown, in FIG. 10, the word "BUST" may be displayed on card device 1005.

In other implementations, any other information may be presented by any card devices in response to any events in any games. For example, information about the hand total may be displayed, information identifying a win may e displayed, information suggesting an action may be displayed, advertising may be displayed, information identifying odds and/or statistics related to various actions and/or outcomes may be displayed, available option may be displayed, information about how to play the game may be displayed, historic card counts may be displayed (e.g., to assist in card counting such as in blackjack and/or spades) and/or any other desired information may be displayed.

In some embodiments, before playing a game, a player may select to play the game. Selection may include selection through an interface, selection by location, selection by time, selection verbally, selection by action, and so on. For example, a player may sit at a table and/or place a bet at the table at a time when blackjack is played at the table to select to play blackjack. A dealer may use an interface to indicate to an external system that a player selected to play a game, a central system may determine a selection based on dealing of cards at the table, and so on. As another example, a player may use an interface of a card device, a deck device, a separate interface, etc. to select a game for play. The interface may be displayed on the display of the card devices and a user may touch the area of the card device corresponding to blackjack to make the selection. In response, an external system may be sent an indication of the selection.

It should be recognized that any game may be played using card devices. For example, various versions of poker may be played, baccarat may be played, spades may be played, and/or any other game may be played. It should be recognized while several implementations involving an external system have been described, various embodiments may include a distributed system, a system in which card devices perform actions that may have been associated with an external system, and/or any other desired configuration is used.

In some embodiments, as illustrated in FIG. 11, an initially displayed card value may be changed to replacement card value. For example, an initially displayed card value that results in a first hand value may be change to a replacement card value that results in a different hand value (e.g., a better hand value, a worse hand value, an equivalent hand value, etc.). For example, in the illustrated FIG. 11, the value of card device 1005 may have been a king as in FIG. 10 when the card device 1005 is initially dealt. In this example, the game being played may be blackjack and the king may have caused the player to bust or otherwise lose the game. The value of the card device 1005 may be changed so that the player does not bust or does not lose the game. In the illustrated example, the value of the king may be change to a nine. In this example, the nine causes the player to receive the top available hand total, a 21, instead of busting.

In some embodiments, an external system (e.g., 503) may determine that the card device should display an initial card value in normal play (e.g., based on a random number generator, lookup table, etc.) and control the card device to display the initial value. The external system may determine that the initial value should be changed to the replacement value regardless of the value that was determined for normal play (e.g., not based on a random number generator, not based on a predetermined card value ordering, taken out of order, etc.). The external system may control the card device to display the replacement value. The determination may be made based on characteristics of a player, an amount of a bet, a promotion, a desire of an advertiser, and so on. For example, an advertiser may desire to engage in an advertisement campaign that involves improving hands of players (e.g., players of a particular type, players of a particular game, at a particular time, etc.). The advertiser may instruct the external system to engage in such behavior (e.g., through an interface with an advertising server, by submitting a set of criteria describing when such behavior should take place). The external system may determine that the card device 1005 meets criteria for such a change and may instruct the card device 1005 to carry out the change. The advertiser may be charged for such a change.

In some implementations, an advertisement may be displayed informing the player that the card value change was performed with reference to an advertiser. For example, in FIG. 11, an advertisement is displayed informing a player that the hand was saved by coca-cola. In various embodiments, advertisers may arrange for hands to be saved in such a way to promote products. Such advertisement may take into account player wagers, player demographics, player history, player preferences, a time a player has played, an amount of a wager, and/or any other desired information. Accordingly, a system may monitor for some event occurring that matches an advertiser's desired criteria and cause an appropriate display to occur on a card device.

In some embodiments, for example, an external system may monitor player actions to determine a profile of a player. A profile may include, for example, an average wager, a play style, and/or any other information. An advertiser may submit information asking the system to save players that meet a particular profile if the player would lose a wager of greater than a threshold amount. The system may receive information that a player with the profile has lost a wager of the threshold amount and in response may cause the player to be saved and an advertisement to be displayed.

In some embodiments, rather determining the initial card value as if it were in normal play, the external system may determine the replacement value as if it were in normal play (e.g., based on random number generator, lookup table, next card from a predetermined ordering of card values, etc.). The system may determine that the replacement value and other criteria (e.g., player profile, amount wagered, time, etc.) meet an advertiser's requirement for providing a change to a card value. Rather than displaying the replacement card value, the system may cause the card device 1005 to display an initial card that would not have otherwise been presented (e.g., not based on normal play, not based on a random number generator, etc.). In such an implementation, the system may cause an initial less favorable hand value that would not have occurred in normal play without the advertiser intervening and then cause a card value to change to the card value that would have been provided under normal circumstances. The player may not know that such a value would have occurred and therefore may still attribute any positive reaction to the change to the advertiser.

It should be recognize that while the above examples of changing a card value from a first value to a second value after the card device is dealt to the player are given as non-limiting examples only. Other embodiments may include changing any card value to another card value in a game after a card device has been dealt to a player based on any desired events and/or information even if that change was not requested by a player and/or would not have happened under normal play of the game. Such action may take place in any game in any fashion.

It should also be recognized that advertising in general is not limited to such card value changing situation, but that any event or information may be used to determine that an advertisement should be displayed at any time and in any way. As another example, advertising may be presented without a change in card value, such as when a player wins a hand, when a player receives a good card, when a player receives a good hand (e.g., blackjack, royal flush, etc.), when a dealer busts, and/or at any other desired time. Advertisements may be presented when a player wins a certain amount of money, when a player loses a certain amount of money, after a player has been playing for a certain amount of time, when the time reaches a desired time (e.g., near dinner time), and/or according to any other desired criteria. Such advertising may include any form, such as haptic, video, images, sounds, and so on from a card device and/or any other device (e.g., speakers, video monitors, etc.).

In some embodiments, as illustrated in FIG. 12, various forms of information may be presented by a card device during play of a game or otherwise. FIG. 12 illustrates an example of information that is not part of traditional game play displayed on a card device during play of a game. It should be recognized that any information may be displayed in a card device in any way and/or at any time. For example, such information may include an advertisement, a recommended action, a direction indicator, statistical information, social messages (e.g., chat messages from other players), a time, emergency information, and so on.

In the illustrated example of FIG. 12, card device 1003 displays an advertisement 1201 for ticket sales to a show. In the illustrated example of FIG. 12 card device 1003 displays a direction indicator 1203 associated with the advertisement that may identify a direction in which a player may travel to purchase tickets for the show. In the illustrated example of FIG. 12 card device 1003 displays a recommended action for an action in the play of the game 1205. It should be recognized that these examples are non-limiting and that other embodiments may display other information as desired.

In the example of FIG. 12, the card device displays an advertisement 1201. An external system may determine that such an advertisement should be displayed and instruct the card device to display the advertisement. In some implementations, the advertisement may be based on user information, such as preferences, demographic information, wagering history, and/or any other information. In some implementations, the advertisement may be based on events such as a card value, a hand value, a game win, a game loss, a dealer bust, a raise, a check, a fold by an opponent, a total win amount, a total loss amount, a passage of time, a time, a location, a movement, and so on. A system may receive such information and information from advertisers regarding criteria for displaying an advertisement. The system may determine if the player information matches the desired advertiser criteria and if it does, may cause the card device to display the advertisement.

For example, an advertiser in the example may be a casino that is putting on a show. The casino may desire to let all customers know that the tickets for the show will be on sale soon. The casino may submit a request to the system to display such an advertisement on card devices. The system may control the card devices to display the advertisement as desired by the casino.

In some embodiments, a same, different, and/or no advertisement may be placed on one or more other card devices (e.g., 1001) associated with a single player as desired. In other implementations, only one advertisement may be placed on card devices associated with the player. For example, in the illustrated embodiments, only card device 1003 includes an advertisement. In some implementations, an external system may determine which of a plurality of card devices associated with a player that may match criteria for an advertisement to place the advertisement on. For example, the central system may determine that a closest card device to a player location, a highest card device, a card device displaying a highest card value, a last dealt card device, a card device determined to be most visible to one or more players, a card device displaying a particular value, and so on should display the advertisement. For example, in the illustrated example, card device 1003 is partially obscuring card device 1001. Accordingly, the system may determine that the advertisement should be displayed on card device 1003. Determining location of card devices is discussed above, and may be used to determine if one card device is obscuring another card device (e.g., determine if two cards have a similar location but one is higher than another).

In some implementations, advertisements may be oriented to face a player location. For example the advertisement 1201 of FIG. 12 may be oriented so that it faces towards the outside of a table on which a game is played. Card orientation, and/or location may be determined based on location data obtained from the card device, from video data of the card devices, and/or form any other source, as discussed above.

A direction indicator 1203 may identify a direction of a desired person, thing, place, etc. The direction indicator may be associated with the advertisement 1201 as illustrated and/or may be unassociated with the advertisement 1201. For example, the direction indicator 1203 may point to a box office where a player may purchase tickets for the show advertised, may point to a location where a player may purchase a product advertised, and so on. In other implementations where the direction indicator is not associated with an advertisement, the indicator may indicate, for example where a waiter is located, where a store is located, where a restaurant is located, where a another player is located, and/or where any other person, place, or thing is located. For example, a direction indicator may indicate a direction of something a player requests that it indicate (e.g., through a user interface, through a dealer, etc.), something an external system desires to indicate to the player (e.g., based on events, user information, etc.), and so on. For example, as discussed below a card device may be customizable and/or may include an interface through which a user may request certain elements (e.g., a direction indicator pointing to something). As discussed above, location and/or orientation information may be determined based on elements of a card device and/or of an external system.

In some implementations, a central system may determine a location of a card as discussed elsewhere herein and a location of a desired thing (e.g., merchant, waiter, etc.). The location of the thing may be predetermined (e.g., entered by an administrator, entered by an advertiser, etc.). The location of the thing may be determined based on tracking of the thing (e.g., similar location determination of the thing, with a tracking device, etc.) The location of the thing may be received from an external source. The location of the card and the location of the thing may be used to provide a direction indicator on the card device. In other implementations, a cad device, deck device, and/or other device may make some or all of such determinations. In some implementations, an orientation of a card device may also be used for such determinations.

Recommended action indicator 1205 may suggest an action for the player to take in a game. For example in the illustration of FIG. 12, the action recommended is a hit. The recommended action may be an action taken by most players in the situation, an action according to an optimal strategy, an action according to basic strategy, an action that takes into account card counts, an action that does not take into account card counts, and/or any other action. In some implementations, a player may request a particular set of principals or strategy to be used in determining a recommended action (e.g., through a user interface, etc.). In some implementations, a central server or other device may determine such recommended actions based on a state of a game, based on historic data, and/or based on a desired strategy.

2. Customization

In some embodiments, elements of a card device may be customizable (e.g., using a user interface of the card device, another user interface, through a dealer, through a deck device, and so on). FIG. 13 illustrates an example of a customized card devices 1301 and 1303. As illustrated, card device 1301 includes a Ferrari logo on the back of the card device 1301 (and may include displays on both sides of the card device). Card device 1303 includes a Ferrari logo on a front of the card device 1303. Such logos may be selected by a user for display from a plurality of options. In some implementations, a user may create his or her own images for display (e.g., from photos on a digital camera, etc.). Such images may be transferred to an external system to be used on the card device through any desired communication interface (e.g., a network connection, a memory card slot, a usb port, etc.). A processor of a card device 1301, an external system and/or any other desired controlling element may cause the display to occur (e.g., at all times, when the card device is in use, when nothing else is being displayed, etc.). In some implementations, advertisements may be displayed instead of such logos in some situations (e.g., when an event occurs, etc.). In some implementations, the use of such logos by a player may prevent other advertisements from being displayed.

In some implementations, a player may purchase customization option similar to ring tones of a cell phone. In some implementations, a player may earn customization options through game play. For example, in some implementations, only high rollers may select certain options, only a winner of a tournament may select certain options, only a top winner of the day may select certain options, and so on. It should be recognized that customization may include any element of a card device as desired in various embodiments. For example, elements to be displayed may be added, removed, and/or modified as desired. Some example customizations may include an addition of a direction indicator, an addition of a action recommendation indicator, an arrangement of card value indications as shown in card device 1301, a change in font size, a change in font, a change in colors, and so on.

In some embodiments, a plurality of hands of a game may be played on a single set of card devices. Each of the plurality of hands may use some or all of the card devices. Each of the plurality of hands may share card values of some or all of the card devices with one or more others of the plurality of hands.

3. Playing Multiple Hands

FIG. 14 illustrates one example of multiple hands of a game being played on a plurality of card devices 1401, 1403, 1405, 1407, and 1409. In the illustrated example, 4 games of a jacks or better stud poker game are illustrated using five card devices 1401, 1403, 1405, 1407, and 1409. It should be recognized that any other game may be played in any other embodiments whether solitary, draw, stud, against another player, against a dealer, and so on.

As illustrated in the example of FIG. 4, a first set of card devices 1401, 1403, 1405, and 1407 may be dealt. Each of the card devices may have a single card value associated with them (e.g., king of diamonds, 10 of diamonds, 2 of spades, and 2 of hearts, respectively). The card values of the first set of card devices 1401, 1403, 1405, and 1407 may be part of each of the plurality of hands.

A second set of card devices 1409 may be dealt. Each card device 1409 of the second set may be associated with a plurality of card values. Each of the plurality of card values may be part of a single respective one of the plurality of hands. For example, in the illustration of FIG. 14, card device 1409 is divided into 4 sections. Each of the four sections may be part of a respective one of the plurality of hands. In each of the four sections, a respective card value is displayed (e.g., king of hearts, 2 of clubs, jack of spades, and 7 of clubs). An outcome of each of the hands may be based on the card values of the first set of card devices 1401, 1403, 1405, and 1407 and a respective one of the card values of each of the second set of card devices 1409. As illustrated in the example of FIG. 14, an indication of whether each hand wins may be presented. In this example, 2 hands win (e.g., have a pair of jacks or better) and 2 hands lose (e.g., do not have a pair of jacks or better). It should be recognized that although 4 sections are shown here, any number of sections and any arrangement may be used in other embodiments.

In some implementations, each card value of a card device of the second set may be displayed sequentially, simultaneously, and/or as desired. In some implementations, each card value of a card device of the second set may be determined independently of other card values of the card device (e.g., to mimic separate decks for each hand), may be selected dependently of other card values of the card device (e.g., to mimic all hands from a same deck), and so on. In some implementations, a player may select to add more hands at the end of play, during play, before play, and so on (e.g., through an interface of a deck device, through a dealer, through an interface of a card device, and so on).

In some embodiments, a bonus game may be based on card values of the second set of card devices. For example, a player may play for a progressive jackpot using such multiple hand game play. For example, if a player accomplishes 5 hands of a royal flush, the player may receive a progressive payout. As another example, bonus game may be based solely on the card values of the second set of card devices (e.g., four aces wins a bonus game, etc.).

It should be recognized that while a stud game is shown in FIG. 14, a draw game may similarly be played. For example, in a draw game a player may select to replace one or more of the first set of card devices. Rather than and/or in addition to dealing more card devices to make the second set of card devices, a portion of the first set of card devices selected for replacement may make up the second set of card devices. Each of the selected card devices may be divided into section corresponding to replacements dealt in a respective hand. In other implementations a separate card device may be dealt to replace a selected card device.

FIG. 15 shows an example of multiple hands being played together using a set of card devices 1501, 1503, and 1505. Each of a plurality of card devices 1501, 1503, 1505 may each include a plurality of card values. Each card value may be part of a respective hand. Each hand may be made of card values from the card devices 1501, 1503, and 1505. For example, each card device may be divided into sections (e.g., 4 sections in the illustration). Each section corresponds to a different hand. A hand may be made up of card values assigned to a section in a same position of each card device 1501, 1503, and 1505. For example, the illustrated example shows 4 hands of blackjack being played. A first hand includes a king and an ace, a second hand includes a 2 an 8 and an 8, a third hand includes an ace, a 2, and a seven, and a fourth hand includes a 6, a 9, and a queen.

As illustrated, in some implementations, each hand may include a different numbers of card values. For example a player may decide to hit in some hands but stand in other hands. A player may play all hands against a dealer hand or some other criteria. For example, in the illustrated example, all four hands may be played against a dealer with a hand of 19. Accordingly, two hands may win and two hands may lose. A player may be shown winning and losing hands by some illustration as shown in FIG. 15. In some implementations, a player may be required to take a same action in each game such that each hand includes a same number of card values.

4. Change in Location and/or Orientation

In some embodiments, a change in location of one or more card devices may indicate (e.g., to an external system) a desired action. Such movement may be determined, as described above, based on card device elements, elements of a system, and/or any other desired ways. The system may facilitate the desired action (e.g., by controlling the card device to display desired information, etc.).

Figure 16A:
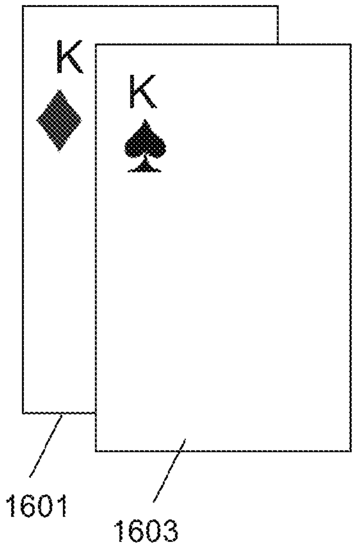
FIGS. 16A, B, C, and D show examples of movement and/or orientation affecting card devices according to some embodiments.
Figure 16B:
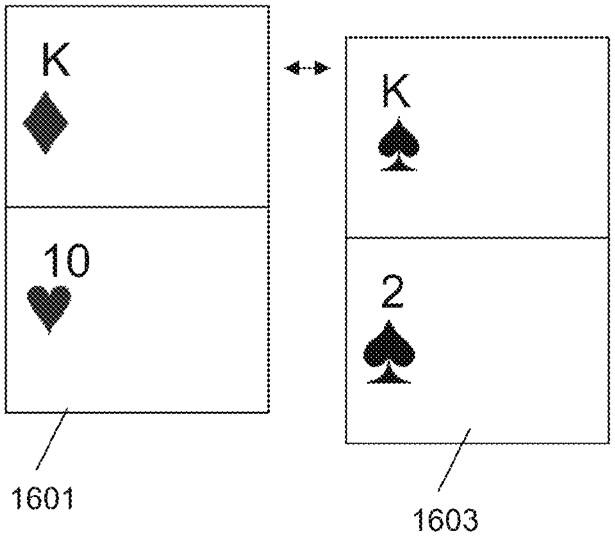
Figure 17:
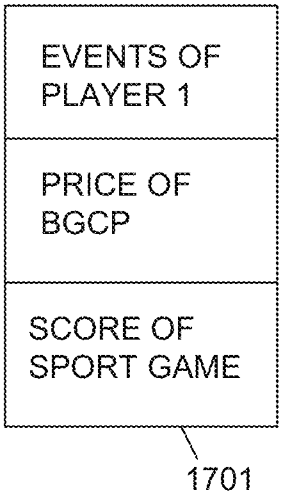
FIGS. 17-19 show example operation of card devices according to some embodiments.

FIGS. 16A and 16B illustrate another example game played using card devices 1601 and 1603 in which a change in location causes an action to be carried out. In the illustrated example, a game of blackjack is being played. A change in location of one or more card devices may indicate that an action in the card game should be taken. For example, in the illustrated example, movement of the card devices away from each other from the position shown in FIG. 16A to the position shown in 16B may indicate that the player desires to split in the blackjack hand. In this example, such a movement corresponds to the movement used to indicate a split in a traditional game of blackjack.

An external system may receive information indicating the change in location has occurred (e.g., indications of the locations), and in response determine card values to be displayed to facilitate the action requested and transmit information causing the card devices to display the card values determined. For example, after the movement from the position of FIG. 16A to the position of FIG. 16B, the system may control each of card devices 1601 and 1603 to be divided into sections as shown and a second card value to be placed in the new section as shown. Accordingly, each card device may display cards of a separate hand caused by the split action (e.g., a first hand with a king and a 10 and a second hand with a king and a 2). Play from this point on may continue as desired in various embodiments (e.g., by dealing more card devices if desired, by standing, and so on).

It should be recognized that the illustrated example of moving card devices apart to indicate a split in a game of blackjack is given as a non-limiting example only. Other embodiments may include any desired movement to indicate any desired action(s) in any desired game that may be carried out in any desired way. For example, card replacements in a draw game may be indicated by moving a card device forward from other card devices and/or flipping a card device over, fold may be indicated by moving card devices into a stack and/or flipping card devices over, a hit may be indicated by rotating a card device, and so on.

Figure 16C:
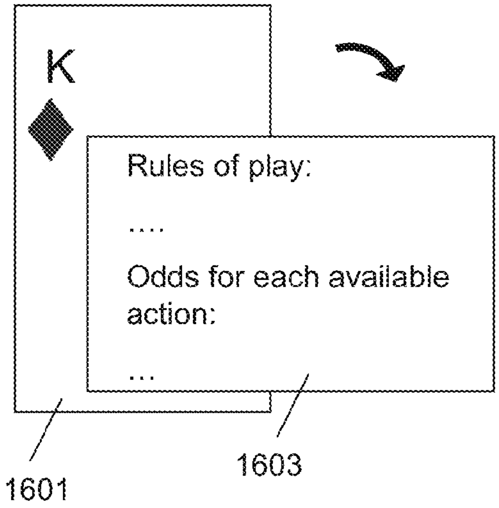

In some embodiments, movement of a card device may result in a change of displayed information on the card device. For example, FIG. 16C illustrates that a movement such as a change in orientation may cause different information to be displayed on a card device. FIG. 16C illustrates that a card device 1603 may be rotated 90 degrees from its position in FIG. 16A to cause a change in displayed information. Such rotation may be determined for example by an external system that controls the display of information on the card device 1603 using elements of the card device, the system, and/or other elements (e.g., gyroscope, accelerometer, video footage, etc.). The central system may determine a desired action to be taken in response to the change in orientation and transmit information causing the action to be taken.

As illustrated in the example of FIG. 16C, when the card device is rotated it may display rules for playing a current game on the card devices, odds for available actions in the game (e.g., if you hit now you will bust X % of the time, etc.), and/or any other desired information. In some implementations, such a movement may correspond to a game action rather than information display. It should be recognized the example of FIG. 16C is given as a non-limiting example and that other embodiments may include display of any information, taking of any game action, and so on in response to any desired movement and/or orientation change. Such actions may be relative to other card devices (e.g., of a particular player, of a dealer, of one or more player, etc.), relative to a position of a card device being moved, relative to a player, and so on.

Figure 16D:
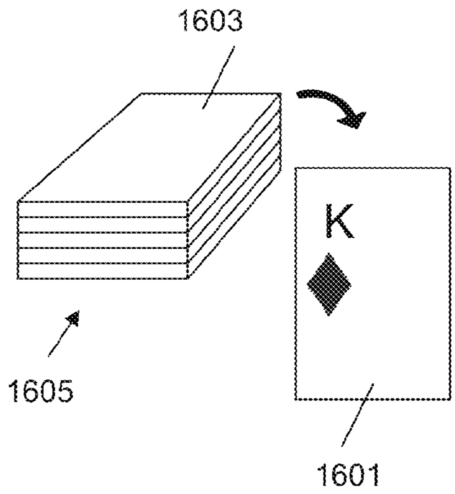

In some embodiments movement of card devices 1601 and 1603 may cause game beginning, game ending, card device assignments and/or other actions related to distribution of card devices. Some examples of such actions are described above with respect to movement of card devices to a particular area resulting in a card device being assigned a card value and/or to a hand/player. FIG. 16D illustrates another example of such an action. FIG. 16D illustrates a deck of cards 1605. As illustrated, card device 1601 may be taken from the deck 1605 and dealt to a player. Such movement may result in the card device being assigned to a player based on location, being assigned a card value (e.g., king of diamonds), may result in a game beginning, and so on. In the illustrated example, the movement of the card being flipped over and moved from the deck 1605 causes the card device to be assigned a value by an external system.

It should be recognized that the examples of FIGS. 16A, B, C, and D are non limiting examples, and that other embodiments may include other actions being taken based on other movements as desired. Further it should be recognized that while examples are given with reference to an external system controlling actions and/or making determinations, various embodiments may include any configuration such as a distributed configuration in which other controllers and/or the card devices themselves may perform some or all such processing.

5. Example Event Monitoring

In some embodiments a card device 1701 may provide information to a user. Such information may include details about ongoing events, past events, any desired events chosen by a user of the card device, and so on. In various embodiments, a card device 1701 may be used as a television display, a display of a movie, a display of a video feed, a display of text, and so on. Such information may be received by a card device from an external system as discussed elsewhere. The external system may receive the information from any desired information source (e.g., over a network), create the information, otherwise determine the information from monitored events, and so on. FIG. 17 illustrates an example of a card device 1701 being used as an information display. As indicated in FIG. 17, the card device 1701 is divided into three sections and each section displays a different piece of information. Card device 1701 displays events of related to another player (i.e. Player 1) in a top portion of the card device 1701. Card activity, wager history, win, loses, and so on regarding the other player may be displayed in this portion of card device 1701. This information may be obtained by an external system (e.g., from monitoring player activity) and may be forwarded to the card device 1701 for display. In some implementations, activity of multiple players may be displayed and used to monitor play for collusion (e.g., by a security officer of a casino). Card device 1701 displays a stock quote for shares of ticker symbol BGCP in a middle portion. This information may be provided from an outside source of financial pricing information to an external system and forwarded for display to the card device 1701. Card device displays a score of an ongoing sports game in a lower section. The score may be obtained by an external system from a website or other score reporting source and forwarded to the card device 1701 for display. It should be recognized that this is an example only and that other information may be displayed as desired. In various embodiments, a user may select types of information to be displayed, format for information display, and so on through an interface and an external system and/or the card device may display the selected information according to any selected configuration.

6. Social Games, Bonus Games

In some embodiments, a card device 1801 may be used to perform social engineering. In some embodiments, a card device 1801 may be used to play a bonus game apart from a base game being played with the card device 1801. FIG.

18 illustrates an example of a bonus game that may be played in some embodiments. As shown in the card device illustrated in FIG. 18, a card device 1801 may include a marker 1803. The marker 1803 may have no effect on the play of a base game using the card value (i.e. king of spades) of the card device 1801. Some example meta games may include, games in which a bonus is paid if all cards in a hand include the marker, games in which the more players whose cards include the marker are playing at a table the higher the payout is at the table, and so on. For example, in some implementations, a central system may determine that a group of people have similar interests, similar demographics, and/or some other characteristic. Based on that determination, the central system may place a similar marker on each of the players cards. The players may receive a bonus for play with other players with similar markers. The players may therefore have an incentive to find the other players with such markers on their cards. Accordingly, a casino or other operator may engage in social engineering to bring groups of people together for what ever reason using a bonus game that is played apart from a base game of a card device 1801.

In some embodiments, a bonus game may be played using a plurality of card devices 1901 A, B, C, D, E, F operated by a plurality of players. The bonus game may or may not be based on play of a base game. The bonus game may provide a bonus for play of the base game (e.g., if a bonus is achieved, etc.). FIG. 19 illustrates an example of a bonus game that may be played using card devices 1901 A, B, C, D, E, F. FIG. 19 illustrates 3 hands of card devices 1901 A and B, 1901 C and D, and 1901 E and F that may be played by 3 separate players.

As illustrated, the card devices 1901 A, B, C, D, E, F includes a marker 1903 on one hand. In this example bonus game, if the hand with the marker 1903 wins, a point may be added to the point total for the table. The point total 1905 is indicated on the card devices. If the point total reaches a certain threshold, a bonus round may be started. An indicator 1907 may indicate the needed points to reach a bonus round. As indicated, 7 more points are needed to enter the bonus round in the illustrated example. In the bonus round, payouts may be higher, odds may be different, and/or any other desired action may take place. In some embodiments, a point total may increase and decrease based on loses and wins of a player with the marker 1903. In some embodiments, a marker 1903 may not be used but rather points may be based on a total of wins and/or loses of a group of players, of players at a table, etc. In some embodiments, a player may bet on the bonus game. In some embodiments, a bonus game may be reset when a player leaves and/or enters a table for play. It should be recognized that various embodiments may include any desired bonus game. Bonus games may be facilitated by an external system (e.g., monitoring play at a table, instructing card devices to display markers, determining if points should increase based on wins and loses, and so on).

7. Interfaces

Figure 20:
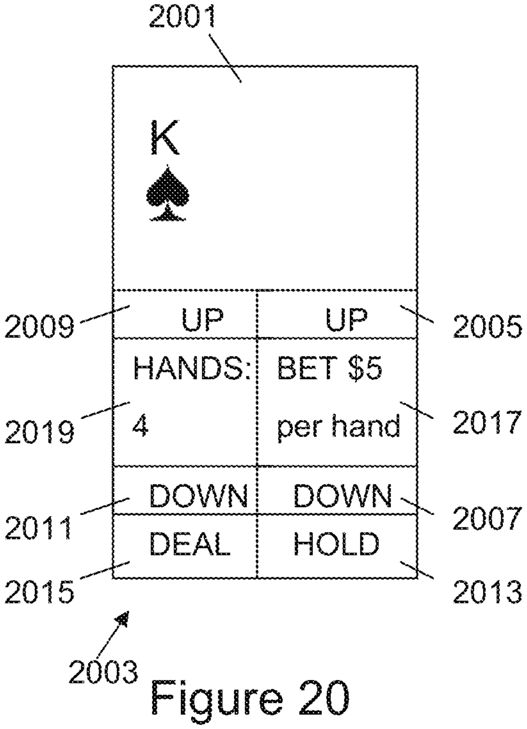
FIGS. 20-27 show example interfaces according to some embodiments.

In some embodiments, an interface 2003 of a card device 2001 may be used to control actions in a game being played using the card device 2001. FIG. 20 illustrates an example card device in which an interface 2003 is displayed. A user may select actions and/or preferences through the interface 2003 (e.g., by touching a section of the card device 2003 that corresponds to the desired action). As discussed above, in various implementations, a dealer may carryout selected actions, an external system may carryout selected actions, a player may carryout selected actions, and so on.

The illustrated example of FIG. 20 shows an interface of card device 2001 for a player that is playing a draw poker game. Some example of such games that may be played using card devices are described in U.S. Pat. Nos. 5,823,873, 6,007,066, and 6,098,985, which are hereby incorporated herein by reference. In play of such a game, if a player hand is above a threshold value, the player may win. In this example, the interface includes an option to increase a bet amount (e.g., button 2005), an option to decrease a bet amount (e.g., button 2007), an option to increase a number of hands being played (e.g., button 2009), an option to decrease a number of hands being played (e.g., button 2011), an option to select a card value for holding (e.g., button 2013), an option to deal a next round of card values for the hand (e.g., button 2015), a display of a current amount set for a bet (display 2017), and a display of a current number of hands to be dealt (display 2019).

In the illustrated implementation, a player may increase a bet amount using up and down buttons, may select to hold a card, may select to deal the next round of cards (e.g., replacements for the unheld cards), and may select to deal more or fewer hands. In this example, a player may play multiple hands off of the initially dealt hand as described in implementations above. For example, selecting 4 hands and a bet of $5 may cause for replacement card to be dealt for each unheld card in a hand. In some implementations, a number of hands for a game may be preset, a number of hands in a game may be limited to a maximum and/or minimum, a bet may be limited to a maximum and/or minimum, a game may end if an initial dealt hand before drawing is a winning hand, and/or any other desired variations may be used. A central system may receive indications of desired game parameters and actions and cause information to be displayed on the card devices in response so that a game maybe played by a player.

Figure 21:
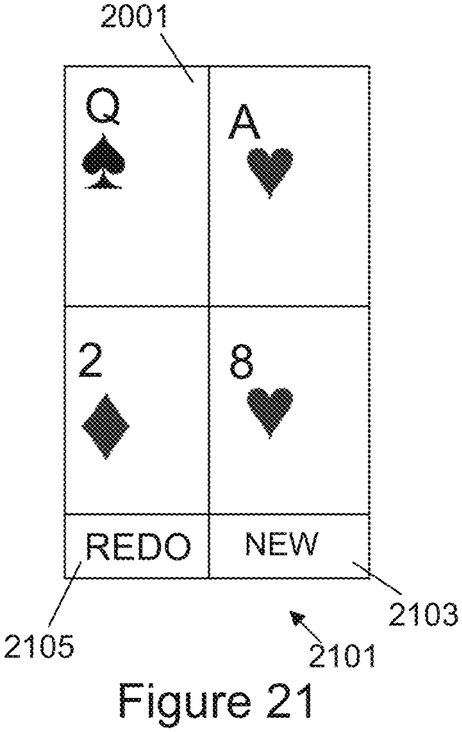

FIG. 21 illustrates an example outcome of play using the interface 2003 of card device 2001 if 4 hands are selected and the card value is not held for the next round when a deal button is pressed. In this example, card device 2001 is divided into four sections and a new card value is presented in each section. Each card value corresponds to a card value in one of the four selected hands based on location of the section on the card device 2001. A player may win or lose each of the four hands. The four hands may be played using any held cards from the original hand.

As illustrated in FIG. 21, after a deal, a new interface 2101 may be displayed with different options from interface 2003. For example, interface 2101 may include an option to start a new game (e.g., button 2103), an option to redo a previous deal (e.g., button 2105). For example, a player may press a new game button to be dealt a new initial hand for a new game. A player may press a redo button to replay a previous hand (e.g., to be redealt the last dealt cards, to go back to a prior point and make new decisions, and so on).

In some embodiments, a progressive game may be played. To win a progressive, a play may be required to play a certain number of hands and receive a certain result in each of the hands.

It should be recognized that while the interface shown and game play involve draw poker, other embodiments may include any desired interface and any desired game.

Figure 22:
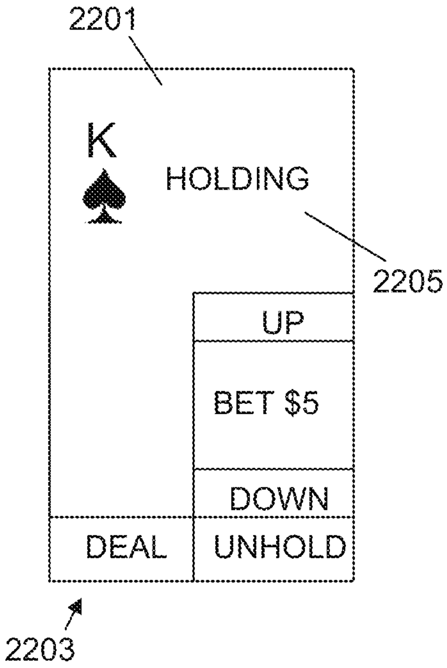

FIG. 22 illustrates another example interface 2203 for use in playing a game with card device 2201. In this illustrated example, another draw poker game is played. In this illustration, a single hand is played rather than multiple hands as illustrated in FIGS. 20 and 21. Interface 2203 includes options for increasing and decreasing a bet, holding a card, and dealing a next round of hand values. As illustrated in FIG. 22, the card is selected for being held and hold indicator 2205 indicates as much. The interface may change to allow unholding of the card from this holding state, as illustrated.

Figure 23:
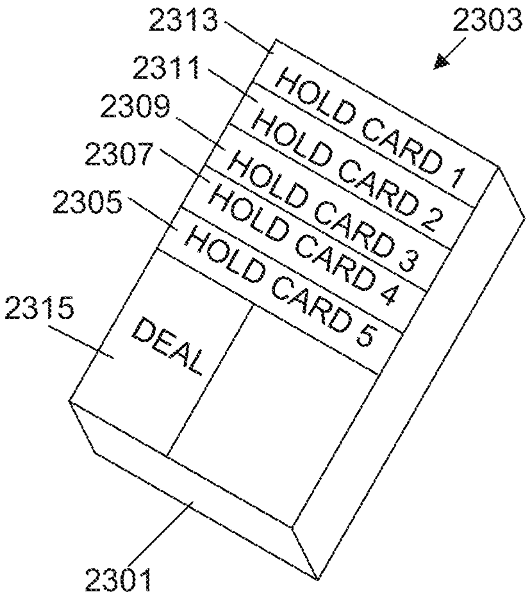

In some embodiments, as described above, a deck device 2301 may include an interface that may be used to play games using card devices. FIG. 23 illustrates an example deck device 2301 with an interface 2303. The interface may, for example, be a touch screen display coupled to the deck device 2301. The interface may allow a player to control a game, select a game, select preferences, request information, display information, and so on. For example, the interface may allow the user to make similar selections as an interface on a card device (e.g., select cards to hold in a game, make bets, and so on). In some implementations, an interface 2303 of a deck device 2301 may be used instead of a card device interface, along with a card device interface, and so on. The deck device 2301 interface 2303 may allow control of a set of card devices associated with the deck device (e.g., held in the deck device 2301, used proximate to the deck device 2301, etc.). For example, a user may remove card devices from the deck device 2301 and use them to play a game. The user may control actions in the game through the interface 2303 of the deck device 2301. The deck device 2301, card devices, and an external system may, in some embodiments, communicate with each other to facilitate such control and game play.

The illustrated example interface 2303 includes options for playing a draw poker game. As illustrated the interface 2303 includes options (e.g., buttons 2305, 2307, 2309, 2311, and 2313) for holding each of five card values which may each be displayed on respective card devices proximate to the deck device 2301. A player may select which cards to hold in a hand by operating the respective buttons. Each card device may include an identifier so that a player may know which card device corresponds to which button. As illustrated the interface 2303 includes an option to deal next cards in the game (e.g., button 2315). After selection of button 2315, replacement card values may be assigned to unheld card devices.

It should be recognized that the example interface 2303 is given as a non limiting example only and that other embodiments may include any desired interface for use with any desired game.

Figure 24:
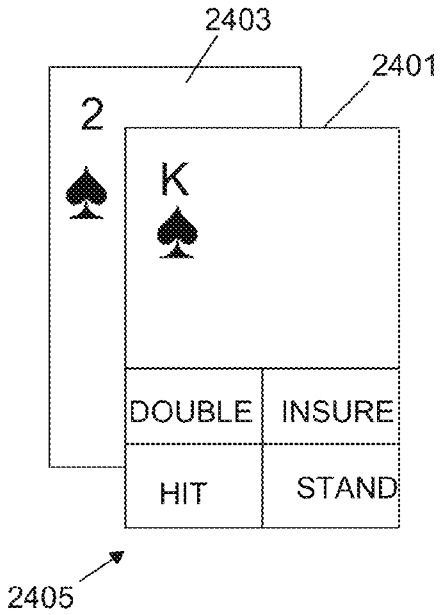

In some embodiments, an interface 2405 of a card device 2401 may control play of a game involving other card devices 2403. FIG. 24 shows another example interface 2405 of a card device 2401 that may be used to control play of a hand involving card device 2401 and 2403. This illustrated interface includes button corresponding to actions that may be taken in a game of blackjack played using the card device 2401 and 2403. In this example, betting may take place at a table using chips and actions may be selected through the interface. In other implementations, betting may be made through the interface as well. In this example, a user may select an action and a dealer and/or the player may carryout any deals that may facilitate the action (dealing cards, etc.). In other implementations, the card devices may change to carry out the action (e.g., changing card values shown, etc.). In some implementations, the interface 2405 may be displayed on a most visible card device of card devices in a hand, a highest card device of card devices in a hand, a last dealt card device of card devices in a hand, and so on. For example, if a hit command causes another card device to be dealt partially on top of card device 2401, interface 2405 may be displayed on the new card device instead of card device 2401.

Figure 25:
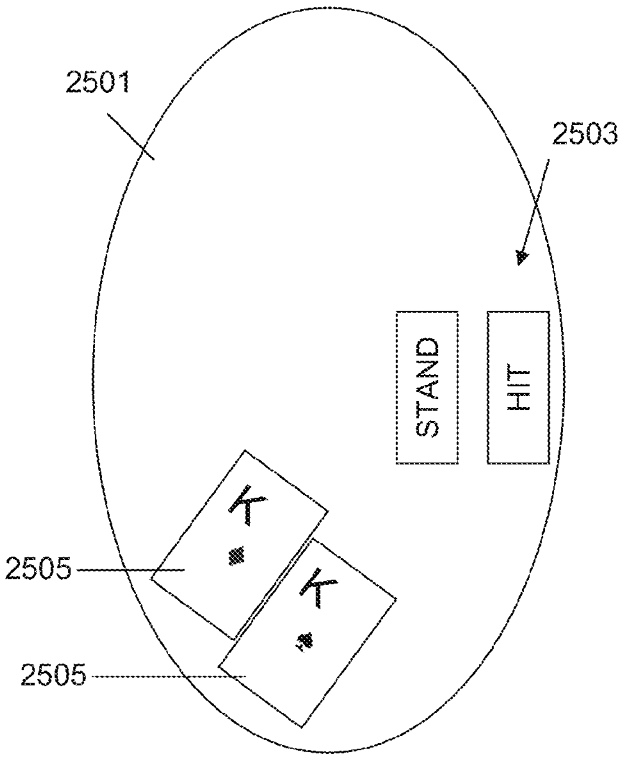

In some embodiments, as described above, a dealer at a table 2501 may use an interface 2503 to input player requested actions related to play of games using card devices 2505. FIG. 25 illustrates an example of such an interface 2503 that may be used in some embodiments. FIG. 25 illustrates a simple interface that may be used to select actions in a game of blackjack. Selected actions may be transmitted to an external system and used to determine further actions in the game. In some embodiments, an interface may include a player selection option (not shown). In other implementations, movement of a card to a player area may be used to determine a player that selected an indicated action. The interface 2503 may include buttons, touch pads, and so on. In some implementations, a dealer may carryout the selected action, a player may carryout the selected action, an external system may carryout the selected action, and/or any other desired element may be used to carryout the selected action. It should be recognized that the example of FIG. 25 is given as a non-limiting example only and that other embodiments may include any desired interface for use with any desired game(s).

Figure 26:
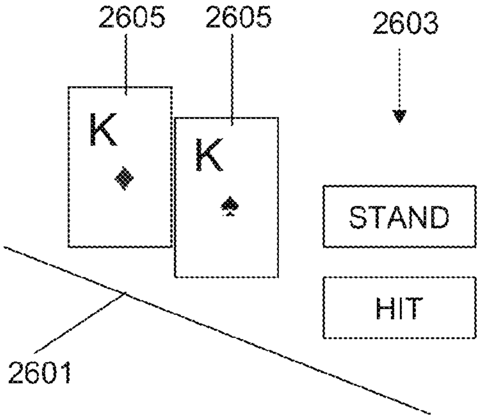

In some embodiments, as described above, a player at a table 2601 may use an interface 2603 to input requested actions related to play of a game using card devices 2605 (e.g., to an external system controlling card devices 2605). FIG. 26 shows another example of an interface 2603 of a table 2601 at which a player may enter desired actions for play of a game of blackjack involving card devices 2605. In some implementations, the interface 2603 may allow betting, selection of game play actions, and/or any other desired actions that may be transmitted to an external system. In some implementations, betting may be performed using chips or otherwise physically at table 2601. In some implementations, a dealer may carryout the selected action, a player may carryout the selected action, an external system may carryout the selected action, and/or any other desired element may be used to carryout the selected action. The interface 2603 may include buttons, touch pads, and so on. It should be recognized that the example of FIG. 26 is given as a non-limiting example only and that other embodiments may include any desired interface for use with any desired game(s).

Figure 27:
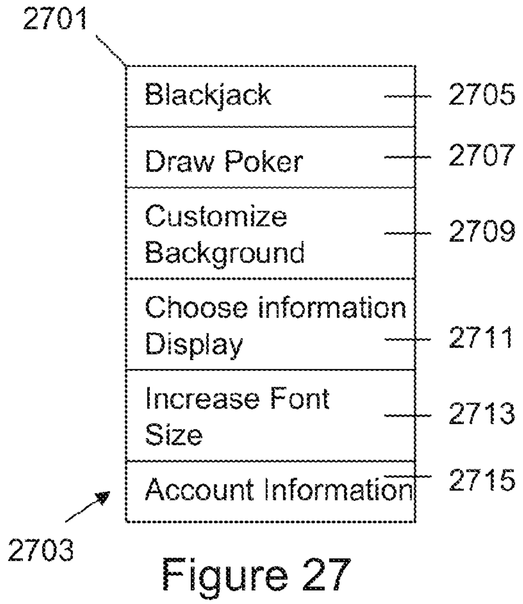

In some embodiments, an interface 2703 of a card device 2701 may be used to select a game to be played. In some embodiments, an interface 2703 may be used to select options for customization of a card device 2701. In some embodiments, an interface 2703 may be used to control administrative information. FIG. 27 shows an example interface 2703 of a card device 2701 that may be used to select games and/or customize a card device 2701. As shown, a user may operate buttons to select a game for play. For example, a user may select button 2705 to play a game of blackjack or select button 2707 to play a game of draw poker. As shown, a user may operate buttons to customize a card device. For example, a user may select button 2709 to enter a background customization interface through which other buttons may be used to select a card background, a user may select button 2711 to enter an information display interface through which a user may select types of information to be displayed on a card device (e.g., sports scores, etc.), or a user may select button 2713 to increase a font size used on the card device. In various implementations, any element may be customized in any desired way (e.g., colors, pictures, wallpapers, logos, text, text size, and so on) In some implementations, an interface itself may be customized. As illustrated, a user may operate buttons to perform administrative actions. For example, a user may select button 2715 to access an interface related to account information that may be used, for example, to display available funds, add and/or remove funds, and so on. In other implementations, such administrative actions may include making purchases, surfing the web, and so on.

It should be recognized that example interface are given as non limiting examples, and that other method may include any other desired type of control. Such control may include a plurality of such interfaces that allow multiple ways of control, no interfaces at all, modified interfaces, and so on. Such methods may include motion and/or speech control. Such method may include any other desired method.

8. Flexibility

Figure 28:
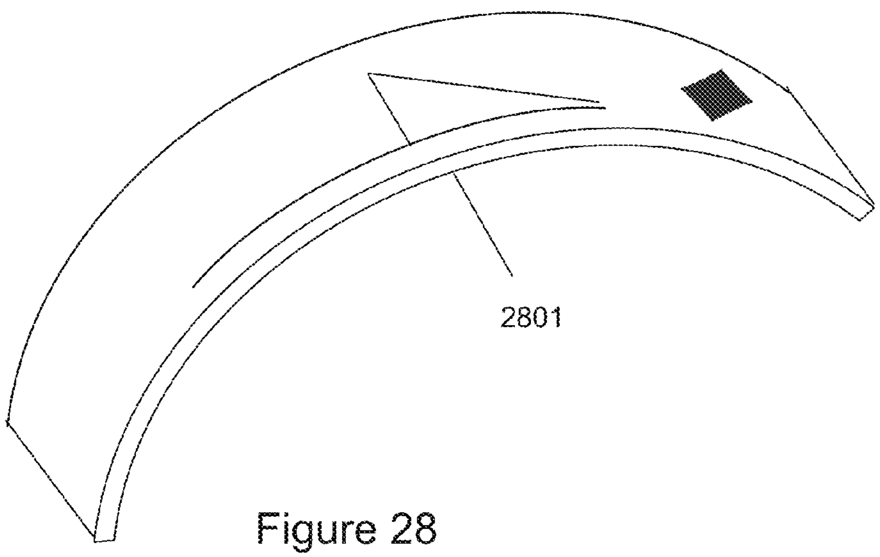
FIGS. 28 and 29 show example card devices according to some embodiments.

As described above, various embodiments may include a card device 2801 that may be bent and/or flexed. FIG. 28 illustrates card device 2801 being bent while displaying a card value. As illustrated, while the card is bent the card may continue to display. In some implementations, bend of a card may cause an action to occur. In some implementations, bend of a card may cause graphics displayed on the card to alter. For example, such alteration may be made to make the graphic appear normal despite the bending, may make the graphics move to a portion of the card that is not bent, and so on.

Figure 29:
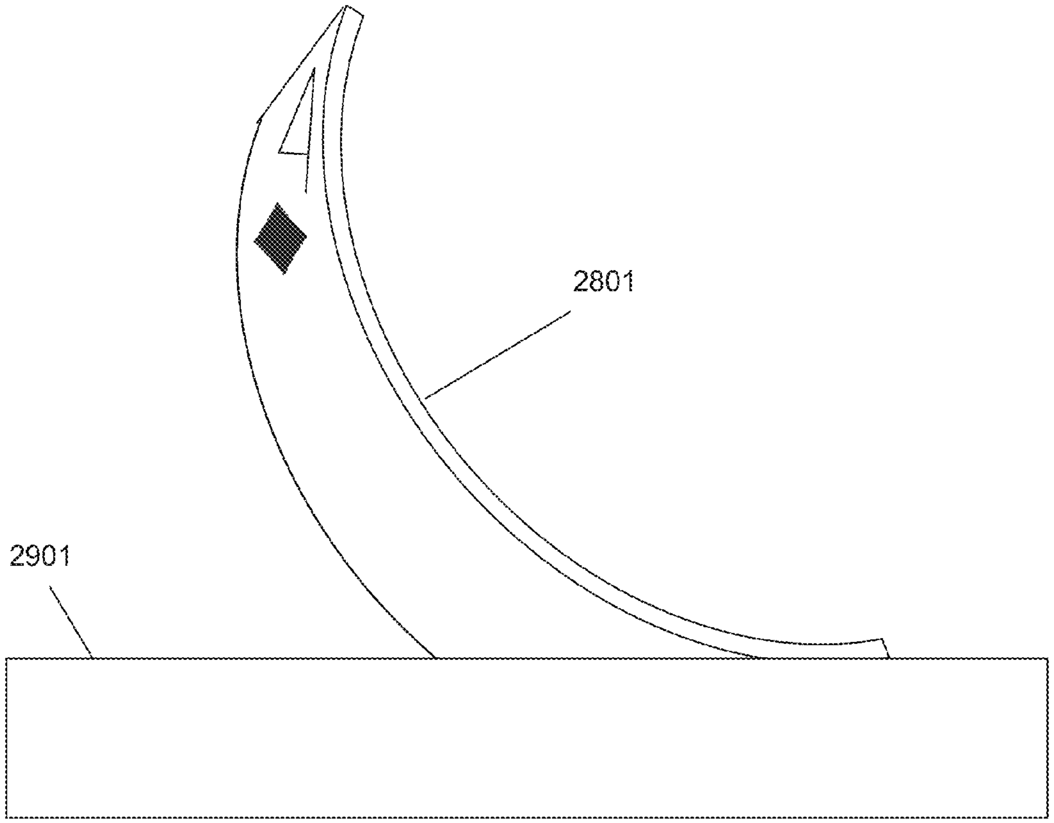

FIG. 29 illustrates an example of a card device 2801 being bent causing a change to graphics of the card device. As illustrated, the card device 2801 of FIG. 29 is being bent up from a table 2901, such as is done in situation where a player wants to see the card value of the card device 2801 without revealing the card value to others. As illustrated, rather than the display of the graphic shown on card device 2801 in FIG. 28, the value of the card device 2801 is displayed in FIG. 29 in the portion of the card device that is being lifted from the table. In some embodiments, location detection, orientation elements, and/or touch elements of a card device 2801 may be used to determine that a card device 2801 is being bent in such a manner (e.g., by determining that the card device 2801 is partially on the table and partially not on the table, by determining one part of the card device is higher than another part of the card device, by determining that a card device is being bent, and so on).

J. Example Methods

In various embodiments, methods may be performed. Methods may be performed for example, by processors, by card devices, by servers, by communication devices, and/or by any other device. Presented below are some example methods that may be performed in some embodiments. It should be recognized that the example methods are given as non-limiting examples only and that other embodiments may include methods that include other actions, different orderings of actions, additional actions, no actions, differently ordered actions, actions that occur sequentially, actions that occur simultaneously, and so on. In some embodiments servers, processors, and so on may be configured to perform one or more methods.

1. Card Device Operation

Figure 30:
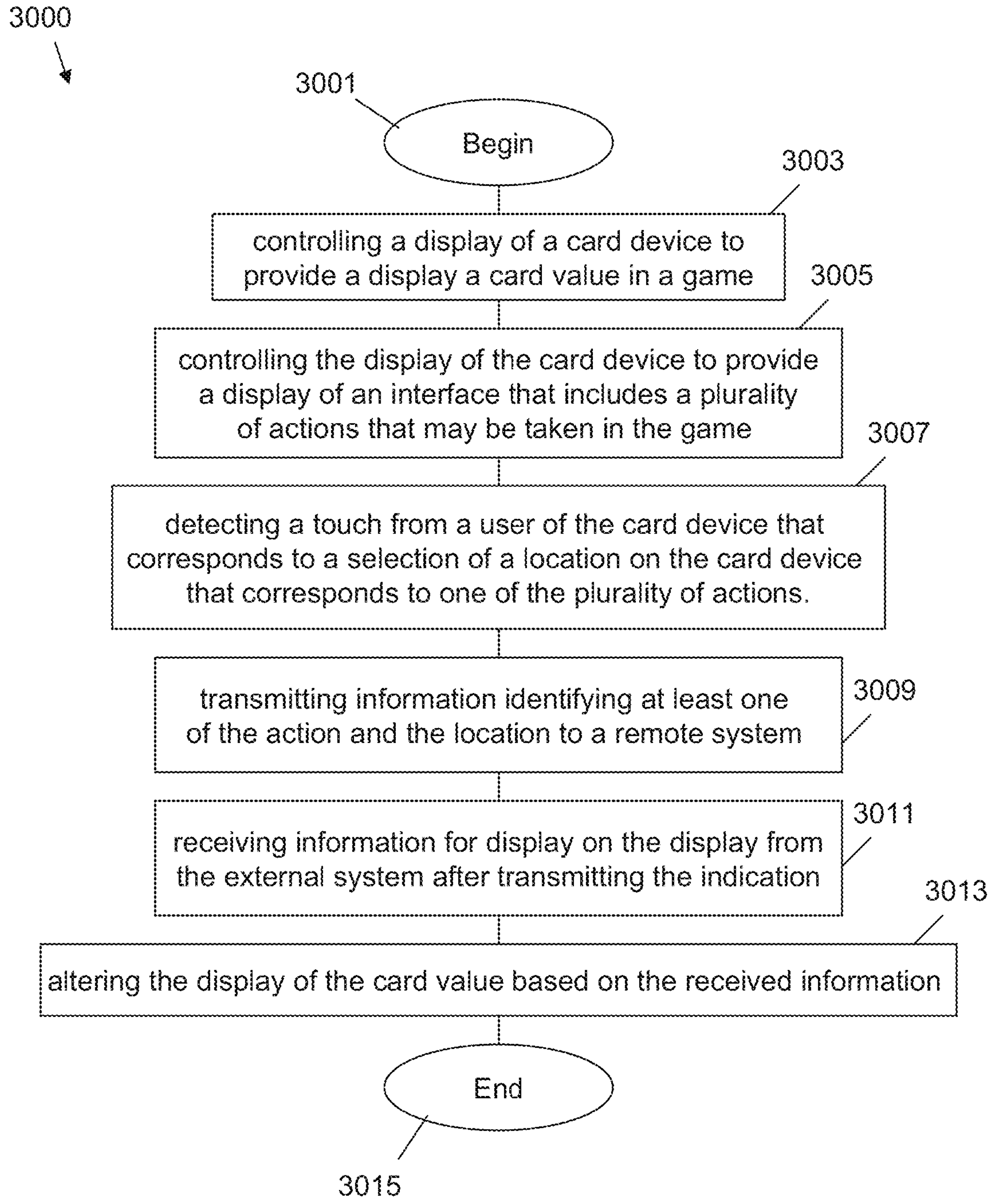
FIGS. 30-39 show example methods according to some embodiments.

FIG. 30 illustrates an example method 3000 that may be performed in some embodiments. Method 3000 may be performed, for example, by a card device in operation. Method 3000 may be performed by a card device during play of a game by a user of the card device. Method 3000 may begin as indicated at 3001.

Method 3000 may include controlling a display of a card device to provide a display a card value in a game as indicated at 3003. The display may include a flexible organic light emitting diode. The card value may include a card number and a card suit. The card value may be a value of a card in a hand of a card game (e.g., poker, bridge, blackjack, etc.). In some implementations, a processing element may control the display to provide the display based on information received from a remote system.

Method 3000 may include controlling the display of the card device to provide a display of an interface that includes a plurality of actions that may be taken in the game as indicated at 3005. The display of the card value and the interface may be made simultaneously. The actions may include actions available at a current time in a game being played using the card device. In some implementations, the processing element may control the display to provide the display (e.g., based on information received from a remote system, based on a current state of the game maintained by the processing element, and so on).

Method 3000 may include detecting a touch from a user of the card device that corresponds to a selection of a location on the card device that corresponds to one of the plurality of actions as indicated at 3007. In some implementations, such detection may be performed by a touch sensitive input element coupled to the card device as discussed above.

Method 3000 may include transmitting information identifying at least one of the action and the location to a remote system as indicated at 3009. In some implementations, the information identifying the location may be provided to a processing element of the card device, which may determine the action. The processing element may control the card device to carry out the action, in one implementation. In one implementations, the processing element may communicate the action to a remote system (e.g., using a communication element), which may control the card device to carryout the action. In other implementations, the information identifying the location may be provided to the remote system (i.e., without a transformation into the corresponding action by the processing element), which may determine the action and control the card device to carryout the action. Method 3000 illustrates only one example implementation.

Method 3000 may include receiving information for display on the display from the external system after transmitting the indication as indicated at 3011. The information may include information to carryout the selected action. For example, in one implementation, the action may include a replacement of the initial card value in a game of draw poker and the information may identify a replacement card. In some implementations, the information may be received by a communication element of the card device and/or a processing element of the card device (e.g., through the communication element).

Method 3000 may include altering the display of the card value based on the received information as indicated at 3013. For example, the card value may be changed to another card value in some implementations. In other implementations, an indication of a winning and/or losing outcome may be displayed on the card device. In other implementation, actions available through the interface may be changed to reflect a new game state. In some implementations, the changed display may reflect a random event generation performed by the remote system (e.g., a selection of anew card from a deck, a random number generator, etc.) It should be recognized that in various implementations, any desired change to the display may be made. In some implementations, a processing element of the card device may control the display to make the alteration.

Method 3000 may end as indicated at 3015. It should be recognized that other embodiments may include other actions, additional actions, fewer actions, and so on.

2. Card Value Change

Figure 31:
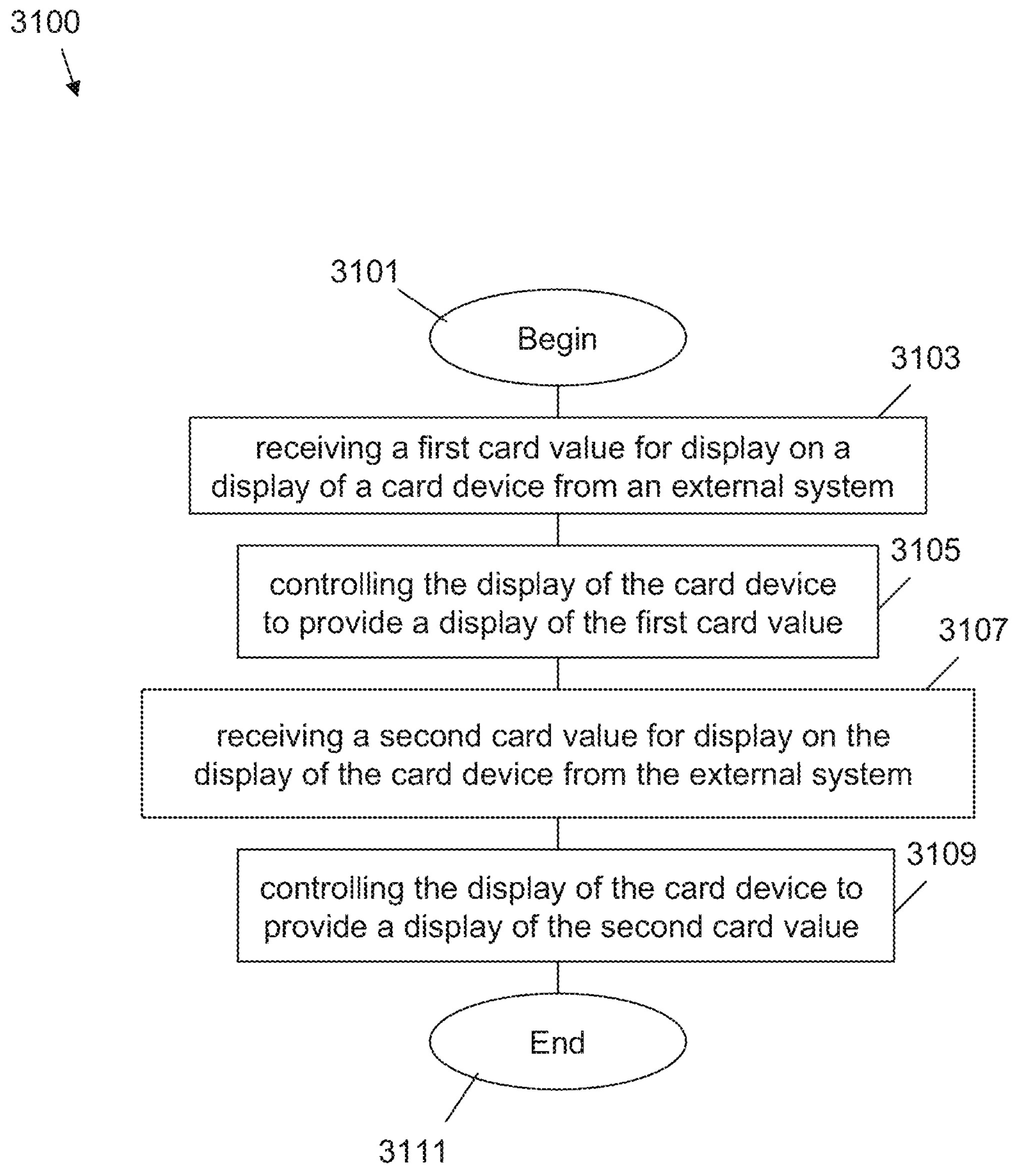

FIG. 31 illustrates an example method 3100 that may be performed in some embodiments during play of one or more games using a card device. Method 3200 may be performed, for example by one or more card devices, one or more processors, and so on. Method 3100 may begin at 3101.

Method 3100 may include receiving a first card value for display on a display of a card device from an external system as indicated at 3103. The card value may be received by a communication element of the card device. The card value may include a card value in a hand of a game played using the card device.

Method 3100 may include controlling the display of the card device to provide a display of the first card value as indicated at 3105. The display may be controlled by a processor element of the card device. The processor element may receive the card value from the communication element (e.g., through a bus or other communication network of the card device). The processor element, for example, may operate a display driver to provide signals that control the display.

Method 3100 may include receiving a second card value for display on the display of the card device from the external system as indicated at 3107. The second card value may be received by the communication element of the card device. The second card value may include a card value in the same hand of the same game played using the card device. The second card value may include a card value in a different hand of the same game played using the card device. The second card value may include a card value in a different hand of a different game played using the card device.

Method 3100 may include controlling the display of the card device to provide a display of the second card value as indicated at 3109. The display may be controlled by the processor element of the card device. The processor element may receive the second card value from the communication element (e.g., through a bus or other communication network of the card device). The processor element, for example, may operate a display driver to provide signals that control the display. Providing the display of the second card value may include replacing the display of the first card value, displaying both the first and second card value simultaneously, and so on.

Method 3100 may end as indicated at 3111. It should be recognized that other embodiments may include other actions, additional actions, fewer actions, and so on.

3. Hand Make-Up

Figure 32:
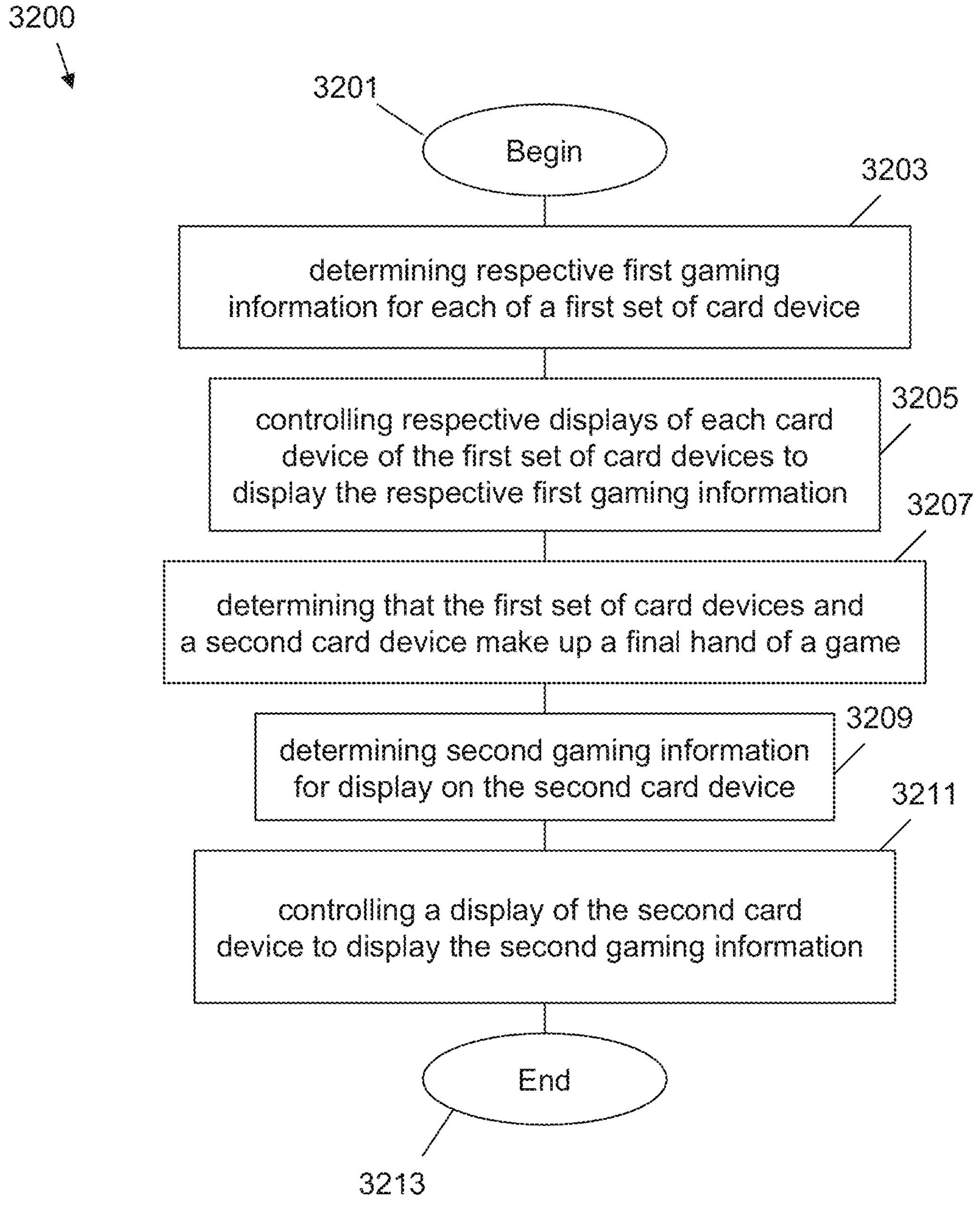

FIG. 32 illustrates an example method 3200 that may be performed in some embodiments. In some embodiments, method 3200 may be performed by a gaming server, a system that is external to a card device, any desired group of servers, one or more particular systems, by a processor, by one or more card devices, and so on. Method 3200 may be performed to allow a player to play a game using a plurality of card devices. Method 3200 may begin at 3201.

Method 3200 may include determining respective first gaming information for each of a first set of card device as indicated at 3203. The first set of card devices may include card devices that make up an initial hand of a game. Each first gaming information may include a respective card value to be displayed on a respective card device of the first set of card devices. In some embodiments, the determination may be based on a random event generation. Such a random event generation may include generation of random/pseudo random numbers that corresponds to each card value, determination of the occurrence of events that correspond to each card value, and so on.

Method 3200 may include controlling respective displays of each card device of the first set of card devices to display the respective first gaming information as indicated at 3205. In some embodiments, such controlling may include transmitting respective information to each card device (e.g., to communication elements of the card devices) through one or more communication devices identifying the respective first gaming information. In some implementations, the communication elements of the card devices may communicate the information to elements of the card devices to facilitate the display (e.g., to processing elements that control a display, to a display driver, and so on).

Method 3200 may include determining that the first set of card devices and a second card device make up a final hand of a game as indicated at 3207. In some implementations, the final hand may be based on the initial hand that may be made up of the first set of card devices. Determining may include receiving an identification of the second card device and the final hand (e.g., from an interface of a table, from a deck device, from a dealer, from a player, from a card device, from a sensor, from a camera, and so on). For example, in some implementations, a selection made on the second card device that the second card device should be added to the initial hand to make up the final hand may be received from the second card device by a communication device. Determining may include determining a location associated with the final hand and determining that the second card device is in the location. For example, in some implementations, a location of the second card device may be changed from a first location (e.g., near a dealer, in a deck, etc.) to a second location that corresponds to the location of the hand (e.g., proximate to the first set of card devices, in an area of a table, on a side of a deck device, on a side of a communication device, and so on).

Method 3200 may include determining second gaming information for display on the second card device as indicated at 3209. The second gaming information may include a card value to be displayed on the second card device. In some embodiments, the gaming information may include gaming information that transforms an initial hand defined by the first gaming information to a final hand that is defined by the first gaming information and the second gaming information. In some embodiments, the determination may be based on a random event generation. Such a random event generation may include generation of random/pseudo random numbers that corresponds to each card value, determination of the occurrence of events that correspond to each card value, and so on.

In some embodiments, the second gaming information may be based on a gaming action. Some implementations may include receiving an indication of the gaming action. The indication may be received from one of the first set of card devices (e.g., a selection through an interface), from the second card device (e.g., a selection through an interface, an indication of a location), from an interface (e.g., of a table, of a deck device, of a dealer), from a dealer, from a deck device, and so on. In some implementations, the indication may include an indication of a location of the second card device and/or of one or more of the first set of card devices. In some implementations, the indication may include an indication of an orientation of the second card device and/or one or more of the first set of card devices. For example, in some implementations, a player may select an action through an interface, a card device may be moved to a location corresponding to an action, a card device may be oriented in a way that corresponds to an action, and so on. The action, for example, may include a hit, a draw, a double down, a split, and so on. In some implementations, the determination of 3209 and/or controlling of 3211 may occur in response to receiving the indication of the action.

Method 3200 may include controlling a display of the second card device to display the second gaming information as indicated at 3211. In some embodiments, such controlling may include transmitting respective information to the second card device (e.g., to communication elements of the card devices) through one or more communication devices identifying the second gaming information. In some implementations, the communication elements of the card device may communicate the information to an element of the card device to facilitate the display (e.g., to processing element that control a display, to a display driver, and so on).

Method 3200 may end as indicated at 3213. It should be recognized that other embodiments may include other actions, additional actions, fewer actions, and so on.

4. Advertising

Figure 33:
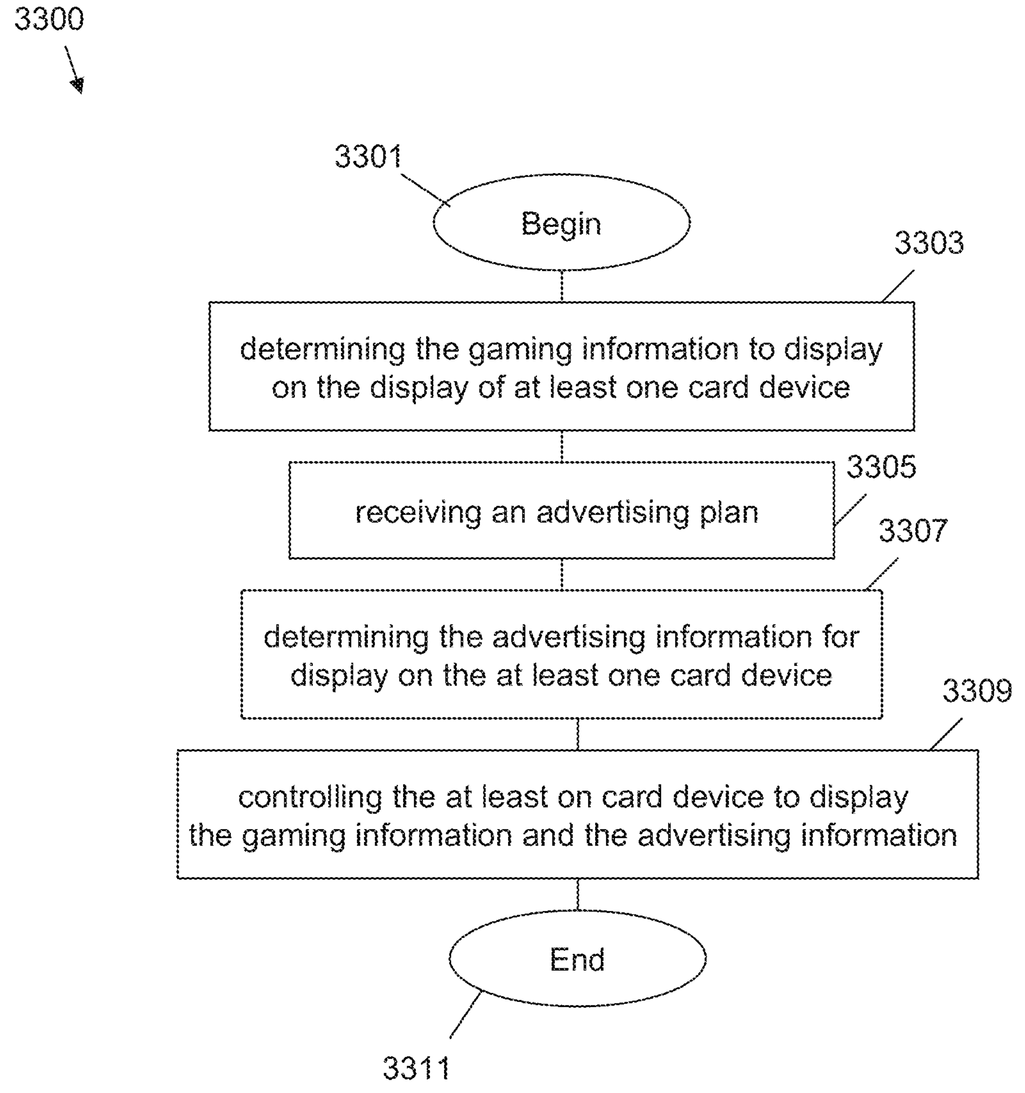

FIG. 33 illustrates an example method 3300 that may be performed in some embodiments. In some embodiments, method 3300 may be performed by a gaming server, a system that is external to a card device, any desired group of servers, one or more particular systems, by a processor, by one or more card devices, and so on. Method 3300 may be used to provide advertising on card devices used for game playing. Method 3300 may begin at 3301.

Method 3300 may include determining the gaming information to display on the display of at least one card device as indicated at 3303. The determination may be made based on an action in a game, based on a random event generation, and so on. The gaming information may include one or more card values for a hand of the game.

Method 3300 may include receiving an advertising plan as indicated at 3305. The advertising plan may include advertising information to be displayed on the at least one card device. The advertising plan may include identification of when the advertising information should be displayed. The advertising plan may be receiving by an advertising and/or gaming server. Information about the plan may be stored in one or more databases that may be queried to determine when the advertising information should be displayed.

Method 3300 may include determining the advertising information for display on the at least one card device as indicated at 3307. Determining the advertising information may include determining that the advertising information should be displayed based on the advertising plan. Determining the advertising information may include determining that the advertising information should be displayed based on the advertising plan, base d on gaming events, and/or based on information about a player. For example, information about a player may include demographic information, winnings, losses, time spent playing, betting history, and so on. Gaming events may include happenings in the game being played using the card device. For example, a gaming event may include the gaming information including winning gaming information, including a cad value above a threshold, including a desired card value, including a card value that causes a winning hand, including a card value that results in a winning bet above a threshold amount, and so on. In some implementations, the determining may be based on the gaming information. For example, the determining may be based on a card value defined by the gaming information, an outcome defined by the gaming information and other gaming information, and so on. In some implementations, the determination may be based on the advertising plan. For example, the advertising plan may define criteria for display of the advertising information, and the determination may include determining that the criteria are met (e.g., the player meets a demographic, an event occurred, and so on). Advertising information may include an image, a video, a text, and so on.

Method 3300 may include controlling the at least on card device to display the gaming information and the advertising information as indicated at 3309. Controlling may include transmitting information to the at least one card device (e.g., to a communication element of the card device). The card device may receive the information and cause the display to display the information (e.g., by operation of a processing element, etc.).

Method 3300 may end as indicated at 3311. It should be recognized that other embodiments may include other actions, additional actions, fewer actions, and so on.

5. Power Generation

Figure 34:
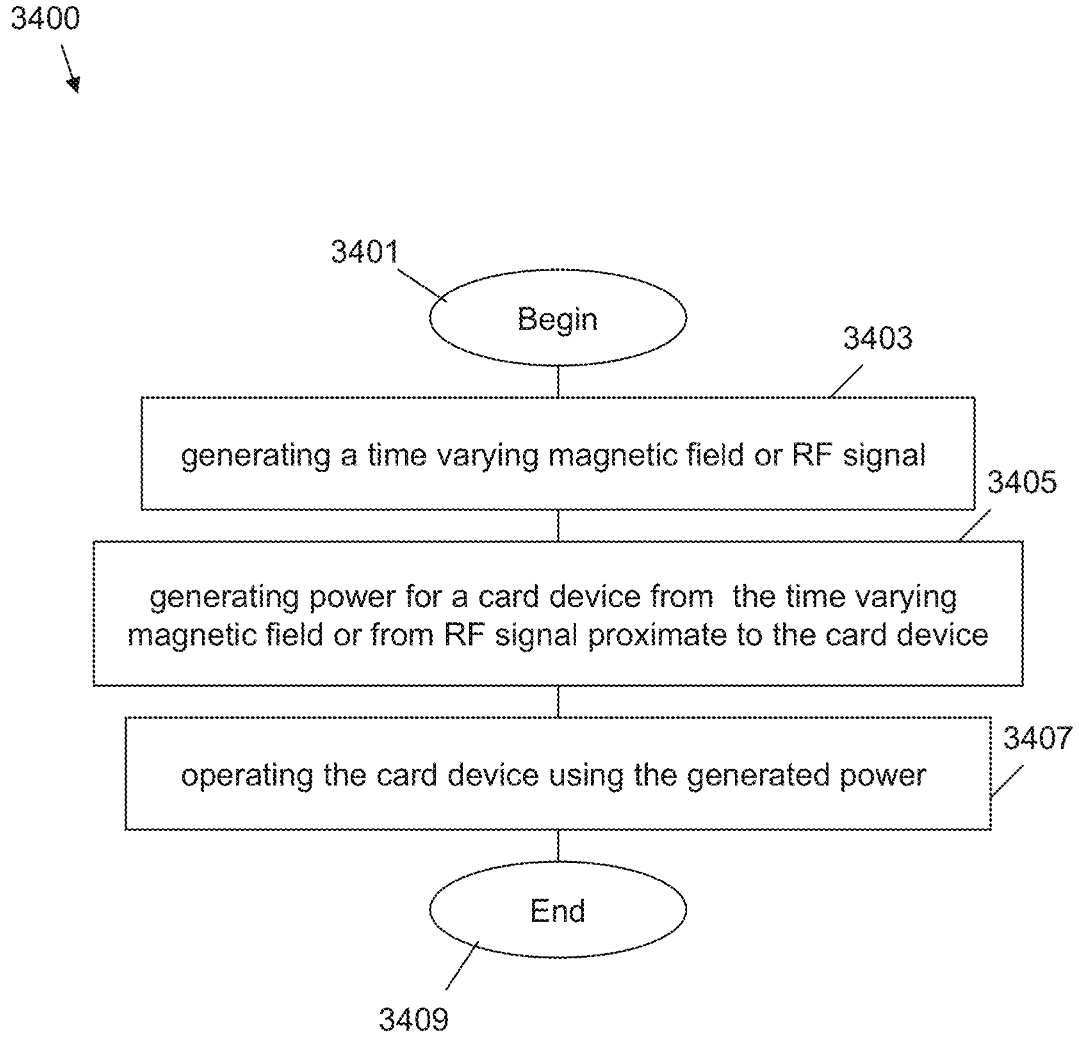

FIG. 34 illustrates an example method 3400 that may be performed in some embodiments. In some embodiments, method 3400 may be performed by a card device, a card device charger, and so on Method 3400 may be used to provide power to one or more elements of a card device. Method 3400 may begin at 3401.

Method 3400 may include generating a time varying magnetic field or RF signal as indicated at 3403. In some embodiments, the time varying magnetic field may be generated by an inductive charger. In some embodiments, the time varying magnetic field may be generated by applying a voltage across a conductive element. In some embodiments the conductive element may include a coil arrangement. In some implementations, the conductive element may include a wire and/or other conductor. In some embodiments, generating the time varying magnetic field may include generating the time varying magnetic field such that the magnetic field varies with a frequency that may be a same or similar to a resonance frequency of one or more card devices. In some implementations, the frequency may be controlled by a frequency of the voltage applied. In some implementations, an RF signal may be generated by an RF transmitter. In some implementations, the RF signal may have a substantially constant intensity. In some implementations, the RF signal may have a low frequency. In some implementations, the RF signal may have a frequency that is resonant with a collector of a card device.

Method 3400 may include generating power for a card device from the time varying magnetic field or RF signal proximate to the card device as indicated at 3405. In some implementations, the card device may not be in contact with the charger. In some implementations, generating power may include inducing a current flow in an arrangement of a second conductive element. The second conductive element may include a coil arrangement. The second conductive element may include flexible circuitry, wire, and so on.

Method 3400 may include operating the card device using the generated power as indicated at 3407. In some implementations, the power may be provided to a display, a processing element, a communication element, a touch input element, a location determination element, and/or any other elements of a card device to operate the elements. In some implementations, the power may be stored in a battery element for later use.

Method 3400 may end as indicated at 3409. It should be recognized that other embodiments may include other actions, additional actions, fewer actions, and so on.

6. Hand Assignment

Figure 35:
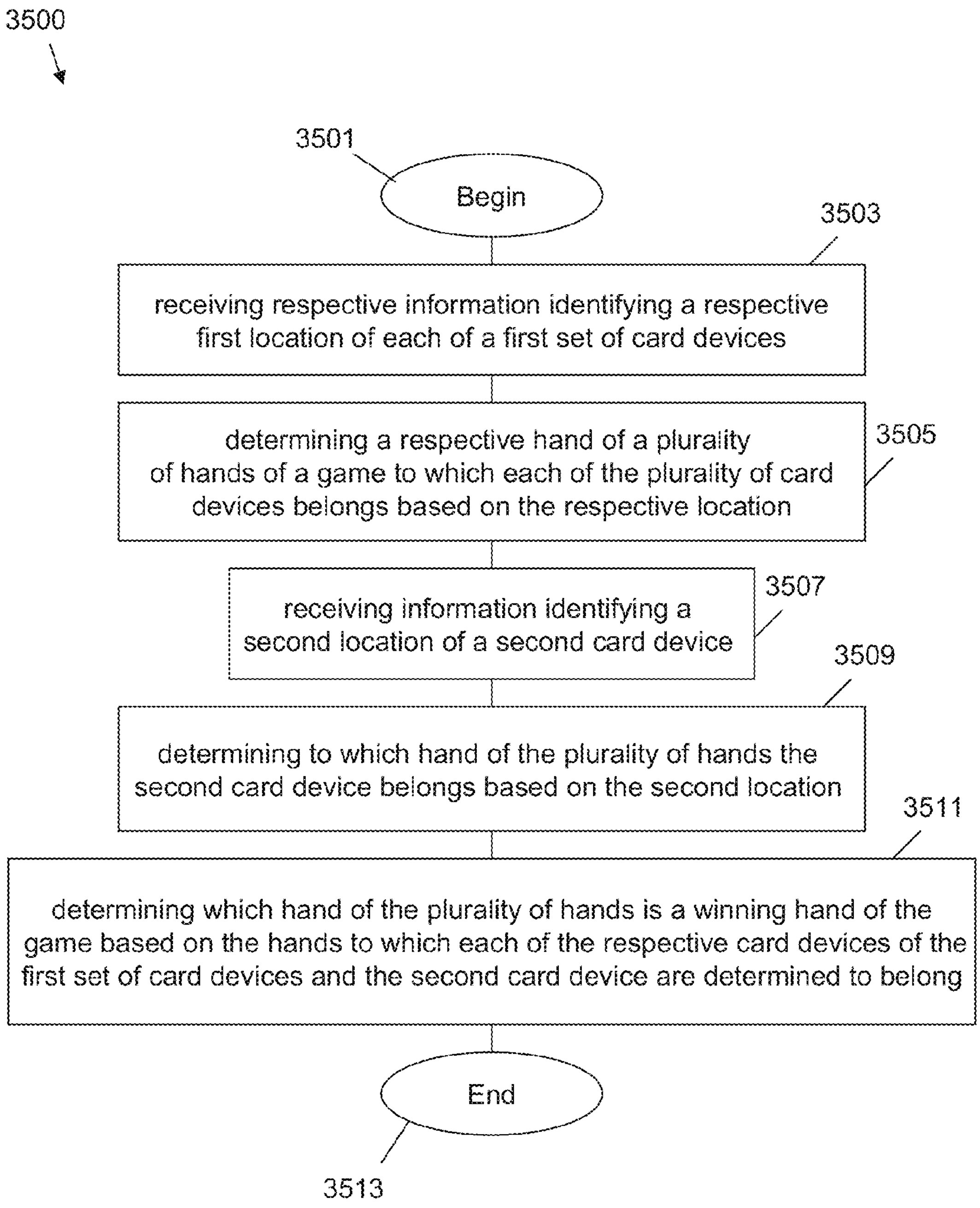

FIG. 35 illustrates an example method 3500 that may be performed in some embodiments. In some embodiments, method 3500 may be performed by a gaming server, a system that is external to a card device, any desired group of servers, one or more particular systems, by a processor, by one or more card devices, and so on. Method 3500 may be performed to allow a player to play a game using a plurality of card devices. Method 3500 may begin at 3501.

Method 3500 may include receiving respective information identifying a respective first location of each of a first set of card devices as indicated at 3503. The information may be received by a server and/or processor (e.g., of a gaming server). In some embodiments, the information may be received form the card devices (e.g., from a location determination element of the card devices such as a GPS device and/or a device configured to triangulate locations based on signal strength from one or more other communication devices). The information may be received from a camera or other sensor configured to track the location of the card devices. The information may be received from a processor, process, thread, and so on configured to processes signal strengths from a communication element of each card device to triangulate the locations.

Method 3500 may include determining a respective hand of a plurality of hands of a game to which each of the plurality of card devices belongs based on the respective location as indicated at 3505. Determining the respective hand may include determining in which respective area of a table each card device is located and determining that each card device in a same respective area belongs to a same respective hand of the plurality of hands. Determining the respective hand may include determining in which direction forma communication device and/or deck device each card device is located and determining that each card device in a direction belongs to a same respective hand of the plurality of hands.

In some implementations, each card device of the first set of card devices may be controlled to display a card value, advertisement, and so on. Determinations may be made that such information should be displayed based on random event generations, gaming actions, and so on.

Method 3500 may include receiving information identifying a second location of a second card device as indicated at 3507. The information may be received by a server and/or processor (e.g., of a gaming server). In some embodiments, the information may be received form the card device (e.g., from a location determination element of the card device such as a GPS device and/or a device configured to triangulate locations base don signal strength from one or more other communication devices). The information may be received from a camera or other sensor configured to track the location of the card device. The information may be received from a processor, process, and so on configured to processes signal strengths from a communication element of each card device to triangulate the location. The information may indicate a change of location from an original location to a later location.

Method 3500 may include determining to which hand of the plurality of hands the second card device belongs based on the second location as indicated at 3509. Determining the hand may include determining in which respective area of a table the second card device is located and determining that the second card device belongs to a same hand as the card devices of the first set of card devices that are also located in the same area. Determining the hand may include determining in which direction from a communication device and/or deck device the card device is located and determining that the second card device belongs to a same hand as card devices of the first set of card devices located in the same direction.

In some implementations, the second card device may be controlled to display a card value, advertisement, and so on. Determinations may be made that such information should be displayed based on random event generations, gaming actions, and so on. In some implementations, the location may be used to determine a gaming action. Such an action may include adding the second card to the hand (e.g., a hit, etc.). In some implementations, one of the first set of card devices may be removed from the hand and replaced by the second card device (e.g., a draw).

Method 3500 may include determining which hand of the plurality of hands is a winning hand of the game based on the hands to which each of the respective card devices of the first set of card devices and the second card device are determined to belong as indicated at 3511. For example, card values assigned to card devices assigned to each respective hand may be compared to one another to determine which hand has a highest set of card values (e.g., according to a rule of a game). For example, card values assigned to card devices assigned to each respective hand may be compared to a dealer hand to determine which hands beat the dealer hand (e.g., according to a rule of a game).

Method 3500 may end as indicated at 3513. It should be recognized that other embodiments may include other actions, additional actions, fewer actions, and so on.

7. Actions Based on Location

Figure 36:
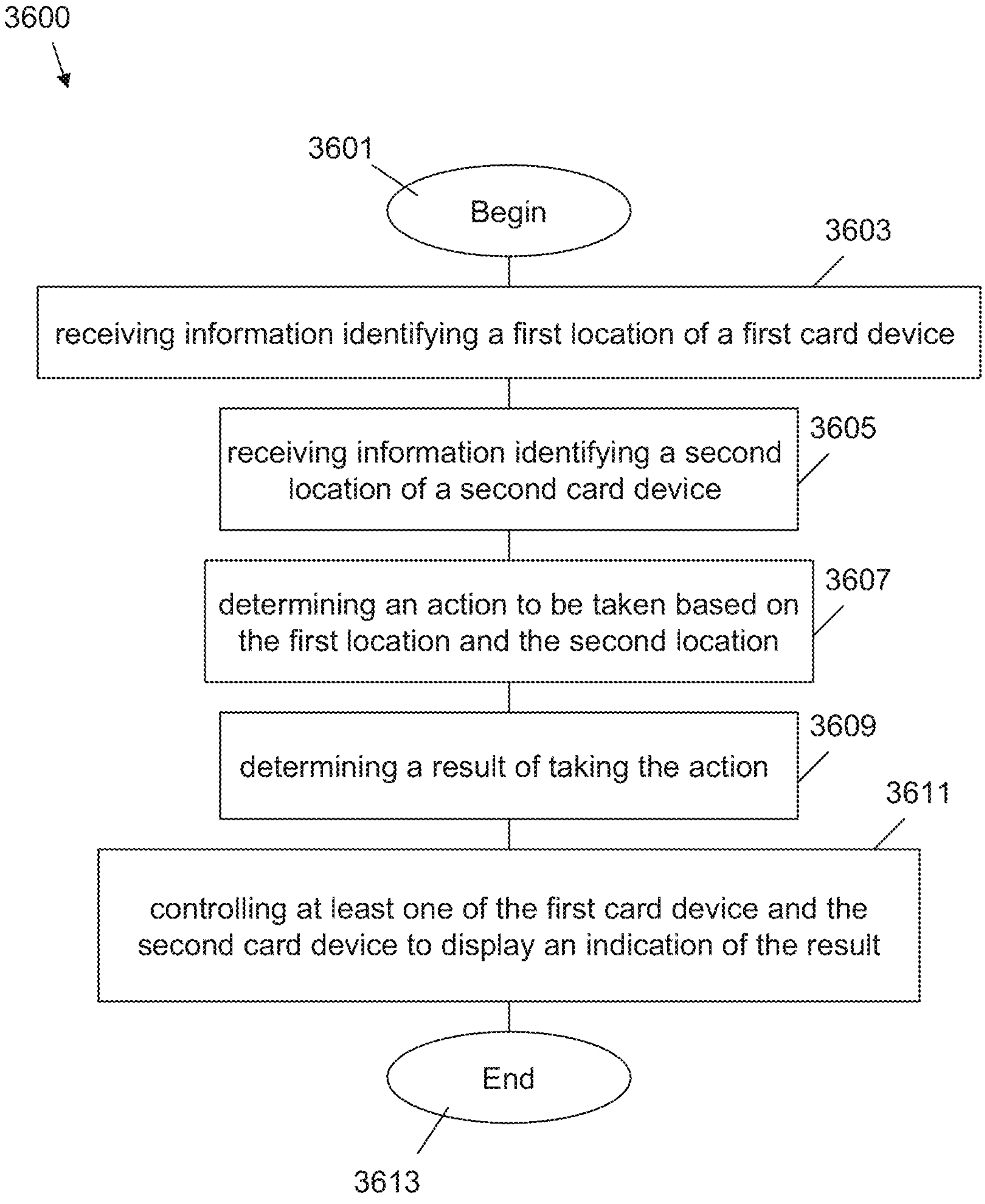

FIG. 36 illustrates an example method 3600 that may be performed in some embodiments. In some embodiments, method 3600 may be performed by a gaming server, a system that is external to a card device, any desired group of servers, one or more particular systems, by a processor, by one or more card devices, and so on. Method 3600 may be performed to allow a player to play a game using a plurality of card devices. Method 3600 may begin at 3601.

Method 3600 may include receiving information identifying a first location of a first card device as indicated at 3603. Some examples of receiving such information are described above.

Method 3600 may include receiving information identifying a second location of a second card device as indicated at 3605. Some examples of receiving such information are described above.

Method 3600 may include determining an action to be taken based on the first location and the second location as indicated at 3607. For example, in some implementations, a direction of one card device with respect to another may be used to indicate an action. For example, in some implementations, a location of each of the card devices may be used to indicate an action. For example, in some implementations, a proximity of one card device to another be used to indicate an action.

In some implementations, a third location of the second card device that corresponds to a location where the second card device was located before it was located at the second location may be received. Such a third location may be used to determine the action. In some embodiments, a movement of the second card device from the third location to the second location with reference to the first location may be used to determine the action. For example, a movement of the second card device from a location that is close to the location of the first card device to a location that is far from the first card device may indicate a particular action (e.g., a split).

Method 3600 may include determining a result of taking the action as indicated at 3609. Determining the result may include determining a card value for display one or both of the card devices. Determining the result may include determining an outcome of a game being played using the card devices. Determining the result may include determining the result based on a random event generation.

Method 3600 may include controlling at least one of the first card device and the second card device to display an indication of the result as indicated at 3611. Various examples of controlling a card device to display information are described above. Displaying the result may include displaying a card value, displaying an indication of an outcome of a game, and so on.

Method 3600 may end as indicated at 3613. It should be recognized that other embodiments may include other actions, additional actions, fewer actions, and so on.

8. Actions Based on Orientation

Figure 37:
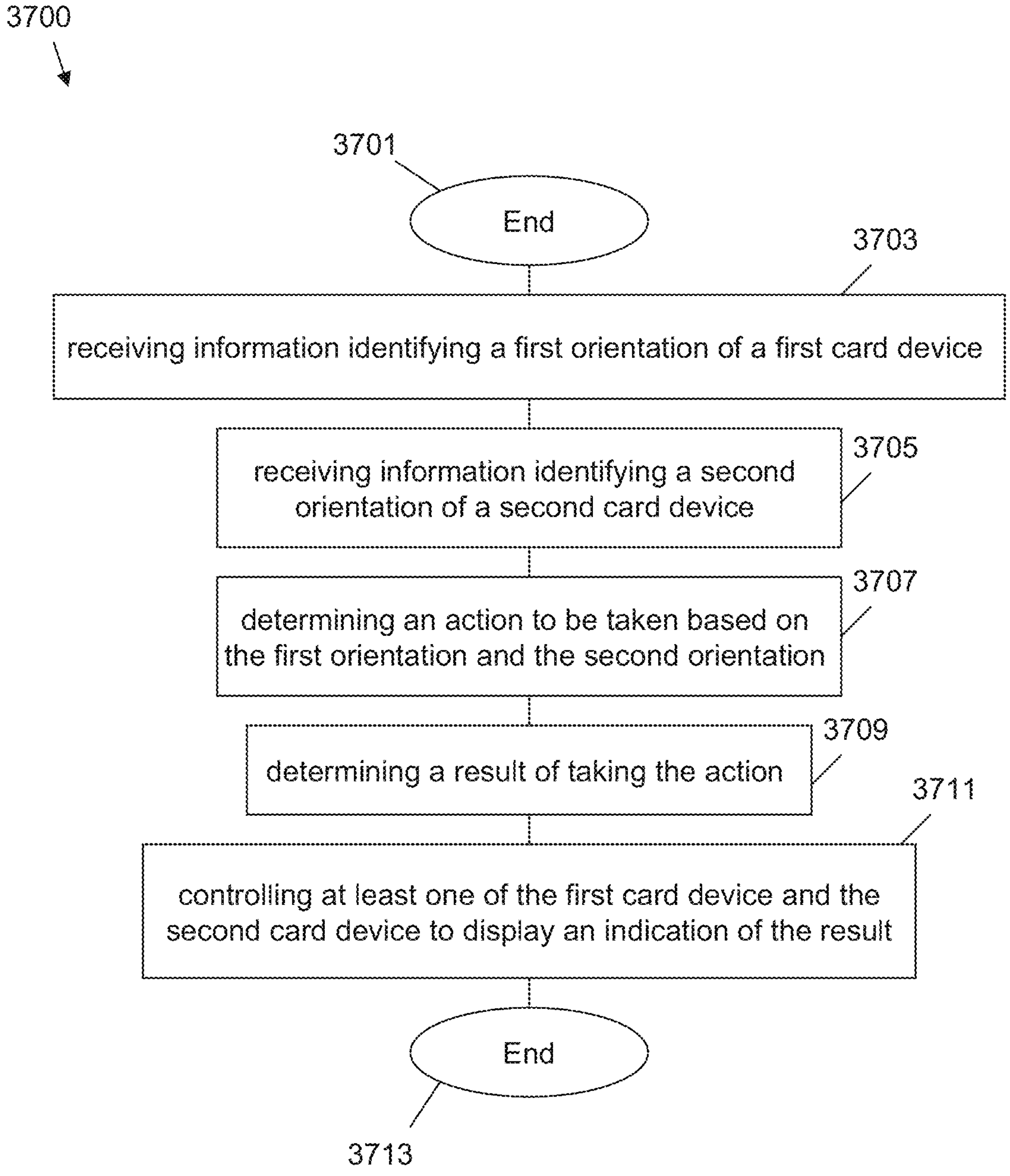

FIG. 37 illustrates an example method 3700 that may be performed in some embodiments. In some embodiments, method 3700 may be performed by a gaming server, a system that is external to a card device, any desired group of servers, one or more particular systems, by a processor, by one or more card devices, and so on. Method 3700 may be performed to allow a player to play a game using a plurality of card devices. Method 3700 may begin at 3701.

Method 3700 may include receiving information identifying a first orientation of a first card device as indicated at 3703. In some implementations, the information may be received from the first card device (e.g., based on information provided by an orientation determination element such as a gyroscope and/or accelerometer). In some implementations, the information may be received from a sensor, a camera, a communication device, and or any other element configured to determine the orientation information.

Method 3700 may include receiving information identifying a second orientation of a second card device as indicated at 3705. In some implementations, the information may be received from the second card device (e.g., based on information provided by an orientation determination element such as a gyroscope and/or accelerometer). In some implementations, the information may be received from a sensor, a camera, a communication device, and or any other element configured to determine the orientation information.

Method 3700 may include determining an action to be taken based on the first orientation and the second orientation as indicated at 3707. For example, in some implementations, an orientation of one card device with respect to another may be used to indicate an action. For example, in some implementations, an angle of the card devices with respect to each other may be used to indicate an action. For example, in some implementations, a ninety degree angle may be used to indicate an action.

In some implementations, a third orientation of the second card device that corresponds to an orientation of the second card device before it was oriented in the second orientation may be received. Such a third orientation may be used to determine the action. In some embodiments, a movement of the second card device from the third orientation to the second orientation with reference to the first orientation may be used to determine the action. For example, a movement of the second card device from an orientation that is parallel with the first card device to an orientation that is perpendicular to the first card device (and/or the opposite) may indicate a particular action (e.g., a split, a request for information, a hit, a fold, etc.).

Method 3700 may include determining a result of taking the action as indicated at 3709. Determining the result may include determining a card value for display one or both of the card devices. Determining the result may include determining an outcome of a game being played using the card devices. Determining the result may include determining the result based on a random event generation.

Method 3700 may include controlling at least one of the first card device and the second card device to display an indication of the result as indicated at 3711. Various examples of controlling a card device to display information are described above. Displaying the result may include displaying a card value, displaying an indication of an outcome of a game, and so on.

Method 3700 may end as indicated at 3713. It should be recognized that other embodiments may include other actions, additional actions, fewer actions, and so on.

9. Card Value Replacement

Figure 38:
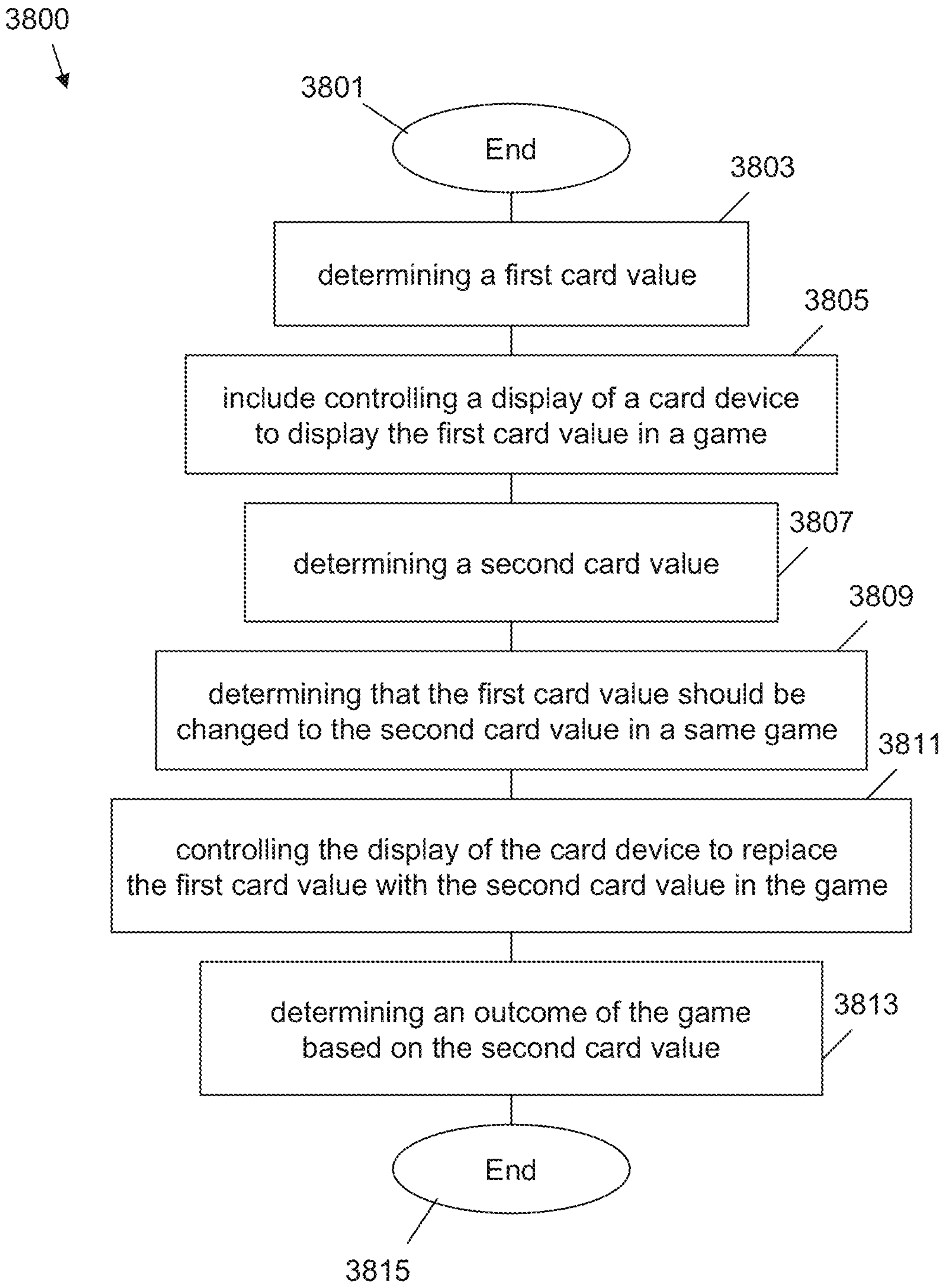

FIG. 38 illustrates an example method 3800 that may be performed in some embodiments. In some embodiments, method 3800 may be performed by a gaming server, a system that is external to a card device, any desired group of servers, one or more particular systems, by a processor, by one or more card devices, and so on. Method 3800 may be performed to provide advertising opportunities related to gaming on card devices. Method 3800 may begin at 3801.

In some implementations, information identifying an advertisement may be received. In some implementations, the information may include an advertising plan as described above. The information may include information identifying when the advertisement should be displayed.

Method 3800 may include determining a first card value as indicated at block 3803. Method 3800 may include controlling a display of a card device to display the first card value in a game as indicated at 3805. Various examples of such control are described above. In some implementations, the control may simulate dealing a card value in a hand made up of one or more other card devices. Method 3800 may include determining a second card value as indicated at block 3807.

Method 3800 may include determining that the first card value should be changed to the second card value in a same game as indicated at 3809. In some implementations, such a determination may include a determination that the advertisement should be displayed on a card device.

In one embodiment, determining the first card value may include determining the first card value based on a random event generation. In such an embodiment, determining the second card value may include determining the second card value based on at least one other card value associated with a hand to which the first card value may be dealt (e.g., card values displayed on other card devices of a same hand as the card device). In some implementations, the second card value may be determined so that the hand results in a winning hand. In some such implementations, determining that the advertisement should be displayed and/or that the first card value should be replaced with the second card value may include determining that the first card value would result in the hand being a losing hand.

In another embodiment, determining the second card value may include determining the second card value based on a random event generation. In such an embodiment, determining the first card value may include determining the first card value based on at least one other card value associated with a hand to which the first card value may be dealt (e.g., card values displayed on other card devices of a same hand as the card device). The first card value may be determined so that the hand results in a losing hand. In some such implementations, determining that the advertisement should be displayed and/or that the first card value should be replaced with the second card value may include determining that the second card value would result in the hand being a wining hand.

Method 3800 may include controlling the display of the card device to replace the first card value with the second card value in the game as indicated at 3811. Some implementations may include controlling the display of the card device to display the advertisement before making the replacement and/or after making the replacement.

Method 3800 may include determining an outcome of the game based on the second card value as indicated at block 3813. In some implementations, the second card value may be used in such a determination even if the first card value would have been dealt according to standard rules. Accordingly, an operator and/or advertiser may save a hand that might otherwise be a losing hand and turn it into a winning hand by changing a card value during the play of a game outside of the rules of the game.

Method 3800 may end as indicated at 3815. It should be recognized that other embodiments may include other actions, additional actions, fewer actions, and so on.

10. Draw Poker

Figure 39:
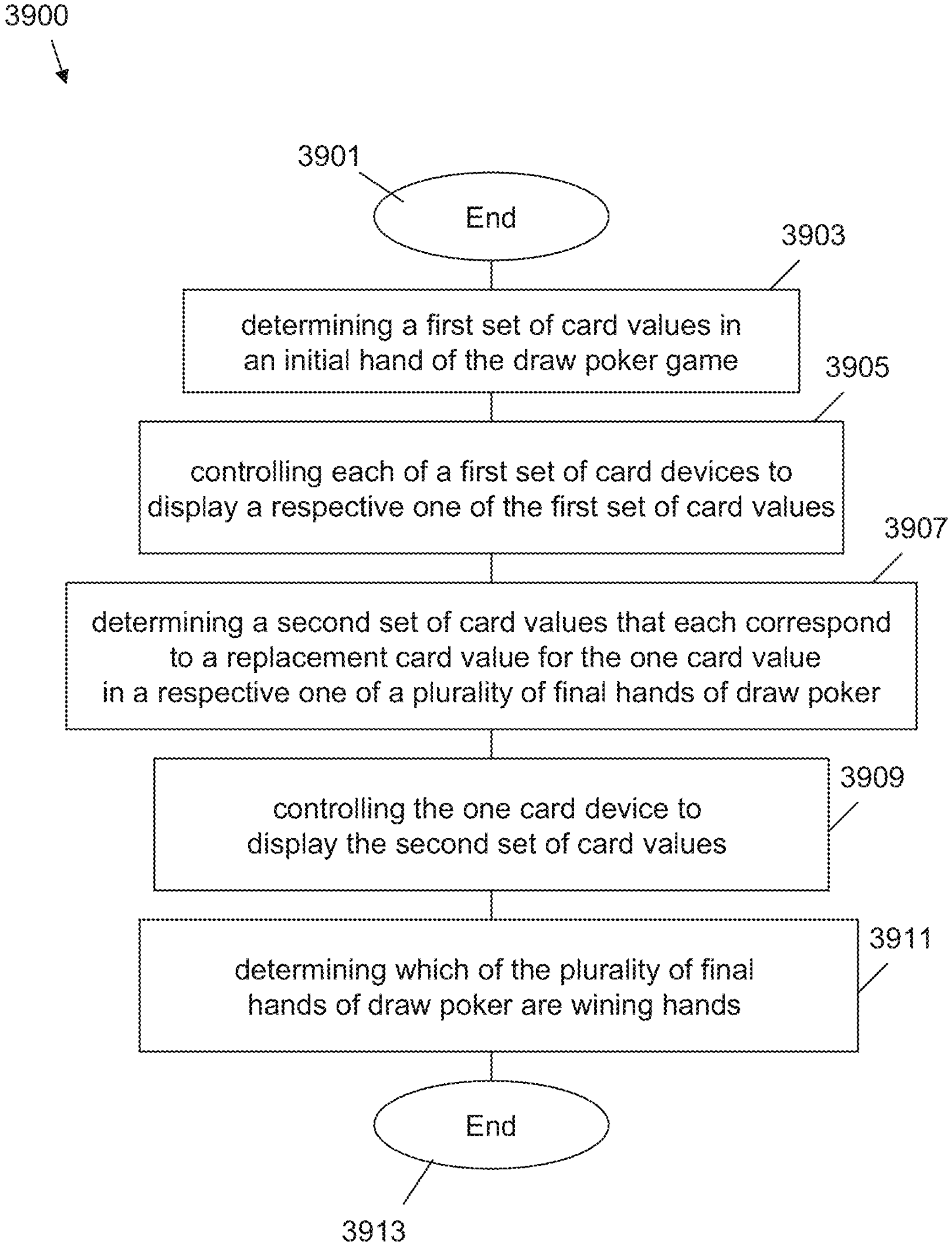

FIG. 39 illustrates an example method 3900 that may be performed in some embodiments. In some embodiments, method 3900 may be performed by a gaming server, a system that is external to a card device, any desired group of servers, one or more particular systems, by a processor, by one or more card devices, and so on. Method 3900 may be performed to allow a user to play multiple hands of a draw poker game using card devices. Method 3900 may begin at 3901.

Method 3900 may include determining a first set of card values in an initial hand of the draw poker game as indicated at 3903. The first set of card values may be determined based on at least one random event generation. The first set of card devices may include a based set of card values from which a plurality of final hands of draw poker may be based.

Method 3900 may include controlling each of a first set of card devices to display a respective one of the first set of card values as indicated at 3905. Examples of controlling card devices are described above.

Method 3900 may include receiving an indication of a request to replace one card value of the first set of card values that is displayed on one card device of the first set of card devices in the game of draw poker as indicated at 3907. Such an indication may be received from one of the card devices, from a dealer, from an interface, and so on. In some implementations, such an indication may include an indication of a location of one or more of the card devices, an indication of an orientation of one or more of the card devices, an indication of a selection of an action from an interface of one or more of the card devices, a deck device, another interface, and so on.

Method 3900 may include determining a second set of card values that each correspond to a replacement card value for the one card value in a respective one of a plurality of final hands of draw poker as indicated at 3909. The second set of card values may be determined based on the at least one random event generation. The second set of card values may each correspond to a value in a respective final hand of draw poker that includes unreplaced values from the first set of card values.

Method 3900 may include controlling the one card device to display the second set of card values as indicated at 3911. Various examples of controlling a card device to display card values are described above. In some implementations, each card value may be display in a separate section that does not overlap with other sections. For example, a grid of card values may be displayed.

Method 3900 may include determining which of the plurality of final hands of draw poker are wining hands as indicated at 3913. Such a determination may be made according to standard rules of the game. For example, a jacks or better game may be played in which winning hands have at least a pair of jacks. Any other desired game rules may be used in other embodiments. In one example, each hand may include a respective one of the second set of card values and the first set of card values without the replaced card value. In other examples, other card values may also have been replaced with respective other sets of card values. In such examples, one card value of each such set may be part of a hand for each one card value of the second set.

Method 3900 may end as indicated at 3915. It should be recognized that other embodiments may include other actions, additional actions, fewer actions, and so on.

11. Miscellaneous

It should be recognized that the example methods illustrate some example concepts described herein and that various embodiments may include any number in any combination including none and all of such concepts. For example, orientation and location may be used to determine gaming actions in a game of draw poker to which an advertisement may be displayed depending on an outcome of the game.

K. Miscellaneous

1. Device to Device Communication

In some embodiments card devices may communicate with each other. In some embodiments, for example, one card device may act as a master of other card devices and rely information to the other card devices, or otherwise control the other card devices. In some implementations, a first card device may communicate orientation and/or location to other card devices. Such other card devices may take actions based on this information. Such an implementations may be used, for example, in social based gaming, in embodiments with a distribute system rather than a central system, and so on.

In some embodiments, card devices may use a communication signal to determine proximity to other card devices or other things. For example, a card device may transmit a signal to nearby card devices. The signal may identify the card device. A strength of the signal may be used by the other card devices to determine a distance that the card device is located form the other card devices. In some implementations, actions may be taken based on such distance (e.g., as described above with respect to movement based actions). For example, a gaming and/or social action may be taken based on such a distance.

It should be recognized that device to device communication may take any form and be used to provide any desired functionality.

2. Example Wagering

In some embodiments, a player may wager on games using a card device. The games may be played on the card device and/or not on the card device. For example, in some implementations, a user may use an interface of a card device to indicate that a bet should be placed on a game played using the card device or another game such as one played at a table without the card device or one played using other card devices.

In some implementations, a gaming server, other server(s), and/or some other element, may cause a card device to display a wagering interface through which a player may place a wager on a game. A wager may be placed through the interface. The interface may allow the user to select various wager amounts and wagerable events, such as betting on a game of cards, etc. The interface may be shown during a game played on the card device, before a game played on the card device, and so on. The interface may include various wagering options, such as wager on a win, wager on a particular result, buy insurance, wager on a lose, wager on another player, and so on.

A wager may be placed using credit that is later resolved (e.g., when paying for a room), using funds in an account which may be accessible through the card device and/or server (e.g., a banking account, an account with a casino, a credit card account, etc.) and/or in any other desired way. Such an account or credit or other means of wagering may be established before placing a wager (e.g., through the interface), and may be accessible through one or more servers (e.g., by communicating with a bank, etc.).

An indication that a wager is desired may be received, e.g., by a server f in some embodiments. The indication may include an indication that a wager was selected through the interface, that a wager was otherwise selected (e.g., in some implementations, play of a game may include a default wager movement may indicate a wager, another interface may be used to select a wager, and so on). The server may take any desired action in response. For example, in some implementations, an indication of the wager may be required before a game may continue and/or begin, so a server may allow a game to continue and/or start a game after receiving the indication of the wager. In some implementations, an account hold may be placed on a n account and/or a removal of an amount of money from an account may be made e.g., for the wagered amount.

An outcome of a wager may be determined based on an outcome of a game. The game may be the game played on the card device and/or some other game. The outcome of the game may be determined by the same server that determines the outcome of the wager, some other server, and/or some other component. In some implementations, the outcome of the wager may include an amount of a winning, a loss of a wagered amount, a return of a wagered amount (e.g., in a tie), application of the amount wagered to another wager (e.g., in a tie), and so on. Determining the outcome of the wager may include determining the outcome of a game, receiving an indication of the outcome of the game and or any desired actions.

In response to determining the outcome of the wager, any action with regard to an account may be taken. For example, in some implementations, an amount of money may be removed from an account in response to a loss, an amount of money may be returned to the account, in response to a tie, an amount of money may be added to the account, and so on. Such an action may be taken by any desired server or other component (e.g., through communication with a bank). In some implementations, a card device may be controlled to display an outcome of a wager, a running account total, and so on.

It should be recognized that various examples of wagering may take place involving a card device as desired in various embodiments. In some implementations, for example, a wager on a game that is played on a card device may be made without use of the card device. For example, such a wager may be made using chips at a table.

3. Various Devices

It should be recognized that while various embodiments herein are described with respect to card devices, that other embodiments may be implemented with other devices. For example, in some embodiments, one or more cellular telephones, cordless telephones, wireless gaming devices, display screens, ebook readers, PDAs, MP3 players, and so on may be used. Such devices may be used in any number and/or combination in various embodiments. For example, such devices may be used to play games as described above with respect to card devices.

4. Miscellaneous

It should be understood that various examples are described herein that may be used in various embodiments in any combination. Examples are given as non-limiting examples and other embodiments may include some, all or none of the features, elements, and/or actions described. For example, other embodiments may include different sized devices (e.g., trading card sized, paper sheet sized, etc.), different games (e.g., poker games, collectible card games, etc.), and so on.

What is claimed is:

1. An apparatus comprising:
- a card device comprising:
  - a substrate having a front face and a back face;
  - a display coupled to the front face of the substrate; and
  - an element coupled to the substrate and configured to:
    - receive an indication of a first card value;
    - control the display to display the first card value;
    - receive an indication of a second card value;
    - receive an advertisement to display on the display; and
    - control the display to replace the first card value with the second card value and to display the advertisement;
  - in which the card device has a combined length, width, and height substantially similar to a playing card and has a combined structure that is flexible; and
- a computing device configured to:
  - receive information identifying the advertisement;
  - determine that the advertisement should be displayed on the card device based on a result of a hand of a game that includes the second card value and at least one other card value displayed on at least one other card device;
  - determine the first card value; and
  - determine the second card value.

2. The apparatus of claim 1, in which determining that the advertisement should be displayed includes determining that the advertisement should be displayed based on a result of a hand of a game that includes the second card value and at least one other card value displayed on at least one other card device.

3. The apparatus of claim 1, in which the server is configured to determine an outcome of a hand of a game being played using the card device in which both the first card value and the second card value are dealt, in which the outcome is based on the second card value rather than the first card value.

4. The apparatus of claim 1, in which determining the first card value includes determining the first card value based on a random event generation, and in which determining the second card value includes determining the second card value based on at least one other card value associated with a hand to which the first card value is dealt.

5. The apparatus of claim 4, in which determining the second card value includes determining the second card value such that the hand results in a winning outcome in response to determining that the advertisement should be displayed.

6. The apparatus of claim 4, in which the at least one random event generation includes at least one of a random number generation, a random event happening, and a pseudo-random number generation.

7. The apparatus of claim 4, in which determining that the advertisement should be displayed includes determining that the first card value results in a losing outcome for the hand and that the second card value will be presented to overturn the losing outcome.

8. The apparatus of claim 1, in which determining the second card value includes determining the second card value based on a random event generation, and in which determining the first card value includes determining the first card value based on at least one other card value associated with a hand to which the first card value is dealt.

9. The apparatus of claim 8, in which determining the first card value includes determining the first card value such that the hand results in a losing outcome.

10. The apparatus of claim 8, in which the at least one random event generation includes at least one of a random number generation, a random event happening, and a pseudo-random number generation.

11. The apparatus of claim 8, in which determining that the advertisement should be displayed includes determining that the second card value results in a winning outcome for the hand and in which the first card value is determined so that the hand results in a losing outcome in response to determining that the advertisement should be displayed.

12. The apparatus of claim 1, in which the server is configured to control the first card device and a plurality of other card devices to be part of a hand in a game.

13. The apparatus of claim 12, in which the server is configured to determine an outcome of the hand based on the second card value and a plurality of respective other card values displayed on the plurality of other card devices.

14. The apparatus of claim 13, in which the card device has a thickness of less than about 0.011 inches.

15. The apparatus of claim 1, in which the card device includes a second display coupled to the back face;

in which displaying the first card value and displaying the second card value includes displaying the respective card value to occupy substantially the entire display;

in which the server is configured to control the first card device and a plurality of other card devices to be part of a hand in a game;

in which the server is configured to determine an outcome of the hand based on the second card value and a plurality of respective other card values displayed on the plurality of other card devices;

in which a card value includes a suit and a rank of a card;

in which the element includes a processor;

in which the element controls the display to display the advertisement between displaying the first card value and displaying the second card value;

in which determining the first card value includes determining the first card value based on a random event generation, and in which determining the second card value includes determining the second card value based on at least one other card value associated with a hand to which the first card value is dealt; and in which the card device has a thickness of less than about 0.02 inches.

16. The apparatus of claim 1, in which the element controls the display to display the advertisement between displaying the first card value and displaying the second card value.

17. The apparatus of claim 1, in which the display includes a flexible organic light emitting diode display.

18. The apparatus of claim 1, in which the card device includes a wireless power element configured to provide power from at least one of a time varying magnetic field and an RF signal generated by a power source that is not in physical contact with the wireless power element.

19. The apparatus of claim 1, in which the card device has a thickness of less than about 0.02 inches.

20. The apparatus of claim 1, in which the advertisement includes at least one of an image, a video, and text.

21. The apparatus of claim 1, in which the substrate is bendable without interfering with operation of the display.

22. The apparatus of claim 1, in which the card device includes a second display coupled to the back face.

23. The apparatus of claim 1, in which displaying the first card value and displaying the second card value includes displaying the respective card value to occupy substantially the entire display.

24. The apparatus of claim 1, in which a card value includes a suit and a rank of a card.

25. The apparatus of claim 1, in which the element includes a processor.

* * * * *